United States Patent [19]

Colton et al.

[11] Patent Number: 4,529,839

[45] Date of Patent: Jul. 16, 1985

[54] MULTILOCATION VIDEO CONFERENCE TERMINAL INCLUDING AN ARRANGEMENT TO REDUCE DISRUPTION IN VIDEO SWITCHING

[75] Inventors: John R. Colton, Freehold; Dominick Scordo, Middletown; David M. Simmons, Howell, all of N.J.

[73] Assignee: AT&T Bell Laboratories, Murray Hill, N.J.

[21] Appl. No.: 545,461

[22] Filed: Oct. 25, 1983

[51] Int. Cl.³ .................. H04M 11/00; H04M 3/56; H04N 7/14

[52] U.S. Cl. .............................. 179/2 TS; 179/18 BC

[58] Field of Search ................ 179/2 TS, 2 TV, 2 R, 179/18 BC; 370/62; 358/85

[56] References Cited

U.S. PATENT DOCUMENTS

| | | | |
|---|---|---|---|
| 3,519,744 | 7/1970 | Dorros et al. | 179/2 TS |
| 3,601,530 | 8/1971 | Edson et al. | 179/2 TS |
| 4,004,084 | 1/1977 | Brown et al. | 179/2 TS X |
| 4,054,908 | 10/1977 | Poirier et al. | 358/85 |

FOREIGN PATENT DOCUMENTS 56-122556  9/1981  Japan .............................. 179/18 BC

OTHER PUBLICATIONS

"Teleconferencing", *IEEE 1981 Conference on Communications*, vol. 2, pp. 31.2.1-4, Jun. 1981, by David W. Kennett.
Bernard A. Wright, "The Design of Picturephone ® Meeting Service (PMS) Conference Centers for Video Teleconferencing", *IEEE Communications Magazine*, pp. 30-36, Mar. 1983.
Audrey J. Kames and W. Gordon Heffron, "Human Factors Design of Picturephone ® Meeting Service", Globecom '82 *Conference Record*, vol. 3, pp. 976-981, 1982.

*Primary Examiner*—Keith E. George
*Attorney, Agent, or Firm*—Thomas Stafford

[57] ABSTRACT

In a Multilocation Conference Terminal (MLCT), disruptions in the video being viewed which are caused by switching from one conference location to another are minimized by delaying switching of the video signal until a so-called get ready control signal is received from the conference location to be viewed. The conference location transmits the get ready control signal a predetermined interval prior to transmitting a so-called fast video picture update in response to a request from a Multilocation Conference Terminal (MLCT). Additional possible disruptions in the video are eliminated by minimizing the number of fast video picture updates that are used to serve a multiplicity of requests from other conference locations. When multiple MLCTs are employed in a conference, the MLCTs communicate to each other the video select modes of all the conference locations in the conference, i.e., a manual select mode or an automatic select mode. Then, the video select mode information is used to minimize the number of fast video picture updates needed to serve conference locations in the automatic select mode.

11 Claims, 68 Drawing Figures

CROSS CONNECT FRAME FORMAT

FIG. 9 CROSS-CONNECT TIME SLOT ASSIGNMENTS

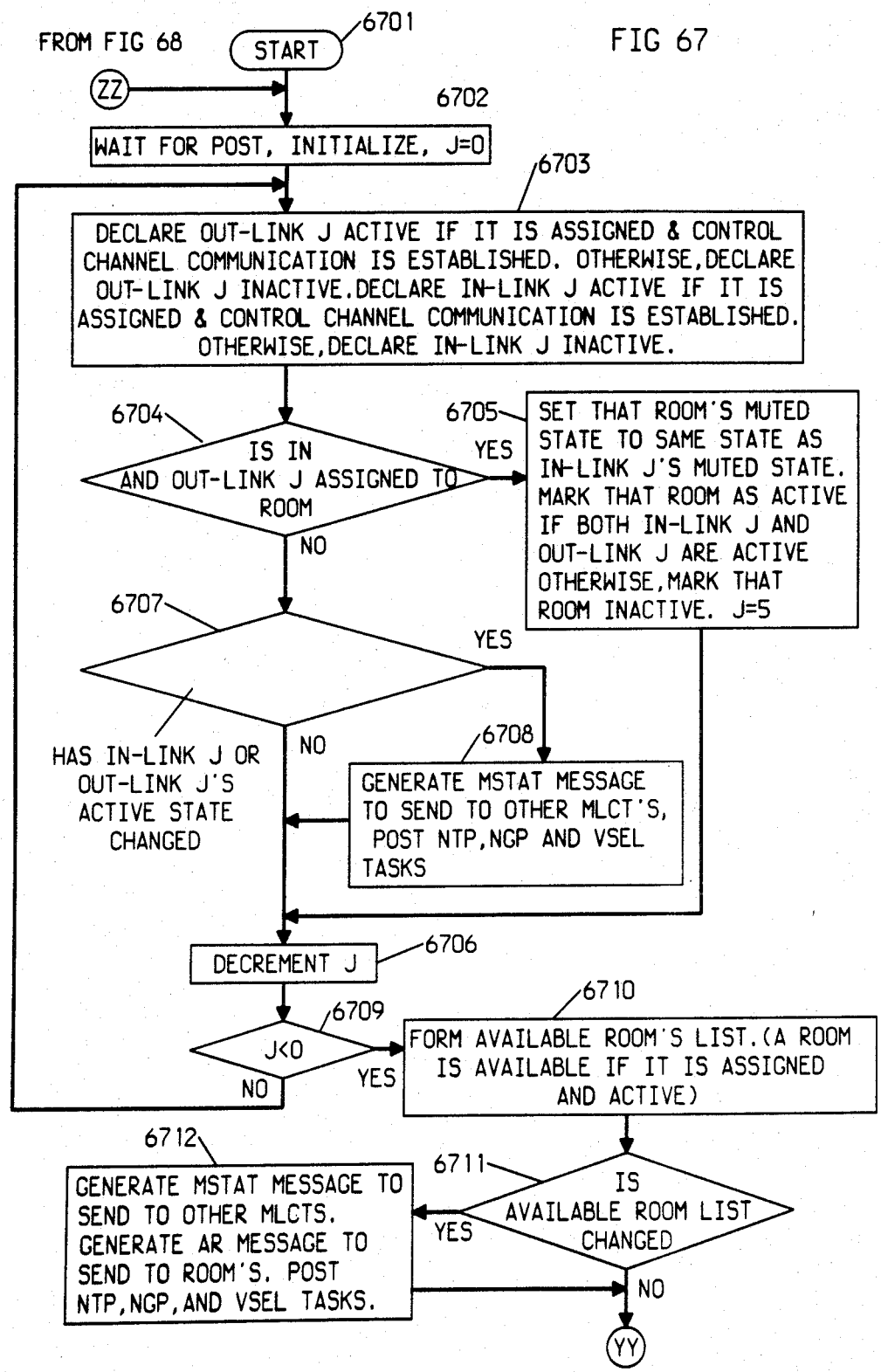

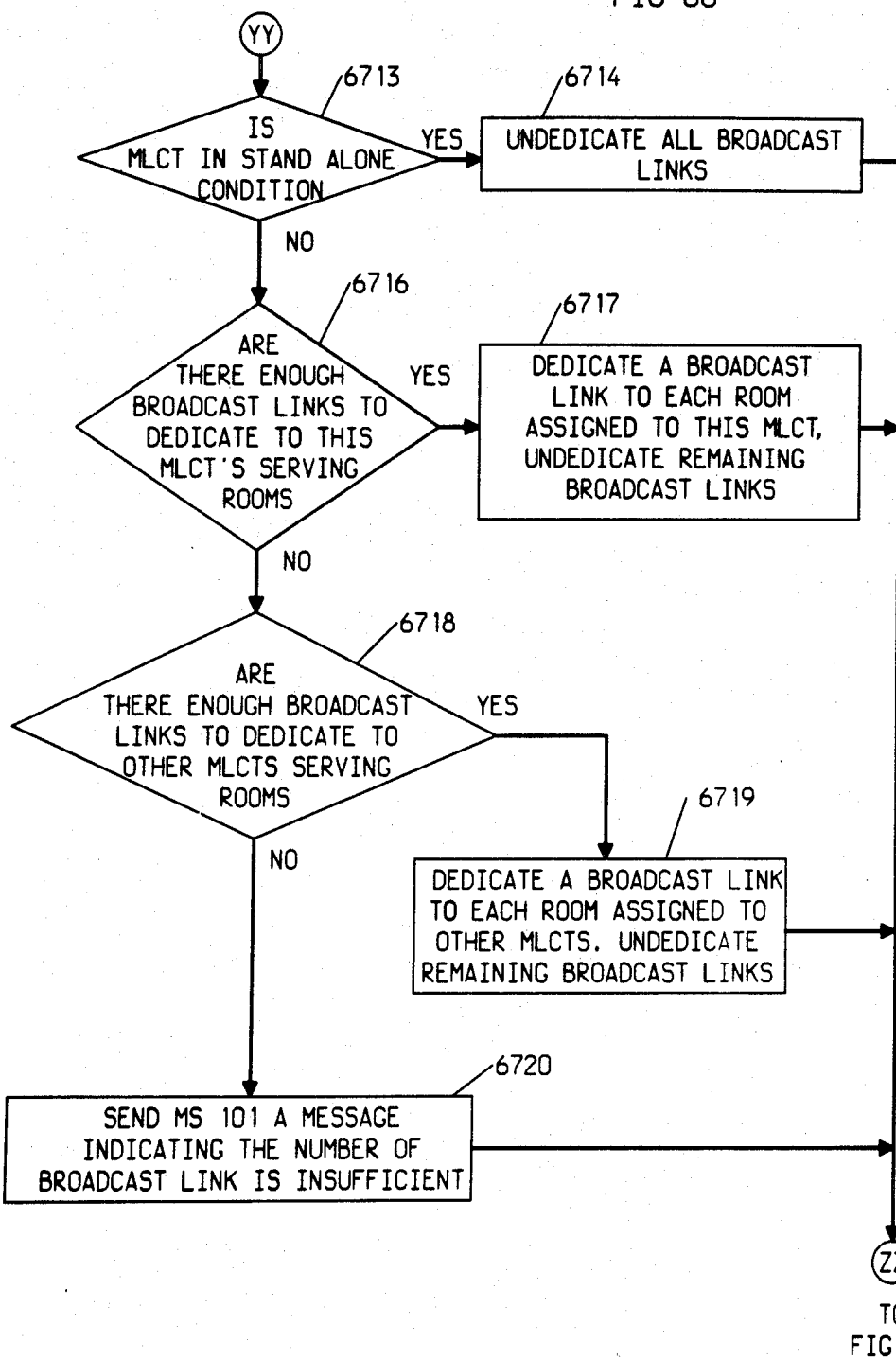

MULTILOCATION VIDEO CONFERENCE TERMINAL INCLUDING AN ARRANGEMENT TO REDUCE DISRUPTION IN VIDEO SWITCHING

RELATED APPLICATIONS

U.S. patent applications Ser. No. 545,206 (J. R. Colton et al (Case 10-2-1), Ser. No. 545,761 (J. R. Colton et al (Case 11-3-2), Ser. No. 545,363 (D. Scordo Case 5), Ser. No. 545,364 (D. Scordo Case 7), and Ser. No. 545,162 (D. Scordo Case 8) were filed concurrently herewith.

TECHNICAL FIELD

This invention relates to audio-visual conferencing systems and, more particularly, to a system for controllably connecting a plurality of conference locations together including substantial reduction in disruption of the video being viewed during switching of the video signal from one location to another location.

BACKGROUND OF THE INVENTION

Heretofore, analog video signals were used in multilocation video conference arrangements. The analog video signal includes complete picture information all the time. In more recent video conference arrangements, digital video signals have been employed advantageously to compress the required transmission bandwith. These digital signals, however, do not include complete picture information all of the time and, typically, only transmit changes in the video picture scene. When the whole scene changes, a so-called fast video picture up-date is generated having a low resolution of the entire scene. In systems in which the digital video signal to be viewed is switched from one conference location to another, there is a possible disruption in the video signal being viewed when the switch is made and the fast picture update is not received shortly thereafter. This can result from transmission delays and the like. These disruptions are annoying to the conferees and, therefore, should be minimized or eliminated.

SUMMARY OF THE INVENTION

Disruption in the video being viewed in a multi-location video conference caused by switching the video signal from one conference location to another is minimized, in accordance with an aspect of the invention, by employing a protocol between a Multilocation Conference Terminal (MLCT) and the conference locations. This protocol includes the MLCT requesting a fast picture update, i.e., complete video picture information from the conference location, and the conference location transmitting a so-called get-ready-for-fast-update control signal to the MLCT prior to transmitting the fast video picture update. The MLCT does not switch the video information to be viewed from the conference location until it has received the get-ready-for-fast-update control signal.

Additional possible disruptions in the video picture are minimized by employing a single fast video picture update to serve multiple requests for fast picture updates and by controllably ignoring fast picture update requests that have been or are being satisfied by a previously generated fast picture update.

Further possible disruptions in the video picture are minimized by delaying the processing of fast picture update requests for the video from a conference location until a predetermined interval has elapsed since the last fast picture update request was processed for that particular conference location.

When multiple MLCTs are connected in a conference, the MLCTs communicate to each other the video select modes of all the conference locations in the conference, i.e., a manual select mode or an automatic mode. The video select mode information is utilized by the MLCT so that only one fast picture update is needed to serve all conference locations in the automatic video select state.

BRIEF DESCRIPTION OF THE DRAWINGS

The invention will be more fully understood from the following detailed description of an illustrative embodiment taken in connection with the appended figures in which:

FIGS. 67 and 68 when connected as shown form a flow chart of steps performed in facility administrator (FADMIN) program task by control processor 1006 of FIG. 39.

DETAILED DESCRIPTION

General

Figure 1:
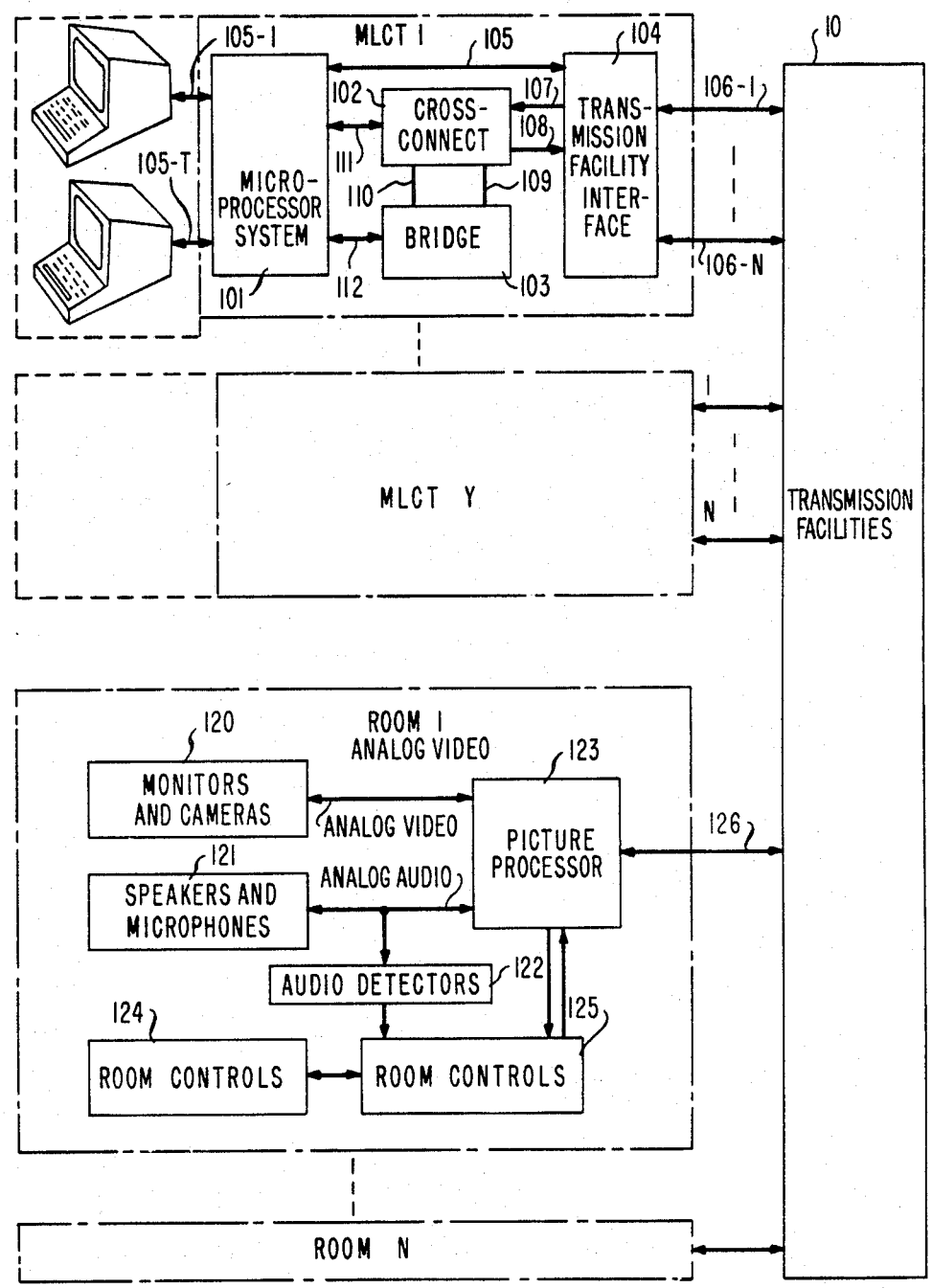
FIG. 1 shows in simplified block diagram form a system arrangement including a Multilocation Conference Terminal (MLCT) incorporating an embodiment of the invention.

The Multilocation Conference Terminal, hereinafter referred to as MLCT, is employed to establish and control a multilocation audiovisual teleconference in a Video Teleconferencing Service, hereinafter referred to as VTS, for conferences involving a plurality of VTS conference rooms. Accordingly, FIG. 1 shows in simplified block diagram form a system arrangement including a plurality of MLCT's, namely, MLCTs 1 through Y and a plurality of conference rooms, namely, rooms 1 through M, which may be controllably interconnected via the MLCT's and transmission facilities 10. Each of MLCTs 1 through Y includes a plurality of VTS communication ports, associated with data links 106-1 through 106-N, for interconnecting up to N rooms via transmission facilities 10. Transmission facilities 10 include both terrestrial communication channels and/or satellite channels. Additionally, facilities 10 also include arrangements for interconnecting one or more of the conference rooms, i.e., conference locations, to an associated MLCT for establishing a conference. These connections may be established manually or via switching apparatus, for example, a digital cross connect arrangement. When satellite channels are deployed a multiplicity of MLCTs are used to reduce the number of end-to-end satellite hops to a maximum of one. In the satellite mode of operation, the MLCTs form a distributed conferencing control structure.

A number of conference configurations are realizable including one or more MLCTs. For example, a single MLCT may be used to inlcude up to N=6 rooms in a conference over either local or long-haul terrestrial communication facilities. While it is possible to use only one MLCT in an all terrestrial conference, it is not necessary to do so. Two MLCT's can be connected terrestrially, allowing savings of transmission facilities. In a mixed satellite/terrestrial conference network, distributed conferencing is used with a MLCT being associated with each satellite earth station. Satellite and terrestrial connections remain unchanged during an ungoing conference.

Each of MLCTs 1 through Y provides a time-space-time switching function and includes microprocessor system 101, digital cross connect 102, bridge 103, transmission facility interface 104 and a plurality of data terminal ports 105-1 through 105-T. Data terminals may be connected to data terminal ports 105-1 through 105-T for manually providing teleconference setup information including VTS port assignment and other information needed for the ongoing conference. Where an operations support system or other reservation service computer is available, the data terminal ports are used to connect the MLCT thereto for carrying out the necessary conference setup and maintenance procedures.

As described hereinafter each MLCT provides audio mixing and video switching of encrypted digital VTS signals which are supplied via VTS ports and data links 106-1 through 106-N, respectively, to transmission facilities 10 and, in turn, to associated ones of rooms 1 through M and/or to another MLCT. In this example, each MLCT includes six (6) VTS ports, i.e., N=6.

Each of conference rooms 1 through M includes known audio and video equipment. For example, each room includes video monitors and cameras 120, speakers and microphones 121, audio detectors 122, picture processor 123, room controls 124 and room controller 125. Rooms substantially identical to rooms 1 through M are presently commercially available for point-to-point audiovisual conferences. Room controller 124 is arranged to respond to an auxiliary control channel signal in the VTS signal from an associated MLCT for controlling picture processor 123 in accordance with aspects of the invention as will be described below. Picture processor 123 is commercially available from Nippon Electric Corporation and is described in Western Electric Company KS-22456 specification. U.S. Pat. No. 3,601,530 discloses a video conference arrangement using voice-switched cameras in a conference room. Further details of the point-to-point conference room are broadly described in an article by Mr. Bernard A. Wright entitled, "The Design and Provisions of PIC-TUREPHONE Meeting Service (PMS) Conference Centers for Video Teleconferencing", in the *IEEE Communications Magazine*, pages 30–36, March 1983. Also seen an article by Audrey J. Kames and W. Gordon Heffron entitled, "Human Factors Design of PIC-TUREPHONE Meeting Service" in *GLOBECOM '82 Conference Record*, Volume 3, pages 976–981, November 1982 for a broad overview of the commercially available point-to-point video teleconferencing service.

Figure 2:
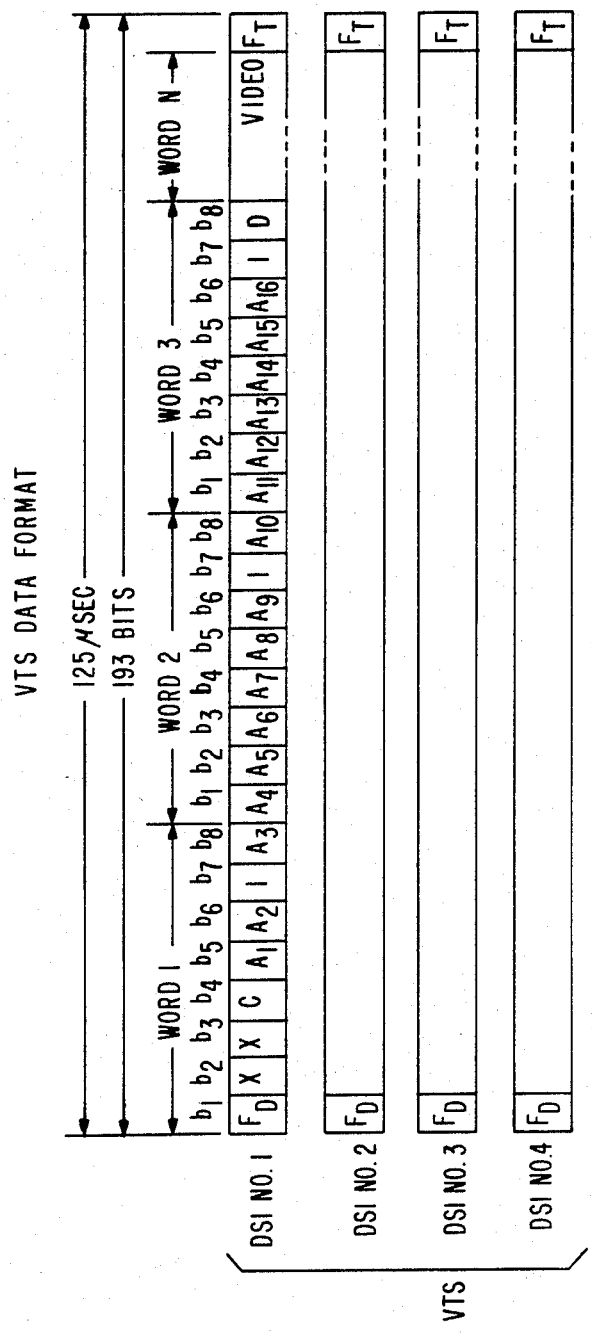
FIG. 2 depicts the VTS signal data format used in the system of FIG. 1.

As indicated above, the MLCTs are interconnected via transmission facilities 10 to associated ones of rooms 1-M and/or another one of the MLCTs through VTS ports 501-1 through 501-N (FIG. 5) and data links 106-1 through 106-N, respectively. The VTS signals are transmitted over one or more time division multiplexed channels, for example, T1 lines, depending on the data rate being employed. In this example, the data rates are selectable at 1.544, 3.088 or 6.176 Mb/sec. In a specific embodiment, two T1 lines are used having the 3.088 Mb/sec data rate with each T1 line having an incoming data link and an outgoing data link. The VTS data format is shown in FIG. 2. One of the T1 lines, designated DS-1 No. 1 carries encoded audio and control channels in addition to video data. The other T1 lines, designated DS-1 No. 2 through DS-1 No. 4 carry only video data. The T1 lines do not have standard DS-1 formats except for framing bits Ft.

The format for DS-1 No. 1 is a combination of three groups of information; one associated with the video signal; another with audio; and another with the control data channel. The control group consists of a single C-bit per frame located in word 1 bit 4, as shown in FIG. 2. The C-bit implements an 8 Kb/sec data link between the MLCT and the remote location communicating to it, i.e., either a room or another MLCT. The audio group consists of 16 audio bits, A1 to A16, a D-bit, as well as "1"s in the shown bit positions, all within the first three words of DS-1 No. 1. The A-bits represent two samples per frame of mu-255 coded audio. Bits A1 through A8 are audio bits belonging to a first sample of the audio signal. Bits A9 through A16 are audio bits belonging to the second sample of the audio signal. The audio may be encrypted or transmitted "on the clear". The D-bit is used for synchronization of the audio encryptor 1004 and a decryptor 1002 described below.

The first three words of the DS-1 No. 1 contain fixed "1"s in the shown position to maintain the required "1"s density during these words for all possible codes transmitted. The remaining bits in DS-1 No. 1, i.e., FD, X, X, and those of DS-1 No. 2 through DS-1 No. 4 contain video information. The MLCT does not process these remaining bit locations aside from maintaining their relative position throughout its switching function. Indeed, except for the information included in the C-bit position, the VTS data format is essentially identical to that employed in the existing point-to-point teleconferencing service available through American Telephone and Telegraph Company.

MLCT OPERATION-GENERAL

A Multilocation Conference Terminal (e.g., MLCT1, FIG. 1) located in a Video Teleconferencing Service (VTS) is connected via transmission facilities 10 to conference locations, i.e., rooms and other MLCTs dependent on the conference being set up.

The MLCT is always in one of the following modes:
Standby (SBY): In the standby mode the MLCT is not processing a conference. It is continually performing internal diagnostics to ensure that it is fully operational.
Sender's Choice (SC): A MLCT in the SC mode is set up to operate a SC conference.
Viewer's Choice (VC): A MLCT in the VC mode is set up to operate a VC conference.

No MLCT mode changes are allowed while the MLCT is processing a conference. To change modes the MLCT must first be removed from the conference.

The steps to set up the MLCT for a conference are as follows:
1. Enter command(s) into the MLCT through an input terminal connected to one of input ports 105-1 through 105-T to place it in the desired mode for the conference (VC,SC) and to define the MLCT's ID in the conference.
2. Setup transmission connections to the MLCT required for the conference.
3. Enter command(s) into the MLCT to assign the VTS ports as either:
   a. connected to a room (specify room ID).
   b. a broadcast link (outgoing transmission path to all other MLCTs in the conference) and/or a MLCT link (incoming transmission path from another MLCT, specify that MLCT's ID).

Once these steps are completed the conference is in progress and the MLCT will automatically set up and maintain communication with its serving rooms, i.e., rooms associated to it, and other MLCTs.

If communication over a VTS port connected to a room, e.g., room I, is lost (or is never established in the first place) the MLCT operates the conference without room I. No other room can view room I. The audio transmitted by room I is not muted unless audio decryptor 1002 (FIG. 10) detects a facility failure in the audio signal incoming from room I. The video transmitted to room I is selected by assuming that room is in the automatic video switching (AVX) mode. Thus, room I essentially becomes a spectator. Room I views a new talker room or a new graphics room as described below. The other rooms hear room I if its audio signal is not muted, but they cannot view room I.

If communication over a broadcast link or MLCT link is lost (or is never established in the fist place) the MLCT operates a conference for only the rooms that it serves.

Configuration changes to a conference already in progress are realized as follows:
1. If any of the MLCT's room, broadcast, or MLCT links are to be removed, then:
   a. Command(s) must be entered into the MLCT that unassign those links.
   b. The port connections to be removed are taken down.
2. If any room, broadcast, or MLCT links are to be added to the conference, then:
   a. The port connections just assigned are set up.
   b. Command(s) must be entered into the MLCT to assign each new port as connected to a room or as a broadcast link and/or MLCT link.

Any number of configuration changes can occur during a conference.

The microprocessor system (MS) 101 (FIG. 1) maintains control of the MLCT. Commands are entered through the links 105-1 through 105-T into the MS 101. The MS 101 interprets these commands and issues signals to set up the other components of the MLCT. The MS 101 is responsible for downloading the proper program code into bridge 103 when any MLCT mode change is performed and for informing the bridge on all the conference attributes (MLCT's ID and link assignments). MS 101 cannot communicate directly with other MLCTs or any room controllers.

Bridge 103 computes the weighted sums of the audio signals, receives the control signals that come over the incoming links from the rooms and other MLCTs, generates the control signals that are transmitted to the rooms and other MLCTs, signals MS 101 to execute video switches, and monitors the links to detect facility failures in the control and audio signals.

MS 101 and bridge 103 interact during a conference to perform two primary functions. Bridge 103 directs MS 101 to perform switching of the video signals. MS 101 and bridge 103 keep each other informed of link failures.

Cross-connect 102 and transmission facility interface 104 provide bridge 103 with audio and control signals, receive conferenced audio and control signals from bridge 103 and perform the switching of the video signals under the control of the MS 101.

The MLCT can be in one of three modes (SBY, SC, or VC) as described above. Bridge 103 can be in one of four states. Three of the bridge states correspond to the MLCT modes (SBY, SC, and VC). Bridge 103 enters the fourth state, called the kernel state, while MS 101 is downloading a new program code. The MLCT's mode and bridge state are set up prior to the start of the conference and do not change while the conference is in progress. By definition the MLCT mode and bridge state during a conference must be the same, either sender's choice or viewer's choice.

When the conference is first initiated, bridge 103 comes up in the stand alone (SA) condition. In the SA condition bridge 103 operates a conference for just its serving rooms.

When the bridge verifies that all of its broadcast links and MLCT links are active, it assumes the distributed (DS) condition. In the DS condition the bridge will operate in the conference with other MLCTs. The conference messages are exchanged with the other MLCTs. If the MLCT is in the DS Condition and one of its broadcast or MLCT links becomes inactive, bridge 103 assumes the SA state again.

If the bridge has communication with the other MLCTs it will notify them of its DS/SA condition transitions by transmitting an MLCT status (MSTAT) message specifying the condition (DS,SA) it has assumed.

The MLCT will try to operate the conference as set up by the commands entered through MS 101. At the initialization of the conference the MLCT mode (VC,SC) and MLCT's own ID is specified before any links are assigned. MS 101 will have already downloaded the program code for the required bridge state into bridge 103. Bridge 103 starts up in the SA condition in the mode specified (VC,SC) with all ports unassigned.
1. MS 101 communicates with bridge 103 to assign a port to a room (MS specifies room ID) or assign a port's in-link, i.e., an incoming transmission path, as a MLCT link (MS specifies MLCT ID) and/or assign the port's out-link, i.e., an outgoing transmission path, as a broadcast link.
2. Bridge 103 marks the in and/or out link as assigned, inactive, and muted.
   a. If the pot is assigned to a room bridge 103 marks that room assigned.
   b. If the in link is assigned to an MLCT bridge 103 marks that MLCT assigned.
3. Bridge 103 trys to establish communication over the links. If communication is established the link is marked active.
4. If decryptor 1002 (FIG. 10) detects no facility failure in the audio signal of the assigned incoming link, bridge 103 unmutes the audio signal and marks the in link as unmuted.

Any subsequent command entered through one of the MLCT's administrative links that declares link(s) to be assigned will be accepted only if it does not reassign links that are presently assigned. All of these subsequent commands are executed (if they are accepted) in the same manner as the first command that assigned links in the conference.

Any subsequent command entered through one of the MLCT's administrative links that declares an in link and/or out link to be unassigned will be accepted only if that in link and/or out link is presently assigned. MS 101 communicates with bridge 103 to update the bridge's link assignments. Bridge 103 does the following:
1. Mark the specified links as unassigned.
2. If any links are being marked unassigned were assigned to rooms, mark those rooms as unassigned.
3. If the last MLCT link assigned to another MLCT, MLCT J, is being marked unassigned, then:
   a. MLCT J is marked unassigned.
   b. All rooms served by MLCT J are marked unassigned.

Any link or room that is marked unassigned is automatically marked inactive and muted.

While the MLCT is involved in a conference (i.e., some links are assigned), no command entered into the MLCT that specifies changing either the MLCT mode or MLCT's own ID will be accepted.

Broadcast links are dedicated to ensure that the MLCT will be able to transmit any of the required combination of video signals to the other MLCTs. At the time of the conference set-up, the MLCT decides how to dedicate each of its broadcast links. The dedication of these broadcast links will not be changed unless the conference set up is changed.

In a Viewer's Choice conference, MLCTs may need more than one broadcast link. The push-to-see (PTS) mode requires that MLCTs be able to transmit any combination of video signals to the rooms. In a Viewer's Choice conference the broadcast links are dedicated according to the following priorities:

1. If the MLCT has enough broadcast links it assigns a broadcast link to each of its serving rooms. In this case all of the other MLCTs always receive video from evey room served by this MLCT.
2. If the MLCT has enough broadcast links it assigns a broadcast link to each of the rooms served by another MLCT. In this case the MLCT will always be able to transmit the video required to each of the rooms served by other MLCTs.
3. If the MLCT does not have enough broadcast links to satisfy either of two previous cases, then the MLCT does not have enough broadcast links to operate properly in the conference. In this case the MLCT prints a warning message. If the MLCT has more than enough broadcast links needed for dedication to the rooms, then it marks the remaining broadcast links as undedicated.

In a Sender's Choice conference each MLCT requires only one broadcast link. This broadcast link is not dedicated.

Returning to MLCT FIG. 1, there is shown MLCT1 including microprocessor system (MS) 101, digital cross connect 102, bridge 103 and transmission facility interface 104 which are interconnected as shown by a multiplicity of data and control paths in order to perform required multilocation audio video teleconferencing functions.

MICROPROCESSOR SYSTEM (MS)

Figure 4:
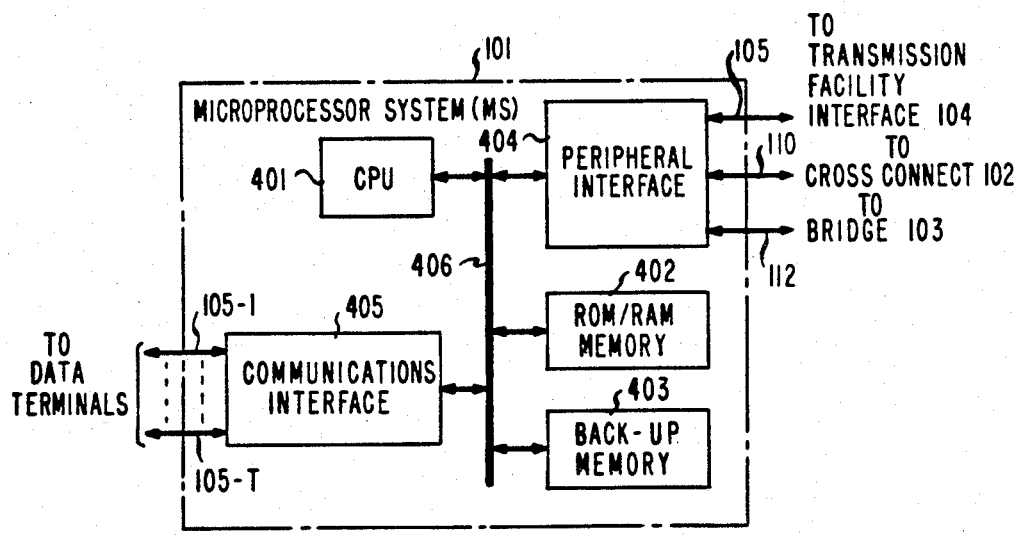
FIG. 4 shows in simplified block diagram form details of microprocessor system 101 employed in the system of FIG. 1.

The MLCT microprocessor system (MS) 101 is shown in simplified block diagram form in FIG. 4. Shown are CPU 401, memory 402, back-up memory 403, peripheral interface 404 and communications interface 405 all interconnected via bus 406. Memory 402 includes program storage in ROM and data storage in RAM. Back-up memory 403 stores data pertaining to conference set-up in a nonvolatile storage such as bubble memory in order to maintain conference set-up information integrity in the event of a short-time power outage to eliminate the re-entry of the information at the data terminals. Microprocessor system 101 communicates via peripheral interface 404 to transmission facility interface 104, cross connect 102 and bridge 103. Peripheral interface 404 communicates to the transmission facility interface 102 to transfer time-slot map information as discussed hereinafter or in other words to allow a connection of a VTS port of the MLCT. Microprocessor system 101 communicates through peripheral interface 404 to cross-connect 102 to map the time multiplexed switches (TMS) for configuring the TMS output data links 603-1 through 603-N (FIG. 6) to contain the information shown in TABLE 3 below and to perform the video switch function by the use of NXN switch 602 (FIG. 6) as described below. The bridge 102 communication is also handled by the peripheral interface 404. Information transfer to bridge 103 includes VTS port assignment, conference set-up including the designation of the various connections to the VTS data links and whether conference rooms or MLCTs are connected to them. Communications interface 405 is used to provide a connection to serial data terminal connections 105-1 through 105-T, in one example T±5, which are used to communicate with the conference set-up operator, a reservation system, or a port system to handle the conference reservation from multiple locations and to perform maintenance operations on the system. The microprocessor system 101 functions may be divided into three distinct classes: maintenance, operational (video switches), and conference parameter management. It performs all communication and administrative functions for the MLCT. It has communication access to all major components of the system to perform conference set-up operations, maintenance functions, error recovery, transmission facility performance monitoring, and video switches upon request from bridge 103. Microprocessor system 101 is essentially identical to the arrangement described by A. J. Cirillo, L. F. Horney II and J. D. Moore in an article entitled, "DACS Microprocessor System", *NTC'81*, *IEEE* 1981 *National Telecommunications Conference*, Vol. 1, pages B1.3.1–B1.3.6, Nov., 1981.

TRANSMISSION FACILITY INTERFACE

Figure 5:
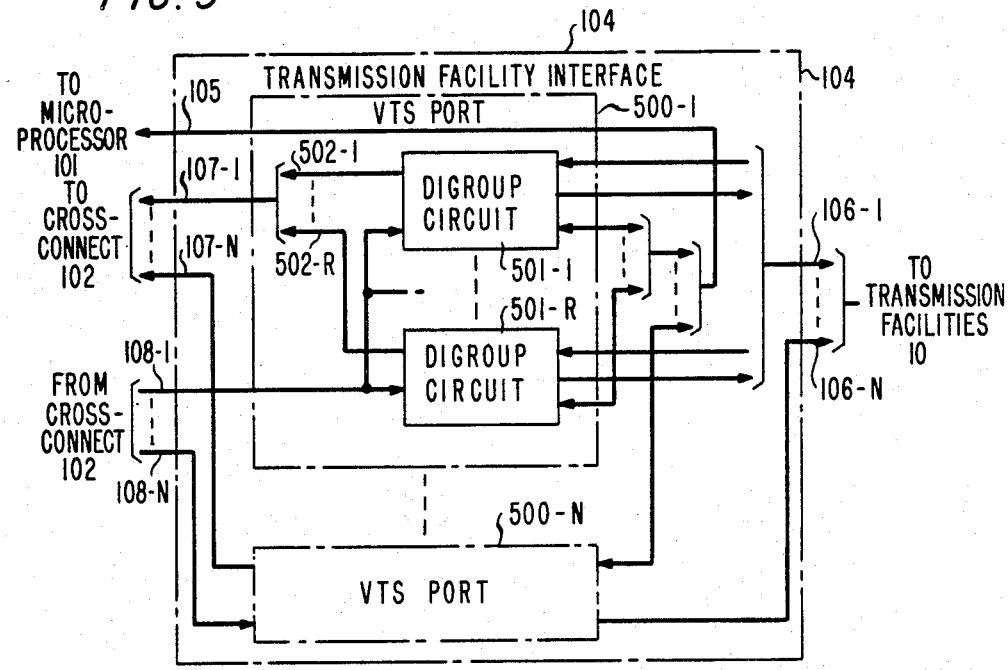
FIG. 5 depicts in simplified block diagram form details of transmission facility interface 104 used in the system of FIG. 1.

Details of transmission facility interface 104 are shown in simplified block diagram form in FIG. 5. It includes VTS ports 500-1 through 500-N, each of which includes a plurality of digroup circuits 501-1 through 501-R. As noted above, in this example two T1 lines are used for each of VTS ports 500-1 through 500-N and, therefore, two digroup circuits are used per VTS port. Again, the VTS ports connect transmission facility interface 104 via transmission facilities 10 (FIG. 1) to associate conference rooms and/or to associated MLCTs. Each of digroup circuits 501-1 through 501-R is connected via a corresponding one of data links 502-1 through 502-R to cross connect 102. Each of digroup circuits 501-1 through 501-R in a VTS port receives data from cross connection 102 on a shared data link, for example, via data link 108-1. Each digroup circuit in transmission facility interface 102 provides a read-write capability to microprocessor system 101 of all error source registers (not shown) and control registers (not shown). The error source registers relate to various internal hardware error detectors as well as to transmission facility related problems such as T1 framing errors, out-of-frame conditions, slips and carrier failure alarms (CFA). In addition to the DS-1 termination function, the digroup circuit implements the "time" portion of the time-space-time switching function of the MLCT. Its receiving section contains a line clock recovery circuit, a framer for recovery of the Ft framing bits, an elastic store, transmission facility error detectors and a time-slot interchanger (RTSI) (all not shown) to transform the T1 frame format to one compatible with that of the cross-connect, i.e., the cross connect data format of FIG. 3. Its transmitting section contains a second time-slot interchanger (TTSI) (not shown) and a DS-1 signal formatter (not shown) to convert the cross-connect data format to the DS-1 format.

Figure 3:
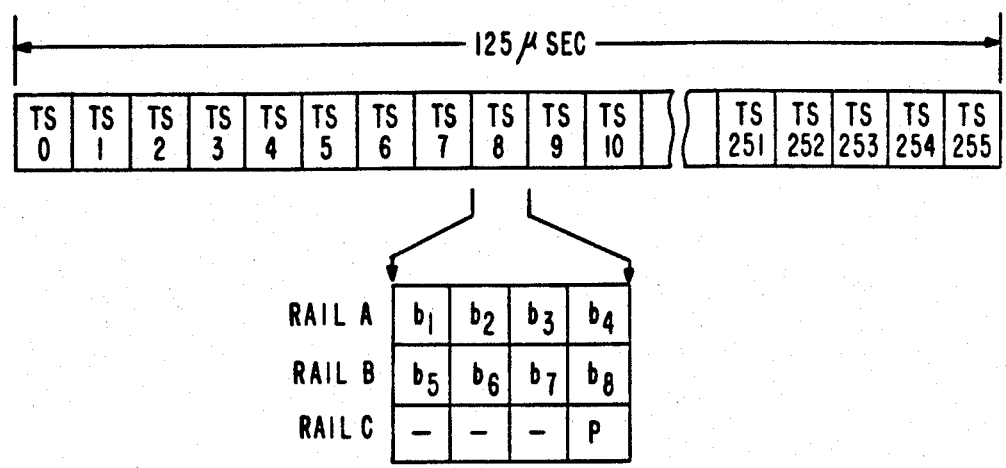
FIG. 3 illustrates the cross connect frame format used in the system of FIG. 1.

The signal format provided by the digroup circuit to the cross-connect 102 is shown in FIG. 3. It consists of a frame of 256 time-slots, labeled time-slot 0 through time-slot 255. It is transported by three rails at a data rate of 8.192 Mb/sec each. Each time-slot contains 12 bits of information: 8 data bits, labeled D1 through D8, three spare bits, and a parity bit that provides odd parity over the 12 bits in the time slot and the eight-bit code representing the time-slot number. The RTSI may be configured to fill any of the 256 time slots with the received 24 words of the incoming T1 line. Similarly, the TTSI may choose any of the 256 time-slots (up to 24) and selectively place them in the outgoing T1 line.

In this example, the digroup circuits 502-1 through 502-R, where R=4, for VTS port 500-1 identify and format the incoming DS-1 signals. Specifically, digroup circuit 502-1 identifies the video control signals, c bit and audio signals in words 1, 2 and 3 and formats them in time slots 0, 1 and 2 in the cross connect frame format of FIG. 3. Similarly, it identifies the video information in words 4 through 24 and formats it into time slots 64 through 84 in the cross connect frame format of FIG. 3. Digroup circuit 502-2 identifies the video information in signal DS1 No. 2 and formats it into time slots 85 through 108 of the cross connect frame format. Digroup circuit 502-3, if used, identifies the video information in signal DS1 No. 3 and formats it into time slots 108 through 132 of the cross connect format. Finally, digroup circuit 502-4, if used, identifies the video information in signal DS1 No. 4 and formats it into time slots 133 through 156 of the cross connect format. For VTS port 500-2 the only difference from VTS port 500-1 is in the formatting of the video control signal, c-bit and audio signals. In this example, this information is formatted into time slots 4, 5 and 6 of the cross connect frame format.

Figure 9:
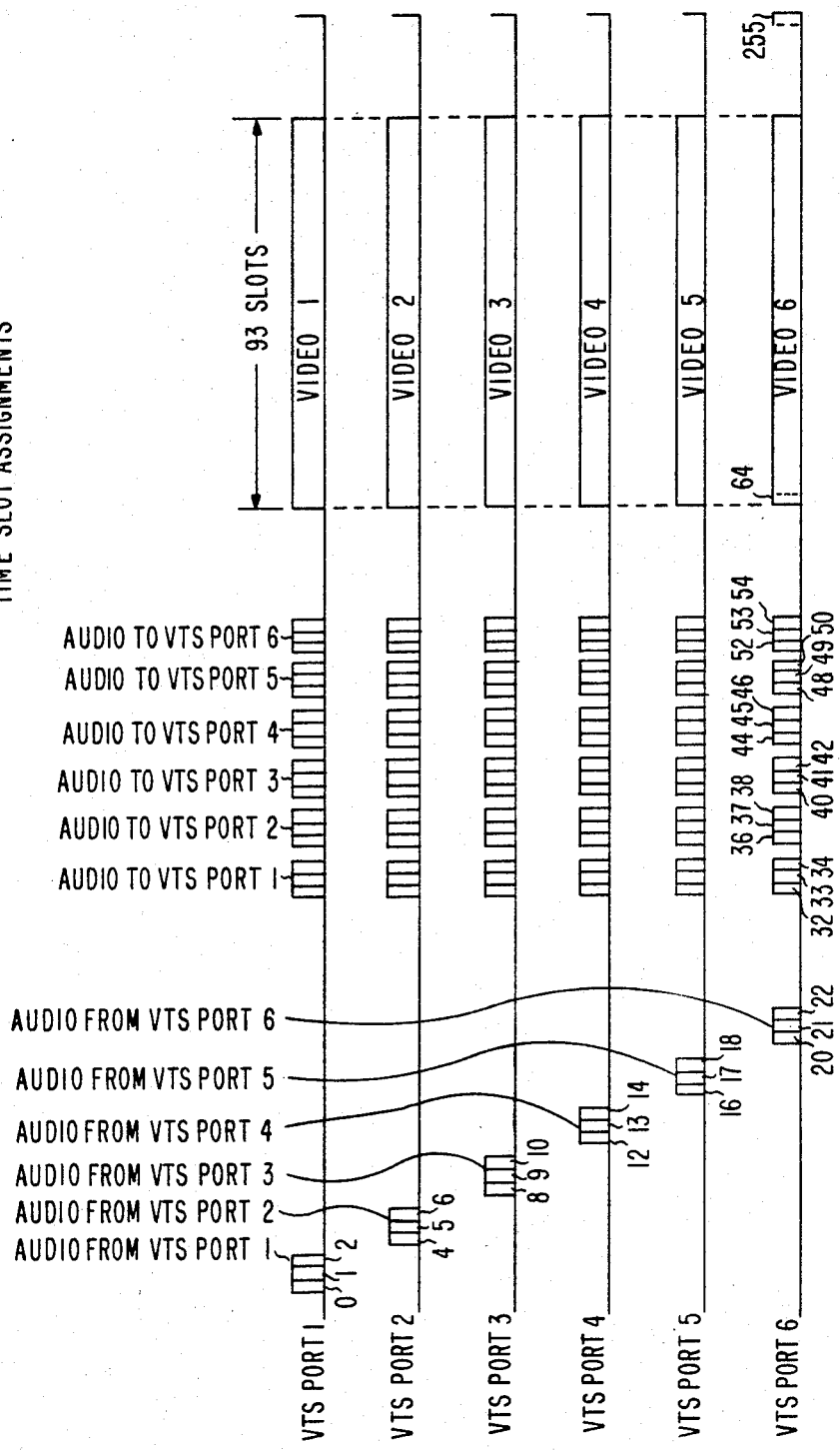
FIG. 9 illustrates the cross-connect 102 audio and video time slot assignments utilized in effecting an aspect of the invention.

This formatting is shown in FIG. 9 relating to the cross connect 102 frame formats. There is shown that for VTS port 500-3 the video control, c-bit and audio information is in time slots 8, 9 and 10, for VTS port 500-4 in time slots 12, 13 and 14, for VTS ports 500-4 in time slots 16, 17 and 18 and for VTS port 6, i.e., N=6, in time slots 20, 21 and 22. These formatted signals are supplied to cross connect 102.

Such digroup circuits are known in the art, see for example the digroup circuit described by R. P. Abbott and D. C. Koehler in an article entitled, "Digital Access and Cross-Connect System—System Architecture", *NTC'81, IEEE* 1981 National Telecommunication Conference, Vol. 1, pages B1.2.1–B1.2.7 at page B1.2.2., Nov., 1981.

VTS ports 500 can be assigned in a conference as follows:
1. Both the input and output data links of a VTS port are assigned to a room;
2. The output data link of the VTS port is assigned as a so-called broadcast link, i.e., the outgoing signal is supplied to all other MLCTs in the conference; and
3. The input data link of the VTS port is assigned as a MLCT link, i.e., it receives an outgoing broadcast signal from another MLCT.

CROSS CONNECT

Figure 6:
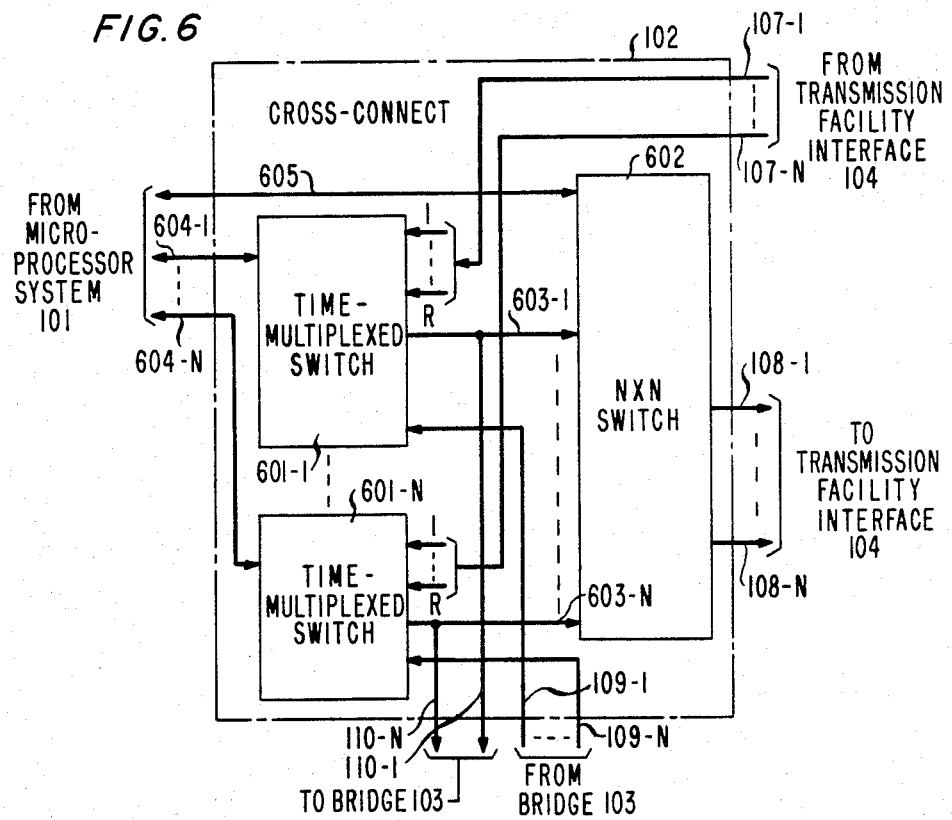
FIG. 6 shows in simplified block diagram form details of cross-connect 102 employed in the system of FIG. 1.

Details of cross-connect 102 are shown in simplified block diagram from in FIG. 6. Cross-connect 102 provides the space switching function of the MLCT time-space-time switching function. Cross-connect 102 includes time-multiplexed switches (TMS) 601-1 through 601-N and N X N switch 602. Time multiplexed switches 601-1 through 601-N are assigned on a one-to-one basis to VTS ports 500-1 through 500-N, respectively, in transmission facility interface 104. Data links 107-1 through 107-N are supplied from transmission interface 104 to TMS 601-1 through 601-N, respectively. Also supplied to TMS 601-1 through 601-N are data links 109-1 through 109-N, respectively. Data links 109-1 through 109-N carry processed information from bridge 103 relating to associated VTS ports 500-1 through 500-N, respectively. Each of TMS 601-1 through TMS 601-N selects on a per time slot basis information from its input data links and combines the information to generate at its output data link another 256 time-slot composite signal frame containing the time slot selection that the TMS is programmed to produce. It is important to note that the video information from a conference location is included in several incoming signals and that the TMS combines the information into the one composite signal. This combining of all the video information from a corresponding conference location into one composite signal enables, in accordance with an aspect of the invention, a rapid switch of the video being viewed. Outputs from TMS 601-1 through 601-N are controllably selected by N X N switch 602 and supplied via 108-1 through 108-N, respectively, to transmission facility interface 104 for transmission on T1 transmission facilities to transmission facility 10 to be routed to appropriate ones of the conference room and/or other MLCTs, TMS 601-1 through TMS 601-N and N X N switch 602 are controlled by microprocessor system 101 to realize a desired video and audio switch to the ports. Through this arrangement anyone of the composite signals from TMS 601-1 through TMS 601-N is selectable via switch 602 for transmission to any one of VTS ports 500.

It is noted that each VTS port receives an audio mix from all the other ports. Thus, the audio that must accompany the video to each port is a different mix. The appropriate audio mix and video are switched to the VTS ports by employing cross-connect 102. Error free, i.e., non-disruptive switching is realized, in accordance with an aspect of the invention, by employing TMS 601-1 through 601-N to each generate a so-called composite audio and video signal. The composite signal includes all the video information from a room associated with the corresponding VTS port and the audio mixes generated by bridge 103 to be transmitted to all of the rooms and partial audio sums to be transmitted to other MLCTs. Cross connect 102 time slot assignments of the signals generated at the outputs of TMS 601-1 through 601-N are shown in FIG. 9. Accordingly, shown in FIG. 9 are the composite signals combined in cross-connect 102 for each of VTS ports 500-1 through 500-N. Thus, for VTS port 500-1 the audio mix to VTS port 1 is in fixed time slots 32, 33 and 34 as supplied from bridge output circuit 1005, the audio mix to VITS port 500-2 is in fixed time slots 36, 37 and 38, the audio mix to VTS port 500-3 is inserted into fixed time slots 40, 41 and 42, the audio mix to VTS port 500-9 is in fixed time-slots 44, 45 and 46, the audio mix to VTS port 500-5 is in fixed time slots 48, 49 and, 50 and finally, the audio mix to VTS port 500-6 is in time slots 52, 53 and 54. The video from VTS port 500-1 is combined into time slots 64 through 156. The audio from VTS port 500-1 which is in time slots 0, 1 and 2 is supplied to bridge 103 via 110-1 to be appropriately mixed with the audio from the other VTS ports and, then, supplied via 109-1 from bridge 103 to TMS 601-1 in the appropriate fixed time slots in the composite signals associated with VTS port 500-1. The composite signals associated with VTS ports 500-2 through 500-6 are similarly obtained as shown in FIG. 9. Consequently, when the video from anyone of the VTS ports and, hence, the associated conference room is switched via N X N switch 602 to anyone of the other conference rooms, the proper audio mix for the specific conference rooms is present and obtained by the MLCT selecting the audio mix in the fixed time slots assigned to the associated conference rooms. The functions of TMS 600 and switch 602 may be realized by employing dual multiplexers of a type described in the article entitled, "Digital Access and Cross-Connect System-System Architecture" noted above.

Figure 7:
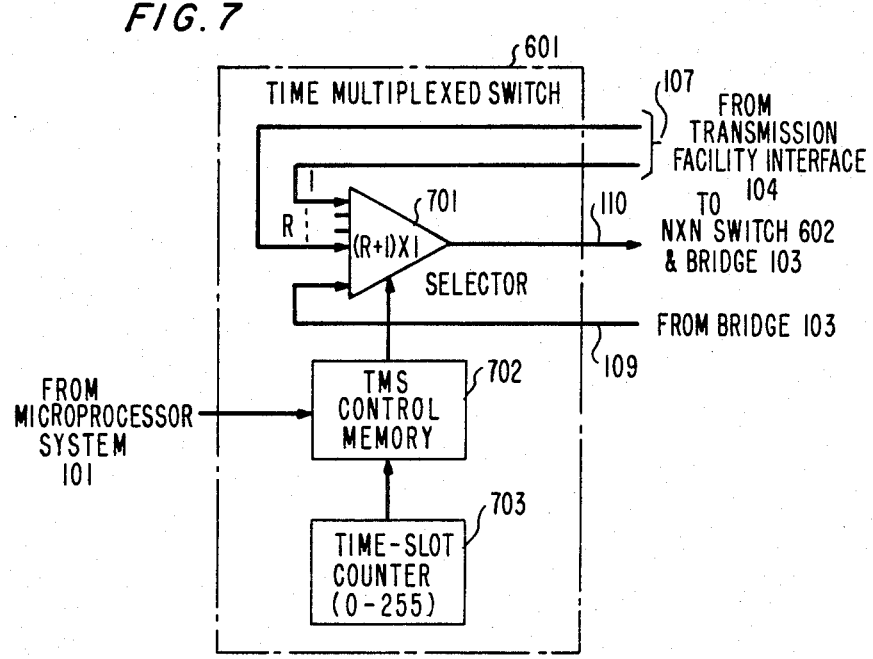
FIG. 7 illustrates in simplified block diagram form details of time multiplexed switch 601 used in cross-connect 102 of FIG. 6.

FIG. 7 shows in simplified block diagram form details of time multiplexed switches 601 of cross-connect 102 (FIG. 6). Accordingly, shown are (R+1) X 1 data selector 701, TMS control memory 702 and time slot counter 703. Selector 701 is controlled by control codes stored in control memory 702. The control codes are written into memory 702 from microprocessor system 101 and include the time slot switching information for the time multiplexed switch for an assigned VTS port. Once the control information is written into control memory 702 no further interaction with microprocessor system 101 is required until a new data link selection is made. Control memory 702 is addressed by time slot counter 703 which generates a sequentially incrementing modulo-256 counter signal synchronized to the time slot occurrences of the cross-connect data format as shown in FIG. 3.

Figure 8:
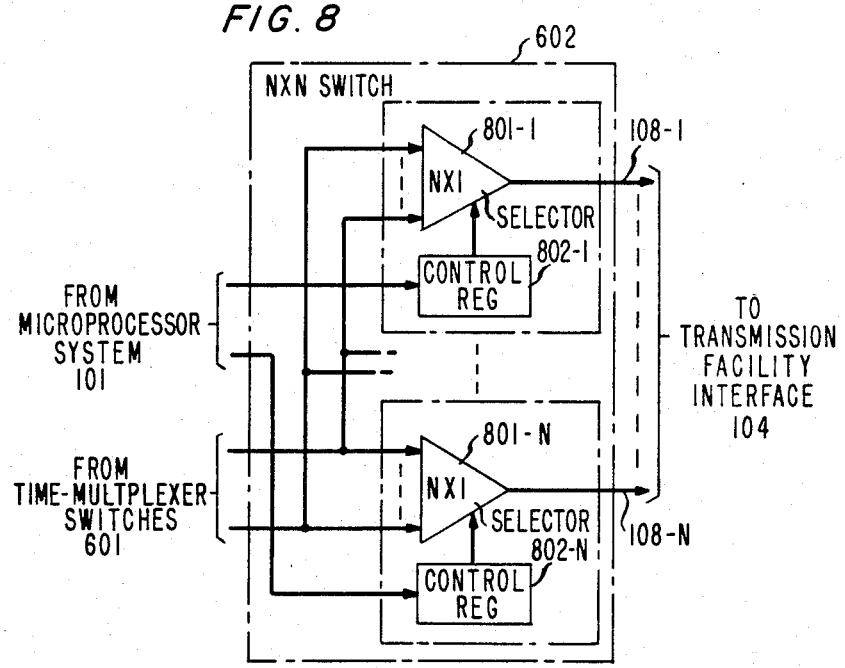
FIG. 8 shows in simplified block diagram form details of N×N switch 602 used in cross-connect 102 of FIG. 6.

FIG. 8 shows in simplified block diagram form details of N X N switch 602 of cross-connect 102 FIG. 6. Switch 602 includes N X 1 data selectors 801-1 through 801-N which are controlled by control registers 802-1 through 802-N, respectively. Each of outputs 108-1 through 108-N of data selectors 801-1 through 801-N, respectively, is connected to an associated one of VTS ports 500-1 through 500-N (FIG. 5). Outputs 603-1 through 603-N from time multiplexed switches 601-1 through 601-N (FIG. 6), respectively, are supplied to respective inputs of selectors 801-1 through 801-N. Switching commands are supplied from microprocessor system 101 via control lines 605-1 through 605-N to control registers 802-1 through 802-N, respectively. In response to the switching commands each of selectors 801-1 through 801-N selects an appropriate one to its inputs and provides it to its associated VTS port in transmission facility interface 104. Consequently, any one of the composite signals supplied from time multiplexed switches 601 can be selected for transmission to any one of the VTS ports 500. The input selection is controlled to occur at the boundary between the cross-connect data format frame in order to prevent any mixing of information from different inputs within a given frame.

In summary, the operation of cross-connect 102 in realizing nondisruptive audio and rapid video switching, in accordance with an aspect of the invention, is such that the first 3 words of DS-1 No. 1 of all N incoming VTS signals are identified by and formatted into predetermined time slots by digroups circuits 501 and sent via TMS 601-1 through 601-N to bridge 103 for processing the audio and control information and for performing subbyte bit manipulation of video-related signaling bits located in the first word. All other words containing video information are formatted into a composite video signal and provided to N X N switch 602 for the video switching function of the MLCT along with processed audio, control, and video related information are supplied by each of data links 109-1 through 109-N from bridge 103. After any selection is made by N X N switch 602, it is up to the particular one of digroup circuits 501 (FIG. 5) to choose the necessary timeslots to form the corresponding outgoing VTS signal.

This implies, as will be seen in the following, that the processed audio and control signals generated in bridge 103 must appear on all data links 603 presented to N X N switch 602 in order to affect only video information when the switch state is changed. The time-slot assignment has been chosen, along with other system features, so that after a conference configuration has been decided and set-up, the time-space-time switching configuration is static except for N X N switch 602. N X N switch 602 is the only switching element whose configuration is dynamic, i.e., during video switches. The other switching elements remain constant until a new conference configuration is required, i.e., addition or deletion of a conference room or MLCT. This type of arrangement allows, in accordance with an aspect of the invention, very efficient and rapid video selection operations. In fact, not using the above method implies remapping one time-slot at a time of all the switching elements to perform a video switch thereby resulting in serious video selection speed degradations.

Table 1 shows the relative time-slot assignment of all information groups as they appear at the output of TMS 601-1 through 601-N. Entries of the form "vnwn" and "vnWn" represents a group of 3 timeslots each. The "Vn" entries represent a group of 21+(24×R) timeslots to accommodate the video information from each VTS port. The table is subdivided into two sections each pertaining to where the information is routed. Bridge 103, for example, has access in space and time to all audio and control inputs to the MLCT. Conversely, bridge 103 provides N copies of the processed audio and control information mixed with video portions pertinent to each VTS port. The transmit sections of digroup circuits (DC) 500 in the transmission facility interface 104 (FIG. 4) choose the time-slots under the "VTS Output Contribution" to construct the word pattern in the R outgoing T1 lines. Once this selection is performed, no other interaction is done with the DC TTSI. When a "space" switch is performed by N X N switch 602 (FIG. 6) it represents a vertical movement of the "VTS Output Contribution" section of the time-slot assignment table which affects only video information.

TABLE 1

| | | | Cross-Connect Time-Slot Assignment | | | | | | |
|---|---|---|---|---|---|---|---|---|---|
| | | | | Time-Slot Assignment | | | | | |
| | | | VTS Input Contribution | | | | Bridge 103 Contribution | | |
| | | | To Bridge 103 | | | | VTS Output Contribution | | |
| L | 1 | v1w1 | — | — | — | v1 | v1W1 | v1W2 | V1Wn | v1WN |
| I | 2 | — | v2W2 | — | — | V2 | v2W1 | v2W2 | v2Wn | v2WN |

TABLE 1-continued

| | | Cross-Connect Time-Slot Assignment | | | | | | | |
|---|---|---|---|---|---|---|---|---|---|
| | | Time-Slot Assignment | | | | | | | |
| | | VTS Input Contribution | | | | Bridge 103 Contribution | | | |
| | | To Bridge 103 | | | | VTS Output Contribution | | | |
| N | n | — | — | vnwn | — | Vn | vnW1 vnW2 | vnWn | vnWN |
| K | N | — | — | — | vNwN | VN | vNW1 vNW2 | vNWn | vNWN |

LEGENDA
vn Video in word 1 of DS-1 No. 1 from VTS Input Port n
Vn Video from VTS Input Port n
wn Control and Audio from VTS Input Port n
Wn Control and Bridged Audio to VTS Output Port n
— Unassigned Time-Slot Group

BRIDGE

Figure 10:
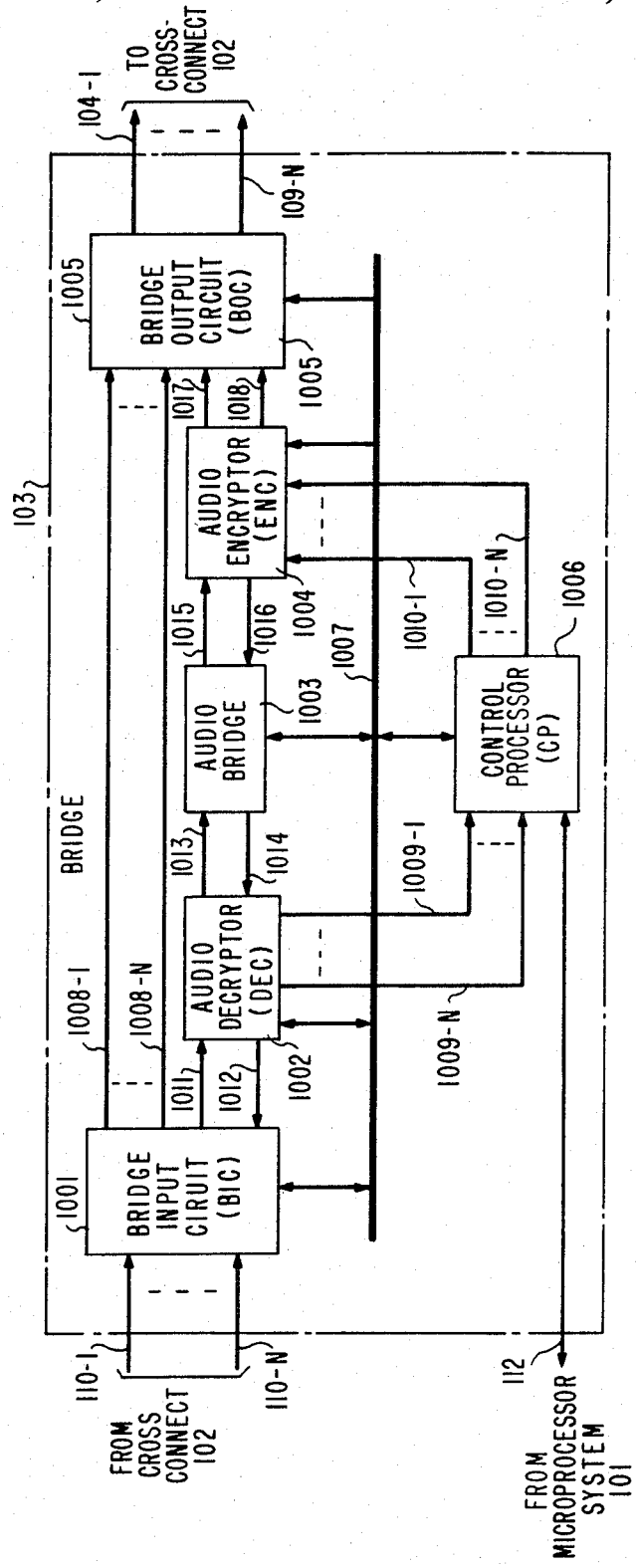
FIG. 10 shows in simplified block diagram form details of bridge 103 used in the system of FIG. 1.

FIG. 10 shows in simplified block diagram form details of MLCT bridge 103. Bridge 103 performs an access formatting function to cross-connect 102, an audio processing function and a conference control function. To this end, bridge 103 includes bridge input circuit (BIC) 1001, audio decryptor (DEC) 1002, audio bridge 1003, audio encryptor (ENC) 1004, bridge output (BOC) circuit 1005 and control processor (CP) 1006 which are interconnected by bus 1007. Details of the components of bridge 103 and their operation are shown in FIGS. 11 through 46 and described below.

Briefly, outputs from time multiplexed switches 601-1 through 601-N (FIG. 6) in cross-connect 102 are supplied via 110-1 through 110-N to bridge input circuit (BIC) 1001. BIC 1001 is arranged under control of processor 1006 to accept the audio time slots associated with the VTS ports. These time slots include words 1, 2 and 3 as shown in the VTS data format of FIG. 3. It separates the video signaling bits FD, X, X from the control bit C and the remaining audio bits for each of VTS ports 500-1 through 500-N. The video signaling bits associated with VTS ports 500-1 through 500-N are supplied via circuit paths 1008-1 through 1008-N, respectively, directly to bridge output circuit (BOC) 1005. This is necessary to keep the current frame video signaling bits with the current frame video information bits. As will be apparent from the discussion below, there is some delay in the audio because of the processing. The audio and control bits associated with each VTS port are supplied to audio decryptor 1002 via 1011. Audio decryptor (DEC) 1002 accesses BIC 1001 via 1012 for this purpose. DEC 1002 under control of processor 1006 separates the control bit C from the remaining audio associated with each VTS port and supplies them via 1009-1 through 1009-N to control processor 1006. DEC 1002 also decrypts, if necessary, the remaining audio for all the VTS ports and supplies it via 1001 to audio bridge 1003. The decryption process is performed using an appropriate decryption key supplied from microprocessor system 101 during the conference setup. The decryption process may be bypassed if the conference is not using encryption of the information. Audio bridge 1003 accesses an output port in DEC 1002 via 1014. Audio bridge 1003 generates the appropriate audio mixes for each VTS port. The audio mix for each of the VTS ports includes the audio from all other ports except itself. For example, the audio mix for VTS port 1 includes only the audio from VTS ports 2 through N. The method with which audio bridge sums the audio varies according to the number of data presently employed in a conference and whether the audio sum is destined to a conference room or to another MLCT. The audio sums are then supplied via 1015 and 1016 to audio encryptor (ENC) 1004. Also supplied to ENC 1004 via 1010-1 through 1010-N are modified control bits associated with each of VTS ports 1 through N, respectively. ENC 1004 encrypts, if necessary, the audio sums in accordance with an encryption key supplied from microprocessor system 101 during setting up of the conference. Again, if no encryption is being used the encryption process in ENC 1004 is bypassed. Additionally, ENC 1004 combines the modified control bits generator by processor 1006 with the appropriate audio sums and supplies them via 1017 and 1018 to bridge output circuit (BOC) 1005. Bridge output circuit 1005 combines the processed audio from ENC 1004 with the video signaling bits from BIC 1001 and formats a cross-connect 102 compatible signal for each VTS port with time-slot assignments consistent with those of Table 3.

Control processor 1006 in addition to control of bridge 103 performs all communications via the auxiliary C bit data channel to the conference rooms and other MLCTs in the conference for realizing necessary communications and video operations within the MLCT. Additionally, processor 1006 switches messages to be transmitted from room to room. Within bridge 103, processor 1006 communicates via parallel bus 1007.

BRIDGE INPUT CIRCUIT (BIC)

Figure 11:
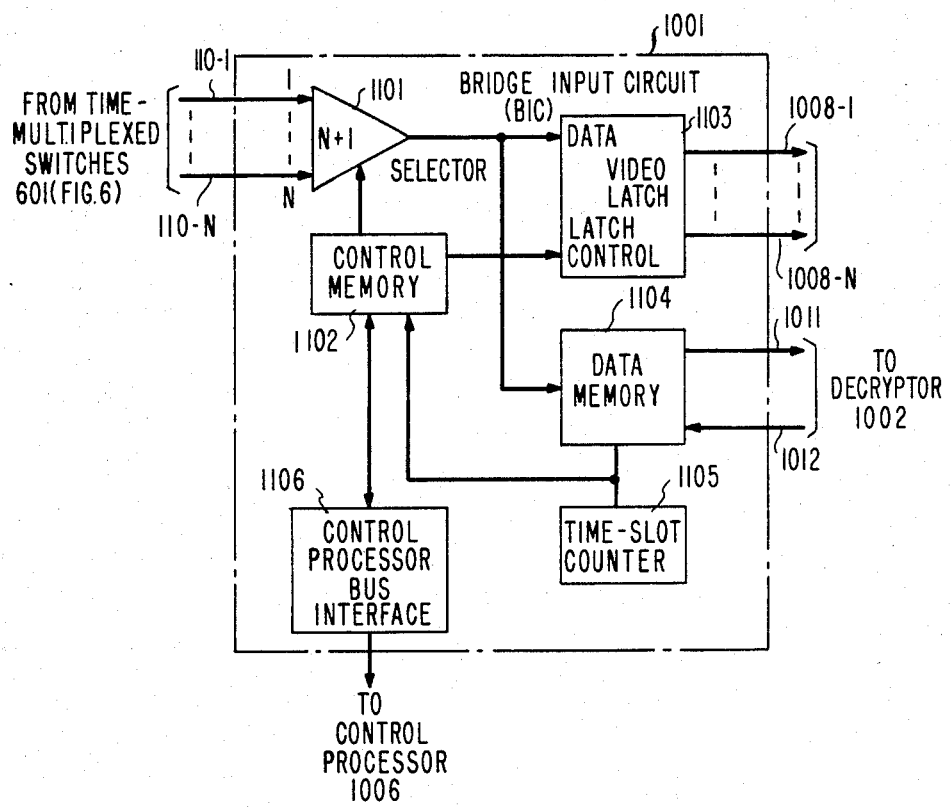
FIG. 11 depicts in simplified block diagram form details of bridge input circuit (BOC) 1001 used in bridge 103 of FIG. 10.

FIG. 11 shows in simplified block diagram form details of bridge input circuit (BIC) 1001. As indicated above, BIC 1001 separates the video signaling bits FD, X, X from the audio information for each VTS port. To this end, the outputs from time multiplexed switches 601-1 through 601-N (FIG. 6) are supplied via 110-1 through 110-N, respectively, to inputs of NX1 data selector 1101. Selector 1101 is controlled by control codes stored in control memory 1102 to perform the space selection function of the audio signals from the VTS ports shown in cross-connect 102 time slot assignments in FIG. 9. The control codes are written into memory 1102 from control processor 1006 (FIG. 10) and include the time slot switching information for the supplied data links from the time multiplexed switches 601-1 through 601—N. The output from selector 1101 is supplied to the data input of video latch 1103 and to data memory 1104. Video latch 1103 includes N latch circuits which are assigned on a one-to-one basis to data links 110-1 through 110-N and are used to temporarily store the video signaling bits FD, X, X from those links. To this end, control memory 1102 also includes codes supplied from control processor 1006 (FIG. 10) for enabling the appropriate latch circuits in video latch 1103 to temporarily store the corresponding video signaling bits which are then supplied via 1008-1 through 1008-N to bridge output circuit 1005. Each code word includes 8 bits and is associated with a specific time slot in the cross connect frame format shown in FIG. 3. Two of the bits are spares and two bits are used for parity. The remaining four bits are so-called operational control bits and are defined as follows:

b3 RVCSEN. Receive Video Control Slot. A logical 1 indicates that the respective time slot contains video control bits FD, X, X to be latched in latch 1103 and transmitted to BOC 1005. A logical 0 indicates a normal time slot.

b2 RPA2. Receive Port Address (MSB).
b1 RPA1. Receive Port Address.
b0 RPA0. Receive Port Address (LSB).

Bits b0–b2 form a three bit code indicating the origin of data to be received by bridge 103. Codes 0–5 select the respective VTS ports. Codes 6 or 7 will not select any port and BIC 1001 assumes that the associate time slot is idle. Data memory 1104 is a dual port memory written with the remaining audio and control information from selector 1101. Memory 1104 is accessed by decryptor 1002 via 1012 further to process the stored audio and control information. Data memory 1104 includes a RAM having duplicate sets of memory locations. A first set of the RAM locations is written with incoming data from selector 1101 while the second set of RAM locations is read by decryptor 1002 during a current frame. During a next subsequent frame the first set is read while the second set is written. Both control memory 1102 and data memory 1104 are sequentially addressed by time-slot counter 1105 which includes a modulo-256 binary counter synchronized to the internal frame time-slot boundaries. Once a code pattern is written into control memory 1102 no other interaction is required unless a VTS port and, hence, a conference room is to be added to or deleted from the conference.

ENCRYPTION/DECRYPTION PROCESS

Audio decryptor (DEC) 1002, audio bridge 1003 and audio encryptor (ENC) 1004 form, in accordance with an aspect of the invention, a programmable audio mixing arrangement including common control decryption and encryption. Such an arrangement is advantageously utilized in controllably adding rooms to and/or deleting rooms from an ongoing conference.

Private communication is realized by separately encrypting both the audio and video information. The audio information from the rooms must be decrypted in the MLCT to perform the audio mixing in bridge 1003. Then, the mixed audio is encrypted on a common control basis in ENC 1004.

For clarity and simplicity of description the general encryption process shall be discussed first. As described below encryption of the audio is obtained by using the Data Encryption Standard (DES) promulgated by the National Bureau of Standards.

The audio information is encrypted by adding each audio bit modulo-2 to a synchronous stream of cipher bits derived from the DES algorithm. The data input to be encrypted is derived from a 64-bit plain text counter having arbitrary contents which are known to both ENC 1004 and DEC 1002. The encryption process in the DES algorithm uses an appropriate 56 bit secret key in conjunction with the contents of the plain text counter to form the cipher bit stream which the audio is added modulo-2 bit-by-bit thereby forming the encrypted audio (A-bits). The encryption process may be easily bypassed. The audio information is sampled in a conference room by picture processor 123 (FIG. 1) and encoded with standard u-255 companding. Therefore, each 125 mu-sec frame includes two adjacent samples of the audio, as shown in Table 2 below.

Decryptor 1002 employs a common control routine to decrypt a plurality of simultaneously received, randomly phased encrypted audio signals by adding modulo-2 to each received signal a cipher bit stream synchronized with and identical to the one used for encrypting the signal. This is realized by use of the 56 bit encryption key and knowledge of the 64 bit plain text counter contents at the time the cipher stream was generated. The plain text counter state is sent over the encryption decipherment bits (D-bits). Also included in the D-bits are a framing pattern and a parity bit which provides EVEN parity over the unencrypted audio samples. This parity bit is used by decryptor 1002 to verify that decryption has been performed correctly. If the decryption is incorrect because of a data link failure, the decryptor will cause that link's audio to be muted. This insures that the audio performance of the conference is not degraded by the link failure.

Figure 12:
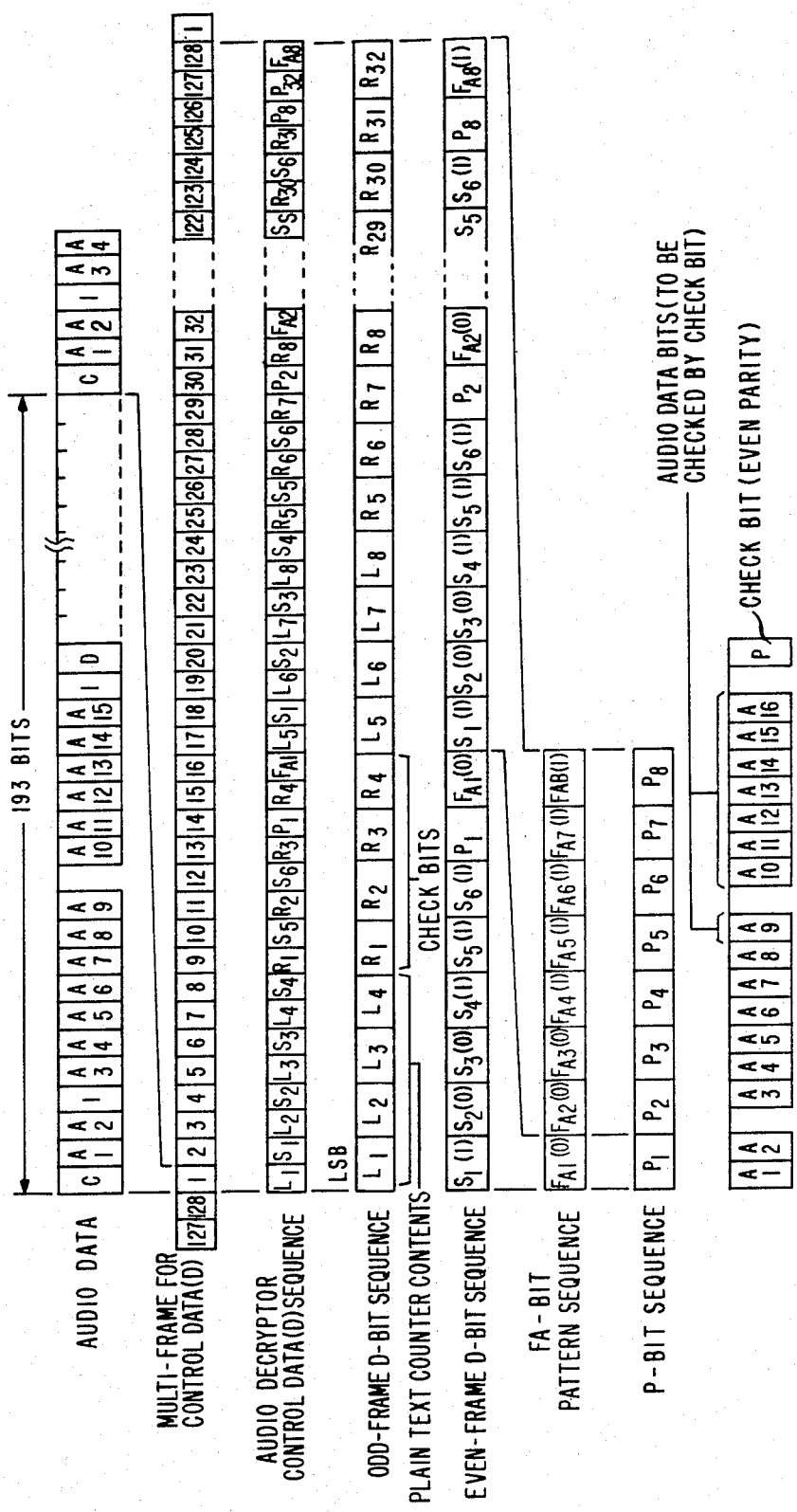
FIG. 12 illustrates the output frame format of the audio encryption process which is useful in describing aspects of the invention.

FIG. 12 shows all the data associated with audio encryptor 1004 output signal for a VTS link in addition to the audio bits (A-bits) shown in Table 2. The relationship of the A-bits to the mu-255 companding law is shown in Table 2. Note that the A-bits do not represent the complemented values of the mu-255 codes as in a normal DS-1 format.

TABLE 2

| VTS Data Format: Audio Group | | | |
|---|---|---|---|
| A-bit | | Mu-law | Description |
| A1 | A9 | M0 | Mantissa Least Significant Bit |
| A2 | A10 | M1 | |
| A3 | A11 | M2 | |
| A4 | A12 | M3 | Mantissa Most Significant Bit |
| A5 | A13 | L0 | Cord Least Significant Bit |
| A6 | A14 | L1 | |
| A7 | A15 | L2 | Cord Most Significant Bit |
| A8 | A16 | S | Sign |

FIG. 12 shows the D-bit sequence. The D-bits are decipherment control bits which are used for synchronization of the audio encryption and decryption circuitry. The D-bits are an 8 Kb/sec data stream organized into a 128 bit superframe. The D-bits are organized into an odd-numbered group and an even numbered group. The superframe also includes 32 most significant bits (MSB) of the counter contents, namely L1–L32 which are used during the next superframe interval, and 32 check bits, namely, R1–R32. The 32 plain text counter contents bits L1–L32 are subdivided into 8 blocks of 4 bits. Appended to each block of 4 bits is a respective block of 4 error control check bits labeled R1 though R32. The L and R bits implement eight blocks of (8, 4) extending Hamming Code words. The even-numbered D-bits contain a fixed sequence of framing bits labeled S1 through S6 and FA0 through FA7 and a set of audio parity bits. The value of the audio parity bits is such that in the frame that they occur, even parity is obtained over the on-the-clear audio sample represented by A9 through A16. This information is shown in TABLE 3 below

TABLE 3

| VTS Data Format: Audio Decipherment Group |
|---|
| Odd Numbered D-bits |

TABLE 3-continued

VTS Data Format: Audio Decipherment Group

| n | Counter Contents | | | | Check Bits | | | |
|---|---|---|---|---|---|---|---|---|
| 0 | L1  | L2  | L3  | L4  | R1  | R2  | R3  | R4  |
| 1 | L5  | L6  | L7  | L8  | R5  | R6  | R7  | R8  |
| 2 | L9  | L10 | L11 | L12 | R9  | R10 | R11 | R12 |
| 3 | L13 | L14 | L15 | L16 | R13 | R14 | R15 | R16 |
| 4 | L17 | L18 | L19 | L20 | R17 | R18 | R19 | R20 |
| 5 | L21 | L22 | L23 | L24 | R21 | R22 | R23 | R24 |
| 6 | L25 | L26 | L27 | L28 | R25 | R26 | R27 | R28 |
| 7 | L29 | L30 | L31 | L32 | R29 | R30 | R31 | R32 |

$$R_{4n+1} = L_{4n+1} \oplus L_{4n+2} \oplus L_{4n+3}$$
$$R_{4n+2} = L_{4n+2} \oplus L_{4n+3} \oplus L_{4n+4}$$
$$R_{4n+3} = L_{4n+1} \oplus L_{4n+2} \oplus L_{4n+4}$$
$$R_{4n+4} = L_{4n+1} \oplus L_{4n+3} \oplus L_{4n+4}$$

Even Numbered D-bits

| n | S1 | S2 | S3 | S4 | S5 | S6 | P | FAn |
|---|----|----|----|----|----|----|---|-----|
| 0 | 1 | 0 | 0 | 1 | 1 | 1 | P | 0 |
| 1 | 1 | 0 | 0 | 1 | 1 | 1 | P | 0 |
| 2 | 1 | 0 | 0 | 1 | 1 | 1 | P | 0 |
| 3 | 1 | 0 | 0 | 1 | 1 | 1 | P | 0 |
| 4 | 1 | 0 | 0 | 1 | 1 | 1 | P | 1 |
| 5 | 1 | 0 | 0 | 1 | 1 | 1 | P | 1 |
| 6 | 1 | 0 | 0 | 1 | 1 | 1 | P | 1 |
| 7 | 1 | 0 | 0 | 1 | 1 | 1 | P | 1 |

The symbol $\oplus$ indicates an "Exclusive OR" function.

Figure 13:
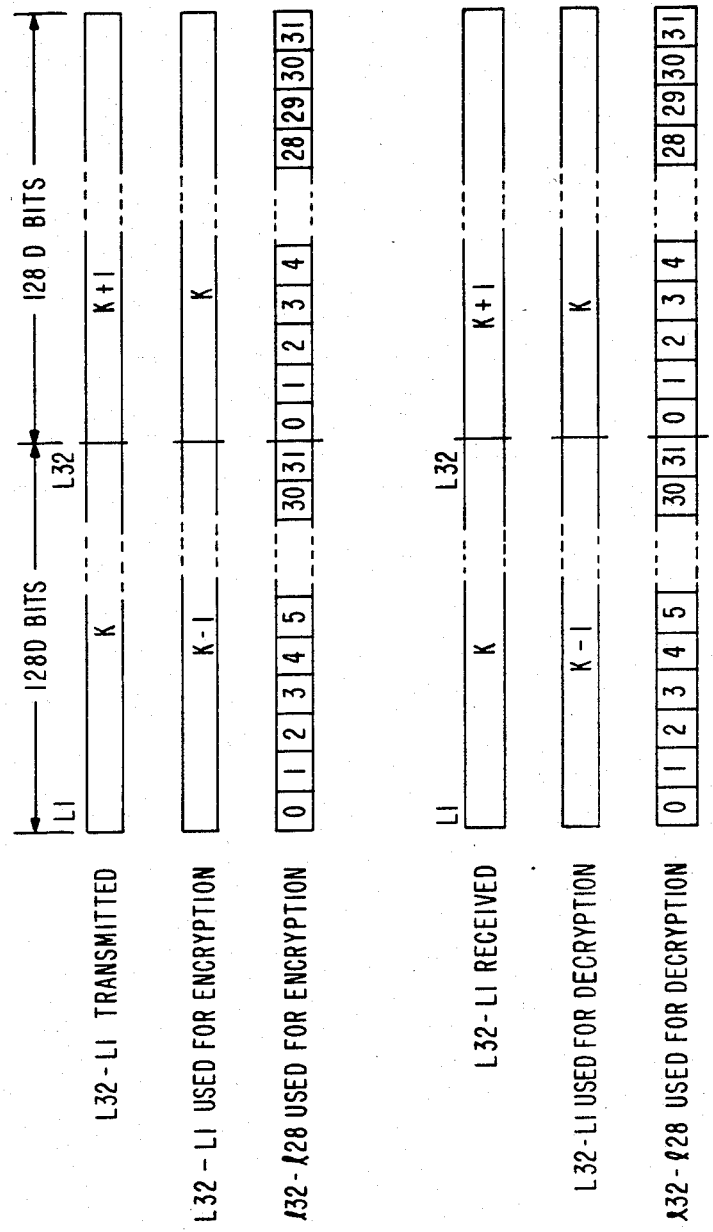
FIG. 13 illustrates timing diagrams useful in describing the encryption and decryption process.

For encryption, the 64 bit plain text counter used to obtain the cipher stream is subdivided into two sections, one including L1-L32 representing the most significant bits and another l1-l32 representing the 32 least significant bits (LSB). At the end of a D-bit superframe, the 32 most significant bits presently sent via the D-bits are utilized as a portion of the plain text during the next superframe and, therefore, are stored for that purpose. The L1-L32 section of the plain text counter is incremented by 1 and the resulting plain text counter contents are used for encryption. The l1-l32 bit section is reset to 0, and every 4 DS-1 frames (125 mu sec) the most 5 significant bits 28 through 32 are incremented and used to perform a plain text counter encryption. One encryption is required every 4 DS-1 frames, because in each frame 16 bits of the cipher stream are used to perform the bit-by-bit modulo-2 sum of the audio and cipher stream. This is turned to account, in accordance with an aspect of the invention, in obtaining the common control encryption and decryption processes described below. The decryptor is able to derive the same cipher stream that was used for encryption because it has obtained the most significant 32 bits (L1-L32) in use by the encryptor during the previous D-bit superframe. The process repeats after 32 encryptions or 128 D-bits have been transmitted. A timing diagram of the encryption process is shown in FIG. 13. The plain text counter section containing the most significant 32 bits L1-L32 is initialized to the preset values as shown in FIG. 13. The identifying code is an arbitrary number chosen by the user.

In the decryption process, tha plain text data input to the DES module is derived from the received 32 most significant bits L1-L32 used to derive the cipher bit stream during the encryption process. The least significant 32 bit portions of the DES plain text data input, namely, bits l1-l32, comprise a plain text counter identical to that used in the encryption process. A framer function locates the phase of the 128 bit superframe boundaries and extracts the information shown in TABLE 3 above, and supplies the audio parity bit to a parity checker during the frame in which the D-bits occur. The parity check generates a chiper error indication. In turn, the cipher error ORed with an out of D-bit superframe indication generates a mute signal which is used to inhibit an erroneous audio information from impairing the conference.

As in the encryption process, the decryption process may readily be bypassed by generating a cipher stream of all 0's.

AUDIO DECRYPTOR (DEC)

Figure 14:
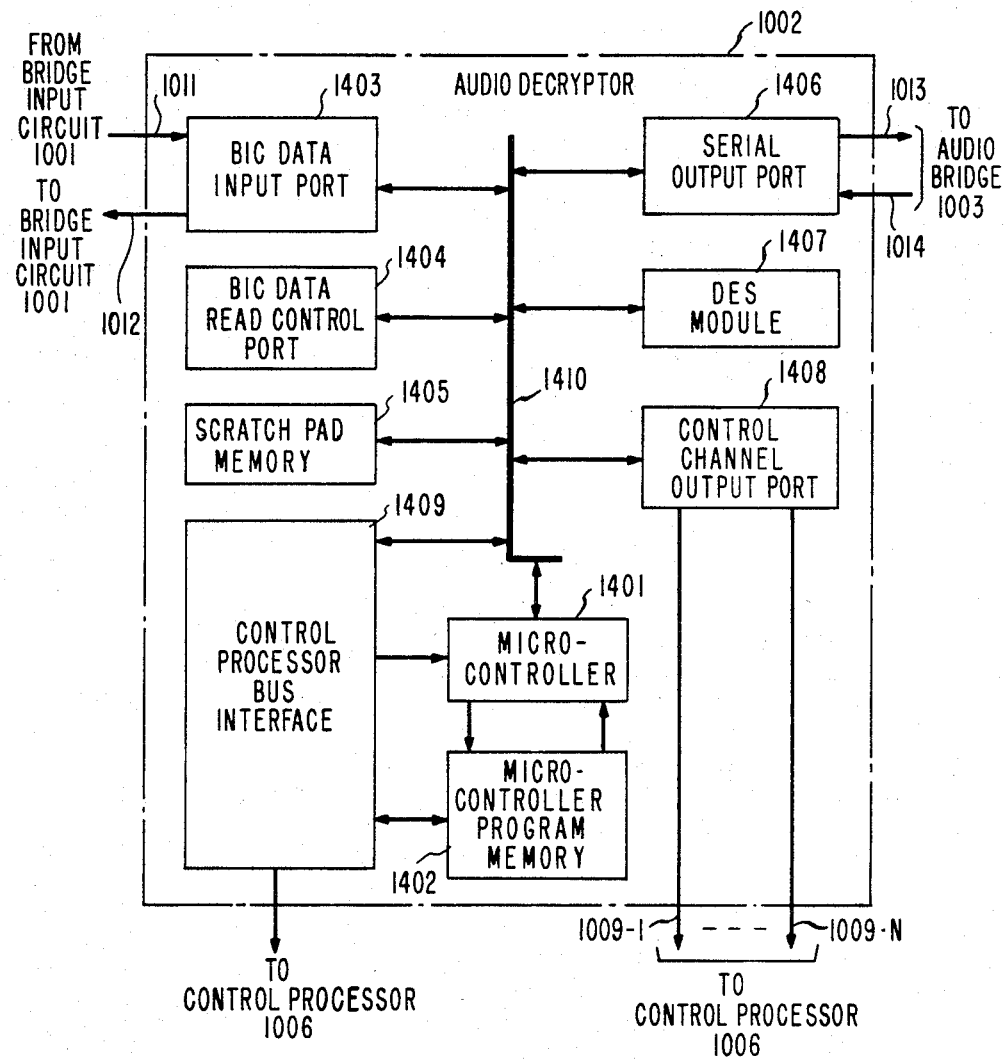
FIG. 14 shows in simplified block diagram form details of audio decryptor (DEC) 1002 used in bridge 103 of FIG. 10.

Details of audio decryptor (DEC) 1002 of FIG. 10 are shown in simplified block diagram form in FIG. 14. DEC 1002 provides, in accordance with an aspect of the invention, a common control arrangement for decrypting a multiplicity of VTS audio channels. Accordingly, shown are microcontroller 1401 and associated program memory 1402, BIC 1001 data input port 1403, BIC 1001 data read control port 1404, scratchpad RAM memory 1405, serial output port 1406, DES data encryption standard module 1407, control channel output port 1408 and control processor bus interface 1409. Microcontroller 1401 is interconnected with units 1403 through 1409 via bus 1410. Additionally, microcontroller 1401 receives a reset signal from interface 1409 and code instructions from program memory 1402 in response to address signals supplied thereto. Program memory 1402 is also connected to interface 1409. In this example, microcontroller 1401 is a Signetics 8×305 and DES module 1407 includes a Fairchild -1,-2,-3,-4 DES chip set which implements the National Bureau of Standards (NBS) Data Encryption Standard (DES).

DEC 1002 accesses the control channel audio, and audio decipherment bits (D-bits) stored in BIC 1001 data memory 1104 (FIG. 11) by supplying an appropriate address via BIC data read control port 1404 over 1012 and by reading the contents of BIC data memory 1104 via BIC data input port 1403. DEC 1002 under control of microcontroller 1401 separates the control C-bits from the stored information and stores them in control channel output port 1208 for further processing by control processor 1006. The audio and audio decipherment bits are operated on to generate deciphered audio for all the VTS ports. The deciphered audio is supplied via serial output port 1406 to audio bridge 1003 for further processing. Control processor 1006 accesses DEC 1002 via control processor bus interface 1409. Interface 1409 provides read-write access to microcontroller program memory 1402 for loading the decryptor program into memory 1402, for verifying that the program is stored properly and to halt and restart microprocessor 1401 as appropriate. Once microcontroller 1401 is in the run mode, control processor 1006 communicates to microcontroller 1401 via bus 1410 for communicating fault conditions associated with the audio decryption operators. These fault conditions are used, in accordance with an aspect of the invention, to determine whether a conference room can be added to or deleted from an ongoing conference without disruption of the conference. Additionally, control processor 1006 (FIG. 39) supplies the DES key and the encryption modes, namely, encrypted/clear via interface 1409 to DEC 1002.

Moreover, DEC 1002 realizes common control decryption of the incoming audio signals under program control. Consequently, rooms may be dynamically added to or deleted from and ongoing conference without disrupting it, in accordance with an aspect of the invention.

Operation of audio decryptor (DEC) 1002 is controlled by microcontroller 1401 under control of programs stored in program memory 1402.

Figure 15:
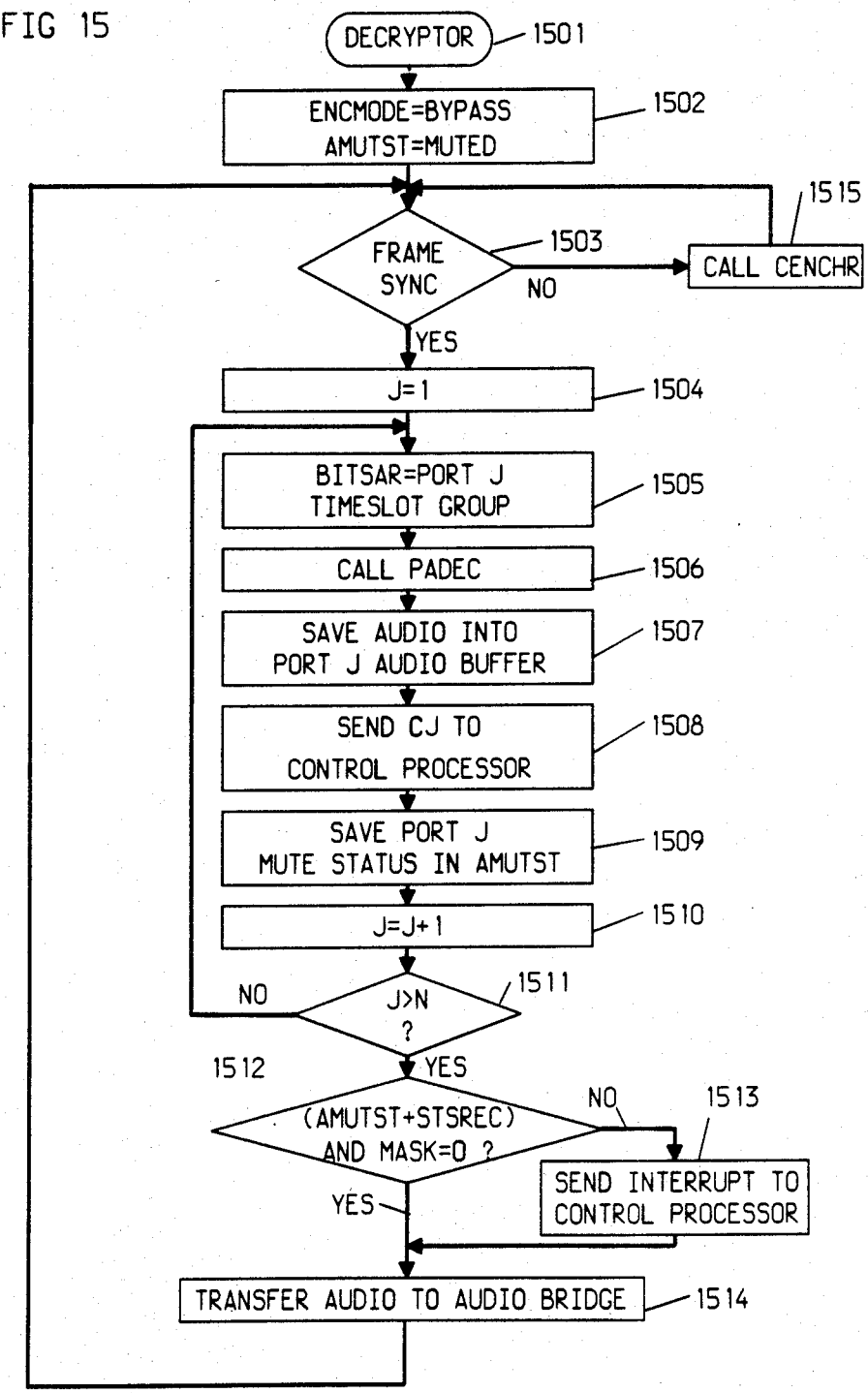
FIG. 15 illustrates a flowchart of the decryptor program routine for the common control operation of decryptor 1002 to controllably decrypt the incoming audio and control information of bridge 103.

FIG. 15 is a flowchart of a program routine stored in program memory 1402 to effect, in accordance with an aspect of the invention, the common control decryption of the sumultaneously received, randomly phased incoming VTS audio signals. Accordingly, the program is entered via oval 1501. Thereafter, operational block 1502 causes initialization of system variables to known states. For example, the ENC mode is set to bypass encryption if transmission is in the clear and AMUTST is set to muted until it is determined that the rooms are being decrypted properly, among others.

Conditional branch point 1503 tests to determine the beginning of the DS-1 frame, i.e., DS-1 frame sync, of the VTS signal. If the test result is true, operational block 1504 sets counter J to 1. is detected. Thereafter, operational block 1504 sets counter J to 1.

Operational block 1505 provides time slot address information for port J to BIC data read control port 1404. Operational block 1506 calls the PADEC subroutine to perform audio decryption and to extract the control channel information for port J.

The PADEC subroutine is shown in FIGS. 16, 17, 18 and 19 and described below.

Operational block 1507 causes the audio information for port J to be stored in an associated portion of scratchpad memory 1405.

Operational block 1508 causes the control channel information i.e., bit CJ, to be supplied to control processor 1006 via an associated one of data links 1009-1 through 1009-N.

Operational block 1509 causes the mute status supplied by subroutine PADEC to be stored in an AMUTST location associated with port J in scratchpad memory 1405.

Operation block 1510 sets counter J equal to J+1.

Conditional branch point 1511 tests to determine if J is greater than N. If the test result is false, control is returned to operational block 1507 and steps 1505 through 1511 are iterated until the test result in step 1511 is true, i.e., yes.

Figure 20:
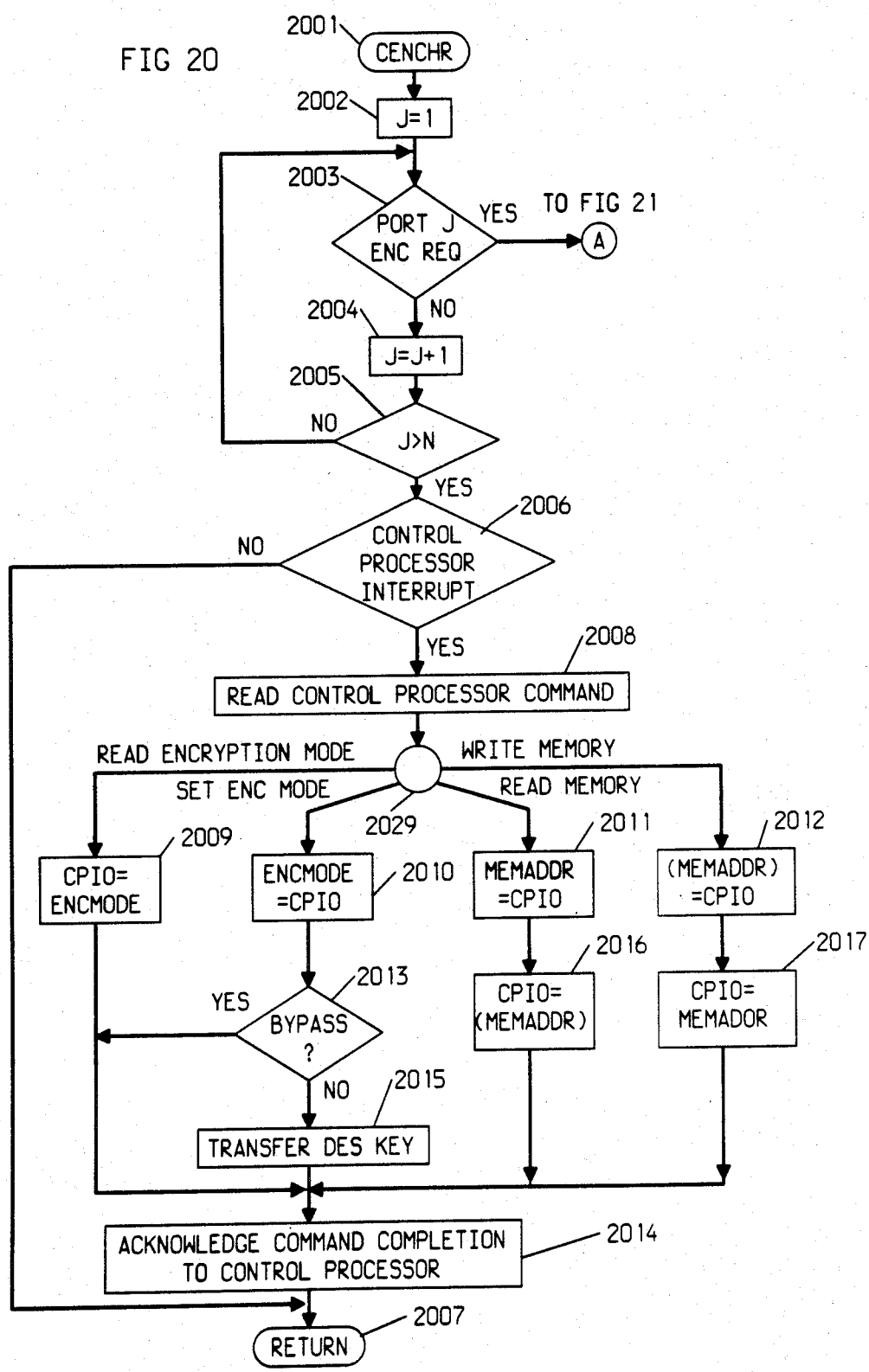
FIGS. 20 and 21 connected as shown form a flow chart of the CENCHR sub-routine used in the decryptor routine of FIG. 15.
Figure 21:
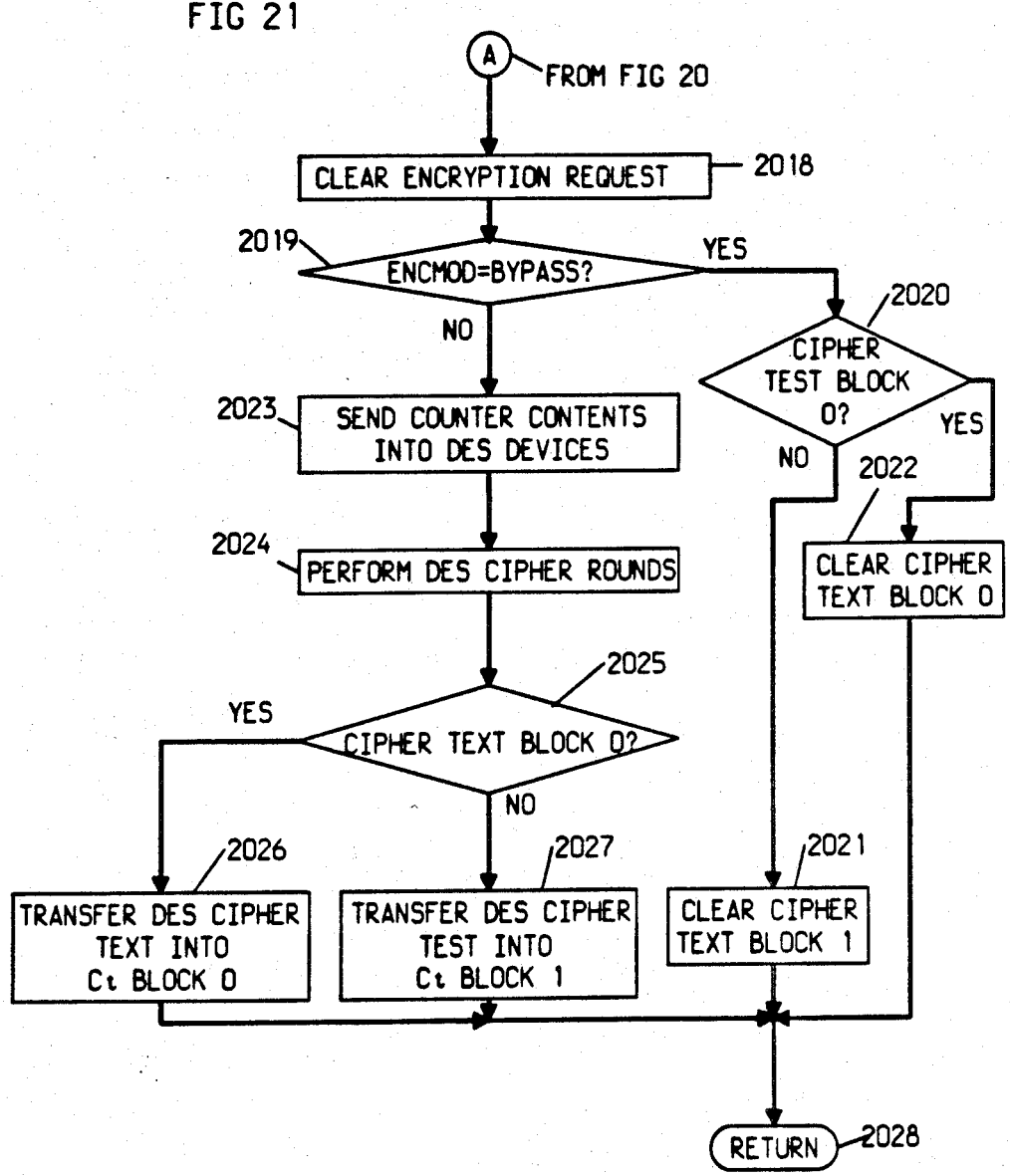

Conditional branch point 1512 tests to determine whether the mute status known by the decryptor is the same as the one known by the control processor 1006. If the test result is false, an interrupt is sent to control processor 1006 via operational block 1513. If the test result in step 1512 is true, no interrupt is sent to control processor 1006. Operational block 1514 causes the transferral of audio information from the scratchpad memory 1405 to audio bridge 1003 via data link 1013. Thereafter, control is returned to conditional branch point 1503. If the test result of conditional branch point 1503 is false, operational block 1515 calls subroutine CENCHR which performs a plane text counter encryption if requested and checks for requests from control processor 1006. The CENCHR subroutine is shown in FIGS. 20 and 21 and described below.

FIGS. 16, 17, 18, and 19 connected as shown illustrate a flowchart of the PADEC subroutine employed in operational block 1506 of the decryptor program routine of FIG. 15. It is important to note that the D-bit sequences of the incoming audio signals are randomly aligned. Consequently, the entire decryption process cannot simply be performed N times and different operations must be performed on each VTS audio signal. These operations are achieved, in accordance with an aspect of the invention, by employing the PADEC subroutine. Accordingly, the PADEC subroutine is entered via oval 1601.

Operational block 1602 causes the BIC data input port 1403 (FIG. 14) to read the data from bridge input circuit 1001 associated with the audio, control channel and audio decipherment information. The data is supplied via data link 1011 in accordance with the address supplied to bridge input circuit 1001 via operational block 1505 (FIG. 15).

Operational blocks 1603, 1604 and 1605 cause segregation of the audio data, control channel data and decipherment information, respectively. Operational block 1606 increments a D-bit counter, i.e., a state counter, for VTS channel J. The state counter is a modulo-128 counter, i.e., counts from 0 to 127 and repeats. The D-bit counter is used in a per channel basis to keep track of operations in performing the decryption.

Operational block 1607 implements a 128 way branch based on the state of the least seven significant bits of the D-bit counter.

Operational block 1608 implements a set of operations based on each of the 128 states of the D-bit state counter on a per channel basis as shown in Table 4 below. The information provided in Table 4 is subdivided into 6 columns as shown.

Column "K" is the D-bit number as described by the state of the D-bit counter in memory 1405 (FIG. 14).

Column "D-bit K Processing" describes the operation that should be performed on each of the different D-bits as shown in FIG. 12.

Column "Received Counter Contents Bookkeeping" assembles the counter contents to be utilized as plain text into the DES module 1407 (FIG. 14).

Column "Counter Encryption Request" requests encryption of the plain text counter contents.

Column "Cipher Byte Selection to Decrypt Audio" determines which cipher text block is to be used to perform audio decryption as described below.

Column "Flow Chart Node" directs the operation to one of flowchart nodes S, LR, or P.

In TABLE 4 the following are used:
LRTMP is a temporary register in memory 1405;
NXTPT is a next plain text register in memory 1405;
HAM(LRTMP) is the code correction of L bits as per TABLE 3;
PRSPT is a present plain text register in memory 1405;
ENCRQ is an encryption request flag including cipher text block [CT]1 or [CT]0; and
CTADDR is a cipher text address in memory 1405.

It is noted that during a present four (4) frame block of audio information, e.g., K=1 through 4, encryption of the plain text counter contents and the resulting cipher text generated by DES module 1407 to be stored, for example, in cipher text (CT) block 1, will be used to decrypt the next subsequent 4 frame block, e.g., K=5 through 8, of audio information. This is realizable because the cipher text is 64 bits and the audio sample is only 16 bits. Thus, the cipher text is used with four audio samples. Since only one cipher text word is needed for every four audio samples per channel the DES module is further freed-up for use with the other channels. During the next 4 frame block of audio information encryption of the plain text counter contents and resulting cipher text stored in [CT] block 0 will be used for decrypting the next block of audio information. That is to say, the cipher text blocks alternate for each 4 frame block of audio information. Moreover, since single DES module 1407 (FIG. 14) needs to be used on a per channel basis only once every 4 frames, and since the DES module performs the prescribed operation in a fraction of an audio sample period, it can be used to perform similar operations for the other VTS channels. Additionally, it is noted that DES module 1407 takes less time than one frame interval to perform the encryption operation on the plain text data. Thus, by employing common control techniques, in accordance with an aspect of the invention, the operations shown in TABLE 4 below are concurrently being performed for up to N randomly phased signals from N VTS channels.

TABLE 4

| K | D-bitK Processing | Received Counter Contents Bookkeeping | Counter Encryption Request | Cipher Byte Selection to Decrypt Audio | Flow Chart Node |
|---|---|---|---|---|---|
| 001 | RTMPO=D=L1 | | ENCRQ (1,[Ct]1) | CTADDR=*[Ct0]0 | LR |
| 002 | FRAMING=D+0 | | | CTADDR=*[Ct1]0 | S |
| 003 | LRTMP1=D=L2 | | | CTADDR=*[Ct2]0 | LR |
| 004 | FRAMING=D+1 | | | CTADDR=*[Ct3]0 | S |
| 005 | LRTMP2=D=L3 | | ENCRQ (2,[Ct]0) | CTADDR=*[Ct0]1 | LR |
| 006 | FRAMING=D+1 | | | CTADDR=*[Ct1]1 | S |
| 007 | LRTMP3=D=L4 | | | CTADDR=*[Ct2]1 | LR |
| 008 | FRAMING=D+0 | | | CTADDR=*[Ct3]1 | S |
| 009 | LRTMP4=D=R1 | | ENCRQ (3,[Ct]1) | CTADDR=*[Ct0]0 | LR |
| 010 | FRAMING=D+0 | | | CTADDR=*[Ct1]0 | S |
| 011 | LRTMP5=D=R2 | | | CTADDR=*[Ct2]0 | LR |
| 012 | FRAMING=D+0 | | | CTADDR=*[Ct3]0 | S |
| 013 | LRTMP6=D=R3 | NXTPT0 = HAM(LRTMP) | ENCRQ (4,[Ct]0) | CTADDR=*[Ct0]1 | LR |
| 014 | PARITY=D | | | CTADDR=*[Ct1]1 | P |
| 015 | | | | CTADDR=*[Ct2]1 | LR |
| 016 | FRAMING=D+1 | | | CTADDR=*[Ct3]1 | S |
| 017 | LRTMPO=D=L5 | | ENCRQ (5,[Ct]1) | CTADDR=*[Ct0]0 | LR |
| 018 | FRAMING=D+0 | | | CTADDR=*[Ct1]0 | S |
| 019 | LRTMP1=D=L6 | | | CTADDR=*[Ct2]0 | LR |
| 020 | FRAMING=D+1 | | | CTADDR=*[Ct3]0 | S |
| 021 | LRTMP2=D=L7 | | ENCRQ (6,[Ct]0) | CTADDR=*[Ct0]1 | LR |
| 022 | FRAMING=D+1 | | | CTADDR=*[Ct1]1 | S |
| 023 | LRTMP3=D=L8 | | | CTADDR=*[Ct2]1 | LR |
| 024 | FRAMING=D+0 | | | CTADDR=*[Ct3]1 | S |
| 025 | LRTMP4=D=R5 | | ENCRQ (7,[Ct]1) | CTADDR=*[Ct0]0 | LR |
| 026 | FRAMING=D+0 | | | CTADDR=*[Ct1]0 | S |
| 027 | LRTMP5=D=R6 | | | CTADDR=*[Ct2]0 | LR |
| 028 | FRAMING=D+0 | | | CTADDR=*[Ct3]0 | S |
| 029 | LRTMP6=D=R7 | NXTPT1 = HAM (LRTMP) | ENCRQ (8,[Ct]0) | CTADDR=*[Ct0]1 | LR |
| 030 | PARITY=D | | | CTADDR=*[Ct1]1 | P |
| 031 | | | | CTADDR=*[Ct2]1 | LR |
| 032 | FRAMING=D+1 | | | CTADDR=*[Ct3]1 | S |
| 033 | LRTMPO=D=L9 | | ENCRQ (9,[Ct]1) | CTADDR=*[Ct0]0 | LR |
| 034 | FRAMING=D+0 | | | CTADDR=*[Ct1]0 | S |
| 035 | LRTMP1=D=L10 | | | CTADDR=*[Ct2]0 | LR |
| 036 | FRAMING=D+1 | | | CTADDR=*[Ct3]0 | S |
| 037 | LRTMP2=D=L11 | | ENCRQ (10,[Ct]0) | CTADDR=*[Ct0]1 | LR |
| 038 | FRAMING=D+1 | | | CTADDR=*[Ct1]1 | S |
| 039 | LRTMP3=D=L12 | | | CTADDR=*[Ct2]1 | LR |
| 040 | FRAMING=D+0 | | | CTADDR=*[Ct3]1 | S |
| 041 | LRTMP4=D=R9 | | ENCRQ (11,[Ct]1) | CTADDR=*[Ct0]0 | LR |
| 042 | FRAMING=D+0 | | | CTADDR=*[Ct1]0 | S |
| 043 | LRTMP5=D=R10 | | | CTADDR=*[Ct2]0 | LR |
| 044 | FRAMING=D+0 | | | CTADDR=*[Ct3]0 | S |
| 045 | LRTMP6=D=R11 | NXTPT2 = HAM(LRTMP) | ENCRQ (12,[Ct]0) | CTADDR=*[Ct0]1 | LR |
| 046 | PARITY=D | | | CTADDR=*[Ct1]1 | P |
| 047 | | | | CTADDR=*[Ct2]1 | LR |
| 048 | FRAMING=D+1 | | | CTADDR=*[Ct3]1 | S |
| 049 | LRTMPO=D=L13 | | ENCRQ (13,[Ct]1) | CTADDR=*[Ct0]0 | LR |
| 050 | FRAMING=D+0 | | | CTADDR=*[Ct1]0 | S |
| 051 | LRTMP1=D=L14 | | | CTADDR=*[Ct2]0 | LR |
| 052 | FRAMING=D+1 | | | CTADDR=*[Ct3]0 | S |
| 053 | LRTMP2=D=L15 | | ENCRQ (14,[Ct]0) | CTADDR=*[Ct0]1 | LR |
| 054 | FRAMING=D+1 | | | CTADDR=*[Ct1]1 | S |
| 055 | LRTMP3=D=L16 | | | CTADDR=*[Ct2]1 | LR |
| 056 | FRAMING=D+0 | | | CTADDR=*[Ct3]1 | S |

TABLE 4-continued

| K | D-bitK Processing | Received Counter Contents Bookkeeping | Counter Encryption Request | Cipher Byte Selection to Decrypt Audio | Flow Chart Node |
|---|---|---|---|---|---|
| 057 | LRTMP4=D=R13 | | ENCRQ (15,[Ct]1) | CTADDR=*[Ct0]0 | LR |
| 058 | FRAMING=D+0 | | | CTADDR=*[Ct1]0 | S |
| 059 | LRTMP5=D=R14 | | | CTADDR=*[Ct2]0 | LR |
| 060 | FRAMING=D+0 | | | CTADDR=*[Ct3]0 | S |
| 061 | LRTMP6=D=R15 | NXTPT3 = HAM(LRTMP) | ENCRQ (16,[Ct]0) | CTADDR=*[Ct0]1 | LR |
| 062 | PARITY=D | | | CTADDR=*[Ct1]1 | P |
| 063 | | | | CTADDR=*[Ct1]1 | LR |
| 064 | FRAMING=D+1 | | | CTADDR=*[Ct3]1 | S |
| 065 | LRTMPO=D=L17 | | ENCRQ (17,[Ct]1) | CTADDR=*[Ct0]0 | LR |
| 066 | FRAMING=D+0 | | | CTADDR=*[Ct1]0 | S |
| 067 | LRIMP1=D=L18 | | | CTADDR=*[Ct2]0 | LR |
| 068 | FRAMING=D+1 | | | CTADDR=*[Ct3]0 | S |
| 069 | LRTMP2=D=L19 | | ENCRQ (18,[Ct]0) | CTADDR=*[Ct0]1 | LR |
| 070 | FRAMING=D+1 | | | CTADDR=*[Ct1]1 | S |
| 071 | LRTMP3=D=L20 | | | CTADDR=*[Ct2]1 | LR |
| 072 | FRAMING=D+0 | | | CTADDR=*[Ct3]1 | S |
| 073 | LRTMP4=D=R17 | | ENCRQ (19,[Ct]1) | CTADDR=*[Ct0]0 | LR |
| 074 | FRAMING=D+0 | | | CTADDR=*[Ct1]0 | S |
| 075 | LRTMP5=D=R18 | | | CTADDR=*[Ct2]0 | LR |
| 076 | FRAMING=D+0 | | | CTADDR=*[Ct3]0 | S |
| 077 | LRTMP6=D=R19 | NXTPT4 = HAM(LRTMP) | ENCRQ (20,[Ct]0) | CTADDR=*[Ct0]1 | LR |
| 078 | PARITY=D | | | CTADDR=*[Ct1]1 | P |
| 079 | | | | CTADDR=*[Ct2]1 | LR |
| 080 | FRAMING=D+1 | | | CTADDR=*[Ct3]1 | S |
| 081 | LRTMPO=D=L21 | | ENCRQ (21,[Ct]1) | CTADDR=*[Ct0]0 | LR |
| 082 | FRAMING=D+0 | | | CTADDR=*[Ct1]0 | S |
| 083 | LRTMP1=D=L22 | | | CTADDR=*[Ct2]0 | LR |
| 084 | FRAMING=D+1 | | | CTADDR=*[Ct3]0 | S |
| 085 | LRTMP2=D=L23 | | ENCRQ (22,[Ct]0) | CTADDR=*[Ct0]1 | LR |
| 086 | FRAMING=D+1 | | | CTADDR=*[Ct1]1 | S |
| 087 | LRTMP3=D=L24 | | | CTADDR=*[Ct2]1 | LR |
| 088 | FRAMING=D+0 | | | CTADDR=*[Ct3]1 | S |
| 089 | LRTMP4=D=R21 | | ENCRQ (23,[Ct]1) | CTADDR=*[Ct0]0 | LR |
| 090 | FRAMING=D+0 | | | CTADDR=*[Ct1]0 | S |
| 091 | LRTMP5=D=R22 | | | CTADDR=*[Ct2]0 | LR |
| 092 | FRAMING=D+0 | | | CTADDR=*[Ct3]0 | S |
| 093 | LRTMP6=D=R23 | NXTPT5 = HAM(LRTMP) | ENCRQ (24,[Ct]0) | CTADDR=*[Ct0]1 | LR |
| 094 | PARITY=D | | | CTADDR=*[Ct1]1 | P |
| 095 | | | | CTADDR=*[Ct2]1 | LR |
| 096 | FRAMING=D+1 | | | CTADDR=*[Ct3]1 | S |
| 097 | LRTMPO=D=L25 | | ENCRQ (25,[Ct]1) | CTADDR=*[Ct0]0 | LR |
| 098 | FRAMING=D+0 | | | CTADDR=*[Ct1]0 | S |
| 099 | LRTMP1=D=L26 | | | CTADDR=*[Ct2]0 | LR |
| 100 | FRAMING=D+1 | | | CTADDR=*[Ct3]0 | S |
| 101 | LRTMP2=D=L27 | | ENCRQ (26,[Ct]0) | CTADDR=*[Ct0]1 | LR |
| 102 | FRAMING=D+1 | | | CTADDR=*[Ct1]1 | S |
| 103 | LRTMP3=D=L28 | | | CTADDR=*[Ct2]1 | LR |
| 104 | FRAMING=D+0 | | | CTADDR=*[Ct3]1 | S |
| 105 | LRTMP4=D=R25 | | ENCRQ (27,[Ct]1) | CTADDR=*[Ct0]0 | LR |
| 106 | FRAMING=D+0 | | | CTADDR=*[Ct1]0 | S |
| 107 | LRTMP5=D=R26 | | | CTADDR=*[Ct2]0 | LR |
| 108 | FRAMING=D+0 | | | CTADDR=*[Ct3]0 | S |
| 109 | LRTMP6=D=R23 | NXTPT6 = HAM(LRTMP) | ENCRQ (28,[Ct]0) | CTADDR=*[Ct0]1 | LR |
| 110 | PARITY=D | | | CTADDR=*[Ct1]1 | P |
| 111 | | | | CTADDR=*[Ct2]1 | LR |
| 112 | FRAMING=D+1 | | | CTADDR=*[Ct3]1 | S |
| 113 | LRTMPO=D=L29 | | ENCRQ (29,[Ct]1) | CTADDR=*[Ct0]0 | LR |
| 114 | FRAMING=D+0 | | | CTADDR=*[Ct1]0 | S |
| 115 | LRTMP1=D=L30 | | | CTADDR=*[Ct2]0 | LR |
| 116 | FRAMING=D+1 | | | CTADDR=*[Ct3]0 | S |
| 117 | LRTMP2=D=L31 | | ENCRQ (30,[Ct]0) | CTADDR=*[Ct0]1 | LR |
| 118 | FRAMING=D+1 | | | CTADDR=*[Ct1]1 | S |

TABLE 4-continued

| K | D-bitK Processing | Received Counter Contents Bookkeeping | Counter Encryption Request | Cipher Byte Selection to Decrypt Audio | Flow Chart Node |
|---|---|---|---|---|---|
| 119 | LRTMP3=D=L32 | | | CTADDR=*[Ct2]1 | LR |
| 120 | FRAMING=D+0 | | | CTADDR=*[Ct3]1 | S |
| 121 | LRTMP4=D=R29 | | ENCRQ (31,[Ct]1) | CTADDR=*[Ct0]0 | LR |
| 122 | FRAMING=D+0 | | | CTADDR=*[Ct1]0 | S |
| 123 | LRTMP5=D=R30 | | | CTADDR=*[Ct2]0 | LR |
| 124 | FRAMING=D+0 | | | CTADDR=*[Ct3]0 | S |
| 125 | LRTMP6=D=R31 | NXTPT6 = HAM(LRTMP) PRSPT=NXTPT | ENCRQ (0,[Ct]0) | CTADDR=*[Ct0]1 | LR |
| 126 | PARITY=D | | | CTADDR=*[Ct1]1 | P |
| 127 | | | | CTADDR=*[Ct2]1 | LR |
| 128 | FRAMING=D+1 | | | CTADDR=*[Ct3]1 | S |

Flow chart node S is entered as described in Table 4. Thereafter, operational block 1609 will choose the proper cipher text as shown in Table 4 to decrypt the audio information in bits A-1 through A-16 by performing an Exclusive OR function of the chosen cipher text portion and the audio sample AJ.

Conditional branch point 1610 tests to determine whether the D-bit counter state is in synchronism with the audio deciphering bits super frame (D-bit super frame). If the test result is true, there is synchronism and control is transferred to conditional branch point 1611. However, if the test result is false, operational block 1612 decrements the D-bit counter to search for D-bit superframe synchronism. Then, operational block 1613 mutes the audio by forcing bits A-1 through A-16 to be logical 0's and also sets the mute flag to a logical 1, thereby indicating that the audio has been muted to control processor 1006. Conditional branch point 1611 tests to determine whether the mute counter is equal to 0. If the test result is true, operational block 1614 sets the mute flag to a logical 0 thereby indicating that the audio is not muted. If the test result in step 1611 is false, the audio bits A-1 through A-16 are set to logical 0's and the mute flag is set to a logical 1, again indicating that the audio is muted. Control is returned to the decryptor program routine (FIG. 15) via oval 1616.

Flow chart node LR is entered as described in Table 4. Thereafter, operational block 1617 will choose the proper cipher text as shown in Table 4 to decrypt the audio information in bits A-1 through A-16 by performing an Exclusive OR function of the chosen cipher text portion and the audio samples AJ.

Conditional branch point 1618 tests to determine if the mute counter is set to 0. If the test result is true, operational block 1619 sets the mute flag to 0 indicating that the audio is not muted. If the test result in step 1618 is false, operational block 1620 sets audio bits A-1 through A-16 ot logical 0's and sets the mute flag to a 1, thereby indicating that the audio is muted. Thereafter, control is returned to the decryptor program routine (FIG. 15) via oval 1621.

Flowchart node P is entered as described in Table 4. Thereafter, operational block 1622 decrypts audio bits A-1 through A-16 by performing an Exclusive OR function of the chosen cipher text portion and the audio sample AJ.

Operational block 1623 computes the modulo-2 sum over the decrypted bits A-9 through A-16 and the associated value of the D-bit.

Conditional branch point 1624 tests to determine whether the modulo-2 sum resulted in an error defined as odd parity over audio bits A-9 through A-16. If the test result is false, control is transferred to conditional branch point 1625. However, if the test result is true, operational block 1626 sets the mute counter to 15 to ensure at least 15 error free audio samples, corresponding to when the D-bit is a parity bit (a total of 240 audio samples), are received before the audio is unmuted. Operational block 1627 sets the audio bits A-1 through A-16 to logical 0's and sets the mute flag to 1, thereby indicating that the audio is muted.

Conditional branch point 1625 tests whether the mute counter equals 0. If the test result is true, operational block 1628 sets the mute flag to 0, thereby indicating that the audio is unmuted. If the test result in step 1625 is false, operational block 1629 decrements the mute counter. Thereafter, operational block 1630 sets audio bits A-1 through A-16 to logical 0 and sets the mute flag to 1, thereby indicating that the audio is muted. Then, control is returned to the decryptor program routine (FIG. 15) via oval 1631.

Thus, the PADEC routine controls operation of DEC 1002 to effect a common time shared function which is responsive to the decipherment control bits (D-bits) from each of a plurality of received audio signals for obtaining plain text data corresponding to each of the received audio signals and for generating corresponding encryption requests as set out in Table 4 above. Additionally, the PADEC routine controls DEC 1002 to controllably utilize, again on a common time shared basis, the cipher text data generated by the CENCHR routine described below for decrypting the received audio samples. As described above, the PADEC routine employs a plurality of process state counters, i.e., DBCNTRJ step 1606, for directing operations, in accordance with Table 4, for each of the received signal channels on a time shared basis.

It is noted that the common control arrangement of the invention does not merely repeat the same function N times for the N audio signals but can perform any one of a multiplicity of operations for each of the N audio signals as directed by the process state counter, i.e., D-bit counter associated with the particular audio signal. Thus, the decryptor, in accordance with the invention, decrypts simultaneously received, randomly phased audio signals. In this example, 128 operations are directed by each of the D-bit counters and each of the N channels may require a different one of those operations.

It is further noted, that although the invention is employed in this example to decrypt audio signals, it is equally applicable to any other type of data signal.

FIGS. 20 and 21 connected as shown form a flowchart of the CENCHR subroutine called in operational blocks 1515 and 1517 of the decryptor program routine shown in FIG. 15. The CENCHR subroutine is the controller for performing the plain text encryption for each of the VTS audio signals. Accordingly, the CENCHR subroutine is entered via oval 2001. Thereafter, operational block 2002 sets counter J to 1.

Figure 16:
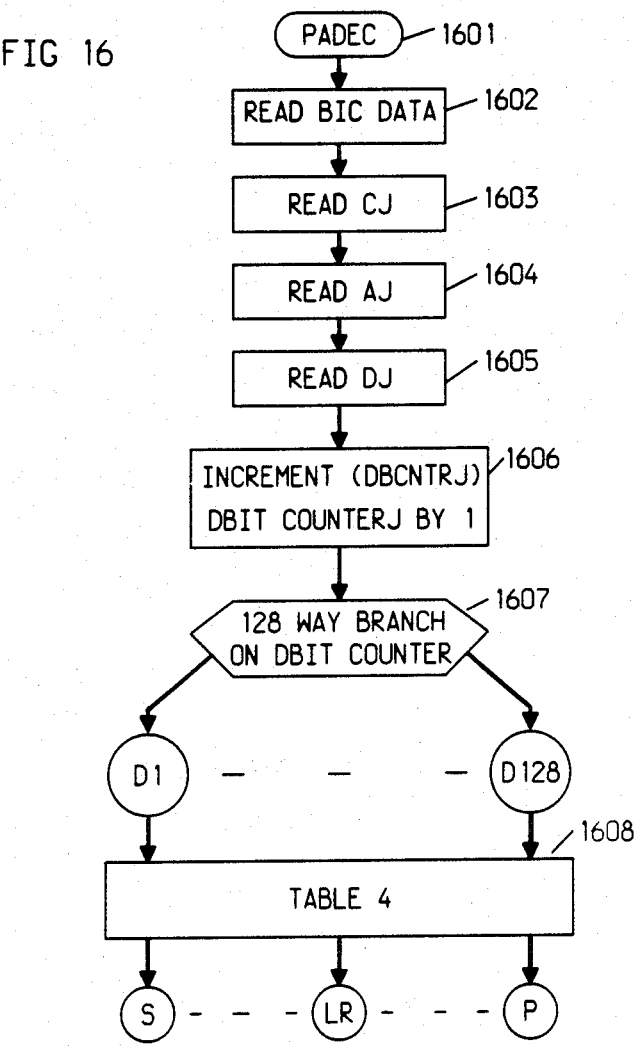
FIGS. 16, 17, 18 and 19 when connected as shown form a flow chart of the PADEC sub-routine used in the decryptor routine of FIG. 15.
Figure 17:
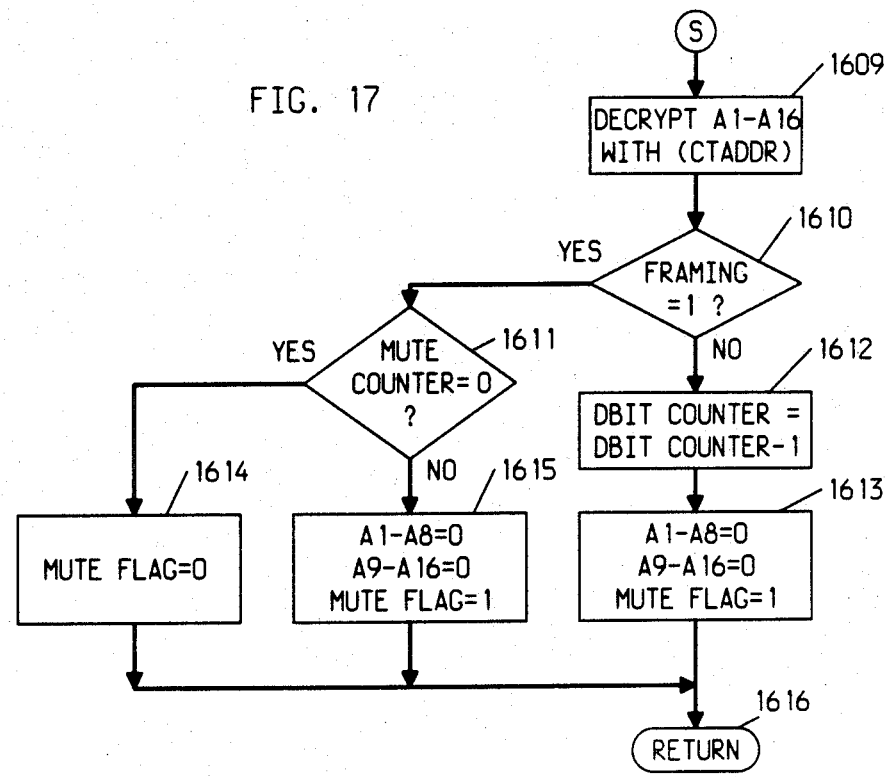
Figure 18:
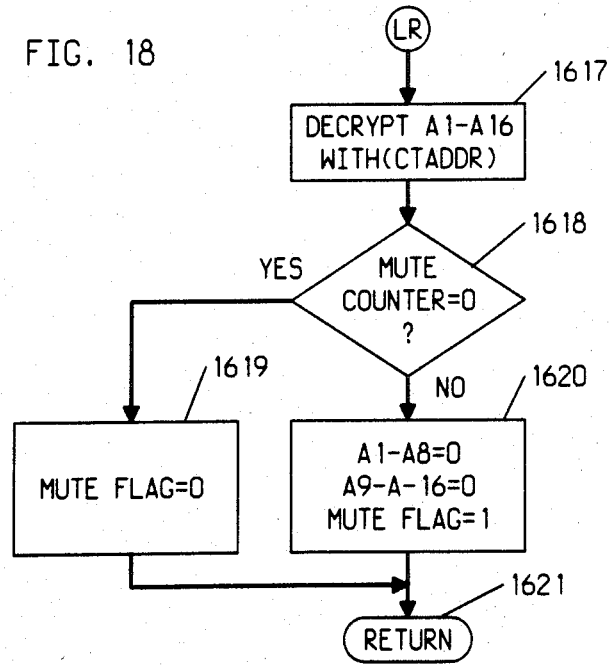
Figure 19:
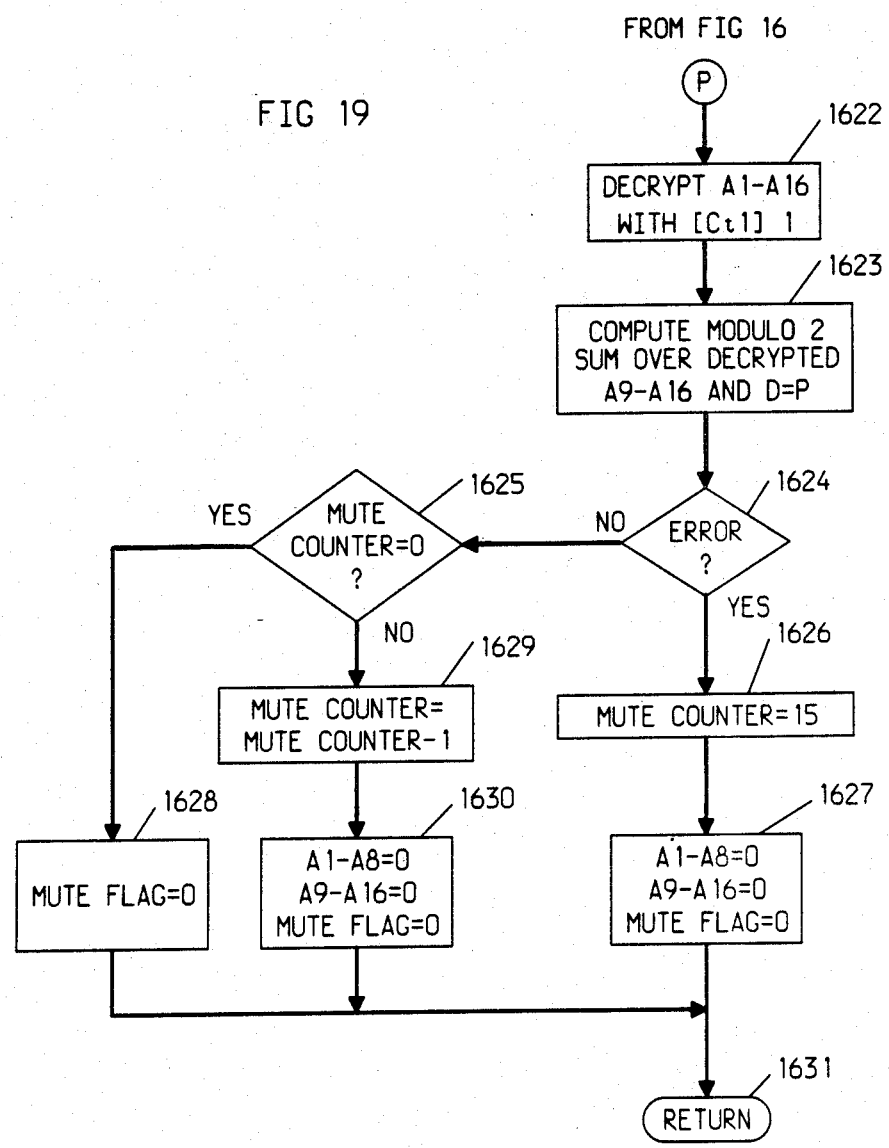

Conditional branch point 2003 tests whether data link J contains an encryption request according to Table 4 of operational block 1608 of the PADEC subroutine shown in FIG. 16. If the test is false, operational block 2004 sets counter J equal J+1.

Conditional branch point 2005 tests whether J>N. If the test result is false, control is returned to conditional branch point 2003. If the test result in step 2005 is true, conditional branch point 2006 tests whether the control processor 1006 requested a command to be executed by the audio decryptor. If the test result in step 2006 is false, control is returned to the decryptor program routine of FIG. 15 via oval 2007. However, if the test result in step 2006 is true, operational block 2008 reads the control processor command and causes one of four operations to be effected depending on the command which is read. The operations are read encryption mode, set encryption mode, read memory 1405, and write memory 1405. where are effected by operational blocks 2009, 2010, 2011 and 2012, respectively.

Operational block 2009 transfers the encryption mode in the ENCMODE register to register CPIO located in control processor bus interface 1409 of FIG. 14.

Operational block 2010 sets the register ENCMODE to the value in register CPIO located in control processor bus interface 1409.

Conditional branch point 2013 tests whether the decryption process is bypassed. If the condition is true, control is transferred to operational block 2014. If the test result is false, operational block 2015 transfers the decryption key information from the scratchpad memory 1405 into the DES module 1407.

Operational block 2011 sets the MEMADDR register to the value of CPIO to indicate which location in memory 1405 should be read.

Operational block 2016 reads the contents of memory 1405 as described by the address located in register MEMADDR and transfers the contents to register CPIO in control processor bus interface 1409.

Operational block 2012 writes the location of memory 1405 at the address designated by MEMADDR with the contents described by register CPIO.

Operational block 2017 transfers the contents of register MEMADDR to register CPIO to indicate to the control processor 1006 which location of memory 1405 was written.

Operational block 2014 acknowledges command completion to control processor 1006. Control is returned to the decryptor program routine via oval 2007.

Returning to conditional branch point 2003, which tests whether data link J contains an encryption request according to Table 4 of operational block 1608 of the PADEC subroutine shown in FIG. 16. If the test result in step 2003 is true, operational block 2018 clears the encryption request and proceeds through conditional branch point 2019.

Conditional branch point 2019 tests whether the encryption mode is to bypass encryption. If the test result in step 2019 is true, conditional branch point 2020 tests which cipher text block located in scratchpad memory 1405 (FIG. 14) is to be cleared to 0. If the test result in step 2020 is false, operational block 2021 clears the cipher text block 1 in scratchpad memory 1405. If the test result in step 2020 is true, operational block 2022 is entered which clears the cipher text block 0 in scratchpad memory 1405.

Returning to conditional branch point 2019, which tests whether the encryption mode is to bypass encryption. If the test result is false, operational block 2023 is entered, which transfers the plain text counter contents located in memory 1405 into the DES module 1407 (FIG. 14).

Operational block 2024 instructs the DES module 1407 to perform the cipher rounds, i.e., the encryption of the plain text.

Conditional branch point 2025 tests which cipher text block located in scratchpad memory 1405 (FIG. 14) is to be loaded with the DES module cipher text. If the condition is true, operational block 2026 is entered which transfers the cipher text from the DES module into the cipher text block 0. If the test result in step 2025 is false, operational block 2027 is entered which transfers the cipher text from the DES module into the cipher text (CT) block 1.

Then, control is returned to the decryptor program routine shown in FIG. 15 via oval 2028.

Thus, the CENCHR routine controls the operation of DEC 1002 to effect common time shared operation of DES module 1407 to generate in response to encryption requests from PADEC (Table 4) and utilizing the supplied plain text data from PADEC the corresponding cipher text data that is used to decrypt the incoming audio samples.

AUDIO BRIDGE

Figure 22:
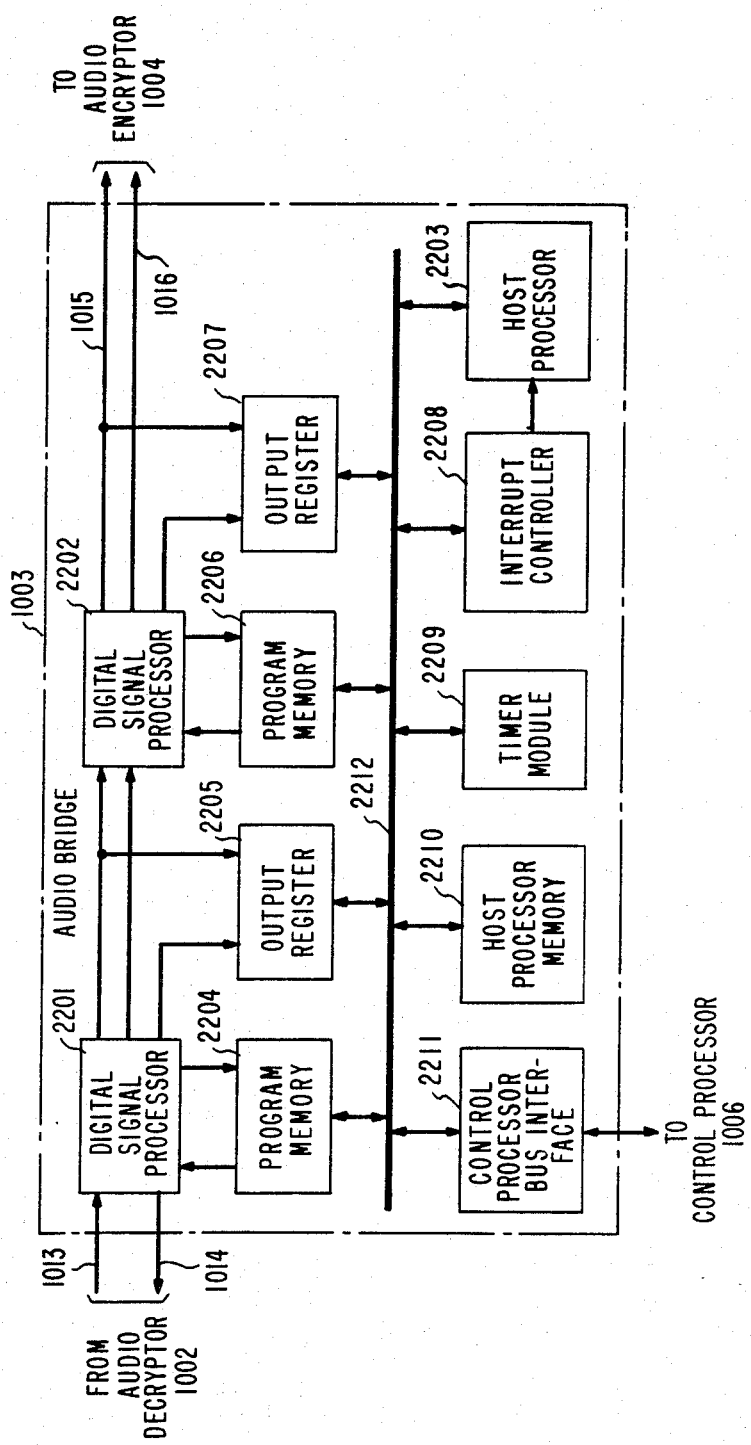
FIG. 22 shows in simplified block diagram form details of audio bridge 1003 employed in bridge 103 of FIG. 10.
Figure 23:
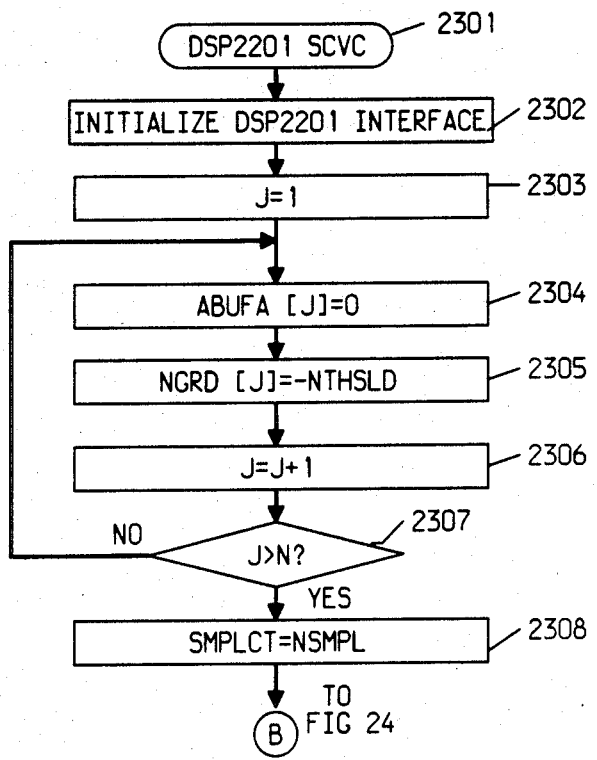
FIGS. 23, 24, 25 and 26 when connected as shown form a flow chart of a program routine for controllably operating DSP 2201 in audio bridge 1003 of FIG. 22.
Figure 24:
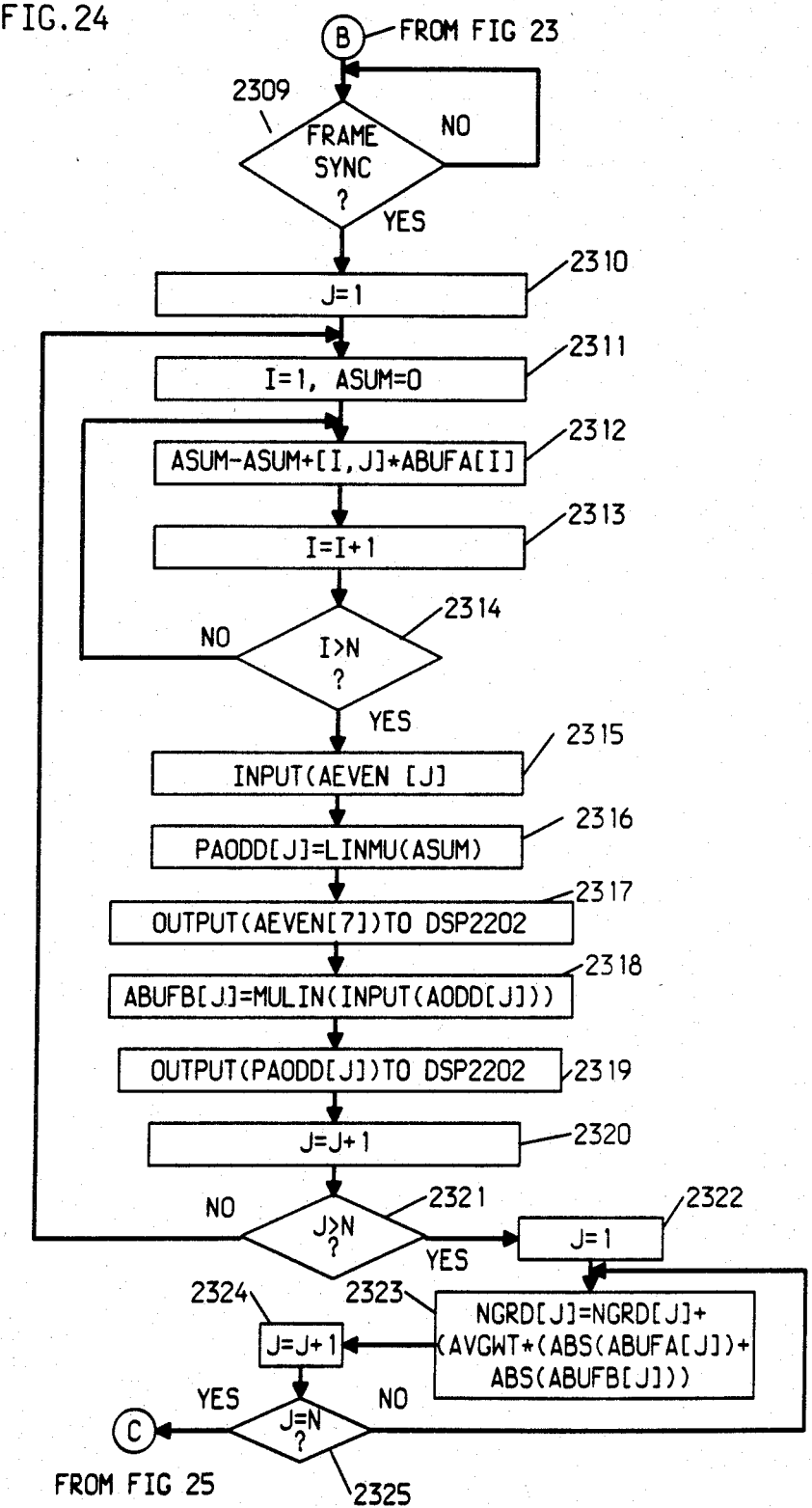
Figure 25:
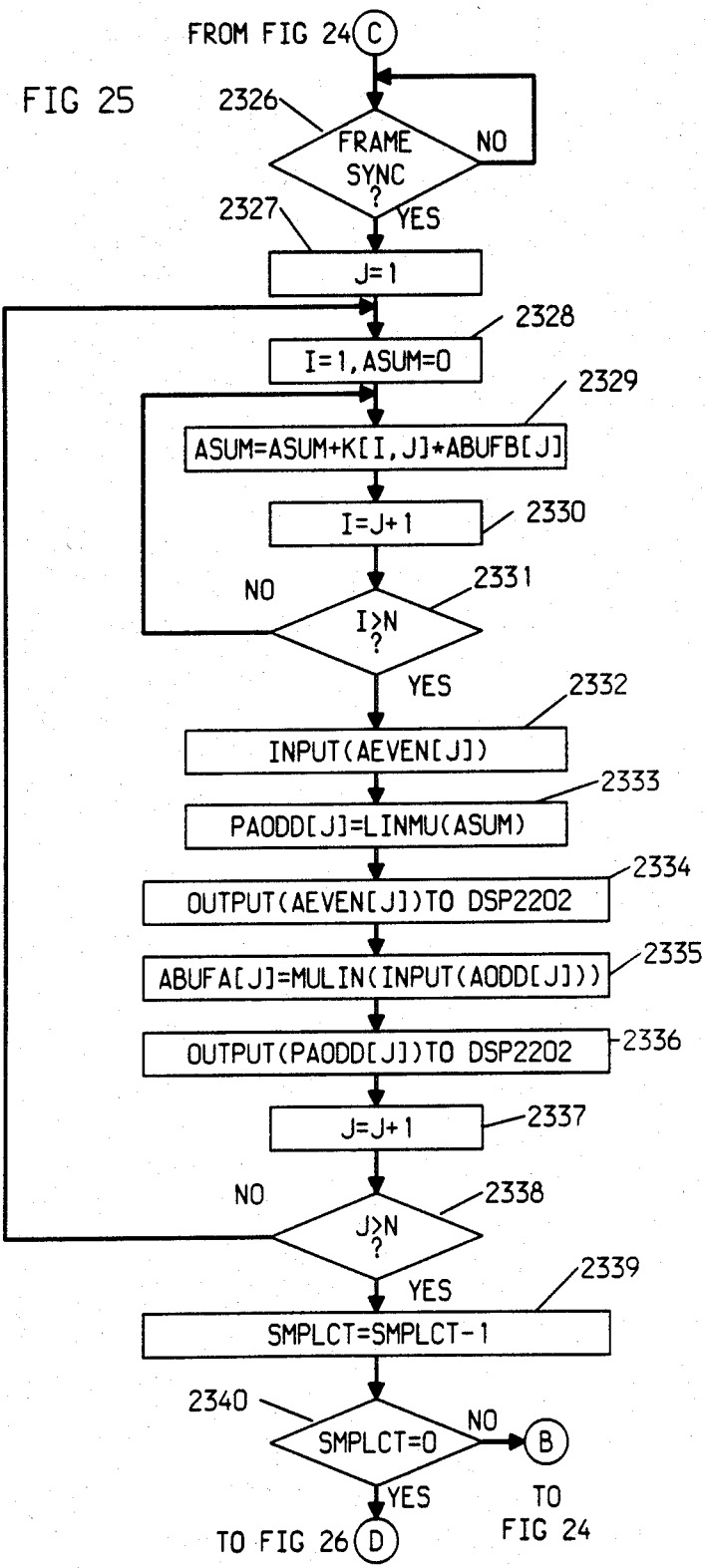
Figure 26:
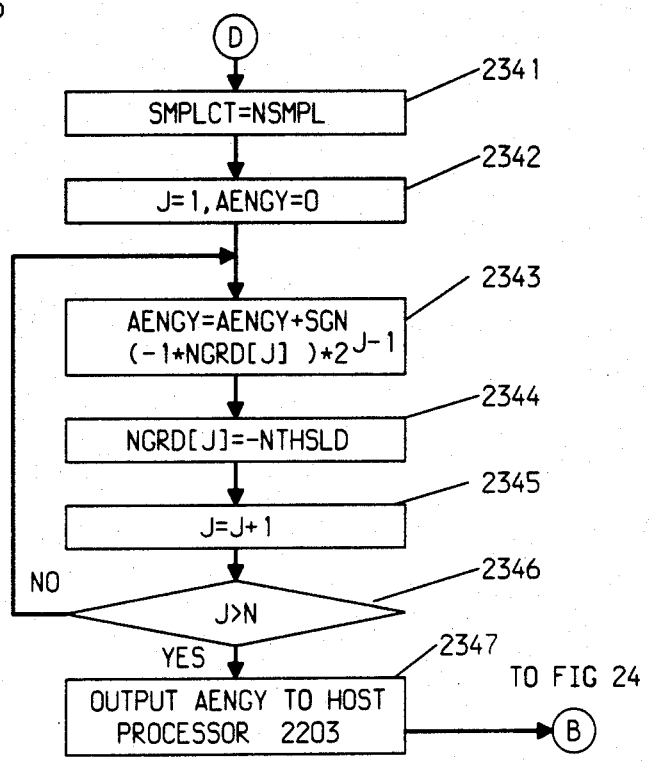
Figure 27:
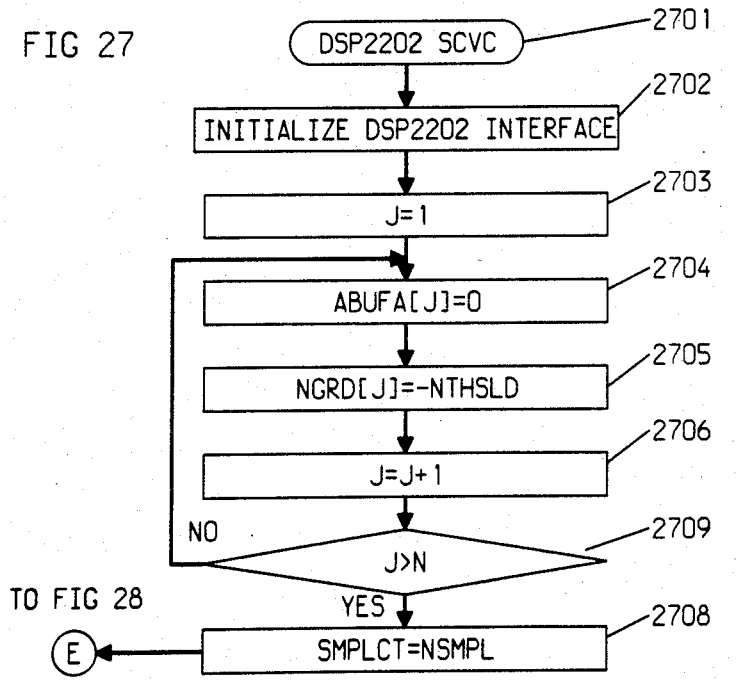
FIGS. 27, 28, 29 and 30 when connected as shown form a flow chart of a program routine for controllably operating DSP 2202 in audio bridge 1003 of FIG. 22.
Figure 28:
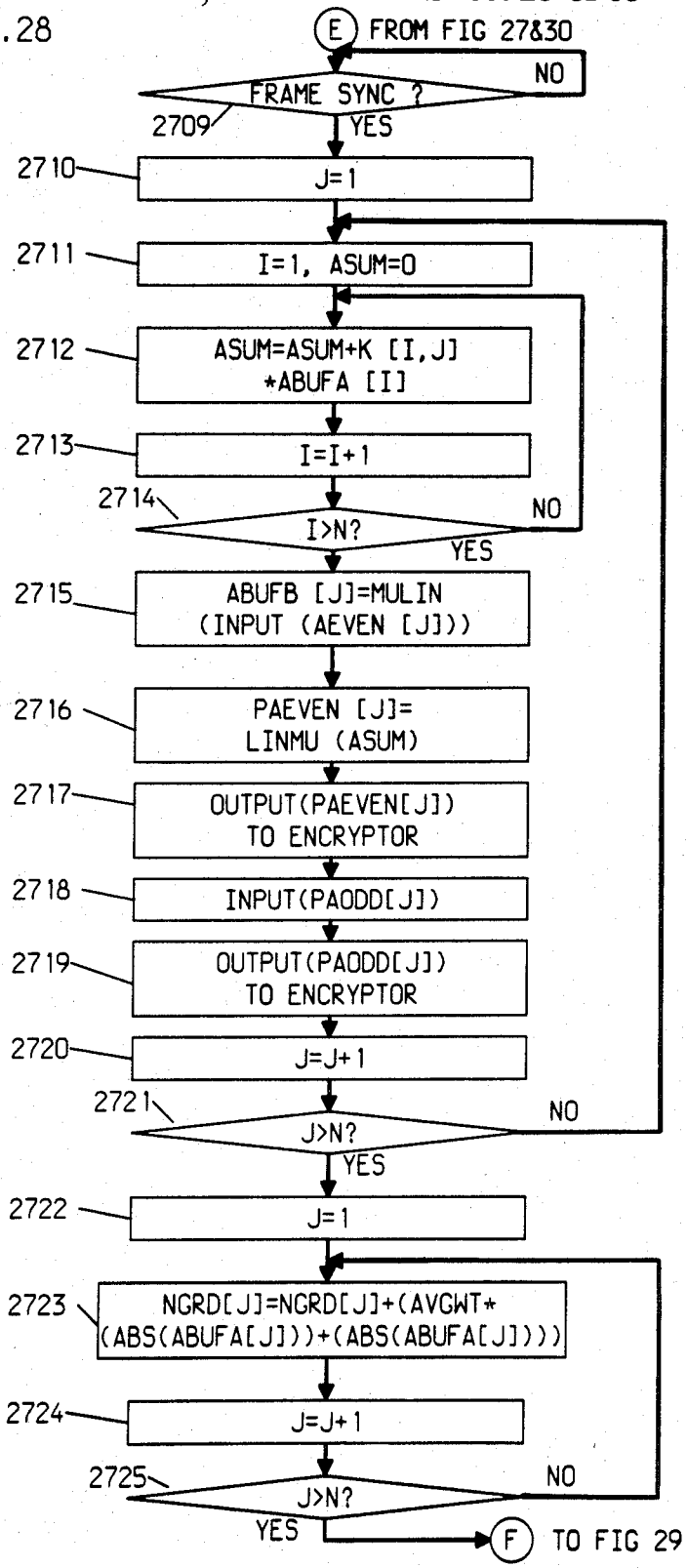
Figure 29:
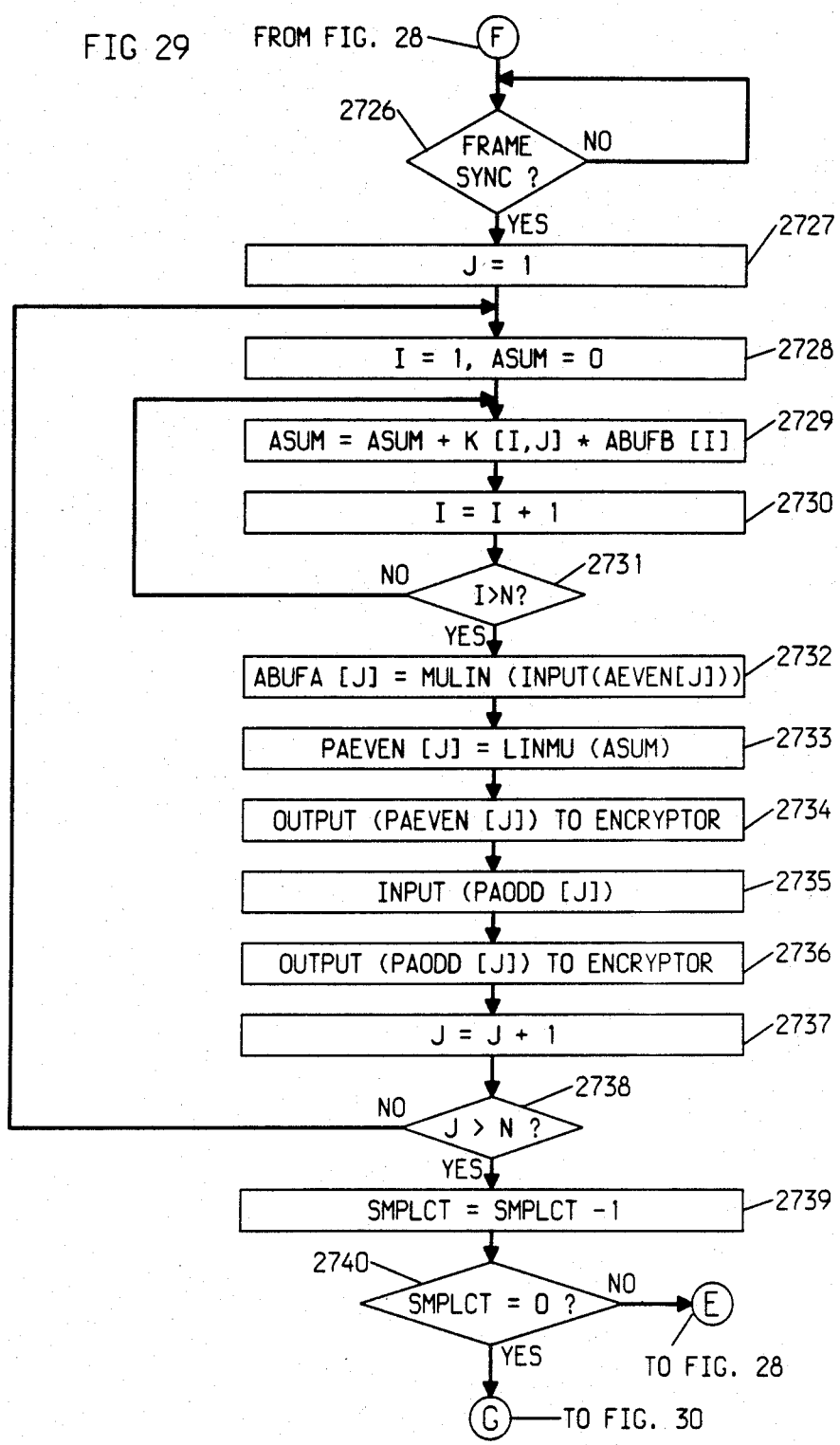
Figure 30:
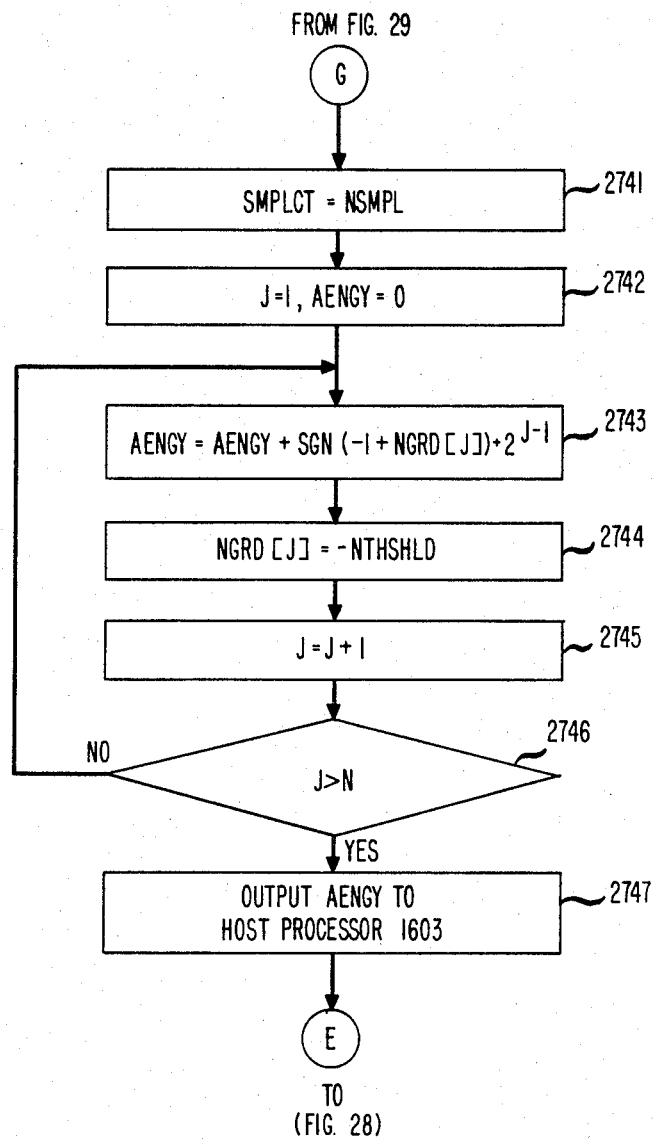

Details of audio bridge 1003 of FIG. 10 are shown in simplified block diagram form in FIG. 22. Audio bridge 1003 includes digital signal processor (DSP) 2201, digital signal processor (DSP) 2202, host processor 2203, program memory 2204, output register 2205, program memory 2206, output register 2207, interrupt controller 2208, timer module 2209, host processor memory 2210 and control processor interface 2211. Units 2204 through 2211 are inter-connected to host processor 2203 via bus 2212. Program memory 2204 and output register 2205 are associated with DSP 2201 while program memory 2206 and output register 2207 are associated with DSP 2202. Program memories 2204 and 2206 appear as dual port storage systems. DSPs 2201 and 2202 have read-only access to memories 2204 and 2206, respectively, for fetching instructions and program constants. Host processor 2203 has read-write access to memories 2204 and 2206 in order to down-line load the DSP programs and to modify certain of the memory locations that appear as constants. DSPs 2201 and 2202 communicate via output registers 2205 and 2207, respectively, to host processor 2203. DSP 2201 under program control can direct its output to output register 2205 or to DSP 2202. Similarly, DSP 2202 can direct its output to output register 2207 or via 1015 to audio encryptor 1004. Each of DSPs 2201 and 2202 includes RAM memory which as described below stores audio input samples AU and also processed audio output samples PAU. It is noted that two DSPs, i.e., DSP 2201 and DSP 2202, are employed in this embodiment to enhance the audio bridge throughput, i.e., speed up the audio processing. To this end, DSP 2201 processes sample represented by bits A9 through A16 while DSP 2202 processes samples represented by bits A1 through A8. Anyone of a number of digital signal processing (DSP) units known in the art may be employed in audio bridge 1003. One such DSP unit is described in several articles in The Bell System Technical Journal, Vol. 60, No. 7, Part 2, dated September 1981 and manufactured by Western Electric Company. Similarly, host processor 2203 may be any of the known microprocessors. In this embodiment a Motorola MC 6809 microprocessor unit is employed.

It is important to note that there is no fixed assignment of the VTS links to conference rooms and/or other MLCTs. Accordingly, audio bridge 1003 under program control effects, in accordance with an aspect of the invention, programmable audio mixing of the incoming audio signals from the VTS links. Additionally, it is possible to controllably reconfigure an on going conference without disrupting it. To this end, audio bridge 1003 processes the incoming audio from the rooms in the conference, in accordance with an aspect of the invention, by employing a partial sum algorithm which employs matrix multiplication to insure the appropriate audio mix is sent to the rooms in the conference. Use of the partial sum arrangement is important to obtain the desired audio mixes when more than one MLCT is used in a conference.

Audio bridge 1003 of FIG. 22 must controllably process the audio information obtained from rooms serviced by the MLCT and also the audio information from rooms serviced by one or more remote MLCTs. Since more than one MLCT may be in a conference and since MLCT's communicate to one another over one out-going data link a straight summation of the audio information cannot readily be realized. This problem of audio mixing is overcome, in accordance with an aspect of the invention, by advantageously using a partial summing process in each MLCT. To this end, the audio information from rooms serviced by a particular MLCT are summed locally and transmitted as a partial sum to the other MLCTs in the conference. The partial sums from the other MLCTs are controllably selectively combined with the locally generated partial sum to generate the appropriate audio mixes for the rooms serviced by the MLCT.

This summing is realized, in accordance with an aspect of the invention, by control processor 1006 (FIG. 39) under program control a programmable matrix operation which in this example employs two $N \times N$ matrices determined according to the MLCT in-links assignments and the desired audio mixes, namely, $$\begin{bmatrix} PAU1 \\ PAU2 \\ \vdots \\ \vdots \\ PAUN \end{bmatrix} = \begin{bmatrix} K11 & K12 \cdots K1N \\ K21 & K22 \cdots K2N \\ \vdots & \vdots & \vdots \\ \vdots & \vdots & \vdots \\ KN1 & KN2 \cdots KNN \end{bmatrix} \times \begin{bmatrix} AU1 \\ AU2 \\ \vdots \\ \vdots \\ AUN \end{bmatrix} \quad (1)$$

Where the processed audio version PAU1 for out-link J is generated via matrices 1 from the in-link audio (AU) from the appropriate in-links. The process performed by DSP 2201 and DSP 2202 is $$PAUJ = \sum_{I=1}^{N} KIJ \cdot AUI \quad (2)$$

where PAU represents the processed audio information, J is the out-link, I is the in-link and AU is the in-link audio information. Constants K, I, and J are determined by control processor 1006 from the link assignments provided by processor 1006 and a noise guard algorithm provided from audio bridge 1003 host processor 2210 (FIG. 22).

The first matrix provided from (1) is called a NO-LOSS matrix and the second is called a LOSS matrix. The NO-LOSS matrix contains either 0.0 or 1.0 as elements K depending on the conference link assignments, i.e., which rooms are active, namely, $$KNOLOSS[I, J] = KASSIGN[I, J], \quad (3)$$

and $$KLOSS[I, J] = KNOLOSS[I, J] \cdot L[I] \quad (4)$$

where $L[I] = -12$ db except when the particular link is a MLCT in-link. Then, $L[I] = 1.0$ or 0 db.

The noise guard algorithm described below chooses appropriate columns K from the NOLOSS matrix or the LOSS matrix depending on whether there is audio or no audio on a given in-link I. The constants K from the column chosen by control processor 1006 are provided to DSP 2201 and 2202 for multiplication with the incoming audio information AU and, therefore, generating the audio mixes as described below. This allows for the controllable insertion of loss in the audio information in those links in which no speech is present to attenuate noise.

Thus, from matrix (3) it is seen that by appropriate selection of constant K any weighted sum of the input audio samples AU can be generated for each of the processed audio output samples PAU. Consequently, the partial audio sums to be transmitted to other MLCT and also the audio mixes for each conference location are readily obtainable under program control. Additionally, from gain matrix (4) it is seen that any predetermined loss value, can be readily inserted in any of the audio input signals AU. Moreover, if desired any predetermined gain value is also readily inserted in any of the audio input signals AU. In this example, not to be construed as limiting the scope of the invention a loss of $-12$ db is controllably inserted as desired.

As shown in the flow charts and described below audio bridge 1003 operates under program control to generate the desired processed audio samples. To this end, the incoming audio samples are converted from mu-law PCM into linear form. The linear samples from a currently received frame are stored in a first buffer memory, e.g., ABUFA[I], while the linear samples from the last previous frame are stored in a second buffer memory, e.g., ABUFB[I]. While inputting audio samples into ABUFA[I], the audio samples in ABUFB[I] are processed via a matrix multiplication, in accordance with an aspect of the invention, to generate desired partial sum processed audio samples for each location in the conference, as well as, the appropriate partial summation of locations served by the MLCT for transmission to other MLCTs in the conference, if any. When inputting samples into ABUFB[I], the samples stored in ABUFA[I] are being processed. The processed samples are converted from linear to mu-law PCM and supplied to encryptor 1004 for further processing.

FIGS. 23, 24, 25, and 26 connected as shown form a flowchart of a program stored in program memory 2204 for controlling operation of digital signal processor 2201 (FIG. 22). It is noted that the references to registers in the following flow charts are registers in the RAM memory of either DSP 2201 or DSP 2202.

Accordingly, the program routine is entered via oval 2301. Thereafter, operational block 2302 initializes the digital signal processor interface (not shown in FIG. 22).

Operational block 2303 sets counter J=1.

Operational block 2304 initializes the register ABUFA containing audio information for port J to 0.

Operational block 2305 initializes the audio energy accumulator MGRD associated with port J to a constant value of −NTHSLD.

Operational block 2306 increments the counter J, i.e., sets J=J+1.

Conditional branch point 2307 tests whether counter J is greater than N. If the test result is false, control is returned to operational block 2304 and steps 2304–2307 are iterated until step 2307 yields a true result. Then, operational block 2308 sets counter SMPLCT to the value NSMPL.

Conditional branch point 2309 tests for the start of a DS-1 frame, i.e., for the DS-1 frame sync. If the test result is false, step 2309 loops until a true test result is obtained.

Then, operational block 2310 sets counter J=1.

Operational block 2311 sets counter I=1 and the audio accumulation sum register ASUM=0.

Operational block 2312 sets the audio accumulation sum to its previous value plus the audio associated with port I after multiplying by a matrix element K[I,J] located in the data memory associated with the digital signal processor 2201 of FIG. 22.

Operational block 2313 increments the counter I, i.e., sets I=I+1.

Conditional branch point 2314 tests whether I>N. If the test result is false, control is returned to operational block 2312 and steps 2312, 2313 and 2314 are repeated until the test result in conditional branch point 2314 is true. When the test result in step 2314 is true, operational block 2315 is entered to receive audio information associated with port J (i.e., bits A-1 through A-8) from audio decryptor 1002 via link 1013 in FIGS. 14 and 22 and stores it in register AEVEN associated with port J.

Operational block 2316 performs a linear to mu transformation on the contents of the audio accumulation contained in ASUM previously computed in operational block 2312 and stores it in register PAODD.

Operational block 2317 sends audio information, i.e., bits A-1 through A-8 previously stored in register AEVEN in step 2315 to digital signal processor 2202.

Operational block 2318 receives audio information, i.e., bits A-9 through A-16 from audio decryptor 1002 via link 1013 in FIG. 14 and performs a mu to linear transformation and then stores the result in register ABUFB associated with port J.

Operational block 2319 sends to digital signal processor 2302 the contents of register PAODD which were computed in step 2316.

Operational block 2320 increments counter J, i.e., sets J=J+1. Thus, steps 2310 through 2320.

Conditional branch point 2321 tests whether J>N. If the test result is false, control is returned to operational block 2311 in which case steps 2311–2321 are iterated until step 2321 yields a true result. Then operational block 2322 sets counter J=1.

Operational block 2323 causes the absolute value of register ABUFA associated with port J to be added to the absolute value of register ABUFB associated with port J. The result of the addition is multiplied by a predetermined constant AVGWT. The result of the multiplication is added to the value in register NGRD associated with port J.

Operational block 2324 increments counter J, i.e., sets J=J+1.

Conditional branch point 2325 tests whether J>N. If the test result is false, control is returned to operational block 2323 and step 2323–2325 are iterated until step 2325 yields a true result.

Steps 2326–2338 are substantially identical to steps 2309–2321 except for several differences, namely, steps 2329 and 2335. In step 2329, ABUFB associated with J is utilized instead of ABUFA and in step, 2335 ABUFA associated with port J is utilized instead of ABUFB. Operational block 2339 decrements counter SMPLCT.

Conditional branch point 2340 tests if counter SMPLCT is equal to 0. If the test result is false, control is returned to conditional branch point 2309. If the test result in step 2340 is true, operational block 2341 is entered which sets counter SMPLCT to a predetermined value NSMPL.

Operational block 2342 sets counter J=1 and sets the active audio energy register AENGY=0.

Operational block 2343 causes information to be supplied to host processor 2203 indicating which ports have active audio information. In the event that a port has audio information, an associated bit in register AENGY is set to be a logical 1.

Operational block 2344 sets the audio energy accumulator NGRD associated with port J to a predetermined value −NTHSLD.

Operational block 2345 increments counter J, i.e., sets J=J+1.

Conditional branch point 2345 tests whether J>N. If the test result is false, control is returned to operational block 2343 and steps 2343–2345 are repeated until step 2345 yields a true result. Then, operational block 2346 sends the active audio register AENGY contents to the host processor 2203 via output register 2205 and link 2212. Thereafter, control is returned to conditional branch point 2309.

FIGS. 27, 28, 29 and 30 connected as shown form a flowchart of a program routine stored in program memory 2206 for controlling digital signal processor 2202. Steps 2701–2746 of the program are substantially identical to steps 2301–2346 of the program routine shown in FIGS. 23–26 and described above. The differences are that the program routine shown in FIGS. 23–26 causes digital signal processor 2201 to pass audio bits A-1 through A-8 to digital signal processor 2202 and causes audio bits A-9 through A-16 to be mixed according to steps 2315–2320 (FIGS. 23–26). On the other hand, the program routine shown in FIGS. 27–30 passes through mixed audio bits A-9 through A-16 from digital signal processor 2201 and mixes audio bits A-1 through A-8 as described in steps 2715–2720. Accordingly, the remaining steps of the program routine shown in FIGS. 27–30 will not be described in detail again.

Figure 31:
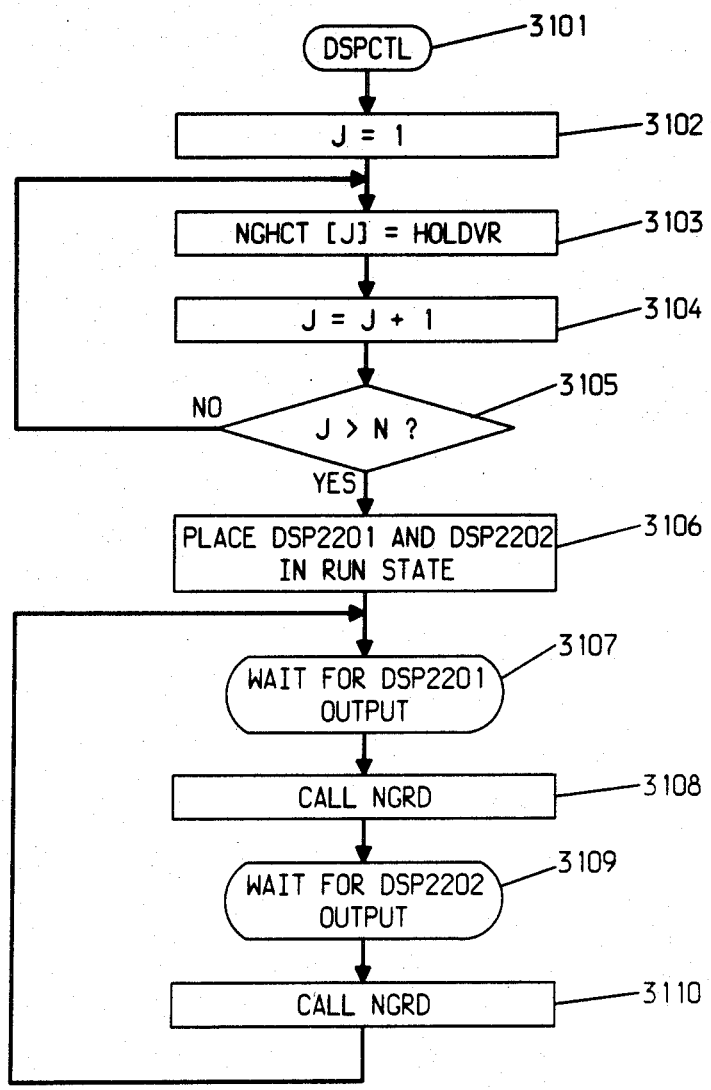
FIG. 31 is a flow chart of a DSP control (DSPCTL) program task for operating host processor 2203 to interact with digital signal processors (DSPs) 2201 and 2202 in audio bridge 1003 of FIG. 22.

FIG. 31 is a flowchart of a DSP control (DSPCTL) program task stored in host processor memory 2210 for operating host processor 2203 under control of a standard operating system to interact with digital signal processors 2201 and 2202.

Accordingly, the DSPCTL task program routine is entered via oval 3101. Thereafter, operational block 3102 sets counter J=1.

Operational block 3103 sets noise guard holdover counter NGHCT equal to a predetermined value HOLDVR associated with port J.

Operational block 3104 increments counter J, i.e., sets J=J+1.

Conditional branch point 3105 tests whether J>N. If the test result is false, control is returned to operational block 3103 and, thereafter, steps 3103, 3104 and 3105 are repeated until the test result is true.

Operational block 3106 places both Digital Signal Processor 2201 and Digital Signal Processor 2202 in the run state.

Oval 3107 places a call to the operating system executed by host processor 2203 to suspend the operation of program task DSPCTL until digital signal processor 2201 has sent output data to output register 2205.

Figure 32:
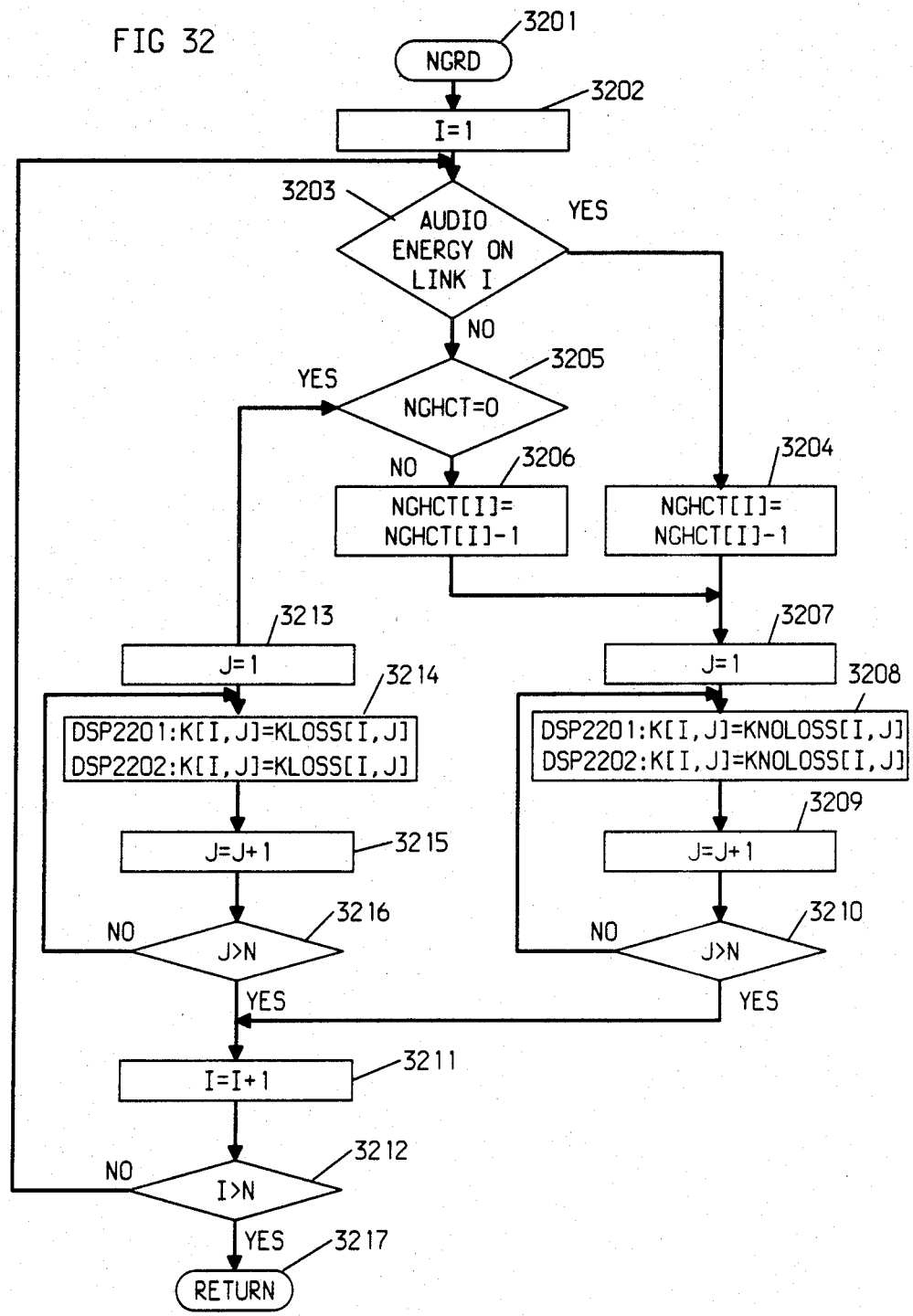
FIG. 32 is a flow chart of a noise guard program (NGRD) sub-routine used in the DSPCTL program task of FIG. 31.

Operational block 3108 calls a subroutine NGRD to perform the noise guard algorithm from audio energy samples associated with audio bits A-9 through A-16. A flowchart of the NGRD Subroutine is shown in FIG. 32 and is described below.

Oval 3109 places a call to the operating system executed by host processor 2203 to suspend the operation of the program task DSPCTL until digital signal processor 2202 has sent data to output register 2207 associated with audio energy of the incoming audio information.

Operational block 3110 calls subroutine NGRD to perform the noise guard algorithm from audio energy samples associated with audio bits A-0 through A-8 as described below.

Control is returned to oval 3107 and steps 3107–3710 are repeated continuously in an endless loop.

FIG. 32 shows a flowchart of the noise guard program subroutine (NGRD) utilized in the DSPCTL program task of FIG. 31. Accordingly, the NGRD subroutine is entered via oval 3201. Thereafter, operational block 3202 sets counter I=1.

Conditional branch point 3203 tests to determine whether audio energy is present from link I. If the test result is true, operational block 3204 sets the noise guard holdover counter associated with port I equal to the predetermined value HOLDVR. If the test result in step 3203 is false, conditional branch point 3205 tests whether the noise guard holdover counter NGHCT associated with port I is equal to 0. If the test result is false, operational block 3206 will decrement counter NGHCT associated with port I.

Operational block 3207 sets counter J=1.

Operational block 3208 transfers to digital signal processor program memory 2204 and program memory 2206 (FIG. 22) column J of matrix KNOLOSS associated with port I.

Operational block 3209 sets counter J=J+1. Conditional branch point 3210 tests whether counter J>N. If the result is false, control is returned to operational block 3208 and steps 3208–3210 are repeated until the step 3210 yields a true result and control is transferred to operational block 3211.

Returning to conditional branch point 3205 if the test result is true, i.e., counter NGHCT=0 operational block 3213 sets counter J=1 indicating the loss is to be inserted.

Operational block 3214 transfers to digital signal processor program memory 2204 and 2206 (FIG. 22) column J of matrix KLOSS associated with port I.

Operational block 3215 sets counter J=J+1 and conditional branch point 3216 tests whether J>N and if the test results are false, control is returned to operational block 3214 and steps 3214–3416 are repeated until step 3216 yields a true test result. Then, control is transferred to operational block 3211.

Operational block 3211 sets counter I=I+1. Conditional branch point 3212 tests whether I>N. if the test result is false, control is returned to conditional branch point 3203 and steps 3203–3211 are repeated as described above until step 3212 yields a true result. Thereafter, control is returned to program task DSPCTL of FIG. 31 via oval 3217.

AUDIO ENCRYPTOR (ENC)

Figure 33:
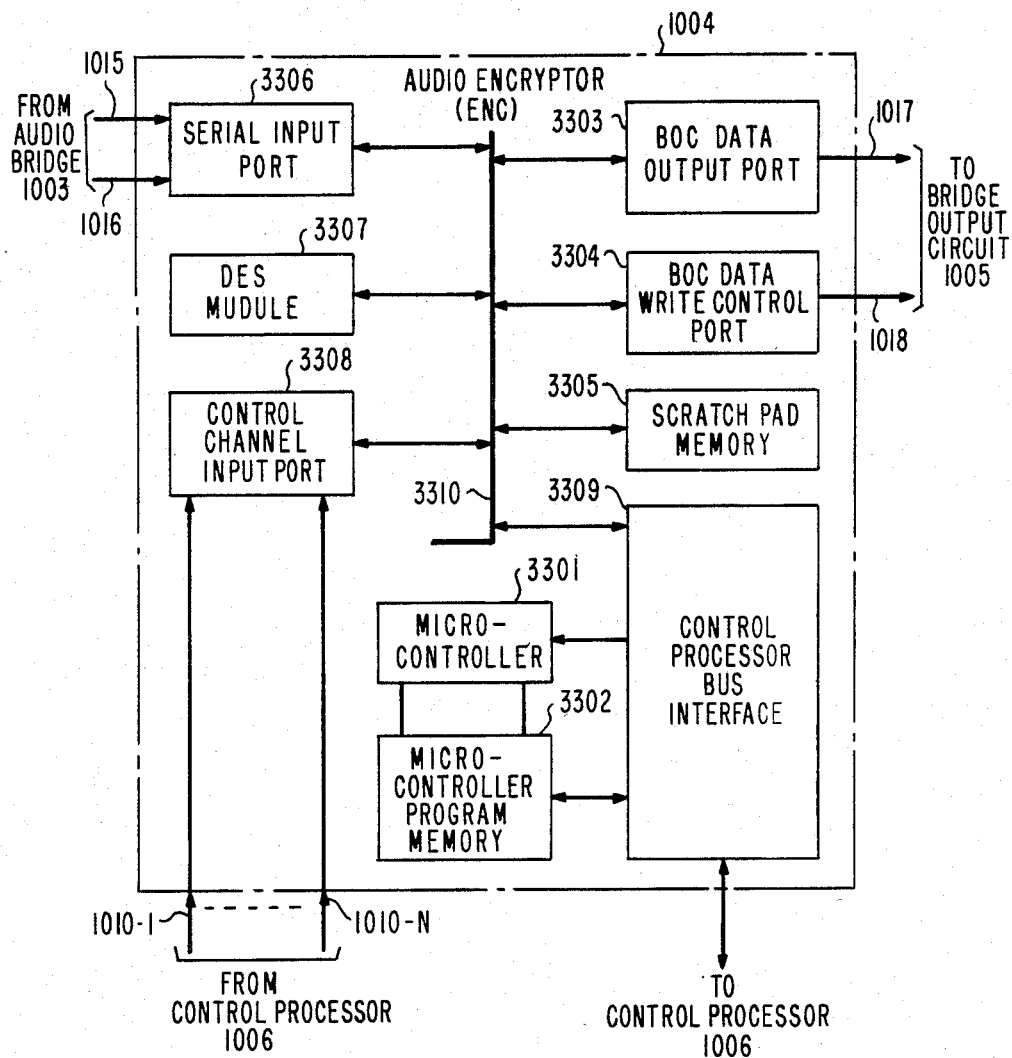
FIG. 33 shows in simplified block diagram form details of audio encryptor (ENC) 1004 employed in bridge 103 of FIG. 10.

Details of audio encryptor (ENC) 1004 of FIG. 10 are shown in simplified block diagram form in FIG. 33. ENC 1004 provides, in accordance with an aspect of the invention, a common control arrangement for encrypting a multiplicity of VTS audio channels. Accordingly, shown are microcontroller 3301 and associated program memory 3302, BOC data output port 3303, BOC data write control port 3304, scratchpad RAM memory 3305, serial input port 3306, DES data encryption standard module 3307, control channel output port 3308 and control processor bus interface 3309. Microcontroller 3301 is interconnected with units 3303 through 3309 via bus 3310. Additionally, microcontroller 3301 receives a reset signal from interface 3309 and code instructions from program memory 3302 in response to address signals supplied thereto. Program memory 3302 is also connected to interface 3309. In this example, microcontroller 3301 is a Signetics 8×305 and module 3307 includes a Fairchild 9414-1,-2,-3,-4 DES chip set which implements the National Bureau of Standards (NBS) Data Encryption Standard (DES).

ENC 1004 receives the conferenced audio from audio bridge 1003 via 1015 and 1016 and control channel information, namely, C1 through CN from control processor 1006 via 1010-1 through 1010-N, respectively, for all N outgoing VTS channels. Microcontroller 3301 under program control causes the cipher test and audio decipherment bits (D-bits) for each VTS channel to be generated as shown in FIG. 12. After an encryption operation on all N audio channels, the control channel information, the encrypted audio and the generated audio decipherment bits are combined into the time slot groups and supplied via 1017 and 1018 to BOC 1005 for transmission to cross connect 102. Communication to BOC 1005 is achieved through BOC data output port 3303 and BOC data write output port 3304. BOC data write output port 3304 contains the time slot number on which the respective data present in BOC data output port 3303 should be inserted at the output data links of BOC 1005.

Control processor 1006 accesses ENC 1004 via control processor interface 3309. Interface 3309 provides read-write access to microcontroller program memory 3302 for loading the encryptor program, for verifying that the program is stored properly, and for halting and restarting microcontroller 3301 as appropriate. Once microcontroller 3301 is in the run mode, control processor 1006 (FIG. 39) communicates with microcontroller 1401 via bus 3310. Additionally, control processor 1006 (FIG. 39) supplies the DES key and the encryption modes, namely, encrypted/clear via interface 3309 to ENC 1004.

Moreover, ENC 1004 realizes common control encryption of the mixed audio signals under program control.

Operation of audio encryptor (ENC) 1004 (FIG. 33) is controlled by microcontroller 3301 under control of programs stored in program memory 3302.

Figure 34:
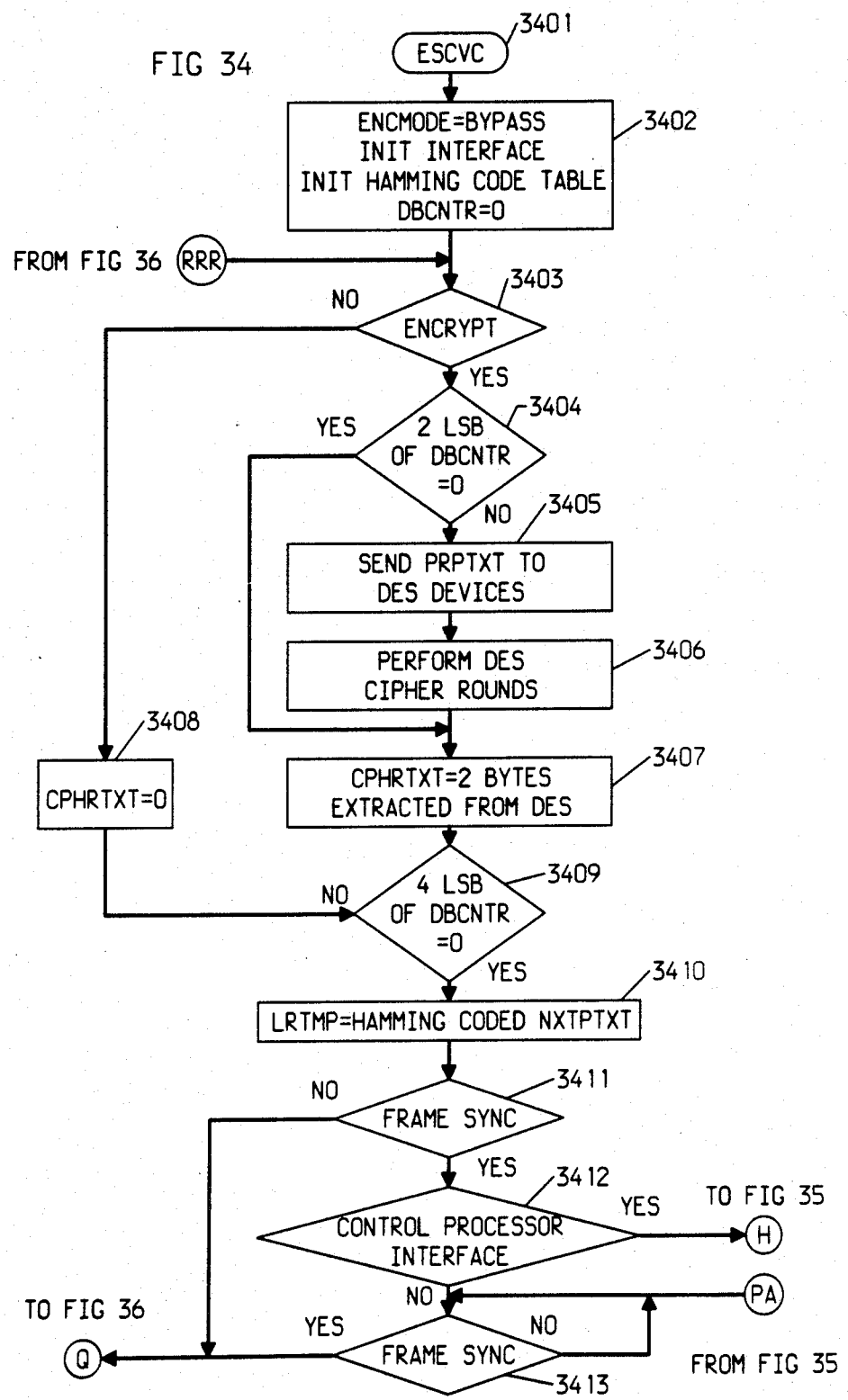
FIGS. 34, 35 and 36 when connected as shown form a flow chart of program routine ESCVC to effect common control of the mixed audio information from audio bridge 1003.
Figure 35:
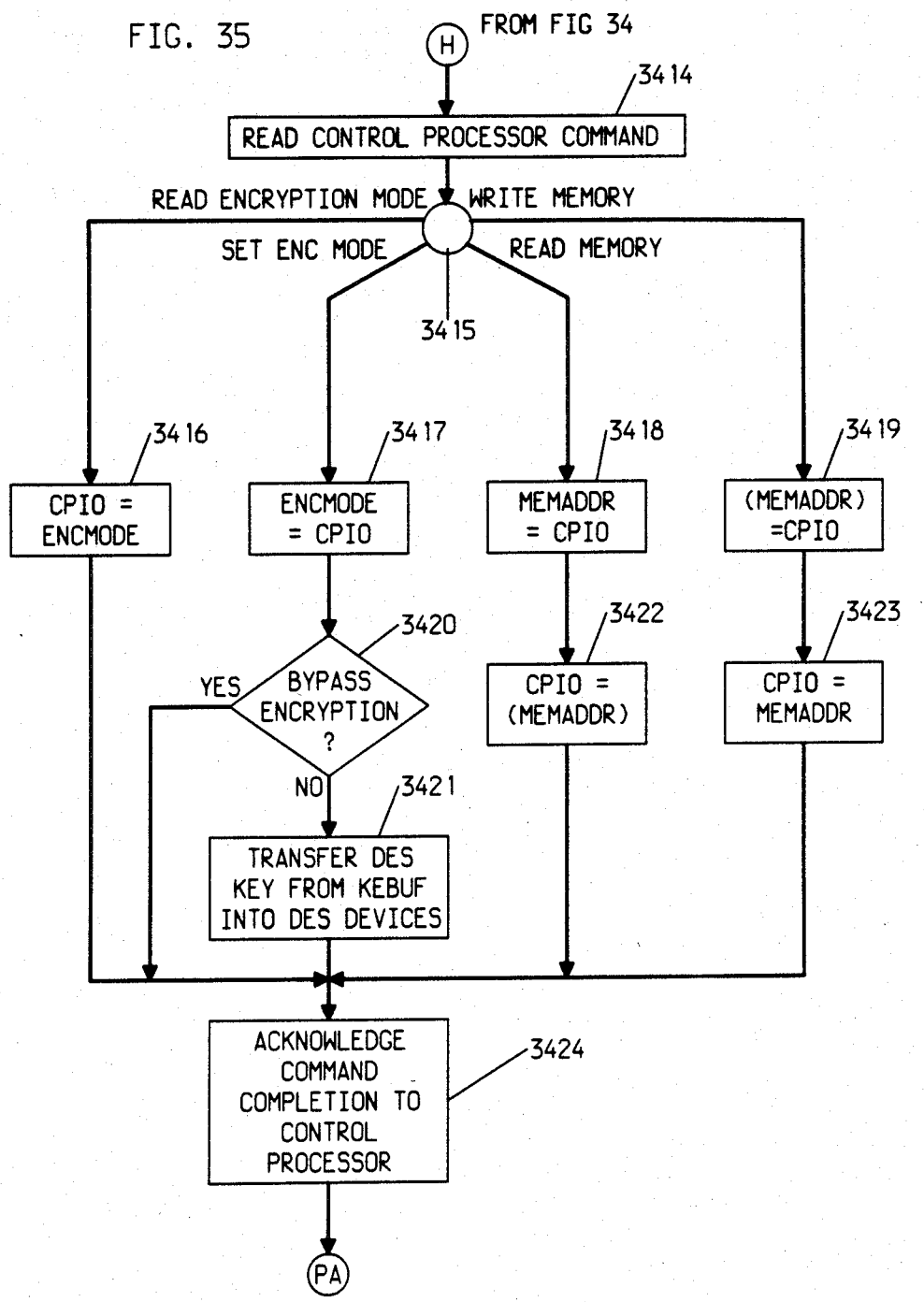
Figure 36:
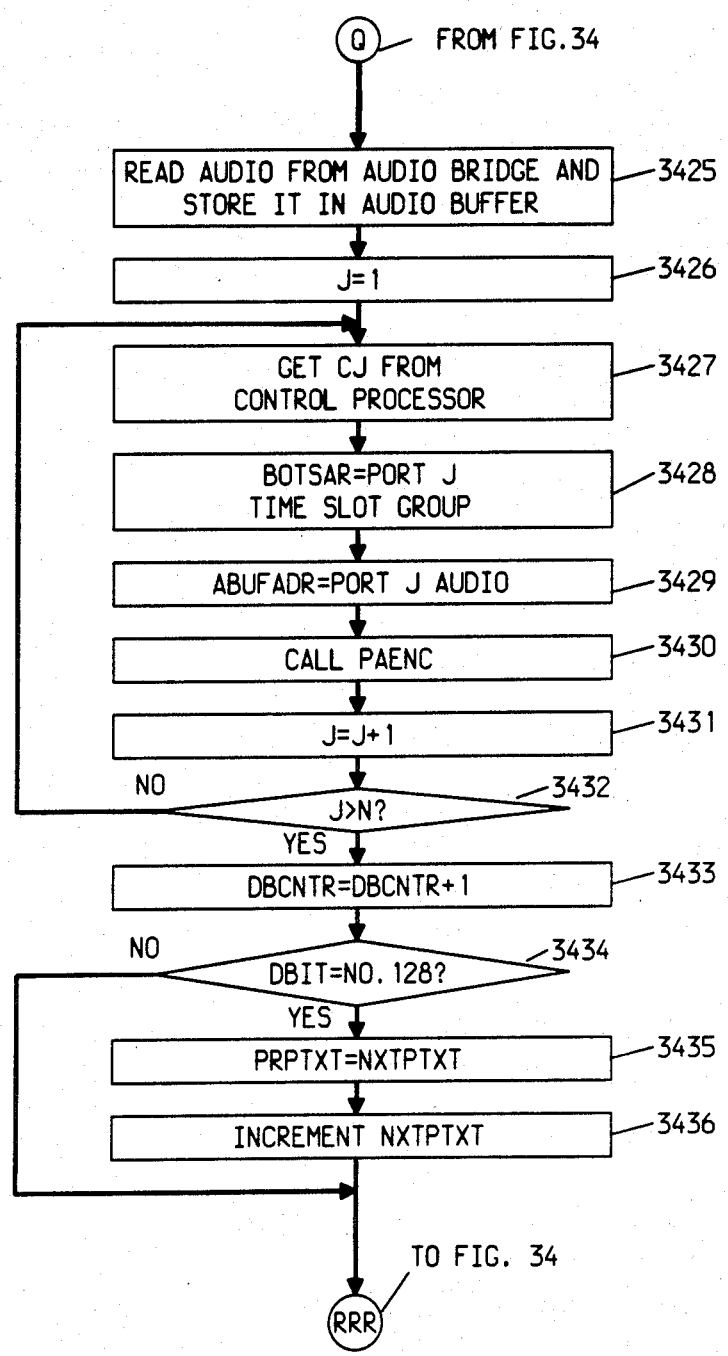
Figure 39:
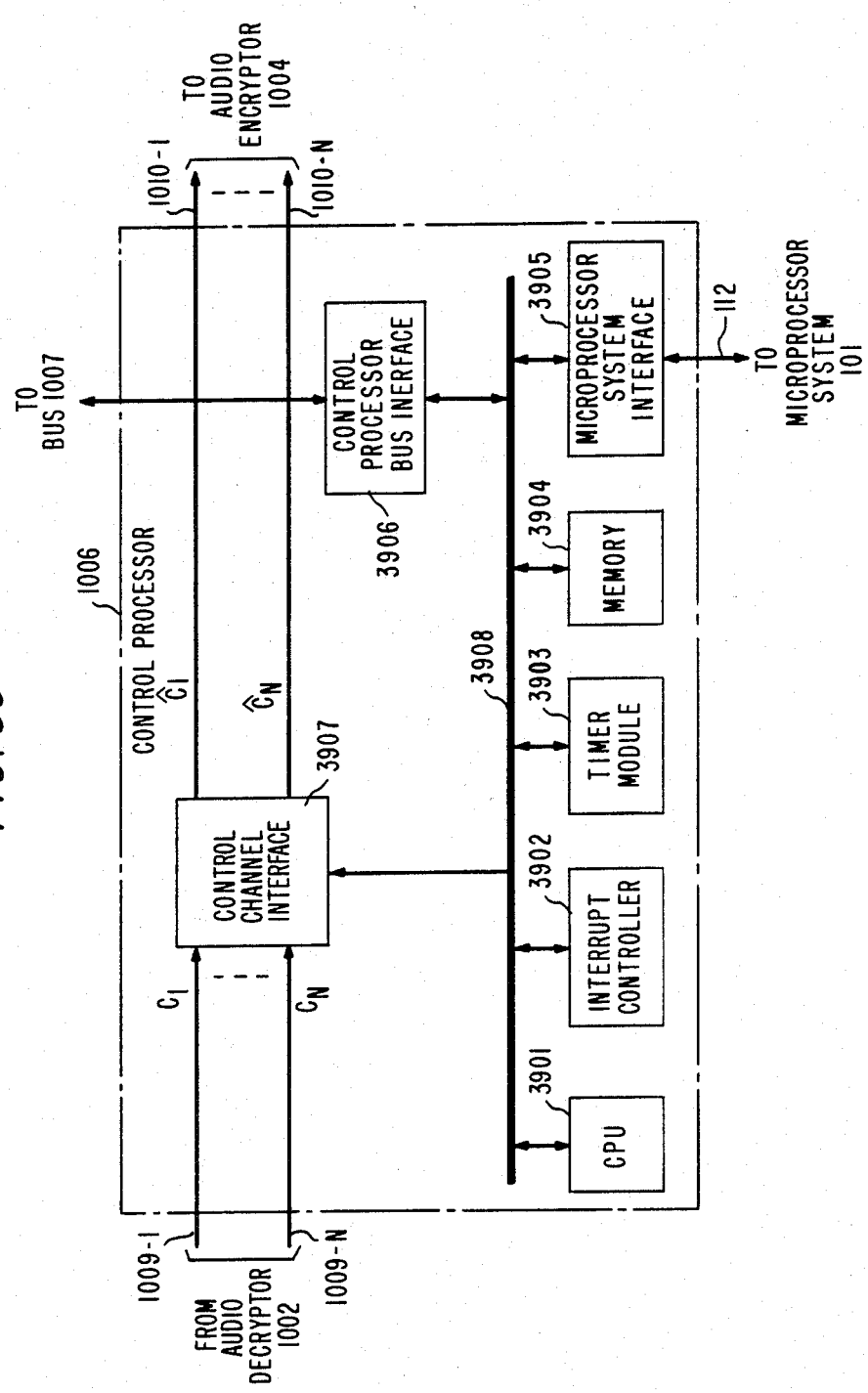
FIG. 39 shows in simplified block diagram form details of control processor (CP) 1006 used in bridge 103 of FIG. 10.

FIGS. 34, 35 and 36 connected as shown form a flowchart of a program routine stored in program memory 3302 to effect the common control encryption of the mixed audio information from audio bridge 1003 and to insert control channel information from control processor 1006 (FIG. 39).

Accordingly, the program is entered via oval 3401. Thereafter, operational block 3402 initializes system variables to known states, for example, ENCMODE is set to bypass encryption if transmission is in the clear, the counter DBCNTR is set equal to 0, and the Hamming code table is initialized, among others.

Conditional branch point 3403 tests whether encryption should be performed. If the test result is false, control is transferred to operational block 3408 where cipher text CPHRTXT in scratchpad memory 3305 is set to 0. If the test result in step 3403 is true, conditional branch point 3404 tests whether the least two significant bits of counter DPCNTR are both equal to 0. If the result is true, operational block 3405 transfers the present state of the plain text counter contents PRPTXT located in memory 3305 to the DES module 3307.

Operational block 3406 instructs the DES module 3307 to perform the cipher rounds, i.e., the encryption of the plain text entered in step 3405.

Operational block 3407 extracts from DES module 1407 two 8-bit words out of 8 cipher words generated by the DES module 3307 and stores them in register CPHRTXT located in memory 3305.

Returning to step 3404, if the test result is false, i.e., either of the two least significant bits counter DBCNTR being equal to 1, control is transferred to operational block 3407 as described above.

Conditional branch point 3409 tests whether the four least significant bits of counter DBCNTR are equal to 0. If the test result is true, the D-bit counter represents the index n as shown in VTS Data Format: Audio Decipher Group of Table 3 described above multiplied by 16.

Operational block 3410 extracts the four-bit block associated with index n from register PRPTXT in memory 3305, computes the Hamming code check bits and stores the resulting 8-bit code word in register LRTNP in memory 3305. If the test result in step 3409 is false, control is transferred directly to conditional branch point 3411.

Conditional branch point 3411 tests for the occurrence of the DS-1 frame sync. If the test result is false, conditional branch point 3412 tests whether control processor 1006 has requested execution of a command. If the test result of step 3412 is false, control is transferred to conditional branch point 3413 which tests for the occurrence of the DS-1 frame sync, i.e., the beginning of the DS-1 frame. If the test result in step 3413 is false, the step is reexecuted until the test yields a true result. Thereafter, control is transferred to operational block 3425.

Returning to conditional branch point 3411, if the test result, i.e., check for DS-1 frame sync, yields a true result control is transferred directly to operational block 3425.

Operational block 3425 causes the mixed audio information associated with each VTS link from audio bridge 1003 to be read via serial input port 3306 (FIG. 33) and transmitted to audio encryptor 1004 via links 1015 and 1016 (FIG. 33). The audio information so read is stored in appropriate locations in memory 3305.

Operational block 3426 sets counter J=1. Operational block 3427 reads the control channel information, i.e., bit CJ supplied to audio encryptor 1004 from control processor 1006 via one of the N control channel links, namely, links 1010-1 through 1010-N. This read operation is performed on control channel input port 3308 (FIG. 33).

Operational block 3428 writes into register BOTSAR of BOC data write control port 3304 (FIG. 33) time slot address information for associated port J.

Operational block 3429 sets register ABUFADR with the address of a memory location in memory 3305 associated with a location containing the audio information associated with outgoing link J.

Figure 37:
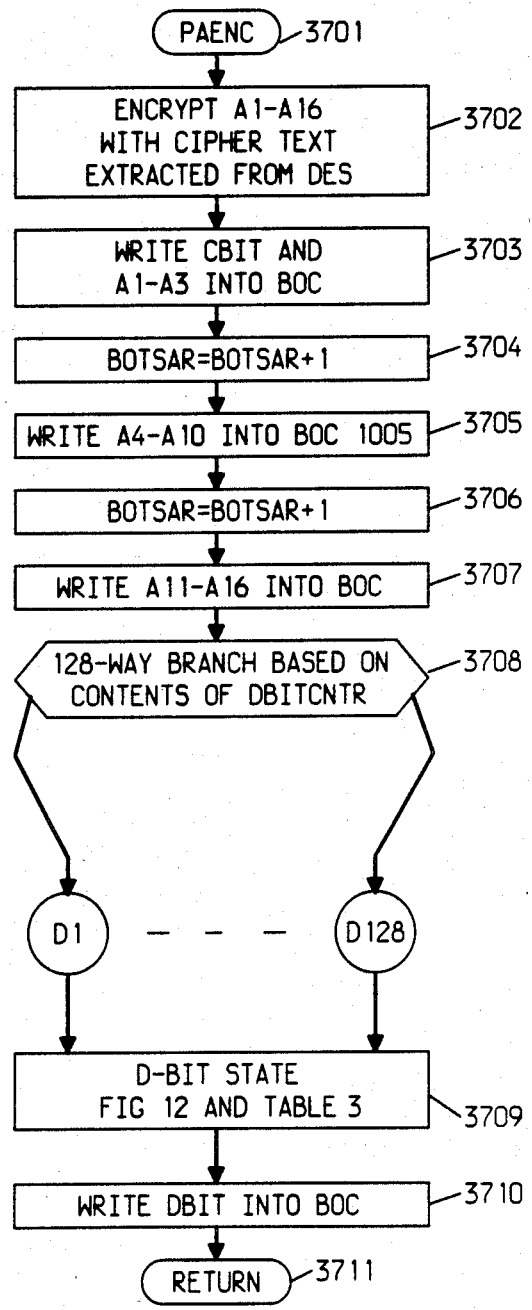
FIG. 37 is a flow chart of the PAENC sub-routine used in the ESCVC program routine of FIGS. 34, 35 and 36.

Operational block 3430 calls the PAENC subroutine to perform audio encryption and to insert the control channel information into the associated port J time slot group in BOC 1005. A flowchart of the PAENC subroutine is shown in FIG. 37 and described below.

Operational block 3431 increments counter J, i.e., sets J=J+1.

Conditional branch point 3432 tests whether J>N. If the test result is true, control is returned to operational block 3427 and steps 3427-3432 are repeated until the test is step 2232 yeilds a true result. This effects, in accordance with an aspect of the invention, the common control encryption of the audio information associated with all of the outgoing links.

Operational block 3433 increments D-bit counter DBCNTR.

Conditional branch point 3434 tests whether the D-bit counter equal to 128, i.e., whether it is at the end of the D-bit superframe. If the test result is true, operational block 3435 transfers the contents of the next state plain text counter NXTPTXT to register PRTTXT in memory 3305 (FIG. 33).

Operational block 3436 increments the counter NXTPTXT and, thereafter, control is returned to conditional branch point 3403. If the test result in step 3434 is false, control is transferred directly to conditional branch point 3403.

Returning to conditional branch point 3412, if the test result therein is true, i.e., if a command execution request is present from control processor 1006, control is transferred to operational block 3414.

Operational block 3414 reads the command from control processor bus interface 3309 (FIG. 33) and, then, oval 3415 causes one of several operations to be effected depending on the type of command which was read in step 3414. The commands are, for example, read encryption mode, set encryption mode, read memory 3305 and write memory 3305. The operations effecting these commands are realized by operational blocks 3416, 3417, 3418 and 3419, respectively.

Operational block 3416 transfers the encryption mode located in the ENCMODE register in memory 3305 to register CPIO located in control processor interface 3309 (FIG. 33).

Operational block 3417 sets register ENCMODE to the value in register CPIO.

Conditional branch point 3420 tests whether the encryption process is to be bypassed. If the test result is true, control is transferred to operational block 3424. If the test result is false, operational block 3421 transfers the encryption key information from memory 3305 into the DES module 3307.

Operational block 3418 sets register MENADDR to the value in CPIO to indicate which location in memory 3305 should be read.

Operational block 3422 reads the contents of memory 3305 identified by the address in register NEMADDR and transfers the read contents to register CPIO in control processor bus interface 3309.

Operational block 3419 writes memory 3305 at the location identified by the address designated by register MENADDR with the contents in register CPIO.

Operational block 3423 transfers the contents of register MENADDR to register CPIO to indicate to control processor 1006 which location of memory 3305 was written.

Operational block 3424 acknowledges completion of the requested command to control processor 1006. Thereafter, control is returned to conditional branch point 3413.

FIG. 37 is a flowchart of the PAENC subroutine utilized in step 3430 of routine ESCVC described above in relationship to FIG. 34. Accordingly, the PAENC subroutine is entered via oval 3701.

Operational block 3702 encrypts audio bits A-1 through A-16 addressed by the contents of register ABUFADR by performing an exclusive-OR operation with the contents of register CPHRTXT in memory 3305 (FIG. 33).

Operational block 3704 increments the time slot register BOTSAR located in BOC data write control port 3304 (FIG. 33).

Operational block 3705 writes encrypted audio bits A-4 through A-10 into BOC 1005.

Operational block 3706 increments the time slot register BOTSAR located in the BOC data write control port 3304.

Operational block 3707 writes encrypted audio bits A-11 through A-16 into BOC 1005.

Operational block 3708 implements a 128 way branch based on the state of the least 7 significant bits of D-bit counter DBCNTR and operational block 3709 implements a set of operations based on each of the 128 branch points to choose a proper state of the D-bit. By way of example, if D-bit counter DBCNTR=1, bit L-1 from register LRTNP is chosen. If D-bit counter DBCNTR=2, D=S1=1. See FIG. 12 and Table 3 for the relationship of the remaining D-bits to the L, S and P bits.

Operational block 3710 writes the D-bit information into BOC 1005 and then control is returned to the encryptor program routine (FIG. 34) via oval 3711.

BRIDGE OUTPUT CIRCUIT (BOC)

Figure 38:
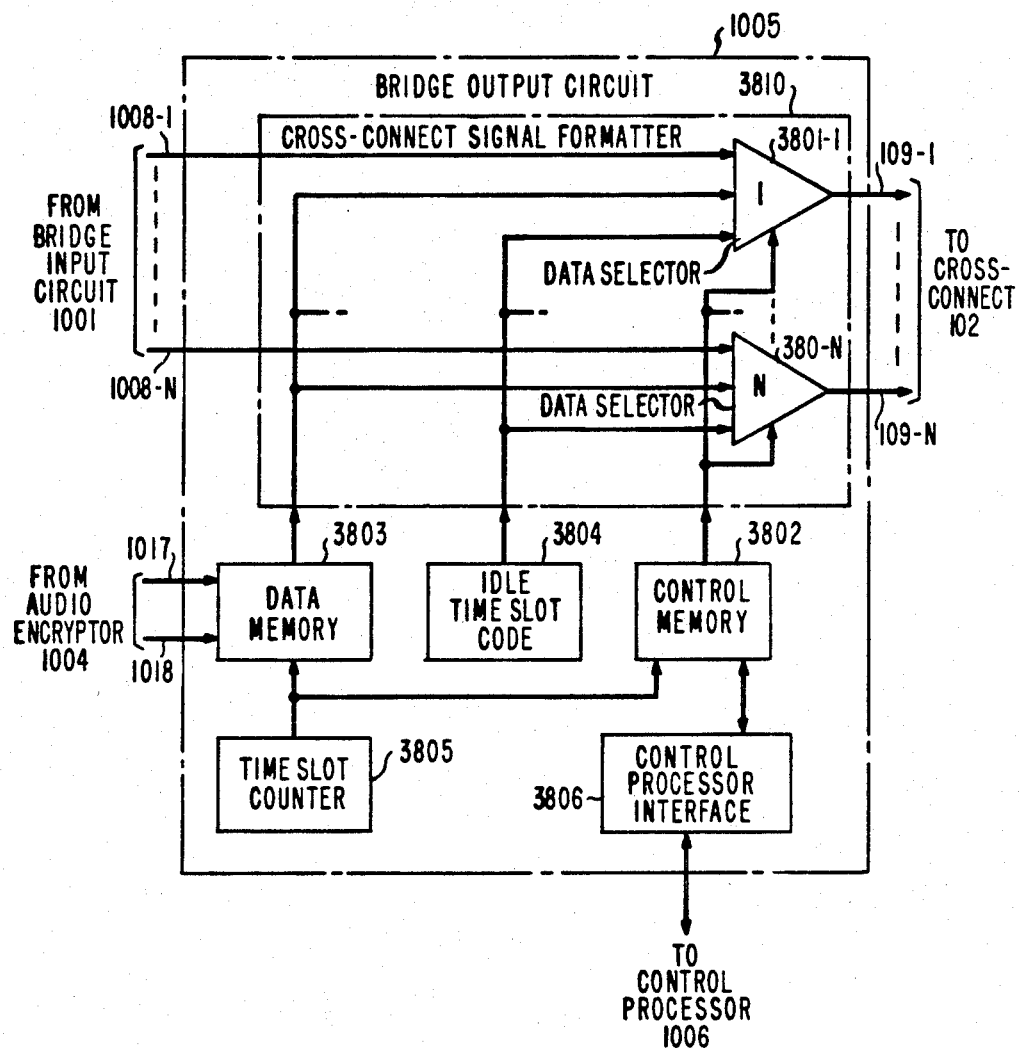
FIG. 38 depicts in simplified block diagram form details of bridge output circuit (BOC) 1005 used in bridge 103 of FIG. 10.

Details of bridge output circuit (BOC) 1005 are shown in simplified block diagram form in FIG. 38. The function of BOC 1005 is to combine the subset of the video control bits, namely, bits FD, X, X stored in video latch 1103 within the present 125 u sec frame in bridge input circuit (BIC) 1001 (FIG. 11) with the audio information provided by encryptor 1004 (FIG. 33), and to provide the combined information at preselected fixed time slots to appropriate ones of time multiplexed switches 601-1 through 601-N in cross connect 102 (FIG. 6) in accordance with the format set out in Table 3 above.

Accordingly, shown in FIG. 38 are data selectors 3801-1 through 3801-N, which form cross connect signal formatter 3810 dual port control memory 3802, dual port data memory 3803, idle time slot code generator 3804, time slot counter 3805 and control processor interface 1606. Video signaling bits FD, X, X are supplied from BIC 1001 via 1008-1 through 1008-N to data selectors 3801-1 through 3801-N, respectively. Data memory 3803 is accessed by encryptor 1004 via 1017 and 1018. Memory 3803 includes a RAM having a duplicate sets of memory locations. A first set of the memory locations is written with the processed audio and control channel information from encryptor 1004 during a current frame while a second set of memory locations is being read to supply the information written during a previous frame to appropriate ones of data selectors 3801-1 through 3801-N. During a subsequent frame, the first set of memory locations is read while the second set is written with the information from encryptor 1004. Data selector 3801-1 through 3801-N combine on a per-time-slot and per-bit basis the video signaling bits supplied from BIC 1001 and the audio and control channel information supplied from data memory 3803. The combination is in accordance with control codes stored in control memory 3802 which are supplied via interface 3806 from control processor 1006 (FIG. 39). An idle time slot code generated by idle time slot generator 3804 is inserted in unused time slots. Both data memory 3803 and control memory 3802 are sequentially addressed by time slot counter 3805 which includes a modulo-256 binary counter synchronized to the internal frame time-slot boundaries. Control processor 1006 with read-write access to any location in control memory 3802 for setting up the desired information selection pattern. Once a selection pattern is written in control memory 3802, no other interaction is required unless a VTS port and, hence, a conference room or another MLCT is added to or deleted from the conference. Accordingly, the combined processed information is selectively supplied to cross connect 102 via 109-1 through 109-N.

Each code word stored in control memory 3802 includes 8 bits and is associated with a specific time slot in the cross connect frame format shown in FIG. 3. Four of the bits are not used and two bits are used for parity. The remaining two bits are operational control bits and are used to indicate to the switching network which of the 256 time slots of the N VTS channels are used to send processed audio and control channel information and, further, to indicate which time slots should be filled with the video signaling bits (FD,X,X). The two operational control bits are defined as follows:

b4 TDSEN. Transmit Data Slot Enable. A logical 1 indicates that the associated time slot is MAPPED and the data contained in the respective data RAM address in data memory 3803 is formatted with odd parity is sent to the switch network. A logical 0 indicates that the time slot is idle and an IDLE code of all logical 1's is supplied from idle code generator 3804 and even parity is sent.

b5 TVCSEN. Transmit Video Control Slot Enable. A logical 1 indicates that the video signaling information (FD,X,X) from BIC 1001 should be inseted in the respective time slot if the time slot is MAPPED.

In this example, data selectors 3801-1 through 3801-N are controlled via control memory 3802 to insert the video control signals from bridge input circuit 1001 into the appropriate bit positions of a time slot. Similarly, data selectors 38011-1 through 3801-N are also controlled to insert the processed audio information from audio encryptor 1004 into the fixed time slots of the composite signals as shown in FIG. 9. Accordingly, the video control, c-bit and processed audio are inserted for VTS port 500-1 into time slots 32, 33 and 34, for VTS port 500-2 into time slots 36, 37 and 38, for VTS port 500-3 into time slots 40, 41 and 42, for VTS port 500-4 into time into time slots 44, 45 and 46, for VTS port 500-5 into time slots 48, 49 and 50 and for VTS port 500-6 into time slots 52, 53 and 54.

BRIDGE CONTROL PROCESSOR (CP)

Details of control processor 1006 of FIG. 10 are shown in simplified block diagram form in FIG. 39. Accordingly, shown are central processing unit (CPU) 3901, interrupt controller 3902, timer module 3903, memory 3904, microprocessor system interface 3905, control processor bus interface 3906 and control channel interface 3907, all of which are interconnected via bus 3908. CPU 3901 is a microprocessor unit. In this embodiment a Motorola MC6809 unit is used. Memory 3904 includes both read-only memory (ROM) and read-write memory (RAM). Control processor bus inter-face 3906 operates as a buffer and provides all interrupt control from bus 1007 to interrupt controller 3902. Interrupt controller 3902 resolves priority of the various interrupts and, then, interrupts CPU 3901. CPU 3901 in response to the interrupt executes the required task to service the interrupt. Timer module 3903 is a programmable timer which generates a "realtime" clock interrupt for CPU 3901 to coordinate all time-referenced tasks. For example, the implementing of timing parameters in the control of conference video selection dynamics. Microprocessor system 101 interface 3905 provides a standard communication interface with microprocessor system 101.

Control channel interface 3907 includes a set of N high-level data links controllers (HDLCs) (not shown) each associated with one of control channels C, through CN to provide the basic frame structure of the BX. 25 level 2 auxiliary control channel. The MC6854 which is commercially available from is used for this purpose. Interface 3907 also includes a set of N direct memory access (DMA) controllers (not shown) associated on a one-to-one basis with control channels C1 through CN which are employed to unburden CPU 3901 of such tasks as transferral of the auxiliary channel messages from and to memory 3904 to the HDLCs in control channel interface 3907. Tasks left to CPU 3901 are "high-level" decision tasks and the generation of messages of actual messages to be transmitted via auxiliary channels C, through CN. The HDLCs handle such tasks as data transferral to memory 3904 through direct memory access (DMA) operations. Upon receipt of a complete HDLC frame on any of auxiliary data channels C1 through CN control channel interface 3907 interrupts CPU 3901 and an appropriate task is rescheduled to handle the received message. In transmitting auxiliary channel messages over auxiliary data channels C1 through CN, control channel interface 3907 under control of CPU 3901 retrieves a prepared message from memory 3904 and employs DMA operations to transmit the message via an appropriate one of auxiliary channels C1 through CN to a conference room or to another MLCT.

Control processor 1006 under program control effects operation of the MLCT to realize the desired video switching, audio mixing, conference set up and conference reconfiguration as desired and described hereinafter. Accordingly, control processor 1006 is employed under program control to effect all set up operations within bridge 103 and to effect all communications to rooms and other MLCTs in the conference in order to realize all communication and video control operations in the MLCT. To this end, control processor 1006 operations under an operating system of a type well known in the art to realize the desired operations under control of specific program routines to be described hereinafter. It is noted, that control processor 1006 does not directly make the video switches. However, control processor 1006 makes all the decisions relating to the video information to be viewed by each room in the conference. Once the selection decisions have been made, they are communicated to microprocessor system 101 which, in turn, controls cross-connect 102 to make the switches as described above.

Communication to audio decryptor (DEC) 1002, audio bridge 1003 and audio encryptor (ENC) 1004 is performed by control processor 1006 task XPCTL. The XPCTL task is responsible to report audio muting information generated by the audio decryptor microcontroller 1401 (FIG. 14) to the input link status array located in the control processor memory 3904 (FIG. 39) for use by the conferencing tasks described below.

Other functions supported by the XPCTL task include the generation of both the KLOSS[I,J] and the KNOLOSS[I,J] matrices for use by audio bridge 1004 host processor 2203 (FIG. 22) to indicate how the partial audio summations should be performed in accordance with the respective input VTS link assignments in audio bridge 1003. Furthermore, the XPCTL enters the DES encryption and decryption key into both audio decryptor memory 1405 (FIG. 14) and audio encryptor memory 3305 (FIG. 33) and to communicate the encryption mode to them, i.e. bypass encryption/decryption or activate encryption/decryption.

Figure 40:
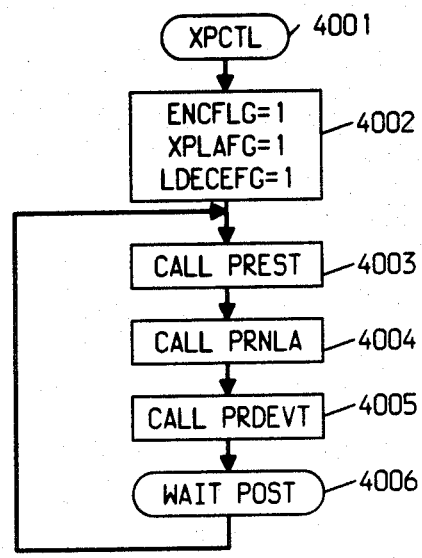
FIG. 40 is a flow chart of program routine XPCTL for operating control processor 1006 of FIG. 39 to control communications to audio decryptor 1002, audio bridge 1003 and audio encryptor 1004.

FIG. 40 is a flowchart of a program routine stored in memory 3904 of the control processor 1006 to effect the communication and control functions described above via the control processor bus interface 3906 and bus 3903 of FIG. 39.

Accordingly, the program is entered via oval 4001. Thereafter, operational block 4002 sets event flags ENCFLG=1, XPLAFG=1, and LDECEFG=1. Event flag ENCFLG indicates the occurrence of a new encryption state change event, XPLAFG indicates a new link assignment event, and LDECEFG indicates that a input link mute state change event occurred in the audio decryptor 1002.

Figure 41:
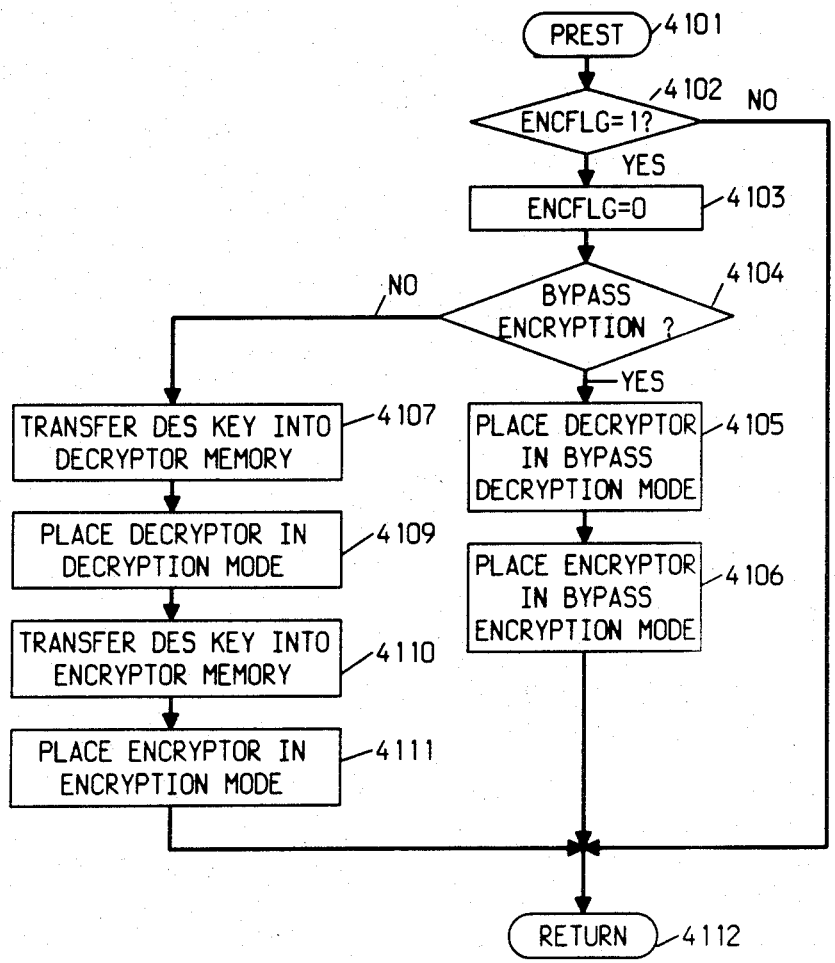
FIG. 41 is a flow chart of sub-routine PREST used in the XPCTL program routine of FIG. 40.
Figure 42:
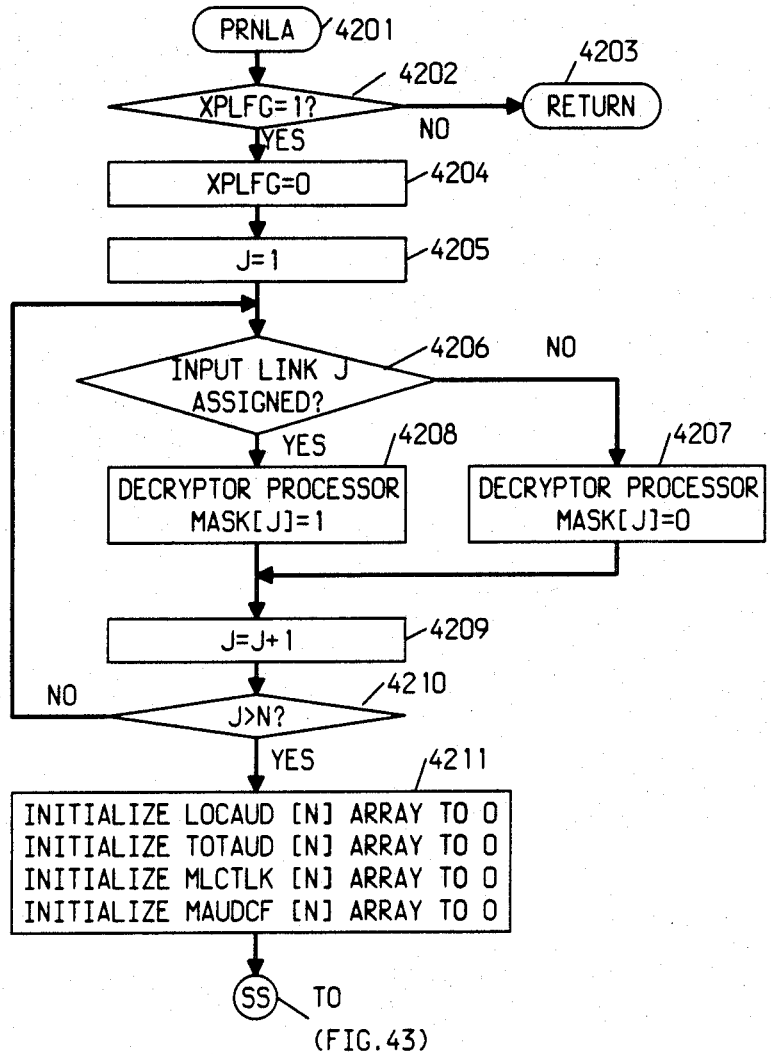
FIGS. 42, 43, 44 and 45 when connected as shown form a flow chart of the PRNLA sub-routine employed in the XPCTL program routine of FIG. 40.
Figure 43:
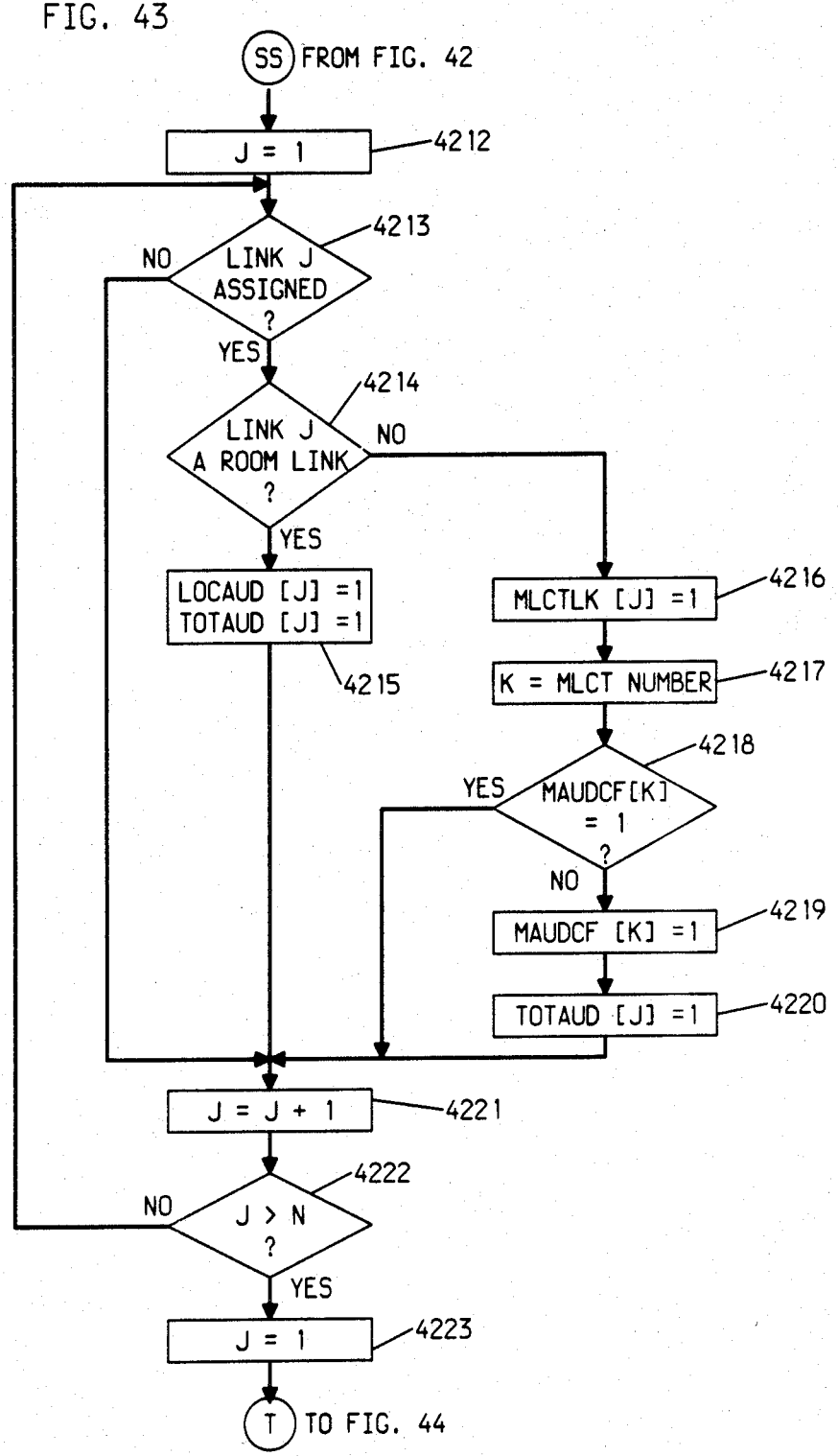
Figure 44:
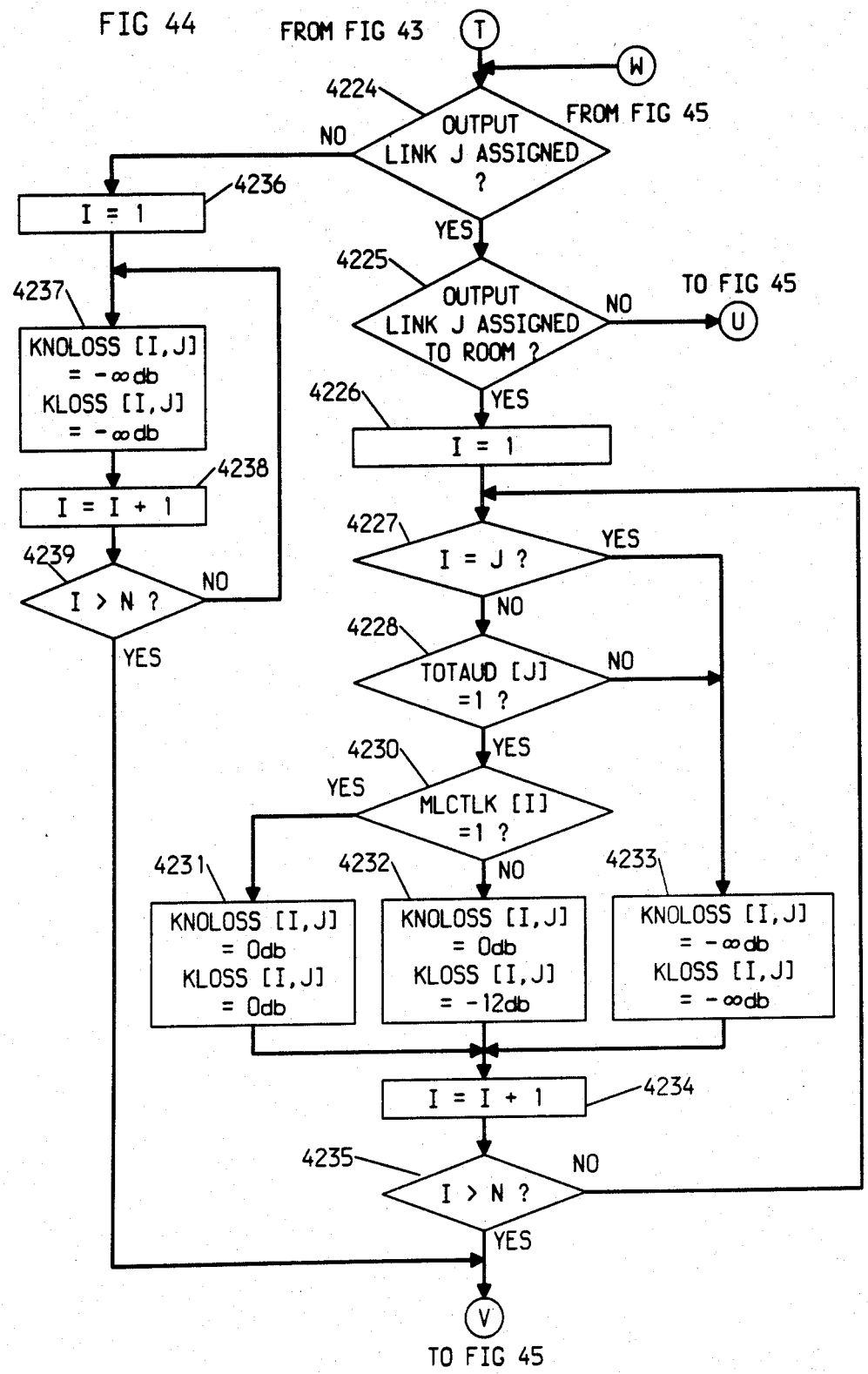
Figure 45:
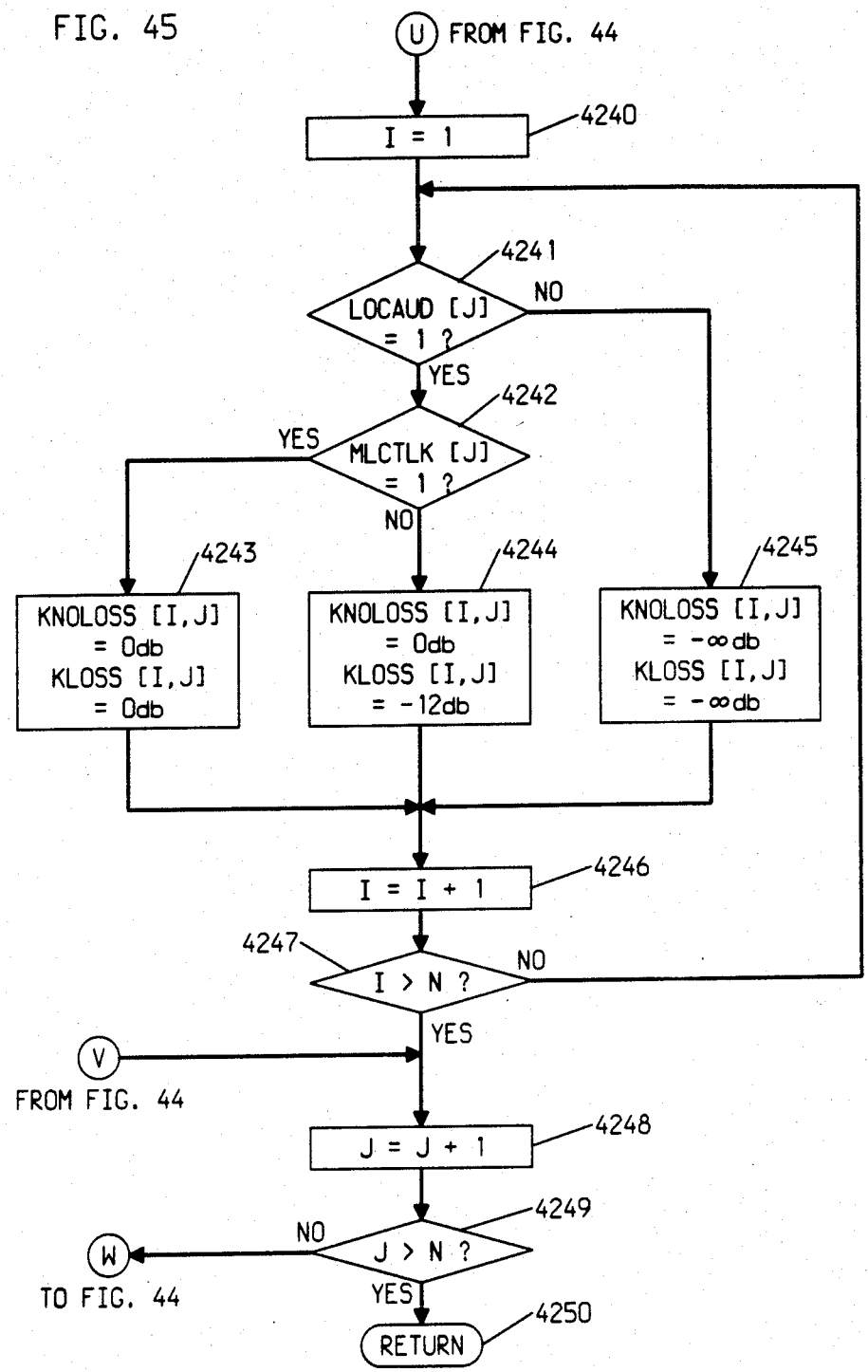

Operational block 4003 calls subroutine PREST which checks whether a new encrypton state change event occurred and performs the required steps to change the encryption key and encryption mode in both the audio decryptor 1002 and the audio encryptor 1004. The PREST routine is shown in FIG. 41 and described below.

Operational block 4004 calls subroutine PRNLA which checks whether a new link assignment has occurred and, accordingly, performs the required steps to format the audio mixing matrices. The check result is relayed to the audio bridge 1003. It also relays the new link assignment to the decryptor 1002 for enabling mute information associated with the new assigned ports to cause a program flow event (interrupt) in the control processor operating system. Conversely, if a link is removed from the conference, the decryptor 1002 will disable the respective link's ability to cause an interrupt on the mute state change in the control processor operating system. Thereby, adding or deleting a room to or from, respectively, the conference without disrupting it, in accordance with an aspect of the invention. The PRNLA routine is shown in FIGS. 42, 43, 44 and 45 and described below.

Figure 46:
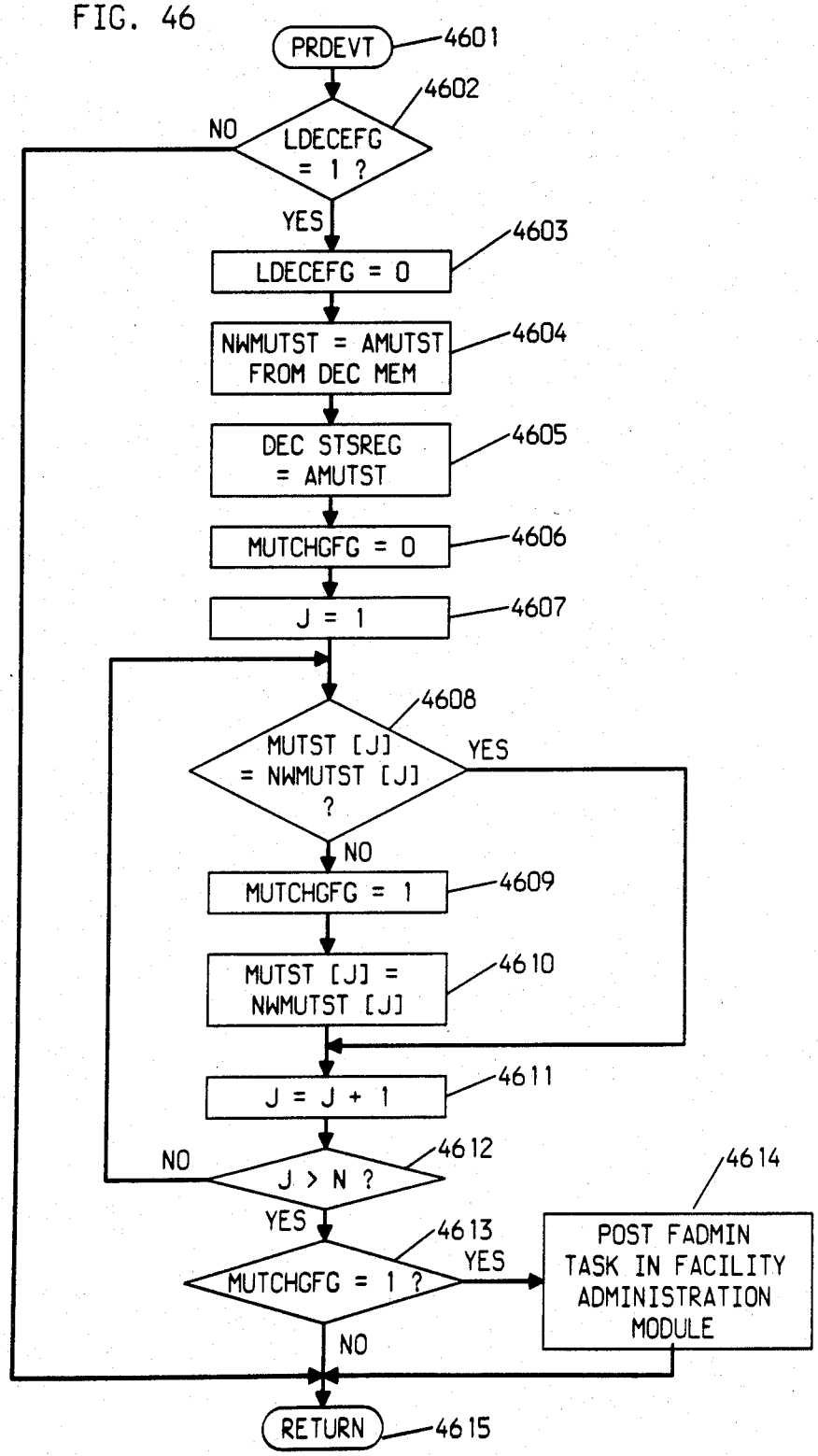
FIG. 46 is a flow chart of the PRDENT sub-routine employed in the XPCTL program routine of FIG. 40.

Operational block 4005 calls subroutine PRDEVT which checks whether a new mute state change event occurred at the audio decryptor 1002 and performs the required steps to relay the new audio muting information generated by the audio decryptor microcontroller 1401 (FIG. 14) to the input link status array located in the control processor memory 3904 for use by the conferencing tasks described below. The PRDEVT routine is shown in FIG. 46 and described below.

Oval 4006 issues a request to the control processor 1006 operating system to be put in a WAIT state until a POST event occurs in which case control is given to operational block 4003 and steps 4003 through 4006 are executed in an endless loop.

FIG. 41 is a flowchart of the PREST subroutine employed by operational block 4003 of the XPCTL program task of FIG. 40.

Accordingly, the PREST subroutine is entered by oval 4101. Conditional branch point 4102 tests whether even flag ENCFLG is set to 1. If the test result is false, control is returned to the calling program routine XPCTL via oval 4112. If the test result is true, operational block 4103 sets event flag ENCFLG=0.

Conditional branch point 4104 tests whether the new encryption state is to bypass encryption. If the test is true, operational block 4105 places the decryptor in the decryption bypass mode by issuing an appropriate command to the decryptor microcontroller 1401 (FIG. 14) as described in the decryptor program shown in FIG. 15.

Operational block 4106 places the encryptor 1004 in the decryption bypass mode by issuing an appropriate command to the encryptor microcontroller 3301 (FIG. 33) as described in the encryptor program shown in FIG. 34 and, then, control is given to the calling program routine XPCTL via oval 4112.

Returning to step 4104, if the test result is false, Operational block 4107 transfers the decryption DES key into the audio decryptor scratchpad memory 1405.

Operational Block 4109 places the DEC 1002 in decryption mode.

Operational Block 4110 transfers the decryption DES key into the audio encryptor scratchpad memory 3305.

Operational Block 4111 places the ENC 1004 in the encryption mode. Control is returned to the calling program routine XPCTL via oval 4112.

FIGS. 42, 43, 44 and 45 connected as shown form a flowchart of the PRNLA subroutine employed by operational block 4004 of the XPCTL program task of FIG. 40.

Accordingly, the PRNLA subroutine is entered by oval 4201. Conditional branch point 4202 tests whether event flag XPLAFG is set to 1. If the test result is false, control is returned to the calling program routine XPCTL via oval 4203. If the test is true, operational block 4204 sets event flag XPLAFG=0.

Operational block 4205 sets counter J=1.

Conditional branch point 4206 tests whether input link J is assigned. If the test result is false, operational block 4207 sets the respective mask bit associated with port J in the decryptor scratchpad memory 1405 register MASK equal to 0 indicating "Mute status changed masked". If the test result is true, operational block 4208 sets the respective mask bit associated with port J in the decryptor scratchpad memory 1405 register MASK equal to 1 indicating "Mute status change unmasked".

Operational block 4209 increments counter J, i.e. sets J=J+1.

Conditional branch point 4210 tests whether J>N. If the test result is false, control is returned to Conditional branch point 4206 and steps 4207 through 4210 are repeated until step 4210 yields a true result.

Steps 4211 through 4250 perform the generation of the audio mixing matrices to be sent to the audio bridge 1003. Accordingly, operational block 4211 initializes several arrays of boolean flags as shown, i.e. sets the N-dimensional array LOCAUD[N]=0, the N-dimensional array TOTAUD[N]=0, The N-dimensional array MLCTLK[N]=0, And the array MAUDCF[N]=0. The Jth element of the LOCAUD array indicates that link J is assigned to a Room and its audio should contribute to the partial summation of audio to be sent to other MLCT(s) in the conference. The Jth element of the TOTAUD array indicates that input link J contributes to the total audio sum of all the conference rooms in the conference. The Jth element of the MLCTLK array indicates whether the link is originating at another MLCT (if set to 1) or a room (if set to 0). The Kth element in array MAUDCF indicates whether the Kth MLCT in the conference has contributed audio at least once in the case when multiple broadcast links are assigned to a particular MLCT in the conference.

Operational block 4212 sets counter J=1.

Conditional branch point 4213 tests whether input link J is assigned. If the test result is false, control is given to step 4221. If the test result is true, conditional branch point 4214 tests whether the assigned input link is assigned to a room. If the test result in step 4214 is true, operational block 4215 sets the Jth element of array LOCAUD and of array TOTAUD to 1. If the test result is false, i.e. link J is assigned to an MLCT, operational block 4216 sets MLCTLK[J]=1.

Operational block 4217 sets register K with the numerical value of the MLCT number that the Jth link is assigned to.

Conditional branch point 4218 tests whether MLCT K has already contributed to the total audio summation. If the result in step 4218 is false, operational block 4219 sets MAUDCF[K]=1 and operational block 4220 sets the Jth element of array TOTAUD[J]=1.

Returning to step 4218, if the test result of conditional branch point 4218 is true, steps 4219 and 4220 are skipped and control is given to operational block 4221.

Operational block 4221 increments counter J, i.e. J=J+1.

Conditional branch point 4222 tests whether counter J is greater than N. If the test result is false, control is given to conditional branch point 4213 and steps 4213 through 4222 are repeated until step 4222 yields a true result.

Operational block 4223 sets counter J=1.

Conditional branch point 4224 tests whether output link J is assigned. If the test result is false, operational block 4236 sets counter I=1.

Operational block 4237 sets the matrix element KNOLOSS[I,J] and the matrix element KLOSS[I,J] in the audio bridge host memory 2210 to 0.0, i.e. −infinite db.

Operational block 4237 increments counter I, i.e. sets counter I=I+1.

Conditional branch point 4239 tests whether I>N. If the test result is false, control is returned to operational block 4237 and steps 4237 through step 4139 are repeated until conditional branch point 4239 yields a true result.

Returning to conditional branch point 4224, If the test result is true, conditional branch point 4225 tests whether output link is assigned to a room. If the test result is true, operational block 4226 sets counter I=1.

Conditional branch point 4227 tests whether I=J. If the test result is true, operational block 4233 sets the matrix element KNOLOSS[I,J] and the matrix element KLOSS[I,J] in the audio bridge host memory 2210 to 0.0, i.e. −infinite db. If the test result is false, conditional branch point 4228 tests whether the Jth element in array TOTAUD is set to 1. If the result is false, control is given to operational block 4233. If the result is true, conditional branch point 4230 tests whether the Ith link is an MLCT link. If the test result in step 4230 is true, operational block 4231 sets the matrix element KNOLOSS[I,J] and the matrix element KLOSS[I,J] in the audio bridge host memory 2210 to 0 db. If the test result in step 4230 is false, operational block 4232 sets the matrix element KNOLOSS[I,J] and the matrix element KLOSS[I,J] in the audio bridge host memory 2210 to 0 db and to −12 db respectively.

Operational block 4234 sets counter I=I+1.

Conditional branch point 4235 tests whether I>N. If the result is false, control is given to conditional branch point 4227 and steps 4227 through 4235 are executed until conditional branch point 4235 yields a true result.

Returning to conditional branch point 4225, if the test result is false, operational block 4240 sets counter I=1.

Conditional branch point 4241 tests whether the Ith element in array LOCAUD is set to 1. If the test result is false, Operational block 4245 sets the matrix element KNOLOSS[I,J] and the matrix element KLOSS[I,J] in the audio bridge host memory 2210 to 0.0, i.e. −infinite db. If the result is true, conditional branch point 4242 tests whether the Ith link is an MLCT link. If the test result in step 4242 is true, operational block 4243 sets the matrix element KNOLOSS[I,J] and the matrix element KLOSS[I,J] in the audio bridge host memory 2210 to 0 db. If the test result in step 4242 is false, operational block 4232 sets the matrix element KNOLOSS[I,J] and the matrix element KLOSS[I,J] in the audio bridge host memory 2210 to 0 db and to −12 db respectively.

Operational block 4246 sets counter I=I+1.

Conditional branch point 4247 tests whether I>N. If the result is false, control is given to conditional branch point 4241 and steps 4241 through 4247 are executed until conditional branch point 4247 yields a true result.

Operational block 4248 sets counter J=J+1.

Conditional branch point 4249 tests whether J>N. If the result is false, control is given to conditional branch point 4224 and steps 4224 through 4249 are repeated until conditional branch point 4249 yields a true result in which case control is given to the calling program routine XPCTL via oval 4250.

FIG. 46 is a flowchart of the PRDEVT subroutine employed by operational block 4005 of the XPCTL program task of FIG. 40.

Accordingly, the PRDEVT subroutine is entered by oval 4601.

Conditional branch point 4602 tests whether event flag LDECEFG=1. If the test result is false, control is given to the calling program routine XPCTL via oval 4615. If the test result is true, operational block 4603 sets event flag LDECEFG=0.

Operational block 4604 sets a register in control processor memory 3904, namely, NWMUTST=AMUTST by performing an appropriate read from scratchpad memory 1405 in the decryptor 1002.

Operational block 4605 sets register STSREG in the decryptor scratchpad memory 1405 with the contents of AMUTST by sending appropriate write command to the decryptor microcontroller 1401.

Operational block 4606 sets flag MUTCHGFG=0. MUTCHGFG indicates whether an audio mute state change occurred.

Conditional branch point 4608 tests whether the audio mute state recorded in the control processor memory 3904 associated with link J, i.e., MUTST[J], equals the new audio mute state in register NWMUTST acquired in step 4604. If the test result is false, operational block 4609 sets flag MUTCHGFG=1.

Operational block 4610 stores the new audio mute status associated with link J in an appropriate location control processor memory 3904.

Returning to step 4608, if the test result is true, steps 4609 and 4610 are skipped and control is given to operational block 4611 which sets counter J=J+1.

Conditional branch point 4612 tests whether counter J>N. If the test result is false, control is returned to conditional branch point 4608 and steps 4608 through 4612 are repeated until the result in conditional branch point 4612 yields a true result.

Conditional branch point 4613 tests whether flag MUTCHGFG was set to 1 in the above process. If the test result is true, operational block 4614 informs the Facility Administration Module of such event and program control is given to the calling program routine XPCTL via oval 4615. If the test result in conditional branch point 4613 is false, step 4614 is skipped and program control is given to the calling program routine XPCTL via oval 4615.

SYSTEM OPERATION

Control Messages

Messages exchanged between the rooms and MLCTs and between MLCTSs, i.e., the VTS message definitions are described below. They are useful in understanding the following operational description.

Messages from Room Controller to MLCT

ST Start Talking message informs the MLCT that someone has started to talk in the ST is transmitted after a transition from a quiet room state to a talker state is detected.

SP Stop Talking message informs the MLCT that the room is no longer in the active talker state.

STG Start Graphics message is transmitted when any graphics-related SEND button is depressed.

SPG Stop Graphics message is transmitted when the room has left the graphics state. The graphics state can be terminated by pressing any of the non-graphics camera buttons (AUTO, CLOSE-UP, OVERVIEW).

PTSI Push-to-see-room-I message is transmitted when an enabled push-to-see button is pressed.

AVX Automatic Video Switch message is transmitted when the room wants to enter the automatic video switch mode. Entering the automatic video switch mode is accomplished by pressing the currently lit push-to-see button.

GFUR Generate Fast Update Request message is transmitted when the room's TV Processor requests a fast update from the distant TVP. The fast update request is conveyed to the room controller via the TVP interface.

GR Get Ready (for fast update) message is transmitted upon receipt of a GFUC message from the MLCT. This message is transmitted a predetermined interval prior to transmitting the fast picture update information by the picture processor.

ARACK Available Rooms Acknowledge message is transmitted as an acknowledgement that the AR message from the MLCT has been received. The ARACK message echoes the available room information bytes sent in the AR message.

MESSAGES FROM MLCT TO ROOM CONTROLLER

AVXACK Automatic Video Switch Acknowledge message is transmitted in response to an AVX message received from a room controller.

STGACK Start Graphics Acknowledge message is transmitted by the MLCT in response to an uncontested STG request.

STGNAK Start Graphics Negative Acknowledge message is transmitted in response to an STG request when there is contention for rooms requesting to send graphics. STGNAK is also transmitted to a room sending graphics to terminate the room's graphics mode in the event of a network fault.

GFUC Generate Fast Update Comman message is transmitted when the MLCT is requesting the room TVP to send fast update video. Upon receiving this message, the room controller will signal the TV processor via the TVP interface to initiate the fast update video and a GR message is transmitted a predetermined interval prior to transmission of the fast video picture update.

GRI Get ready (for fast update from room I) message is transmitted as a positive acknowledgement to either a GFUR message or a PTSI message that has been previously transmitted from a room controller. GRI may also be sent autonomously to a room before an unsolicited fast update video is being sent, such as when the new-talker room is changed.

AR Available Rooms message is transmitted to inform the room controller which push-to-see buttons are to be activated during the conference.

An AR message is transmitted to:
1. configure the conference at the start,
2. serve as a negative acknowledgement to a PTSI message that selects an unavailable room,
3. reconfigure the conference by adding or deleting rooms, or
4. declare assigned rooms to be active or inactive.

MESSAGES FROM MLCT TO MLCT

BR Bus Request message is broadcasted to all the other MLCTs when the MLCT first assumes the bus-request state. (i.e. One or more of its serving rooms is active, unmuted, and has talker.)

NBR Non Bus Request message is broadcasted to all the other MLCTs when the MLCT first assumes the non-bus requested state. (i.e. All of its serving rooms are either inactive, muted, or do not have a talker.)

NTI New Talker Room I message is broadcasted once by an MLCT when it assigns the new talker to one of its serving rooms.

BL Bus Release message is broadcasted once by the MLCT when it releases the new talker.

BRG Bus Request Graphics message is broadcasted to all the other MLCTs when the MLCT first assumes the graphics-bus-request state. (i.e. One of its serving rooms is active and requesting to send graphics.)

NBRG Non Bus Request Graphics message is broadcasted to all the other MLCTs when the MLCT first assumes the non-graphics-bus-request state. (i.e. All of its serving rooms are either inactive or not requesting to send graphics.)

NGI New Graphics Room I message is broadcasted once by an MLCT when it assigns the new graphics to one of its serving rooms.

BLG Bus Release Graphics message is broadcasted once by the MLCT when it releases the new graphics.

GFURI Generate Fast Update from Room I Request message is transmitted by the MLCT when it requires a video fast update from a room (room I) served by another MLCT.

GRI Get Ready for fast update from room I message is transmitted over any broadcast link that is transmitting room I's video signal when room I is sending a fast update.

PTSIJ Room I is in push-to-see room J message is transmitted when a MLCT changes the mode of one of its serving rooms (room I). J contains desired room id when room I is in the push-to-see mode and contains FF(hex) when room I is in the automatic switching mode.

EXPANDED SOFTWARE CODE

The video selection and fast update algorithms described below are performed by control processor 1006 under control of the so-called expanded software code. Control processor 1006 expanded code operates under a real time multi-tasking operating system of a type known in the art. The expanded software code is arranged in tasks which are ordered according to their priority. While the control processor expanded code is activated these tasks will always be in one of the following states:

DORMANT The task is not scheduled to be run;
READY The task is scheduled to be run;
RUNNING The task is running (Only one task is running at a time);
"WAIT INTERRUPT" The task is waiting for a specified interrupt to occur;
"WAIT POST" The task is waiting for a post from another task;
"WAIT TIMER" The task is waiting for a specified time period to elapse.

The control processor expanded mode code consists of a plurality of highly interactive tasks which can be functionally divided into the following seven separate modules:

MS INTERFACE Processes orders received from the microprocessor system (MS) 101;

FACILITY ADMINISTRATOR Monitors the facilities of the ports assigned in the conference. Performs error recovery and operates the front panel lights;

TRANSMISSION PATH INTERFACE Performs the software interface with BIC 1001, DEC 1002, BPC 1003, ENC 1004, and BOC 1005 hardware;

FACILITY ERROR MONITOR Monitors facility errors and interrupts the MS when significant changes have occurred;

LEVEL 2 PROTOCOL Handles the control channel communication over the DS1 links connected to the rooms and other MLCTs in the conference;

MESSAGE PROCESSING Processes messages received over the DS1 link's control channels from rooms and other MLCTs by adjusting status and posting the proper tasks. Also, formats outgoing messages for the rooms and other MLCTs;

CONFERENCE CONTROL Performs the video selection and fast update algorithms. This is done by interpreting the status changed by the message processing and facility administrator modules and posting tasks in the message processing module to generate any required messages to the rooms and other MLCTs.

MS INTERFACE

The MS interface module 4710 (FIG. 47) processes the orders sent by microprocessor system (MS) 101 to bridge 103. These orders are:

1. Assign MLCT ID and speed for conference;
2. Assign port;
3. Adjust the MS status of a port;
4. Read status stored in bridge;
5. Download of encryption key;
6. Place the MLCT in the encrypted or clear state;
7. Clear bridge hardware alarms.

The first four orders are related to the administration of the facilities used in the conference. When one of these orders are received, the MS interface module adjusts status and posts one of the facility administrator modules' tasks.

The last three orders are related to operation of the BIC 1001, DEC 1002, BPC 1003, ENC 1004, and BOC 1005 circuits. When one of these orders are received the MS interface module adjusts status and posts one of the transmission path interface module's tasks.

TRANSMISSION PATH INTERFACE

The transmission path interface module 4709 (FIG. 47) interfaces with the BIC 1001, DEC 1002, BPC 1003, ENC 1004, and BOC 1005 circuits. It performs the communication required to:

1. Set up the audio summing matrixes;
2. Set up for encrypted audio or nonencrypted (clear) audio;
3. Monitor the circuits to determine hardware detected facility alarms.

The transmission path interface module sends an interrupt to the MS 101 when it first determines a facility failure. Once one of the facility alarms becomes active, the alarm remains active until the MS interface module notifies the transmission path interface module of a MS request to clear hardware alarms.

FACILITY ADMINISTRATOR

The facility administrator module 4708 (FIG. 47) maintains the basic status of the conference. It receives information from the following modules:

MS INTERFACE relays information from the MS about the port assignments and MS status of the ports;

TRANSMISSION PATH INTERFACE passes information about the facility errors detected by the bridge hardware;

LEVEL 2 PROTOCOL informs facility administrator when control channel communication over each of the ports is connected or disconnected and when an error has occurred in the allocation of space for messages;

MESSAGE PROTOCOL informs the facility administrator when the status of other MLCTs or rooms served by other MLCTs change and when an error has occurred in the allocation of space for messages.

The facility administrator uses this information to maintain the MLCT's condition (stand-alone or distributed) and each of its serving room's active and muted states. The MLCT is in the stand-alone condition if the level 2 protocol module indicates that at least one of the links assigned as incoming from another MLCT or as a broadcast link has either the MS status of the link being bad or the control channel communication disconnected.

While in the stand-alone condition the MLCT operates its own conference separate from the other MLCTs. Otherwise, the MLCT is in the distributed condition. A room is declared active, if it is assigned in the conference, the MS status of the port it is connected to is good, and the level 2 protocol module indicates the control channel communication with the room is connected. Otherwise, the room is inactive. A room is declared muted (unmuted) if the transmission path module has muted (unmuted) the incoming audio signal of the port assigned to the room.

The facility administrator prompts the message processing module to generate messages to the other MLCTs to keep them informed of the MLCT's port assignments, MLCT's condition, and the active and muted states of the rooms served by the MLCT. Thus, if the MLCT is in the distributed condition it is aware of the state of all rooms in the conference.

The facility administrator module is posted by the transmission path interface module when the muted state of any assigned link changes, by the MS interface module when link assignments change, and by the message processing module when changes occur to states (assigned, active or muted) of rooms served by other MLCTs.

The facility administrator module processes all status to determine the active and muted states of the rooms that the MLCT serves. If a change has occurred to any of the assigned room's active states, the facility administrator module posts the NTP, NGP, and VSEL tasks. If a change has occurred to any of the assigned room's muted states, the facility administrator module posts the NTP task.

LEVEL 2 PROTOCOL MODULE

The level 2 protocol module performs the communication protocol of the DS-1 link's control channel. It transmits and receives messages from the rooms connected to the MLCT via a BX.25 level 2 protocol. The BX.25 level 2 protocol is described in the Bell System Technical Reference "Operations Systems Network Communications Protocol Specification, BX.25", Issue 3, June 1982 (Publication 54001). The level 2 protocol module uses a modification of the BX.25 level 2 protocol in its communication with the other MLCTs. This was necessary because of the broadcast function of the inter-MLCT connections. This modified protocol will be described in terms of the BX.25 level 2 protocol, defining parameters and deviations from BX.25.

The level 2 protocol module passes all messages received to the message processing module. All messages to be transmitted are passed to the level 2 protocol module by the message processing module.

The level 2 protocol module notifies the facility administrator module when control channels are first connected and when control channels are disconnected due to facility failures. In the latter case the facility error monitor module is notified also.

The following BX.25 level 2 system parameters are defined.

"T1" is the time the transmitting station will wait for an acknowledge before retransmitting. In this example, T1 must be greater than the round trip satellite delay of 600 milliseconds.

"T3" is the maximum time allowed with no information messages being transmitted without polling the remote station.

"T4" is the time that a station will receive the idle channel (no flags) state before the station considers the link to be disconnected.

"N2" is the number of times that a message is transmitted and retransmitted.

"N1" is the number of bits in the information field and must contain an integral number of octets (bytes). The largest information field allowed is 96 bits (12 bytes).

"R" is the maximum number (k) of sequentially numbered I frames that may be outstanding (i.e. unacknowledged) at a given time and is defined in this example to be 4.

The frame formats for MLCT-room communication protocol messages, i.e., C-bit protocol, are shown in Table 5.

TABLE 5

FRAME FORMATS for MLCT-Room Messages

| Bit order of transmission | | | | |
|---|---|---|---|---|
| 12345678 | 12345678 | 12345678 | 16 to 1 | 12345678 |
| Flag | Address | Control | FCS | Flag |
| F | A | C | FCS | F |
| 01111110 | 8-bits | 8-bits | 16-bits | 01111110 |

| Bit order of transmission | | | | | |
|---|---|---|---|---|---|
| 12345678 | 12345678 | 12345678 | 123...N | 16 to 1 | 12345678 |
| Flag | Address | Control | Information | FCS | Flag |
| F | A | C | I | FCS | F |
| 01111110 | 8-bits | 8-bits | N-bits | 16-bits | 01111110 |

FCS = frame checking sequence

The BX.25 protocol defines two addresses, A=3 and B=1. The room, which functions as the data circuit-terminating equipment (DCE), is assigned address A. The MLCT, which functions as the data terminal equipment (DTE), is assigned address B. The address is used to differentiate between commands and responses. When transmitting a command the room uses the address of the MLCT, address B. When transmitting a response the room uses its own address, address A. Similarly, the MLCT uses address A (B) when transmitting a command (response).

The MLCT and room can exchange the following messages:

I information
RR receive ready
RNR receive not ready
REJ reject
DM disconnected mode
SABM set asynchronous balanced mode
UA unnumbered message
FRMR frame reject
DISC Disconnect Link connections between MLCTs and rooms are established according to the BX.25 protocol. When no frames are being transmitted the MLCT and room will transmit continuous flags. The link connection is made by the following sequence of events:

1. When the MLCT (room) detects the flags, it transmits a set asynchronous balanced mode (SABM) command with the poll bit set.
2. Upon receipt of the SABM command the room (MLCT) transmits an unnumbered acknowledged (UA) response with the final bit set and resets both its send and receive state variables, V(S) and V(R), to zero.
3. Upon receipt of the UA response, the MLCT (room) resets both its send and receive state variables, V(S) and V(R), to zero.

Both the room and MLCT are now considered to be in the receive ready state.

The MLCT or room can disconnect the link by transmitting a DISC command. The room or MLCT will consider the link disconnected upon transmitting or receiving a DISC message.

While the link is connected the MLCT and room should never let the channel go to the idle state. Interframe time fill (transmission of contiguous flags between frames) should be used to keep the channel active. If the MLCT or room detects an idle channel, they consider the link disconnected.

In an MLCT—MLCT connection, each MLCT will receive signals from all other MLCTs. An MLCT may desire to send a message to one MLCT in a MLCT conference and all the other MLCTs must not respond to that message. In other cases an MLCT may want to send a message to all MLCT'S in a conference. Thus, the receive section of each MLCT has to be capable of disregarding any messages not intended for it and accepting only those that are to be processed by that MLCT.

Herein the term "logical link" refers to the communication protocol established over one of the MLCT's broadcast links. The logical MLCT—MLCT link is a one-way information transfer link. In a multiple MLCT conference each MLCT will have at least one logical MLCT link (incoming link from another MLCT) and at least one logical broadcast link (outgoing link to other MLCTs). The MLCT maintains a send state variable, V(S), for each logical broadcast link, but no receive state variable. Similarly, the MLCT maintains a receive state variable, V(R), for each logical MLCT link, but no send state variable.

The frame formats for MLCT—MLCT messages are shown in Table 6. The MLCT—MLCT frame contains two addresses, the destination address (DADDR) and the source address (SADDR).

TABLE 6

FRAME FORMATS for MLCT-MLCT Messages

| Bit order of transmission | | | | | |
|---|---|---|---|---|---|
| 12345678 | 12345678 | 12345678 | 12345678 | 16 to 1 | 12345678 |

TABLE 6-continued

FRAME FORMATS for MLCT-MLCT Messages

| Flag<br>F<br>01111110 | DADDR<br>A<br>8-bits | SADDR<br>A<br>8-bits | Control<br>C<br>8-bits | FCS<br>FCS<br>16-bits | Flag<br>F<br>01111110 |
|---|---|---|---|---|---|
| \multicolumn{6}{Bit order of transmission} | | | | | |
| 12345678<br>Flag | 12345678<br>DADDR | 12345678<br>SADDR | 12345678<br>Control | 123...N<br>Information | 16 to 1<br>FCS | 12345678<br>Flag |
| F<br>01111110 | A<br>8-bits | A<br>8-bits | C<br>8-bits | I<br>N-bits | FCS<br>16-bit | F<br>01111110 |

DADDR = destination address
SADDR = source address
FCS = frame checking sequence The BX.25 protocol defines only two addresses, A=3 and B=1, that are used to delineate between commands and responses. These two addresses are not sufficient to handle the MLCT—MLCT messages. The MLCT can transmit a message over a broadcast link and receive the acknowledge over any MLCT link (which could be assigned to any of the MLCT's six ports).

Table 7 shows how the MLCTs will assign their source addresses for broadcast links. Bit 8 is used to distinguish MLCT addresses from room addresses (Bit 8=1 indicates an MLCT, bit 8=0 indicates a room). Bit 7 indicates whether the frame is a command (bit 7=0) or a response (bit 7=1).

TABLE 7

MLCT-MLCT SOURCE ADDRESS FORMAT

| Bit | 8 | 7 | 6 5 4 | 3 2 1 |
|---|---|---|---|---|
| MLCT Individual Address | Always One | C/R | Port ID (0-5) | MLCT ID (0-5) |

C/R = for command frame, 1 for response frame
MLCT ID = ID of MLCT transmitting the frame
Link ID = ID of port over which MLCT is transmitting the frame MLCTs store their MLCT ID in bits 1-3 and the port ID of the output link over which the message is being transmitted in bits 4-6. When transmitting a response to a command, MLCTs always use the command frame's source address as the destination address in the response frame (with bit 7=0). Thus, the destination address of a response frame specifies not only the MLCT, but the output link (broadcast link) to which the response is directed. The port ID is required, since the responses to commands transmitted over a broadcast link can be received over any of the MLCT's input links (that is assigned as a MLCT link).

Table 8 shows how the MLCTs will assign their destination addresses for broadcast links. As in MLCT—MLCT source addresses bit 8 distinguishes MLCT addresses from room addresses. Bit 7 indicates whether the destination address is an individual address (bit 7=0) or a broadcast address (bit 7=1).

TABLE 8

MLCT-MLCT DESTINATION ADDRESS FORMATS

| Bit | 8 | 7 | 6 5 4 | 3 2 1 |
|---|---|---|---|---|
| MLCT Individual Address | Always One | Always Zero | Port ID (0-5) | MLCT ID (0-5) |

| Bit | 8 | 7 | 6 | 5 | 4 | 3 | 2 | 1 |
|---|---|---|---|---|---|---|---|---|
| MLCT Broadcast Address | One | One | One | One | One | One | One | One |

M(0-5) indicates message is addressed to MLCT (0-5)

The MLCT—MLCT individual destination address format is the same as that of the MLCT—MLCT source address (with bit 7=1). This comes from the fact that MLCTs use the source address of frames received over a MLCT link to direct responses to that particular MLCT link. In the MLCT—MLCT individual destination address, the MLCT ID is the ID of the MLCT that is to receive the frame and the port ID is the ID of the particular link (broadcast link) in that MLCT to which the frame is directed.

MLCTs use the MLCT—MLCT broadcast address as the destination address when broadcasting commands to the other MLCTs. If a command frame with a MLCT—MLCT broadcast address requires a response, the transmitting MLCT expects a response from all other MLCTs in the conference.

The logical links and logical MLCT link can exchange all of the following messages: RR, RNR, REJ, SABM, DISC, DM, UA, FRAMR.

| Broadcast Link | | MLCT Link | |
|---|---|---|---|
| I | information | RR | receive ready |
| RNR | receive not ready | RNR | receive not ready |
| DISC | disconnect | REJ | reject |
| SABM | set asynchronous balanced mode | DM | disconnected mode |
| | | UA | unnumbered message |
| | | FRMR | frame reject |

The procedure in establishing logical link connections was derived assuming one basic premise: The inability to communicate over one broadcast link in the conference stops the exchange of information between MLCTs. Losing an MLCT link or broadcast link causes the MLCT to go to the stand-alone condition. MLCTs in the stand-alone condition do not transmit information frames.

The rules for establishing and maintaining logical link connections are as follows:

1. When not transmitting frames over a broadcast link, an MLCT will transmit continuous flags. (i.e. The connected, but idle state is not allowed in MLCT—MLCT communication.)
2. The MLCT transmits a set asynchronous balanced mode (SABM) command with the poll bit set.
3. Upon receiving the SABM command over an MLCT link each of the other MLCTs will transmit an unnumbered acknowledged (UA) response with the final bit set over any of their broadcast links and reset their receive state variable, V(R), for that MLCT link. The MLCTs that transmitted a UA response consider that logical MLCT link connected at this point.

4. Upon receiving a UA response (with the final bit set) from each of the other MLCTs the first MLCT resets the send state variable, V(S), for the logical broadcast link. The first MLCT considers that logical broadcast link connected at this point.

After all of the MLCTs perform the above steps for each of their broadcast links, full communication between the MLCTs is established.

A MLCT considers an established logical MLCT link to be disconnected if it fails to detect flags for more than time period T4 or it receives a DISC command over the link. A MLCT considers a logical broadcast link to be disconnected, if it transmits and retransmits a frame N2 times without receiving the required response from all of the other MLCTs.

The MLCTs exchange the MLCT messages according to the procedure described in Publication 54001 noted above. The only difference is that when the MLCT transmits a command with a MLCT—MLCT broadcast address the MLCT must receive a response from each of the other MLCTs. If it fails to receive a response from any of the other MLCTs, the MLCT will retransmit the command. The command is transmitted and retransmitted up to N2 times. If after N2 times the MLCT still fails to receive all of the required responses, it disconnects the logical broadcast link. The other MLCTs that have already transmitted a response acknowledging receipt of the command will receive the command again and:

1. Ignore the command, if it is an information frame but send the response again. They will recognize the retransmission because the send sequence number, N(S), will be out of sequence.
2. Execute the command and send the response again, if it is a supervisory or unnumbered command.

The MLCT will never send a DM response since it always wants the link connected and active.

Included in the information messages are the VTS operating code. The VTS operating code, hereinafter opcode, is defined as the first byte (8 binary bits) contained in the information field of a BX.25 message exchanged between rooms and MLCTs in a conference. There are four basic types of VTS opcodes; room to MLCT opcodes, MLCT to room opcodes, MLCT to MLCT opcodes, and room to room opcodes. The bit pattern of the VTS opcodes was chosen to allow easy recognition of the type of opcode. In addition, the opcodes which involve the MLCT have been assigned contiguously to simplify the MLCT's programming.

Bits 7 and 8 are assigned as follows:

| bit 8 | 7 | |
|---|---|---|
| 0 | 0 | MLCT to MLCT opcode |
| 0 | 1 | MLCT to room opcode |
| 1 | 0 | Room to MLCT opcode |
| 1 | 1 | Room to room opcode |

Thus, bit 8 indicates who the message is from and bit 7 indicates to whom the message is destined (0—MLCT, 1—room).

MLCT TO MLCT OPCODE FORMATS

| | MLCT to MLCT OPCODE FORMATS | | |
|---|---|---|---|
| | | Information Field | |
| Message | Byte 1 | Byte 2 | Byte 3 |
| NBR | 00 | — | — |
| BR | 01 | — | — |
| NBRG | 02 | — | — |
| BRG | 03 | — | — |
| BL | 04 | — | — |
| NTI | 05 | room ID | — |
| BLG | 06 | — | — |
| NGI | 07 | room ID | — |
| PTSIJ | 08 | from room ID | desired room ID |
| GRI | 09 | room ID | — |
| GFURI | 0A | room ID | — |
| LNKST | 0B | ded room ID | |
| MSTAT | 0C | **see below for additional bytes | |

**The additional bytes for the MSTAT opcode are:
byte 2: bits 1–3 contain the MLCT's ID
bits 4–6 MLCT mode (SC=010, VC=011)
bit 7 MLCT encryption state (0=clear, 1=encrypted)
bit 8 MLCT condition (SA=0, DS=1)
byte 3: bits 1–6 are assigned MLCT bits (one bit for each MLCT).
Bit set indicates the room is assigned.
Bit 1–6 corresponds to MLCT 1–6.
bits 7,8 are always zero
byte 4 zero
byte 5 assigned room bits (one bit for each room).
Bit set indicates the room is assigned.
Bit 1–6 corresponds to room 1–6 respectively.
byte 6 zero
byte 7: active room bits (one bit for each room).
Bit set indicates the room is active.
Bit 1–6 corresponds to room 1–6 respectively.
byte 8 zero
byte 9 unmuted room bits (one bit for each room).
Bit set indicates the room is unmuted.
Bit 1–6 corresponds to room 1–6 respectively.

MLCT TO ROOM OPCODE FORMATS

| | | Information Field | |
|---|---|---|---|
| Message | Byte 1 | Byte 2 | Byte 3 |
| AVXACK | 00 | — | — |
| AR | 01 | room ID | *available rooms |
| STGNAK | 02 | — | — |
| STGACK | 03 | — | — |
| GFUC | 04 | — | — |
| GRI | 05 | room ID | — |

*bit 0–5 of available rooms byte is set if room 0–5 respectively is available for push-to-see.
(bits 6 and 7 are always zero)

(bits 6 and 7 are always zero)

ROOM TO MLCT OPCODE FORMATS

| | | Information Field | |
|---|---|---|---|
| Message | Byte 1 | Byte 2 | Byte 3 |
| SP | 00 | — | — |
| ST | 01 | — | — |
| SPG | 02 | — | — |
| STG | 03 | — | — |
| ARACK | 04 | room ID | *available rooms |
| PTSi | 05 | room ID | — |
| AUX | 06 | — | — |
| GFUR | 07 | — | — |
| GR | 08 | — | — |

*available rooms byte should be same as the available rooms byte in the last AR message received from the MLCT.

MESSAGE PROCESSING MODULE

The message processing module 4707 (FIG. 47) is the interface between the conference control module and level 2 protocol module. The message processing module interprets the messages received from rooms and other MLCTs, adjusts the related status, and posts the proper task in the conference control module. The message processing module allows the conference control module to be nearly unaware of how rooms and MLCTs are connected to this MLCT.

When the message processing module processes a message received from a room or another MLCT it adjusts status and post tasks according to the type of message. The processing of the various messages is as follows:

| Message Received | Action Taken |
| --- | --- |
| ST/SP | The room that transmitted the ST (SP) message is marked as having (not having) a talker and the NTP task is posted. |
| BR/NBR | the MLCT that transmitted the BR (NBR) message is marked as having (not having) a talker and the NTP task is posted. |
| NTI/BL | The NTI (BL) message is stored in the last NTI (BL) message received variable, the NTI (BL) message received flag is set, and the NTP task is posted. |
| STG/SPG | The graphics request flag of the room that transmitted the STG (SPG) message is set (cleared) and the NGP task is posted |
| BRG/NBRG | The MLCT that transmitted the BRG (NBRG) message is marked as having (not having) a graphics request and the NGP task is posted. |
| NGI/BLG | The NGI (BLG) message is stored in the last NGI (BLG) message received variable, the NGI (BLG) message received flag is set, and the NGP task is posted. |
| PTSI/AVX | The room that transmitted the PTSI (AVX) message is marked being in the PTSI (AVX) mode and the VSEL task is posted. |
| GFUR/GFURI | Room I's request fast update received flag is set and the FUGEN task is posted when the GFUR message is received from a room receiving room I's video or a GRURI message is received from another MLCT. |
| GR/GRI | Room I's fast update received flag is set and the VSWCH task is posted when a GR message is received from room I or a GRI message is received from another MLCT. |
| LNKST | The link's dedicated room status is adjusted according to the LNKST message and the FADMIN task is posted. |
| MSTAT | The status of the rooms (assigned, active, and muted states) is adjusted according to the MSTAT message and the FADMIN task is posted. |

CONFERENCE CONTROL MODULE

The conference control module performs the video selection and fast update algorithms. It monitors the state of each room in the conference to determine the desired room to be viewed for each room. If some rooms are not viewing their desired room the conference control module initiates fast updates and performs a video switch for the rooms when the fast updates arrive.

Fast updates are also initiated upon request from rooms who have lost synchronization with their incoming video signal. The conference control module maintains timing windows for each room to ensure that fast updats and video switches are performed properly.

FACILITY ERROR MONITOR MODULE

The facility error monitor module sets error flags when various facility errors occur. Once an error flag is set it will remain set until a specified hold interval elapses without its respective error occurring again. The facility error monitor module interrupts the MS when any of these error flags transition. The hold interval allows the MS to notice transient errors that the bridge may detect and recover from before the MS has a chance to read the status. The facility error monitor module received input from the facility administrator, level 2 protocol, message processing, and conference control modules.

VIDEO SELECTION AND FAST UPDATE ALGORITHMS—GENERAL

Figure 47:
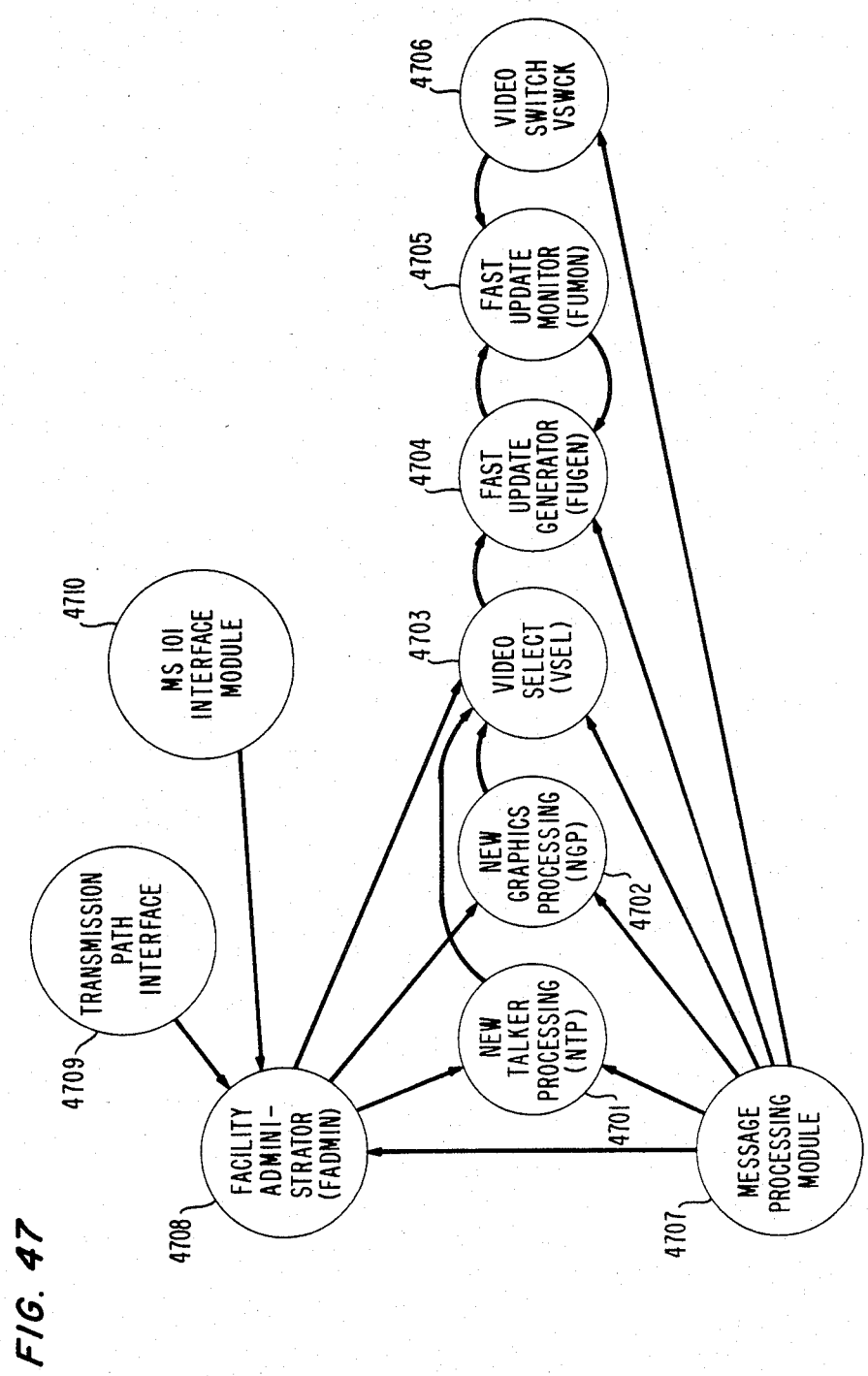
FIG. 47 illustrates the relationship among the program tasks that perform the video selection algorithm and the fast update algorithm.

The tasks that perform the video selection algorithm and the fast update algorithm, in accordance with the aspects of the invention, are presented in FIG 47. The video selection algorithm is implemented in the New Talker Processing (NTP) task 4701, New Graphics Processing (NGP) task 4702, and Video Select (VSEL) task 4703. The fast update algorithm is implemented in the Fast Update Generator (FUGEN) task 4704, Fast Update Monitor (FUMON) task 4705, and Video Switch (VSWCH) task 4706.

Message Processing module 4707, Facility Administrator module 4708, Transmission Path Interface module 4708 and MS Interface module 4710 all described above administer operation of the video selection and fast update algorithms.

The tasks communicate with each other by setting flags and sending a post to another task via an operating system of a type well known in the art in control processor 1006. The usual manner is to have an originating task store any required information and set a flag which signals the destination task to perform a certain operation. The originating task sends a post to the destination task. When the destination task runs, it checks the flag to see if the operation needs to be performed. If the flag is set the destination task clears the flag and performs the operation. Most of the status variables which are not controlled by one task are flags.

VIDEO SELECTION ALGORITHM

The video selection algorithm allows, in accordance with an aspect of the invention, two modes of conferences, namely, a "Sender's Choice" conference and a "Viewer's Choice" conference. In a Sender's Choice conference all rooms stay in the automatic video switching (AVX) mode. The video switching decisions for rooms in the AVX mode are performed automatically by the MLCT.

During a conference, an MLCT maintains active and muted status of its serving rooms. A room is active if no facility errors, other than errors in the audio signal, are detected in the port connected to the room. That is to say, good control channel communication is established. Facility errors that affect the room's active status are loss of the BX.25 communication protocol with the room and port errors detected by the network. If the MLCT detects problems in decrypting the room's audio the MLCT declares the room muted. That is to say, the room is muted if unsatisfactory audio information is detected. The MLCT exchanges the active and muted status of its serving rooms with all the other MLCTs in the conference via the MLCT status (MSTAT) message. MLCTs use the room's active and muted status to determine how the room may function in the conference.

At the start of a conference, each MLCT transmits an available room list (AR) message to its serving rooms. The available room list specifies what rooms can be selected for viewing. In a Viewer's Choice conference, the available room list is the list of active rooms. When a room's active/inactive status changes, each MLCT sends an updated available room list (i.e. an AR message) to each of its serving rooms. In a Sender's Choice conference, the available room list is always empty.

The conference rooms have certain so-called activity states. The term "graphics bus contention" is used in the following discussion. Graphics bus contention exists when a room requests to send graphics and another room is either already assigned the new-graphics or is requesting to send graphics. The existence of graphics bus contention forces the MLCT to reject all requests for sending graphics at that time. If the new-graphics is assigned to a room when graphics bus contention occurs, that room remains the new-graphics.

During a conference, an MLCT maintains a new-graphics state and a new-talker state for itself and a single-room-activity state for each of its serving rooms.

Each room served by an MLCT will be in one of the following single-room-activity states:
1. Idle state—the room does not have a talker and is not sending graphics.
2. Talker-only state—the room has a talker, but is not sending graphics.
3. Graphics-only state—the room is sending graphics, but does not have a talker.
4. Graphics-and-talker state—the room has a talker and is sending graphics.

When a room first becomes active, its MLCT places the room in the idle state. The room remains in the idle state until the MLCT receives a start-talking (ST) or a start-graphics-request (STG) message from the room. If a room in the idle state transmits ST, the MLCT places the room in the talker-only state. If a room in the idle state transmits an STG message and graphics bus contention exists, the MLCT rejects the request by transmitting a start-graphics-negative-acknowledge (STGNAK) message and keeps the room in the idle state. Otherwise, the MLCT assigns the new-graphics to the room, places the room in the graphics-only state and sends the room a start-graphics-acknowledge (STGACK) message.

A room in the talker-only state remains in that state until the MLCT receives from the room either a stop-talking (SP) message or an STG message with no graphics bus contention present. If the room sends SP, the MLCT places the room in the idle state. If the room sends STG when graphics bus contention exists, the MLCT sends STGNAK to the room and the room remains in the talker-only state. Otherwise, the MLCT assigns the new-graphics to the room, places the room in the graphics-and-talker state, and sends STGACK to the room.

A room in the graphics-only state remains in that state until the MLCT receives a stop-graphics (SPG) message or an ST message from the room. In the former case, the MLCT places the room in the idle state. In the latter, the MLCT places the room in the graphics-and-talker state.

A room in the graphics-and-talker state remains in that state until the MLCT receives an SP message or an SPG message from the room. In the former case, the MLCT places the room in the graphics-only state. In the latter, the MLCT places the room in the talker-only state.

The facility administrator module maintains the active and muted status for each of the rooms served by the MLCT. When the facility administrator module adjusts a room's active or muted status it posts the NTP, NGP and VSEL tasks to update their processing.

A MLCT determines the video to transmit to each of its serving (assigned) rooms as follows:
1. To view the selected room—if the room is in the PTS mode or enters the PTS mode, the room receives the video from the room it specified in the last PTS request.
2. To view the new-graphics—If the room is in the AVX mode and if another room, room I, is currently assigned the new graphics, the room receives the video from room I.
3. To view the new talker—If the room is in the AVX mode and if another room, room I, is currently assigned the new talker, the room receives the from room I.
4. To view the last new-talker—If the room is in the AVS mode and if another room, room I, was last assigned the new talker, the room receives the video from the last NTR.
5. To view the second to last new-talker—If the room is in the AVX mode and if another room, room I, was the second to last room assigned the new talker, the room receives the video from room I.
6. If none of the above conditions apply, the room continues to receive the video it is presently receiving.

For each broadcast link that is dedicated to a room served by this MLCT the MLCT transmits the video signal received from that room. For each broadcast link that is dedicated to a room served by another MLCT the MLCT determines the video to transmit as follows. If the room is in the push-to-see mode specifying a room served by this MLCT, the MLCT transmits the video of that specified room. Otherwise, the MLCT selects the video signal to transmit according to the priorities established for undedicated broadcast links. The MLCT video signal selection priorities for its undedicated broadcast links are:
1. Transmit graphics room's output video if the new the new graphics is assigned to one of the MLCT's serving rooms.
2. Transmit the new talker room's output video if the new talker is assigned to one of the MLCT's serving rooms.
3. If the last room, room I, that was assigned the new talker is served by this MLCT, then transmit room I's output video.
4. If the second to last room, room I, assigned the new talker is served by this MLCT, then transmit room I's output video.
5. If none of the above cases apply leave the video transmission as it is.

Following these priorities the other MLCTs will always have the video signals required to ensure each of their serving rooms receive their desired video.

NEW TALKER PROCESSING (NTP) TASK

New talker processing (NTP) task 4701 resolves contention among conference locations for the video to be transmitted. To this end, it maintains a talker bus state which is a summary of the talkers in the MLCT's serving rooms. If none of the MLCTs serving rooms have a talker (i.e. all of the serving rooms are in the graphics only or idle state) the MLCT is in the non-bus-request state. If at least one of the serving rooms has a talker (is in the talker-only or graphics-and-talker state), then the MLCT is in the bus-request state. When a MLCT transitions to the bus-request (non-bus-request) state it braodcasts a bus-request, BR, (non-bus-request, NBR) message to the other MLCTs. Thus, the NTP task knows the talker bus state of all MLCTs in the conference.

The NTP task uses the MLCT's serving room's single room activity states and the other MLCTs talker bus state to maintain a new-talker (NT) states. A MLCT is in the NT-idle state if the new talker is not assigned and none of its serving rooms has a talker (i.e., all rooms are in the idle or graphics-only state). At the start of the conference, all MLCTs are in the NT-idle state. If a MLCT in the NT-idle state detects a talker in one of its serving room's (i.e., its talker bus is in the bus-request state), then the MLCT assumes the bus-contend state. A MLCT in the bus-contend state keeps checking to see if one of its serving rooms has an uncontested talker. That is to say, no change in the video being transmitted to the rooms is made until one and only one room has a talker during a predetermined talker contention timing interval. The MLCT remains in the NT-bus-contend state until one of the following events occurs:

1. All of the rooms served by the MLCT stop talking. (All of the rooms served by the MLCT are in either the idle state or the graphics-only state.) In this case, the MLCT enters the NT-idle state.
2. The NTP task determines that one of the MLCT's serving rooms has an uncontested talker. When only one of the MLCT's serving rooms has a talker (i.e. only one serving room is in talker-only or graphics-and-talker state) and all of the other MLCTs talker buses are in the non-bus-request state, the MLCT starts a timing window. If the timing window expires without detecting any other talkers (i.e. any other room served by the MLCT assuming the talker-only or graphics-and-talker state and none of the other MLCT's talker buses assuming the bus-request state), the MLCT assumes the serving room has an uncontested talker. In this case, the NTP task assigns the new-talker to that room (room I), transmits a NTI message to the other MLCTs specifying that room I is the new-talker and puts the MLCT in the NT-this-MLCT state.
3. A room served by another MLCT is assigned the new-talker. (The MLCT receives an NTJ message from another MLCT.) In this case, the NTP task assigns the new-talker to room J and puts the MLCT in the NT-other-MLCT state.
4. The MLCT receives a bus-release (BL) message from another MLCT. (This is an invalid condition.) In this case, the NTP task would put the MLCT in the NT-idle state. If one of the rooms served by the MLCT still has a talker (the room is in the talker-only state or graphics-and-talker state), the MLCT would immediately return to the NT-bus-contend state.

A MLCT can only enter the NT-this-MLCT state from the NT-bus-contend state. Once in the NT-this-MLCT state, the MLCT remains there until one of the following events occurs:

1. The room that is assigned the new-talker stops talking. (The room assumes the idle state or graphics-only state.) In this event, the NTP task transmits BL and puts the MLCT in the NT-idle state.
2. The MLCT receives a BL message from another MLCT. (This is an invalid condition, since only the MLCT serving the new-talker should transmit the BL message.) In this event, the NTP task would put the MLCT in the NT-idle state.
3. The MLCT receives a NTI message from another MLCT. (This is an invalid condition, since no MLCT should transmit a NTI message when the new-talker exists.) In this event, the NTP task would transmit a BL message to all of the other MLCTs to force them into the NT-idle state and put the MLCT in the NT-idle state.

A MLCT enters the NT-other-MLCT state when it is in the NT-idle or NT-bus-contend state and receives a NTI message. The MLCT remains in the NT-other-MLCT state until it receives a BL message from another MLCT. When this occurs, the MLCT enters the NT-idle state.

If the MLCT should receive a NTJ message while in the NT-other-MLCT state (this is an invalid condition), the MLCT would remain in the NT-other-MLCT state and assume room J to be the new-talker.

If the MLCT is in the stand-alone condition then the NTP task does not check the other MLCTs talker bus states. It instead performs the assignment of the new-talker as if this MLCT is the only MLCT in the call.

The timing interval window used to resolve talker contention should prevent more than one MLCT from assigning the new talker at a time. If a MLCT has assigned the new talker (is in the NT-this-MLCT state) and receives a NTI message from another MLCT, the first MLCT transmits a BL message placing all MLCTs back into the NT-idle state.

Figure 48:
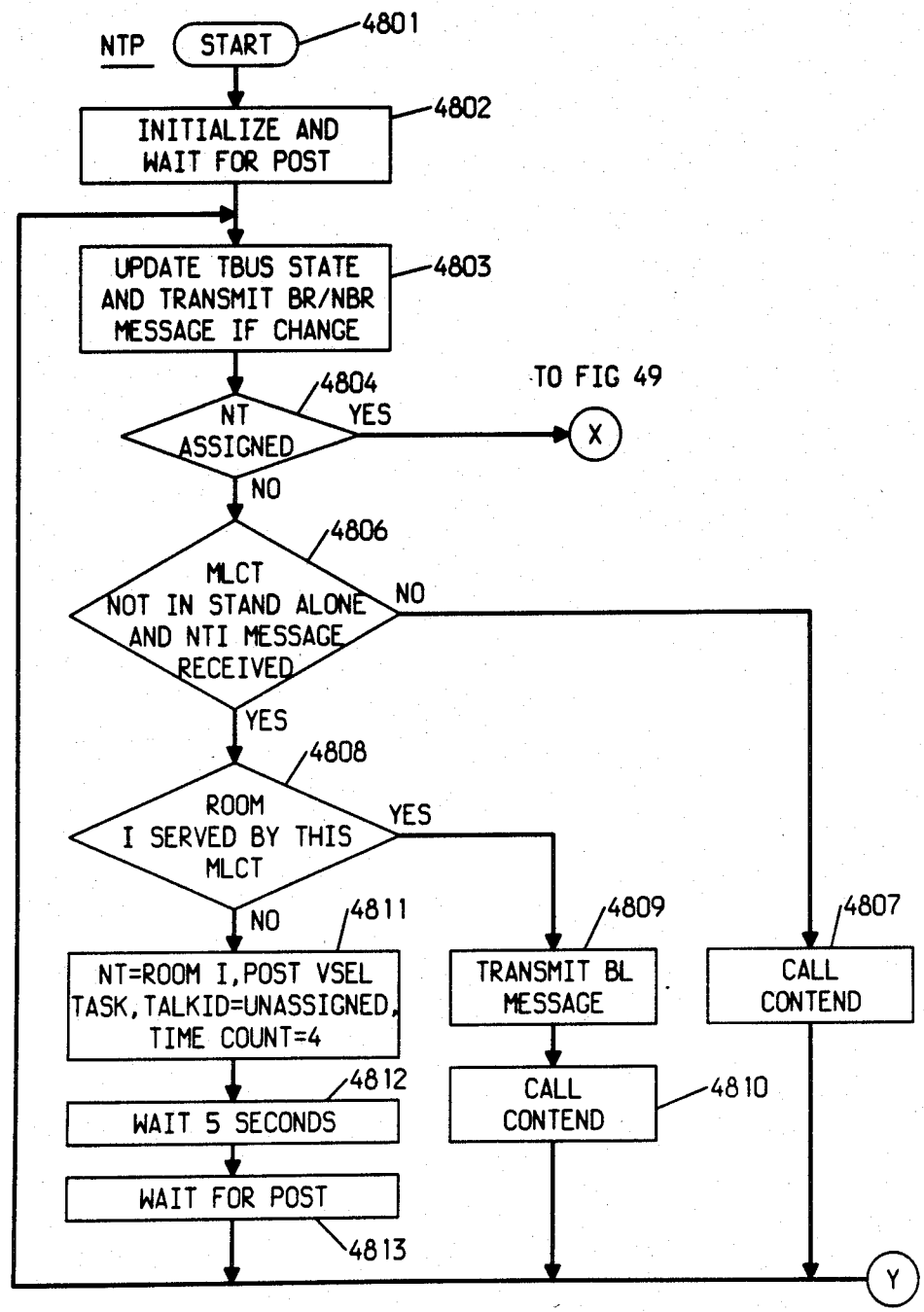
FIGS. 48, 49 and 50 when connected as shown form a flow chart of steps performed in the new talker process (NTP) task by control processor 1006 of FIG. 39.
Figure 49:
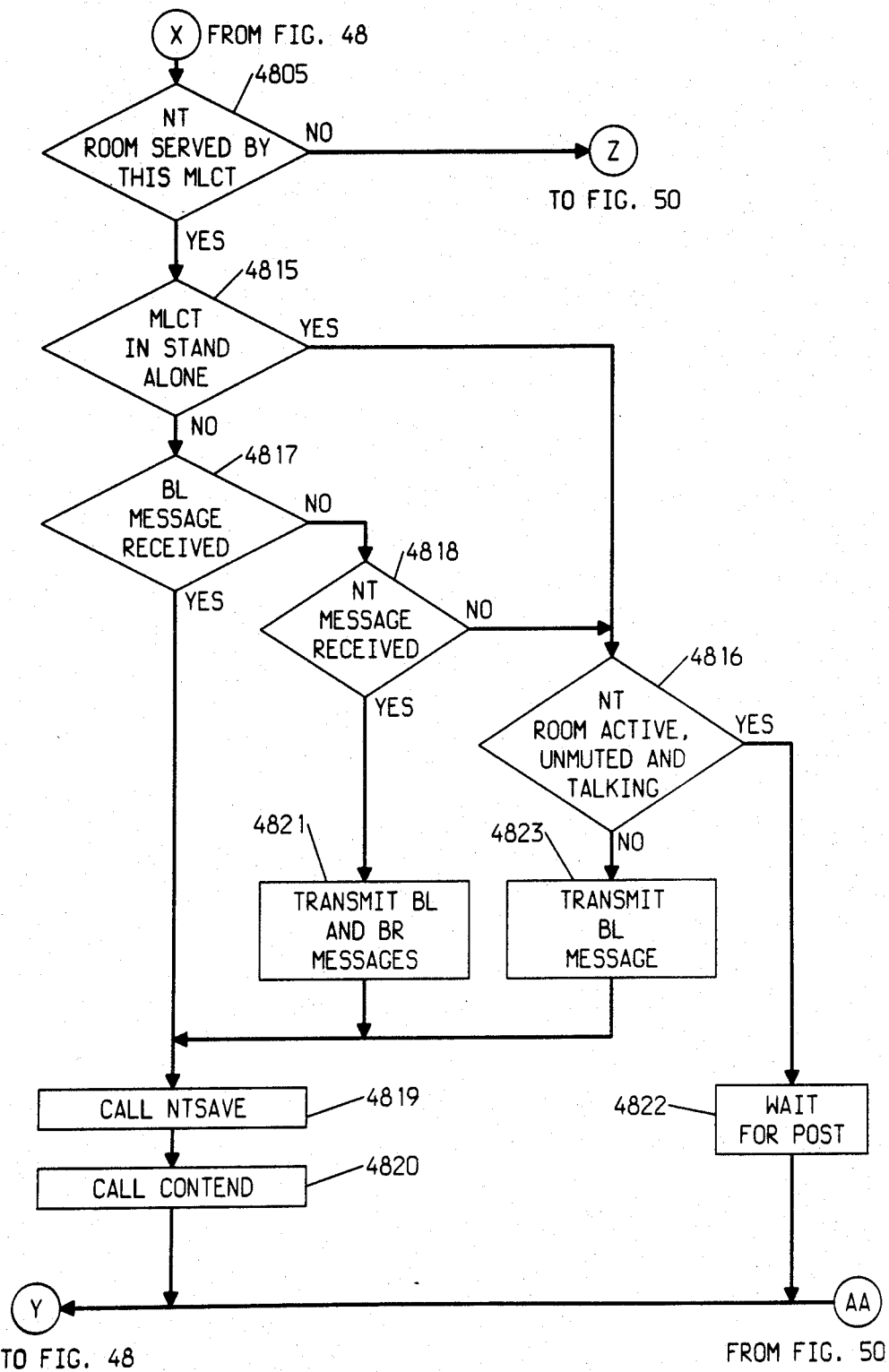
Figure 50:
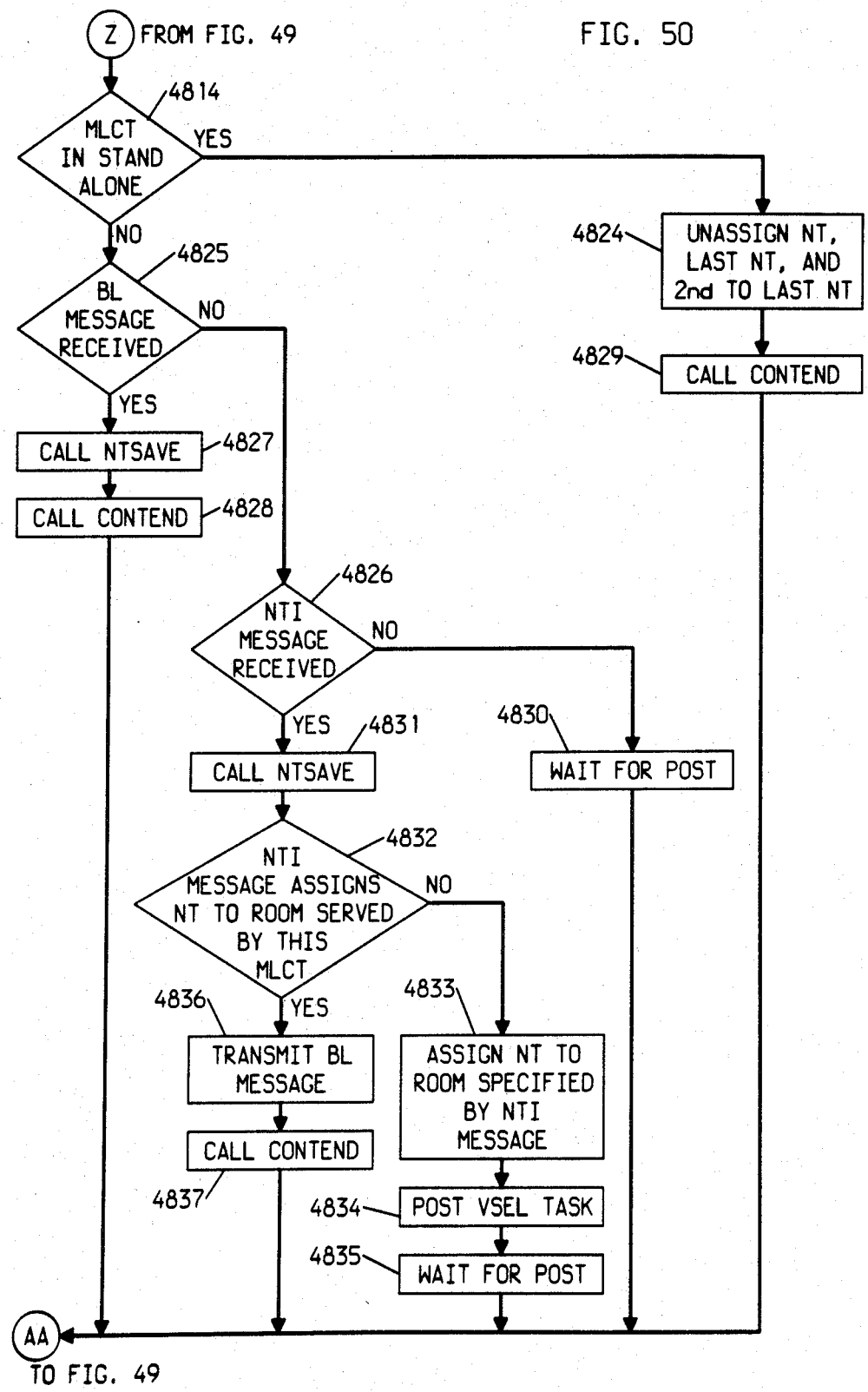

FIGS. 48, 49 and 50 connected as shown form a flow-chart of the steps performed in the new talker process task (NTP) by control processor 1006 of FIG. 39. The program is stored in memory 3904 (FIG. 39).

Briefly, the NTP task maintains the new talker state (NT) and talker bus state. It processes changes to the rooms served by the MLCT, i.e., active, unmuted or talker and to the new talker and talker bus states of other MLCTs in the conference. Accordingly, it updates the new talker state. Additionally, it also updates the last new talker states and second to last new talker states.

The NTP task is entered via oval 4801. Thereafter, operational block 4802 initializes the variables controlled by the NTP task, namely, new talker=bus-release, talker bus=nonbus request, talkerid=unassigned, timecount=4, transmits bus release (BL) message, transmits bus request (BR) message, and waits for post.

Operational block 4803 updates the talker bus state (TUBS) of the MLCT and transmits a BR/NBR message if a change in the talker bus state occurs.

Figure 51:
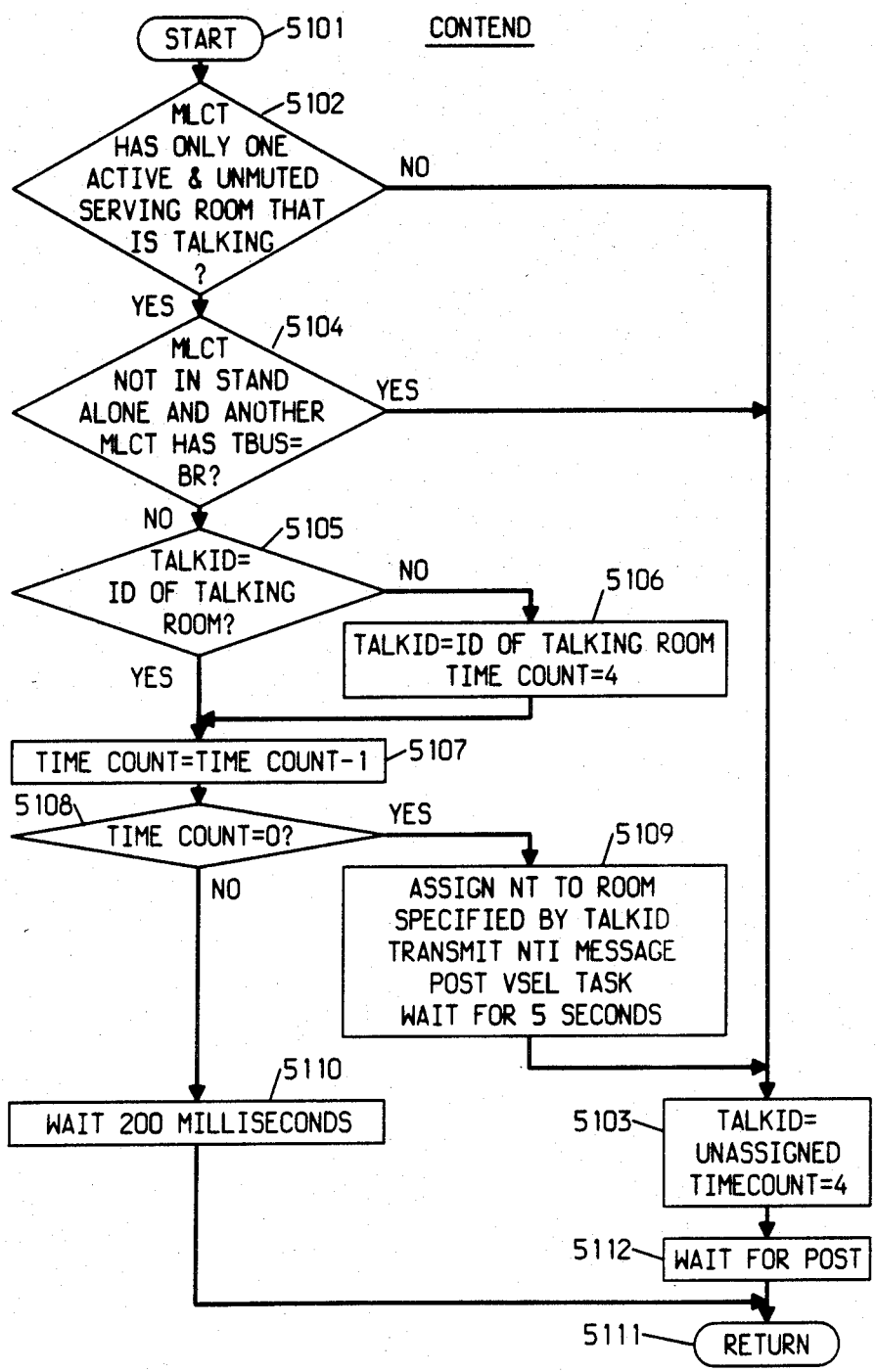
FIG. 51 is a flow chart of the CONTEND sub-routine used in the NTP program task of FIGS. 48, 49 and 50.

Conditional Branch point 4804 tests the new talker (NT) state to determine if NT is assigned. If the test result is true, i.e., yes, NT is assigned and control is transferred to conditional branch point 4805. However, if the test in step 4804 is false, i.e., no, NT is not assigned and control is transferred to conditional branch point 4806. Conditional branch point 4806 tests to determine whether this MLCT is in a stand alone condition and whether a new talker I (NTI) message has been received. If the test result is false, i.e., a NTI message is not received or the MLCT is in the stand alone condition, control is transferred to operational block 4807 which calls sub-routine CONTEND. A flow chart of sub-routine CONTEND is shown in FIG. 51 and described below. Upon completion of the CONTEND sub-routine control is returned to block 4803.

If the test result in step 4806 is true, control is transferred to conditional branch point 4808 which tests to determine if the NTI message has assigned the new talker to a room served by this MLCT. If the test result in step 4808 is true, control is transferred to operational block 4809 and the bus release message (BL) is transmitted. Thereafter, the CONTEND sub-routine is called via operational block 4810. Upon completion of the CONTEND sub-routine control is returned to operational block 4803. If the test in step 4808 is false, control is transferred to operational block 4811 and the new talker is assigned to the room specified by the new talker (NTI) message. Then, it posts the VSEL task, talkid is set to equal unassign and time count is set to 4.

Operational block 4812 causes a 5-second wait interval and operational block 4813 causes a wait-for-post to occur. Thereafter, control is returned to operational block 4803. Returning to conditional branch point 4805, a test is made to determine if the new talker (NT) room is served by this MLCT. If the test result is false, control is transferred to conditional branch point 4814.

Figure 52:
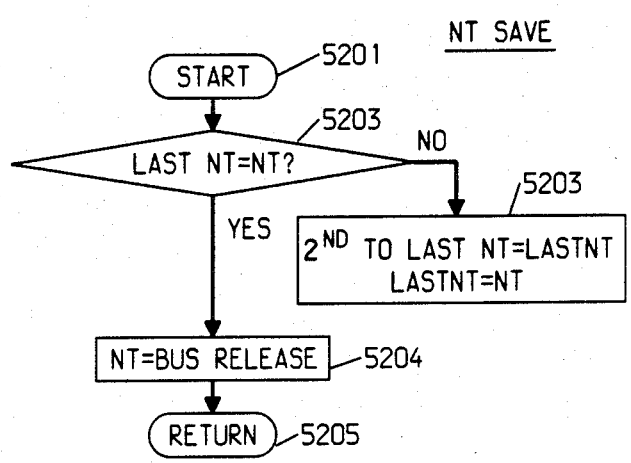
FIG. 52 is a flow chart of the NTSAVE sub-routine used in the NTP program task of FIGS. 48, 49 and FIGS. 53, 54, 55 and 56 when connected as shown form a flow chart of the steps performed in the new graphics process (NGP) program task by control processor 1006 of FIG. 39.
Figure 53:
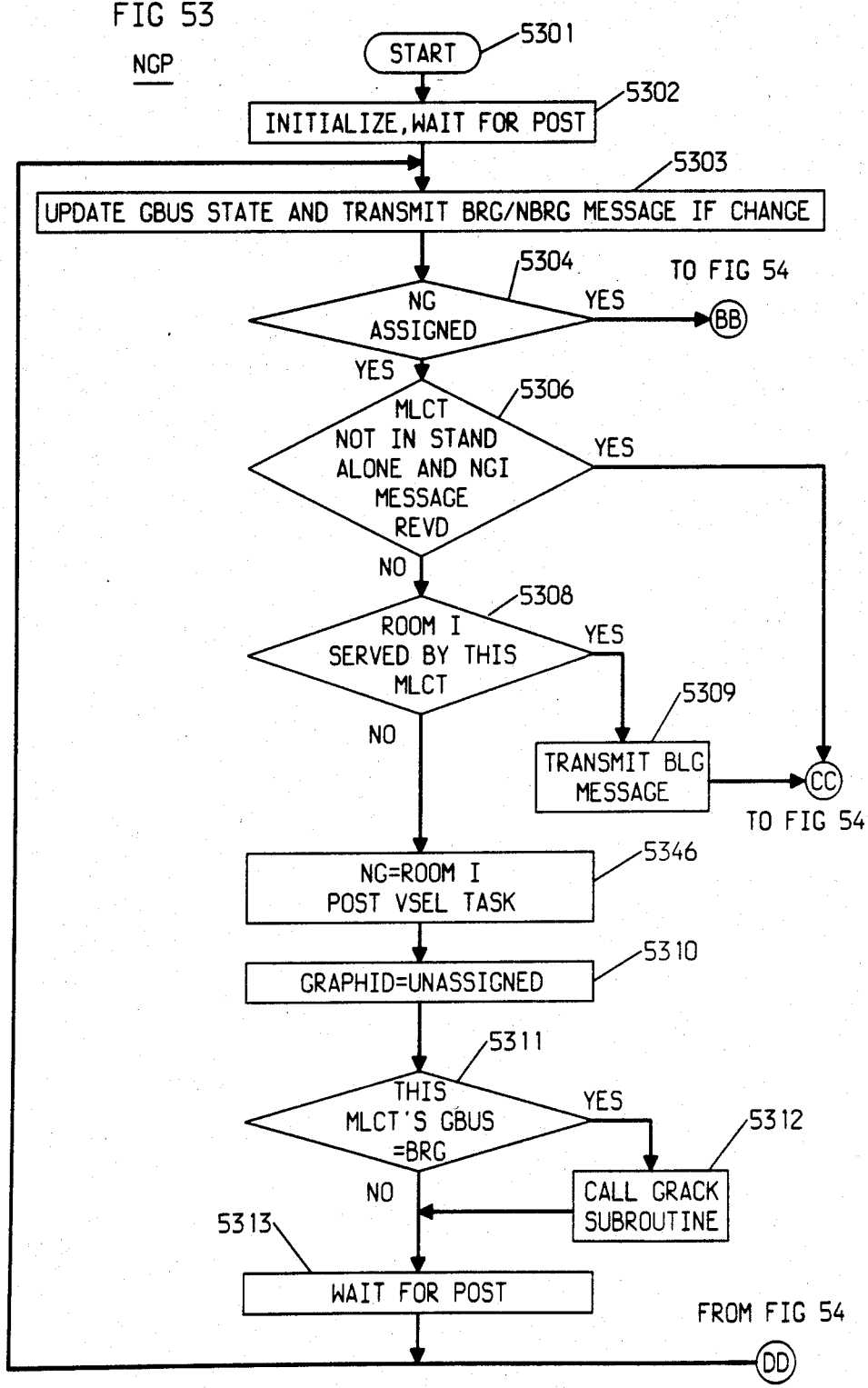
Figure 54:
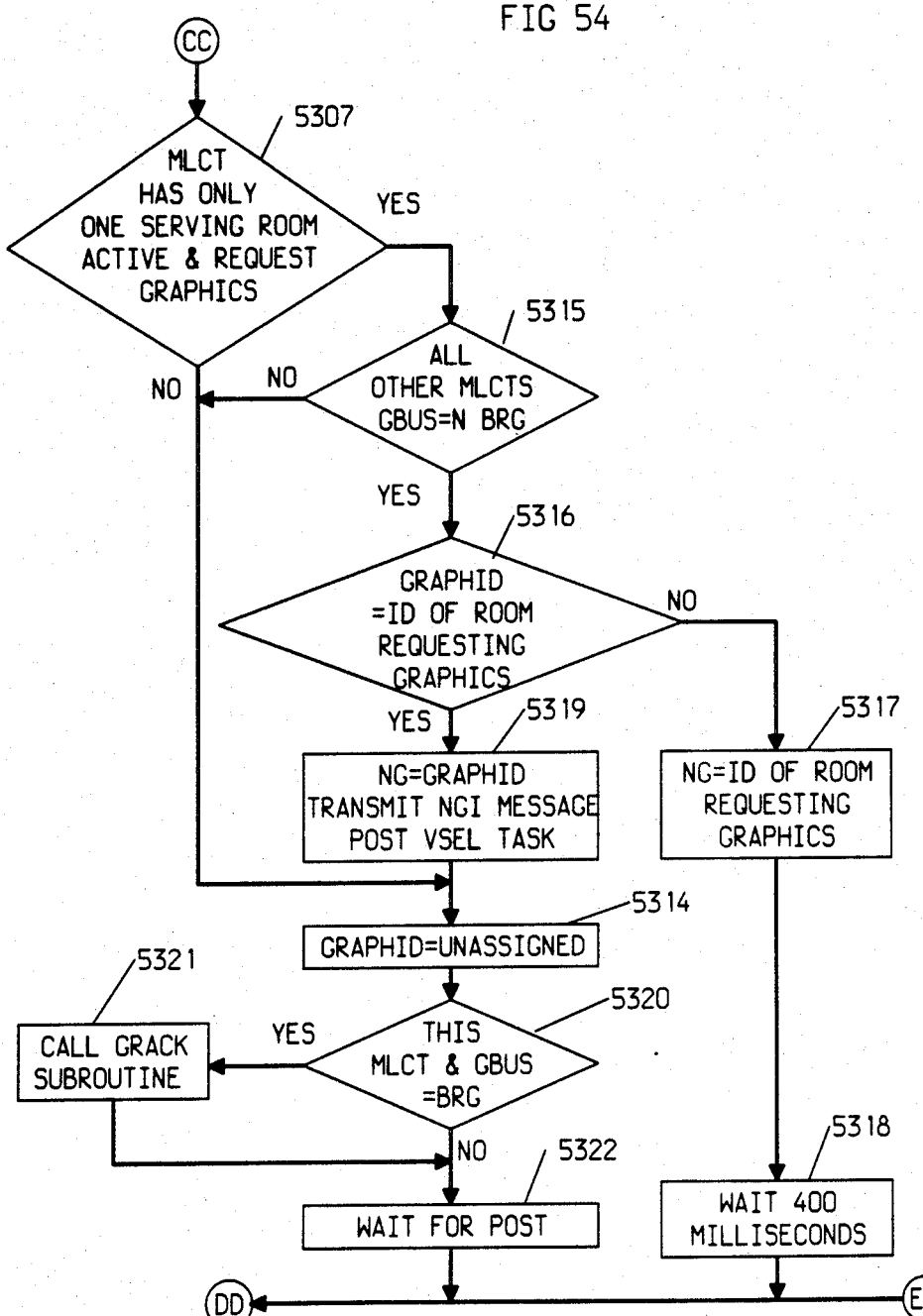
Figure 55:
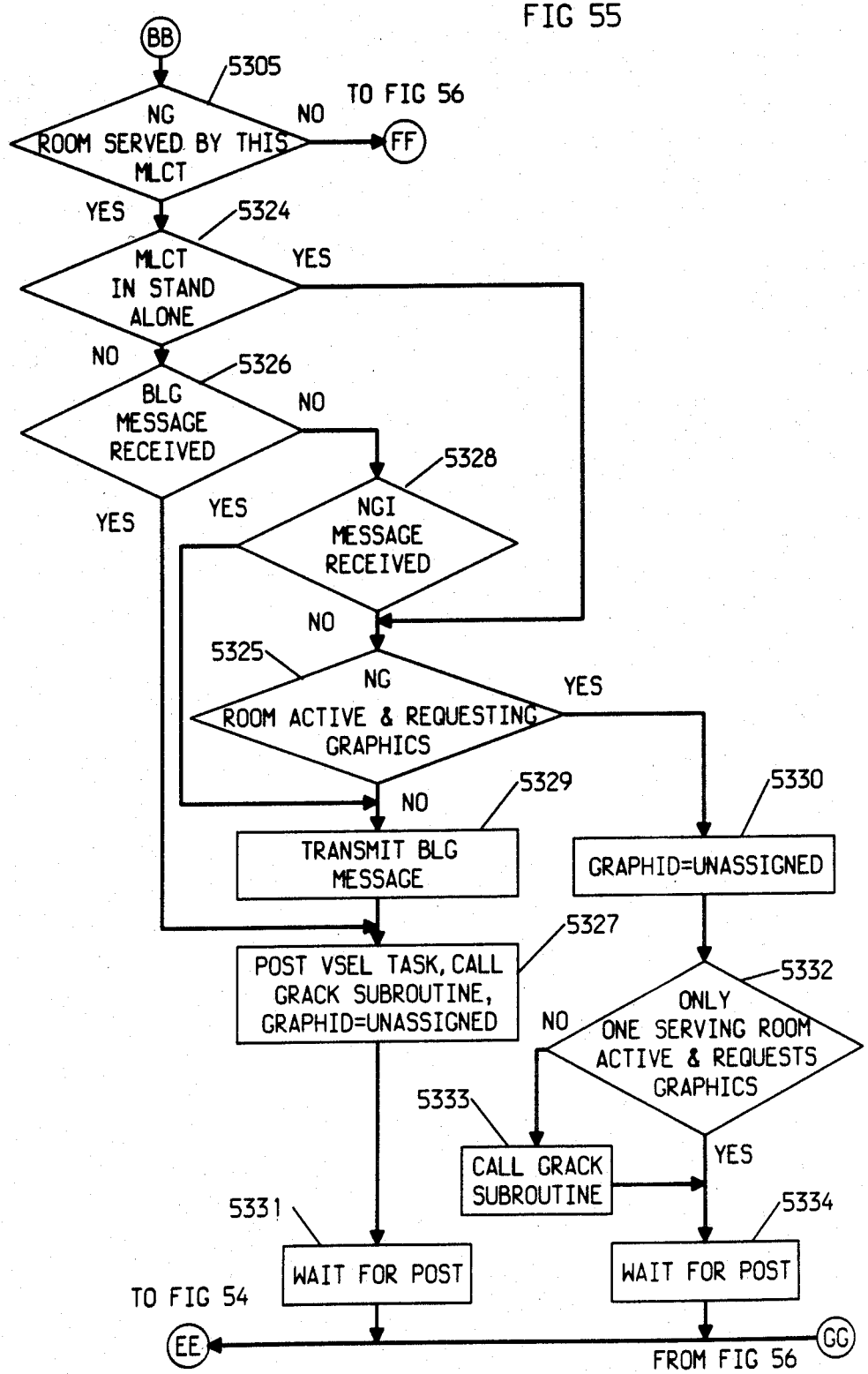
Figure 56:
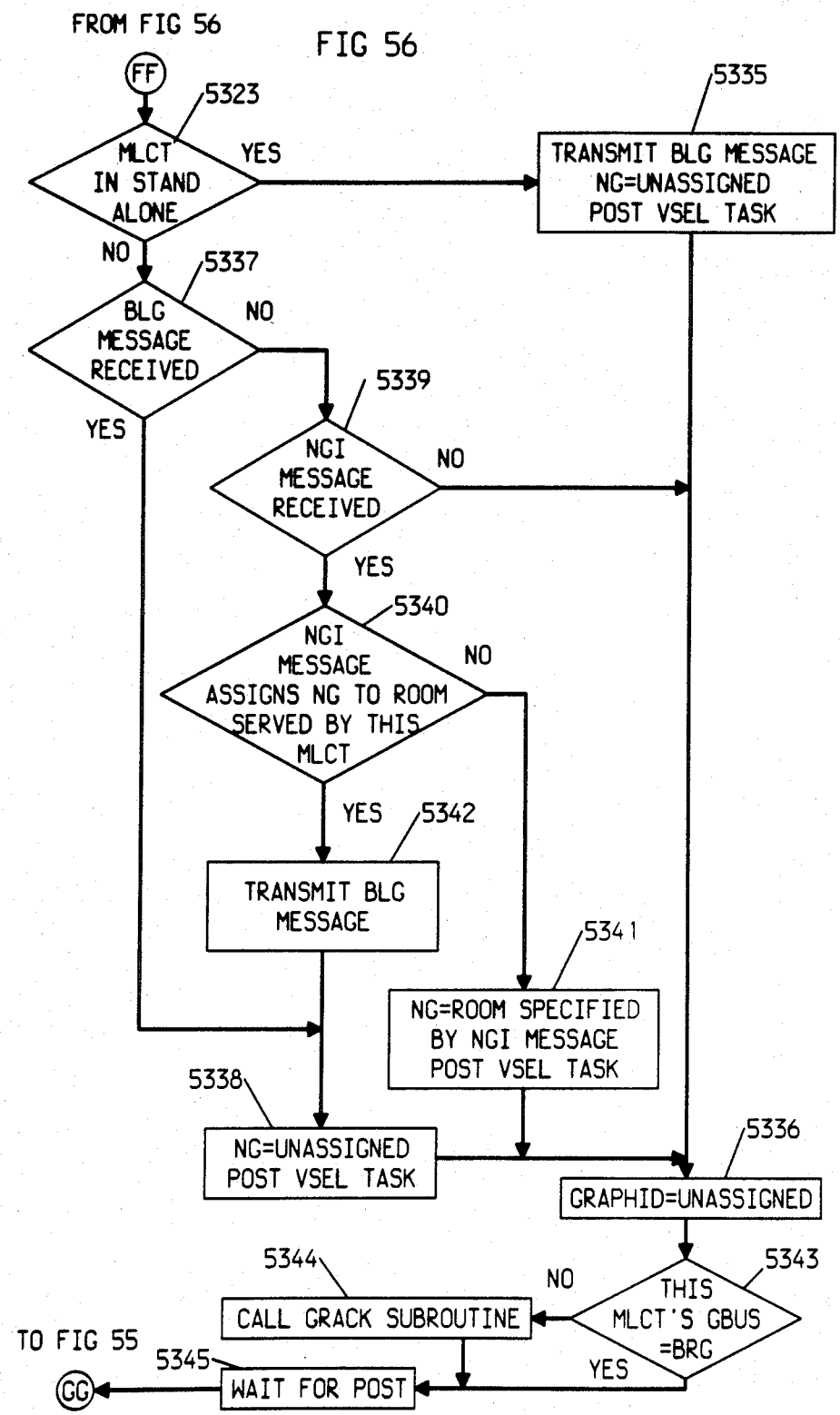

If the test result in step 4805 is true, control is transferred to conditional branch point 4815 and a test is made to determine if the MLCT is in a stand-alone-condition. If the test result in step 4815 is true, control is transferred to conditional branch point 4816. If the test result is false, control is transferred to conditional branch point 4817 and a test is made to see if a bus release message is received. If not, control is transferred to conditional branch point 4818. If the test result in step 4817 is true, control is transferred to operational block 4819. Operational block 4819 calls the NTSAVE sub-routine, the flowchart of which is shown in FIG. 52 and is described below. Thereafter, control is transferred to operational block 4820 and the CONTEND subroutine noted above is called. Then, control is returned to operational block 4803.

Returning to conditional branch point 4818, a test is made to determine if the new talker message has been received. If not, control is transferred to conditional branch point 4816. If the test result is true, control is transferred to operational block 4821.

Operational block 4821 causes a bus release (BL) message and a bus request (BR) message to be transmitted to the other MLCTs in the conference. Thereafter, control is transferred to operational block 4819.

Conditional branch point 4816 tests to see if the new talker room is active, unmuted and talking. If true, control is transferred to operational block 4822 and a wait-for-post is caused to occur. Thereafter, control is returned to operational block 4803.

Returning to conditional branch point 4816, if the test result is false, control is transferred to operational block 4823 and a bus release (BL) message is transmitted to the other MLCTs. Thereafter, control is transferred to operational block 4819.

Conditional branch point 4814 tests to see if this MLCT is in a stand-alone-condition. If true, control is transferred to operational block 4824. If false, control is transferred to conditional branch point 4825. Conditional branch point 4825 tests to determine if a bus release (BL) message has been received. If the result is false, control is transferred to conditional branch point 4826. However, if the result is true, control is transferred to operational block 4827 and the NTSAVE sub-routine is called. Thereafter, operational block 4828 causes the CONTEND sub-routine noted above to be called. Then, control is returned to operational block 4803. Operational block 4824 unassigns the new talker, last new talker and second to last new talker. Thereafter, control is transferred to operational block 4829 and the CONTEND sub-routine noted above is called. Thereafter, control is transferred to operational block 4803.

Returning to conditional branch point 4826, a test is made to see if a NTI message has been received. If the test is false, control is transferred to operational block 4830 which causes a wait-for-post. Thereafter, control is returned to operational block 4803. If the test result is true, i.e., NTI message has been received, control is transferred to operational block 4831 and the NTSAVE sub-routine noted above is called. Thereafter, control is transferred to conditional branch point 4832.

Conditional branch point 4832 tests to see if the new talker (NTI) message assigns the new talker to a room served by this MLCT. If the test result is false, control is transferred to operational block 4833 which assigns the new talker to the room specified by the NTI message. Thereafter, control is transferred to operational block 4834 which posts the VSEL task noted above. Then, operational block 4835 causes a wait-for-post. Thereafter, control is transferred to operational block 4803. If the test result in step 4832 is true, i.e., a new talker is assigned to a room served by this MLCT, control is transferred to operational block 4836 and a bus release (BL) message is transmitted.

Then, control is transferred to operational block 4837 and the CONTEND sub-routine noted above is called. Thereafter, control is returned to operational block 4803.

FIG. 51 shows a flowchart of the steps performed in the CONTEND sub-routine utilized in the new talker processing task described in relationship to FIGS. 48, 49 and 50 by control processor 1006 (FIG. 39). This program is also stored in memory 3904 (FIG. 39).

The CONTEND sub-routine is entered via oval 5101. Thereafter, conditional branch point 5102 tests to determine if the MLCT has the only active and unmuted serving room that is talking. If the test result is false, i.e., there is either none or more than one room contending for the new talker state and control is transferred to operational block 5103.

If the test result in step 5102 is true, i.e., there is only one serving room having a talker, control is transferred to conditional branch point 5104.

Conditional branch point 5104 tests to determine if the MLCT is not in the stand-alone-condition and another MLCT has its talker bus=to bus request. If the test result is true, control is transferred to operational block 5103. However, if the test is false, control is transferred to conditional branch point 5105.

Conditional branch point 5105 tests to determine if the talkid equals the id of the talker room. If the test is false, control is transferred to operational block 5106 which sets talkid equal to the id of the talking room and sets time count=4. Then control is transferred to operational block 5107. If the test in step 5105 is true, control is transferred directly to operational block 5107 and time count is set to time count=time count−1.

Conditional branch point 5108 tests to determine if time count=0. If the test is true, 4 passes have been made through the new NTP task and control is transferred to operational block 5109. However, if the test result is false, control is transferred to operational block 5110 which causes a wait-for-200 milliseconds. Then, control is transferred to oval 5111 and returns to the NTP task.

Operational block 5109 assigns the new talker to the room specified by talkid, transmits a NTI message to the other MLCTs in the conference, posts the VSEL task, and waits 5 seconds. Then, control is transferred to operational block 5103 where talkid is set to unassign, time count is set equal to 4 and operational block 5112 causes a wait-for-post. Thereafter, control is transferred to oval 511 and 1 control is returned to the NTP task.

FIG. 52 shows a flowchart of the steps performed by processor 1006 of FIG. 39 in the NTSAVE sub-routine utilized in the new talker processor task shown in FIGS. 48, 49 and 50. The NTSAVE program is also stored in memory 3904 (FIG. 39).

The NTSAVE sub-routine is entered via oval 5201. Thereafter, conditional branch point 5202 tests to determine if the last new talker is the new talker. If the test is false, control is transferred to operational block 5203 which sets the second to last new talker to the last new talker and sets the last new talker equal to the new talker. Control is then transferred to operational block 5204. If the test in conditional branch point 5202 is true, control is transferred directly to operational block 5104 which sets the new talker equal to bus release. Thereafter, control is returned via oval 5205 to the new talker processing task shown in FIGS. 48, 49 and 50.

NEW GRAPHICS PROCESSING (NGP) TASK

New Graphics Processing (NGP) task 4702 resolves contention among the conference locations for the graphics to be transmitted. To this end, it maintains a graphics bus state which is a summary of the requests for graphics by the MLCT's serving rooms. It should be noted that there is an interdependence between the MLCT's new-graphics state and all of the single-room-activity states. If the MLCT is in the NG-this-MLCT state, then one and only one of its serving rooms is in the graphics-only state or graphics-and-talker state. That is, one of the rooms served by the MLCT is assigned the new-graphics. If the MLCTs is in the NG-idle state or NG-other-MLCT state, then all its serving rooms are in the idle state or talker-only state. That is, none of the rooms served by the MLCT is assigned the new-graphics.

A serving room is considered to be requesting graphics if it is active and has transmitted an STG message to the MLCT and the MLCT has not transmitted a subsequent STGNAK message. If none of the MLCTs serving rooms are requesting graphics the MLCT is in the non-graphics-bus-request state. If at least one of the MLCT's serving rooms is requesting graphics, the MLCT is in the graphics-bus-request state. When an MLCT transitions to the graphics-bus-request (non-graphics-bus-request) state it broadcasts a graphics-bus-request, BRG, (non-graphics-bus-request, NBRG) message to the other MLCTs. Thus, the NGP task knows the graphics bus state of all MLCTs in the call.

At the start of the conference, all MLCTs are in the NG-idle state. If one of the MLCTs active serving rooms requests graphics (transmits a STG message), the NGP task checks all of the other MLCTs graphics bus states. If at least one of the other MLCTs is in the graphics-bus-request state the NGP task transmits a start-graphics-negative-acknowledge (STGNAK) message. That is to say, if more than one room in the conference has requested graphics video transmission, all requests are denied. Otherwise, the NGP task puts the MLCT in the graphics-bus-request state, broadcasts a BRG message to the other MLCTs, and starts a timing interval window. When the timing window expires the NGP task checks to see if graphics bus contention exists. (i.e., Another of the MLCT's serving rooms is requesting graphics or one of the other MLCTs has assumed the graphics-bus-request state). If graphics bus contention exists the NGP task transmits a STGNAK message to the serving room(s) requesting graphics, puts the MLCT in the non-graphics-bus request state, and broadcasts a NBRG message to the other MLCTs. If graphics bus contention does not exist the NGP task assigns the new graphics to the serving room (room I) requesting graphics, puts the MLCT in the NG-this-MLCT state, broadcasts a new-graphics-is-room-I (NGI) message to the other MLCTs, and transmits a start-graphics-acknowledge (STGACK) to room I. Room I is now in the graphics-only or graphics-and-talker state. The MLCT remains in the NG-this-MLCT state until one of the following events occurs:

1. The room assigned the new-graphics assumes the idle state or talker-only state. In this case, the NGP task transmits a BLG message to the other MLCTs and puts the MLCT in the NG-idle state.
2. The MLCT receives a BLG message. (This is an invalid condition, since only the MLCT that serves the room assigned the new-graphics should transmit BLG.) In this event, the NPG task would transmit an STGNAK message to the room that was assigned the new-graphics and put the MLCT in the NG-idle state.
3. The MLCT receives an NGJ message. (This is an invalid condition, since no MLCT should assign a new-graphics when the new-graphics is already assigned.) In this event, the MLCT would broadcast a BLG message to all the other MLCTs to force them into the NG-idle state, transmit an STGNAK message to the room that was assigned the new-graphics, and enter the NG-idle state.

If the MLCT is in the NG-idle state and receives an NGI message from another MLCT, the NGP task puts the MLCT in the NG-other-MLCT state. If the MLCT is in the NG-other-MLCT state and should receive an NGJ message (this is an invalid condition), the NGP task would assume the new-graphics is assigned to room J. When the MLCT in the NG-other-MLCT state receives a BLG message, the NGP task puts the MLCT in the NG-idle state.

If the MLCT is in the stand-alone condition then the NGP task does not check the other MLCTs graphics-bus states. It instead performs the assignment of the new graphics as if this MLCT is the only MLCT in the call.

The 400 millisecond timing window used to resolve graphics contention should prevent more than one MLCT from assigning the new graphics at a time. If an MLCT has assigned the new graphics (is in the NG-this-MLCT state) and receives a NGI message from another MLCT, the first MLCT transmits a BLG message placing all MLCTs back into the NG-idle state.

FIGS. 53, 54, 55 and 56 connected as shown depict a flowchart of the steps performed in the new graphics process (NGP) task by control processor 1006 of FIG. 39. This program is also stored in memory 3904 (FIG. 39).

The NGP task maintains the new graphic state and graphic bus state of the MLCT. It processes changes to the rooms served by the MLCT, i.e., active and graphics and the new graphics and graphics bus states of the other MLCTs in the conference and updates its new graphics state accordingly.

The NGP task is entered via oval 5301. Thereafter, operational block 5302 causes the NGP task to initialize the variables it controls, namely, new graphics=unassigned, graphics bus=non graphics bus request, graphid=unassigned, transmits a bus graphics (BLG) message, transmit a bus request graphics (BRG) message, and wait-for-post.

Operational block 5303 updates the graphic bus state (GBUS) of the MLCT and transmits a BRG/NBRG message if a change in the graphic bus state occurs.

Conditional branch point 5304 tests to determine if the new graphic (NG) is assigned. If the test is true, control is transferred to conditional branch point 5305. If the test is false, control is transferred to conditional branch point 5306. Conditional branch point 5306 tests to determine if a NGI message has been received and if it should be processed. If the test is false, control is transferred to conditional branch point 5307. If the test is true, control is transferred to conditional branch point 5308.

Conditional branch point 5308 tests to determine if the NGI message assigns the new graphics to a room served by this MLCT. If the test result in step 5308 is true, control is transferred to operational block 5309 which transmits a bus release message (BL). Thereafter, control is transferred to conditional branch point 5307. If the test result in step 5308 is false, the room is not served by this MLCT and control is transferred to operational block 5346.

Figure 58:
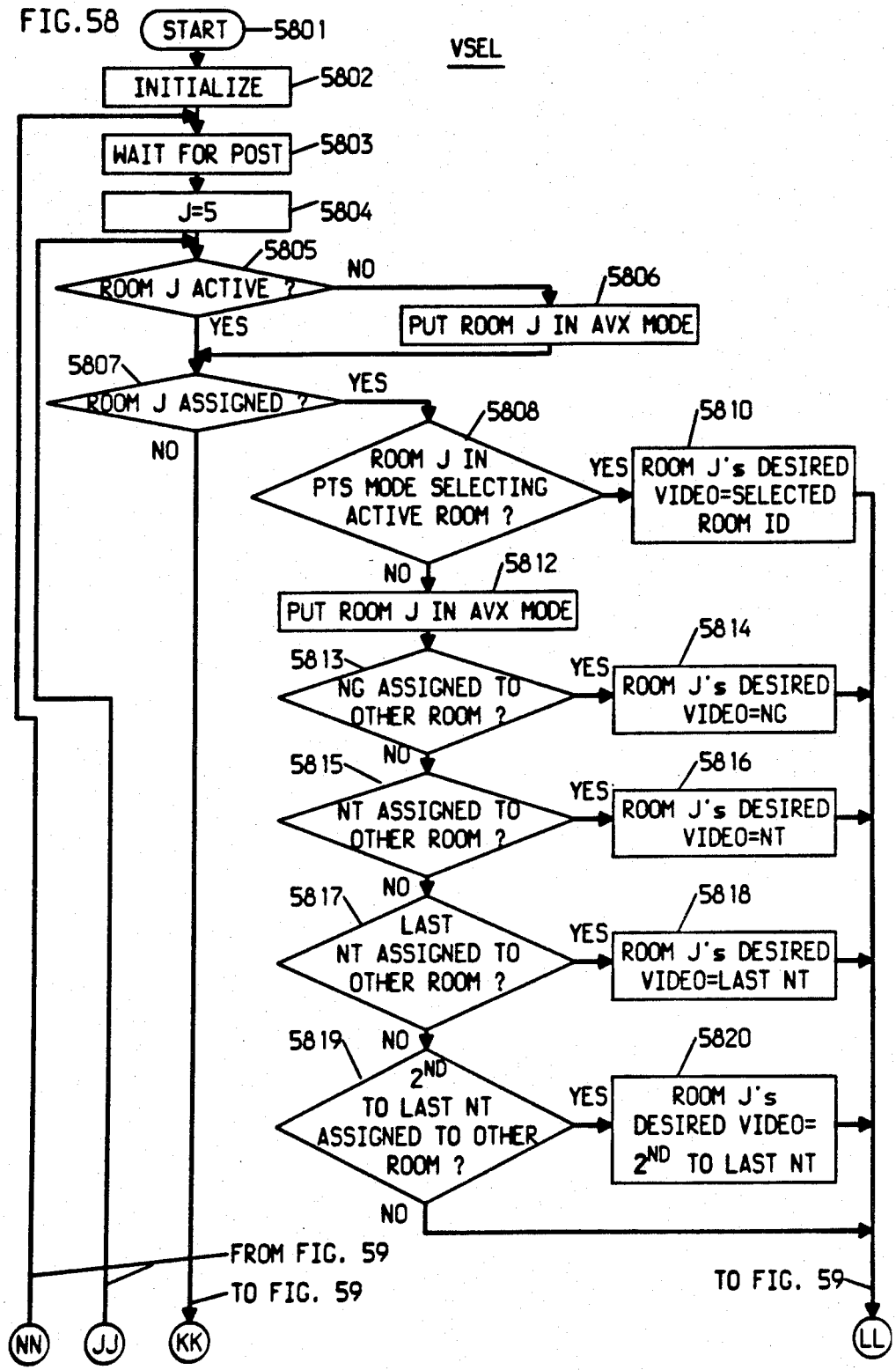
FIGS. 58 and 59 when connected as shown form a flow chart of the steps performed in the video selection (VSEL) program task by control processor 1006 of FIG. 39.
Figure 59:
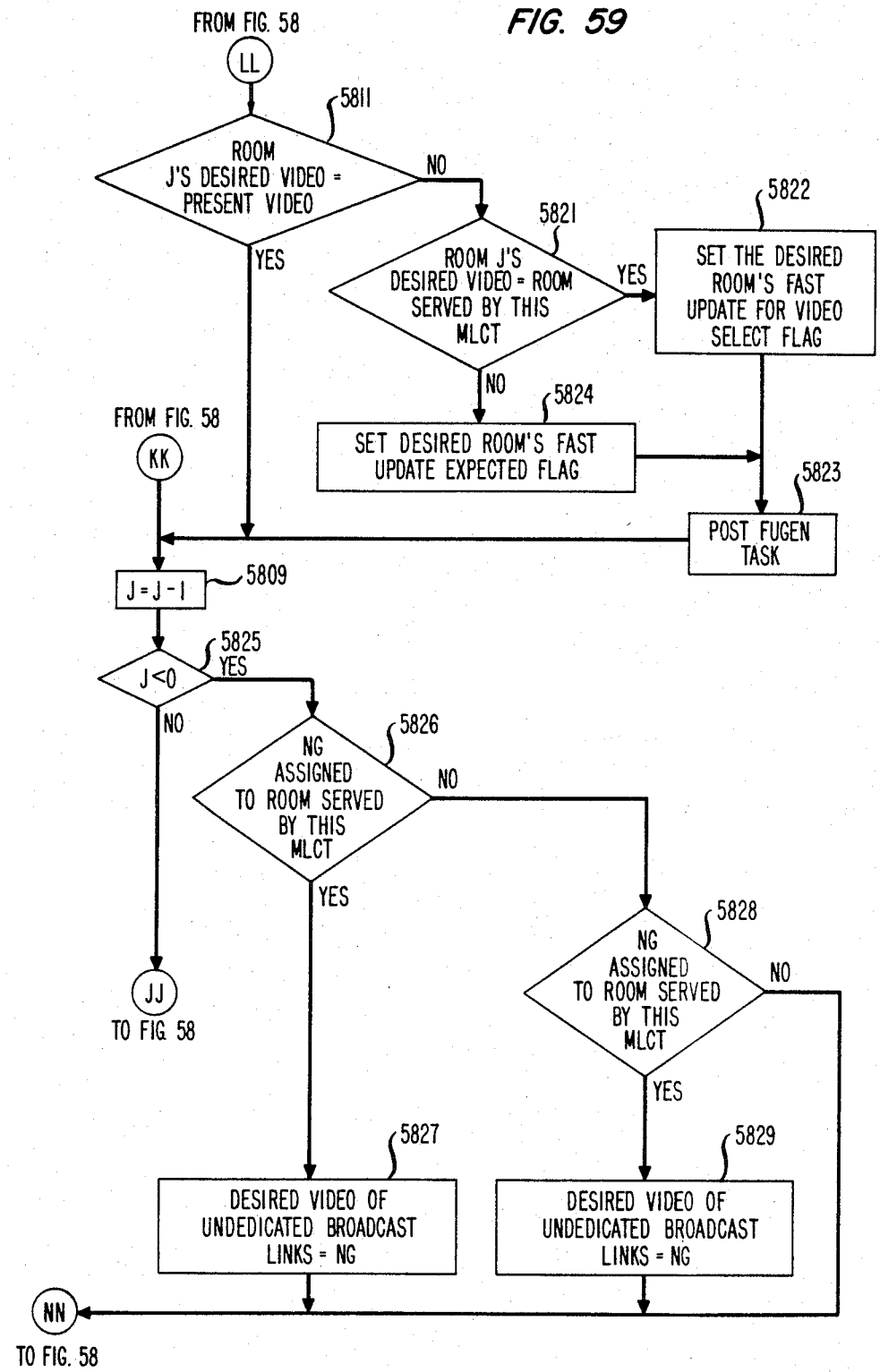

Operational block 5346 assigns the new graphics to the room specified and posts the VSEL task which is shown in FIGS. 58 and 59 and described below.

Operational block 5310 sets the graphid to unassigned. Conditional branch point 5311 tests to determine if this MLCT's graphics bus=BRG. If the test is true, operational block 5312 calls sub-routine GRACK shown in FIG. 57 and described below. Then, control is transferred to operational block 5313. If the test result in step 5311 is false, control is transferred directly to operational block 5313 which causes a wait-for-post. Thereafter, control is returned to operational block 5303.

Returning to conditional branch point 5307, it tests to determine if the MLCT has one-and only-one serving room active and requesting graphics. If the test is false, control is transferred to operational block 5314. However, if the test is true, control is transferred to conditional branch point 5315. Conditional branch point 5315 tests to determine if the graphics bus state of all the other MLCTs=non graphics bus request. If the test is false, control is transferred to operational block 5314. However, if the test is true, control is transferred to conditional branch point 5316. Conditional branch point 5316 tests to determine if the graphid=the id of the room requesting graphics. If the test is false, control is transferred to operational block 5317. Operational block 5317 sets the new graphics=to the id of the room requesting graphics. Then, operational block 5318 causes a wait interval of 400 milliseconds. Thereafter, control is returned to operational block 5303.

If the test result in conditional branch point 5316 is true, the operational block 5319 sets the new graphics=to the room id stored in graphid, transmits a NGI message to the other MLCTs, and posts the VSEL task noted above.

Operational block 5314 sets graphid=to unassigned. Then, conditional branch point 5320 tests to determine if this MLCT's graphic bus=graphics bus request. If the test is true, control is transferred to operational block 5321 which calls the GRACK sub-routine, noted above. Then, control is transferred to operational block 5322. If the test in step 5320 is false, control is transferred directly to operational block 5322. Operational block 5322 causes a wait-for-post to occur. Then, control is returned to operational block 5303.

Conditional branch point 5305 tests to determine if the new graphics is assigned to a room served by this MLCT. If the test is false, control is transferred to conditional branch point 5323. However, if the test is true, control is transferred to conditional branch point 5324. Conditional branch point 5324 tests to determine if the MLCT is in the stand-alone condition. If the test is true, control is transfereed to conditional branch point 5325. However, if the test result in step 5324 is false, conditional branch point 5326 tests to determine if a BLG message has been received. If the test is true, control is transferred to operational block 5327. However, if the test result in step 5326 is false, control is transferred to conditional branch point 5328. Conditional branch point 5328 tests to determine if a NGI message has been received from another MLCT. If the test is false, control is transferred to conditional branch point 5325. However, if the test result in step 5328 is true, control is transferred to operational block 5329.

Conditional branch point 5325 tests to determine if the new graphics room is active and still requesting graphics. If the test is true, control is transferred to operational block 5330. If the test is false, control is transferred to operational block 5329 and a BLG message is transmitted to the other MLCTs. Operational block 5327 posts the VSEL task, calls the GRACK sub-routine and sets the graphid=unassigned. Operational block 5331 causes a wait-for-post. Thereafter, control is transferred to operational block 5303.

Operational block 5330 sets graphid=unassigned. Conditional branch point 5332 tests to determine if only one room served by the MLCT is active and requesting graphics. If the test is false, control is transferred to operational block 5333 which causes the GRACK sub-routine. Control is then transferred to operational block 5334. If the test in step 5332 is true, control is transferred directly to operational block 5334 which calls a wait-for-post. Thereafter, control is returned to operational block 5303.

Conditional branch point 5323 tests to determine if the MLCT is in the stand-alone-condition. If the test is true, control is transferred to operational block 5335. Operational block 5335 causes a BLG message to be transmitted to the other MLCTs, sets new graphics=to unassigned, and posts the VSEL task. Control is then transferred to operational block 5336. If the test result in step 5323 is false, control is transferred to conditional branch point 5337. Conditional branch point 5337 tests to determine if a BLG message has been received from another MLCT. If the test is true, control is transferred to operational block 5338. If the test result in step 5337 is false, the control is transferred to conditional branch point 5339 which tests to determine if a new NGI message has been received from another MLCT. If the test is step 5339 is false, control is transferred to operational block 5336. If the test result in step 5339 is true, control is transferred to conditional branch point 5340. Conditional branch point 5340 tests to determine if the NGI message assigns the new graphics to a room served by this MLCT. If the test is false, control is transferred to operational block 5341 which assigns the new graphics=to the room specified by the NGI message and posts and VSEL task. Control is then transferred to operational block 5336. If the test result in step 5341 is true, operational block 5342 transmits a BLG message to the other MLCTs. Then, operational block 5338 sets the new graphics=unassigned and posts the VSEL task. Operational block 5336 sets graphid=unassigned.

Conditional branch point 5343 test to determine if this MLCT's graphics bus=bus request graphics. If the test is false, control is transferred to operational block 5344 which calls the GRACK sub-routine noted above. Then control is transferred to operational block 5345. If the test in 5343 is true, control is transferred directly to operational block 5345 which waits for post. Thereafter, control is returned to operational block 5303.

Figure 57:
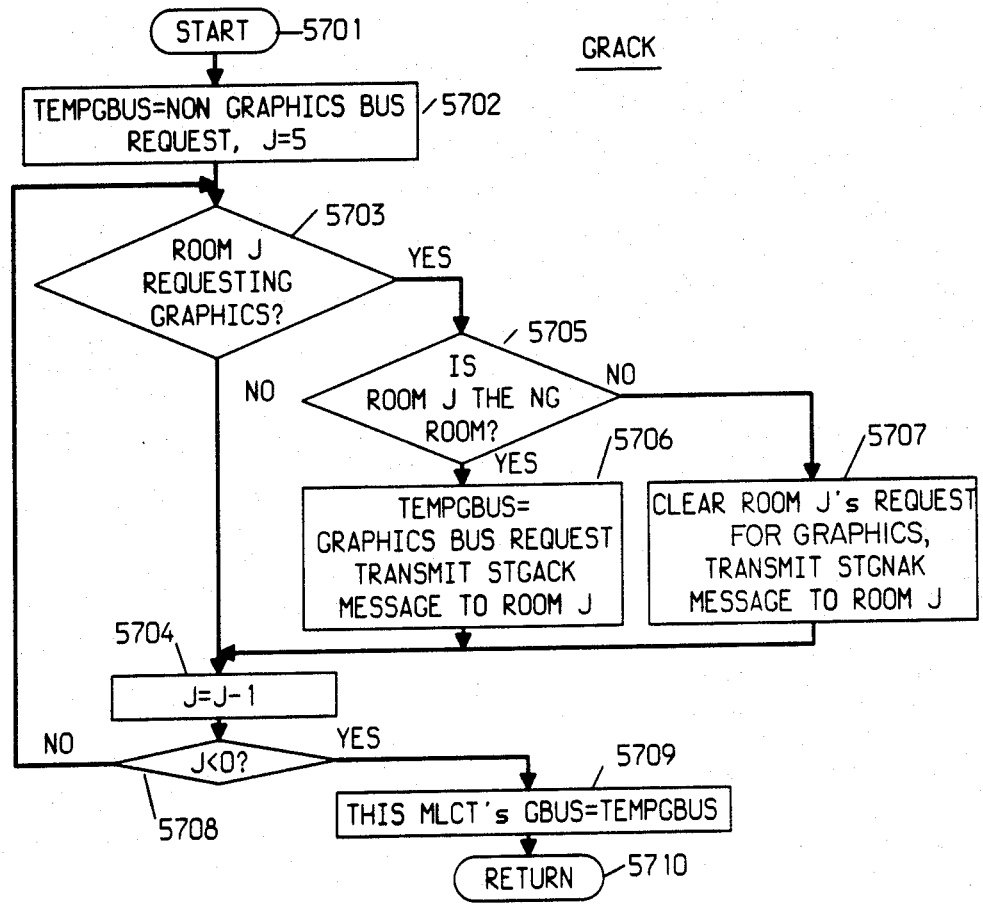
FIG. 57 is a flow chat of the GRACK sub-routine used in the NGP program task of FIGS. 53, 54, 55 and 56.

FIG. 57 shows a flowchart of the steps performed in the GRACK sub-routine utilized in the new graphics processing task of FIGS. 53, 54, 55 and 56 and performed by control processor 1006 (FIG. 39). The program described by this flowchart is stored in memory 3409 (FIG. 39).

The GRACK sub-routine processes the active serving rooms requesting graphics after new graphics have been assigned. It sends the appropriate STGACK/STGNAK message to each of the rooms clears the graphics requests for those rooms, which were denied graphics and updates the graphics bus in this MLCT.

The GRACK sub-routine is entered via oval 5701. Thereafter, operational block 5702 sets TEMPGBUS=non graphics bus request and sets counter J=5. Conditional branch point 5703 tests to determine if room J is requesting graphics. If the test is false, then control is transferred to operational block 5704. If the test is true, control is transferred to conditional branch point 5705. Conditional branch point 5705 tests to determine if room J is the new graphics room. If the test is true, operational block 5706 sets TEMPGBUS=graphics bus request and transmits a STGACK message to room associated with the id J. Then, control is transferred to operational block 5704. If the test result in step 5705 is false, operational block 5707 clears the request for graphics for the room identified by J and transmits a STGNAK message to that room. Control is then transferred to operational block 5704 which sets counter J to J−1. Conditional branch point 5708 tests to determine if J is less than 0. If the test is false, control is transferred to conditional branch point 5703 and the process is iterated until the test result in step 5708 is true. Then, operational block 5709 sets this MLCT graphics bus=TEMPGBUS bus. Control is then returned to the new graphics task via oval 5710.

VIDEO SELECTION (VSEL) TASK

Video Selection (VSEL) task 4703 selects the video signal transmitted to each room in the conference according to the mode that the room is in. In a viewer's choice conference a room may be in either the push-to-see (PTS) mode or the automatic video switching (AVX) mode. The room controls the mode it is in by the messages that it transmits to the MLCT. In a Sender's Choice conference all rooms remain in the AVX mode.

When an MLCT in a Viewer's Choice conference receives a push-to-see-room-I (PTSI) message from an active room (room J) to select another active room (room I), the VSEL task places room J in the PTS mode and performs the steps required to switch the video of room J to view room I. The get-ready-for-fast-update-from-room-I (GRI) message that room J receives from room I functions as the acknowledge to room J's PTSI message.

If an MLCT in a Viewer's Choice conference should receive a PTSI message selecting a room that is inactive, the message processing module would transmit an available-rooms (AR) message to the room. This ensures that the room would have the current available rooms list and also serves as the negative acknowledge to the PTSI message. The room that has transmitted the invalid PTSI message would remain in its previous PTS or AVX viewing mode.

In a Sender's Choice conference the message processing module responds to all PTS messages by transmitting an AR message with an empty list of available rooms. Thus, from the video selection viewpoint the Sender's Choice conference can be treated as a special Viewer's Choice conference.

A room can switch from the PTS mode to the AVX mode by transmitting an automatic-video-switch (AVX) message. The VSEL task generates an AVX acknowledge (AVXACK) message to the room and puts the room in the AVX mode. The VSEL task also puts any inactive room that it serves in the AVX mode.

The VSEL task selects the input video for every room in the call according to the following priorities:
1. To view the selected room—If the room is in the PTS mode or enters the PTS mode, the room receives the video from the room it specified in the last PTSi message.
2. To view the new-graphics—If the room is in the AVX mode and if another room is assigned the new graphics, the room receives the video from that room.
3. To view the new-talker—If the room is in the AVX mode, and if another room is assigned the new talker, the room receives the video from that room.
4. To view the last new-talker—If the room is in the AVX mode, and if another room was the last new talker, the room receives the video from that room.
5. To view the second to last new-talker—If the room is in the AVX mode, and if another room was the second to last new talker, the room receives the video from that room.
6. If none of the above conditions apply, no video switch is made. The room continues to receive the video it is receiving.

The VSEL task is posted by the following:
Facility Administrator Module Posts VSEL task when it changes the active status of one or more rooms.
Message Processing Module Posts VSEL task when it adjusts one or more of the room's PTS modes.
NTP Task Posts VSEL task when it changes the assignment of the new talker.
NGP Task Posts VSEL task when it changes the assignment of the new graphics.

FIGS. 58 and 59 connected as shown depict a flowchart of the steps performed in the video selection (VSEL) task by control processor 1006 of FIG. 39. The program is stored in memory 3904 (FIG. 39).

The VSEL task determines the desired video of each room in a conference and the desired video of the undedicated MLCT broadcast links.

Accordingly, the VSEL task is entered via oval 5801. Thereafter, operational block 5802 initializes the variables controlled by the VSEL task, namely, it clears all fast update expected flags of the rooms in the conference and clears all fast update for video select flags for all rooms in the conference. Operational block 5803 causes a wait-for-post and operational block 4 sets counter J=5. Five is employed in this example because there are a maximum of 6 rooms in a conference.

Conditional branch point 5805 tests to determine if room J is active. If the test is false, operational block 5806 puts room J in the automatic video switching mode (AVX). Thereafter, control is transferred to conditional branch point 5807. If the test in step 5805 is true, control transfers directly to conditional branch point 5807.

Conditional branch point 5807 tests to determine if room J is assigned. If the test is true, control is transferred to conditional branch point 5808. However, if the test is false, control is transfereed to operational block 5809. Conditional branch point 5808 tests to determine if room J is in the push-to-see (PTS) mode and is selecting an active room. If the test is true, operational block 5810 sets room J's desired video equal to the selected PTS room. Thereafter, control is transferred to conditional branch point 5812. If the test result in step 5808 is false, operational block 5811 places room J in the AVX mode.

Conditional branch point 5813 tests to determine if the new graphics (NG) is assigned to another room. If the test is true, operational block 5814 sets room J's desired video equal to the new graphics room. Thereafter, control is transferred to conditional branch point 5811. If the test in step 5813 is false, conditional branch point 5815 tests to determine if the new talker (NT) is assigned to another room. If the test is true, operational block 5816 sets room J's desired video equal to the new talker room. Thereafter, control is transferred to conditional branch point 5811.

If the test in step 5815 is false, conditional branch 5817 tests to determine if the last new talker is assigned to another room. If the test is true, operational block 5818 sets room J's desired video equal to the last new talker. Thereafter, control is transferred to conditional branch point 5811. If the test in step 5817 is false, conditional branch 5819 tests to determine if the second to last new talker is assigned to another room in the conference. If the test is true, operational block 5820 sets room J's desired video equal to the second to last new talker. Thereafter, control is transferred to conditional branch point 5811. If the test in step 5819 is false, control is transferred directly to conditional branch point 5811.

Figure 60:
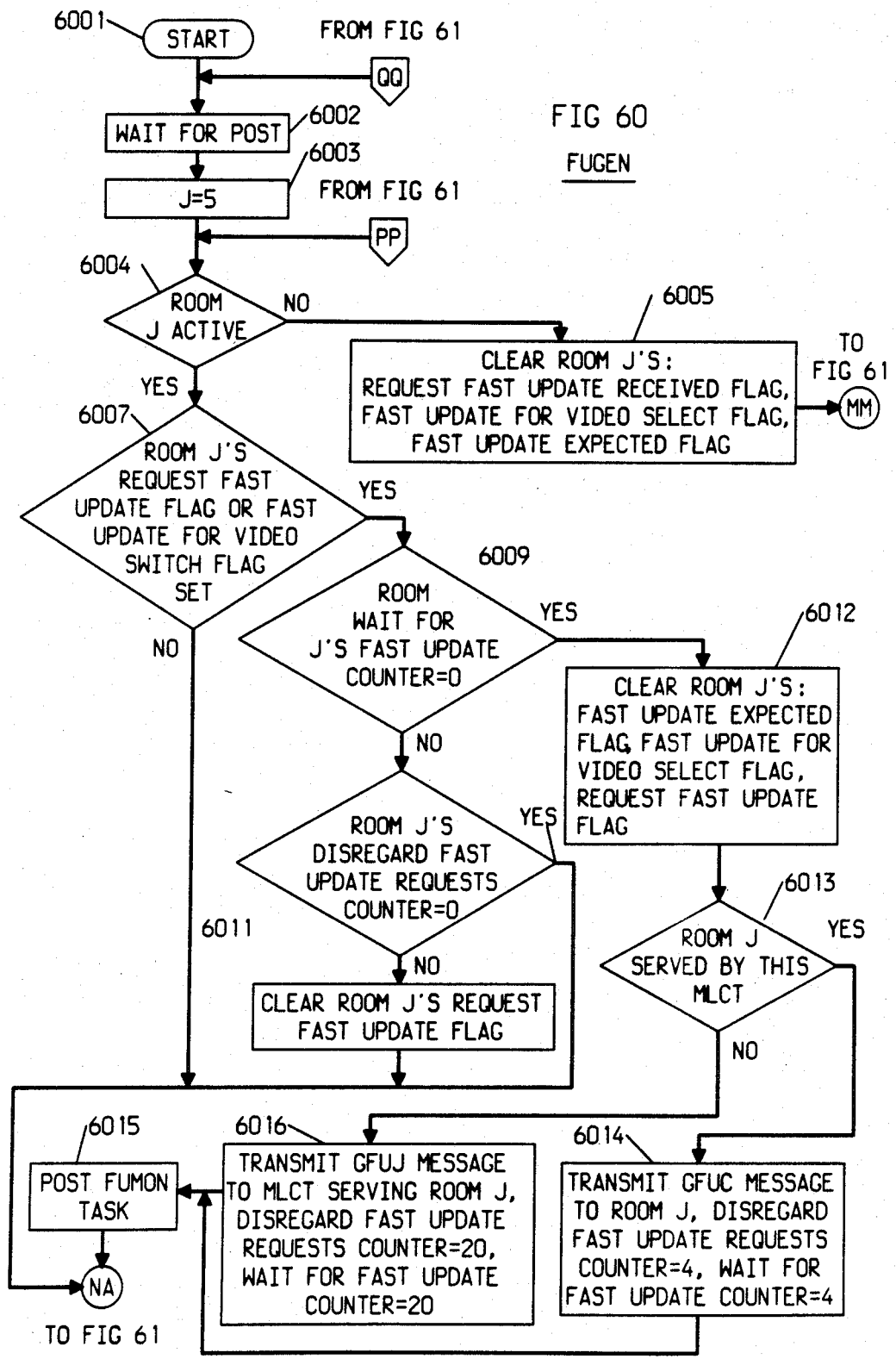
FIGS. 60 and 61 when connected as shown form a flow chart of the steps performed in the fast update generator (FUGEN) program task by control processor 1006 of FIG. 39.
Figure 61:
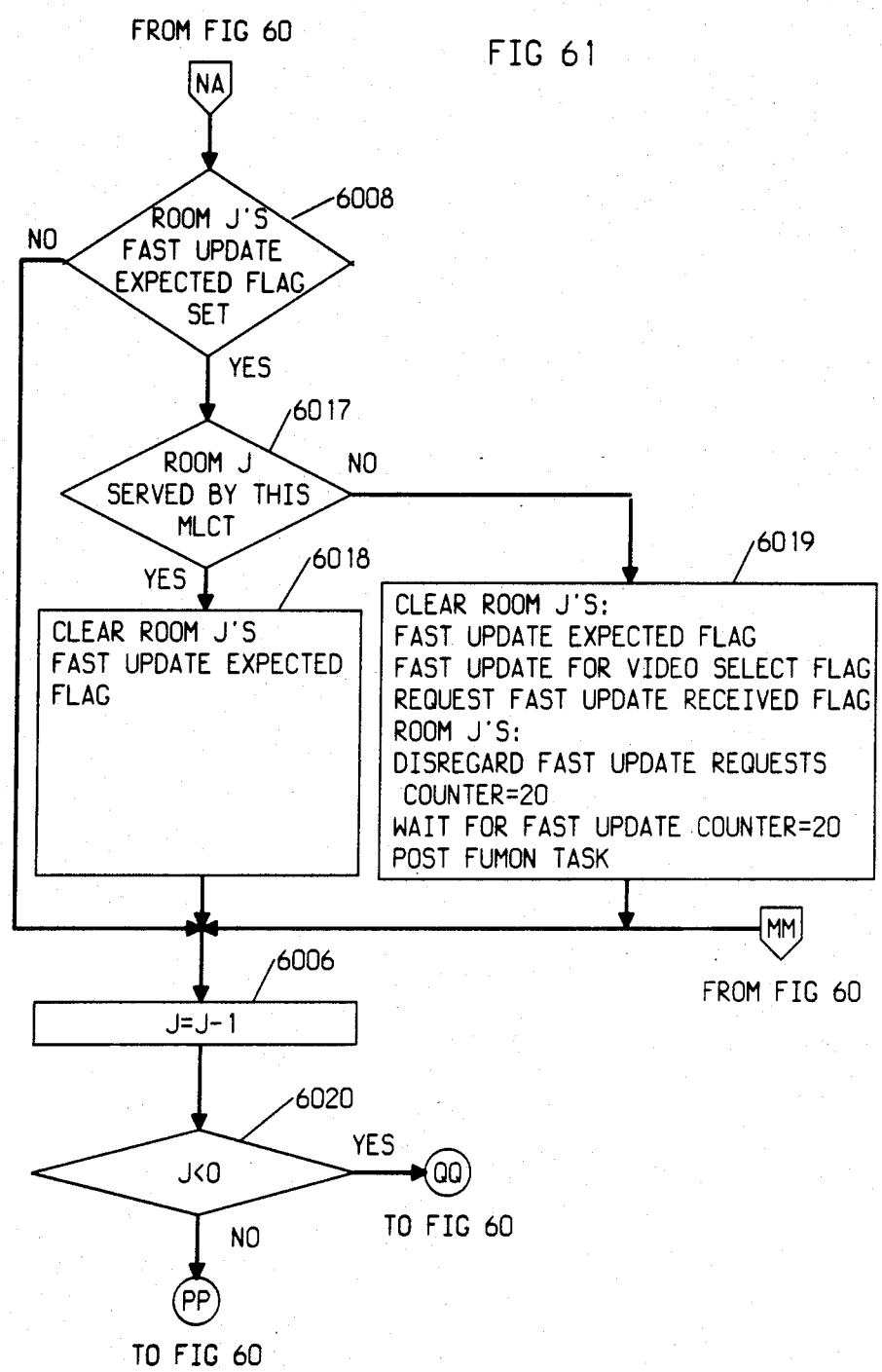

Conditional branch point 5811 tests to determine if room J's desired video equals its present video. If the test is true, control is transferred to operational block 5809. However, if the test is false, conditional branch point 5821 tests to determine if room J's desired video equals a room served by this MLCT. If the test is true, operational block 5822 sets the desired room fast update for video select flag and transfers control to operational block 5823. If the step in 5821 is false, operational block 5824 sets the desired rooms fast update expected flag and control is transferred to operational block 5823. Operational block 5823 causes a post to the FUGEN task. A flow chart of the FUGEN task is shown in FIGS. 60 and 61, and is described below. Thereafter control is transferred to operational block 5809. Operational block 5809 sets counter J=J−1.

Conditional branch point 5825 tests to determine if counter J is less than 0. If the test is false, control is transferred to conditional branch point 5805. If the test is true, conditional branch 5826 tests to determine if the new graphics is assigned to a room served by this MLCT. If the test is true, operational block 5827 sets the desired video of the undedicated MLCT broadcast links equal to the new graphics. Thereafter, control is transferred to operational block 5803.

If the test in step 5826 is false, conditional branch 5828 tests to determine if the talker is assigned to a room served by this new MLCT. If the test in step 5828 is false, control is transferred directly to operational block 5803. However, if the test is true, operational block 5829 sets the desired video of the undedicated MLCT broadcast links equal to the new talker. Thereafter control is transferred to operational block 5803.

VIDEO SWITCHING AND FAST UPDATE ALGORITHM

The video switching and fast update algorithm is implemented in the Fast Update Generator (FUGEN) task 4704, Fast Update Monitor (FUMON) task 4705, and Video Switch (VSWCH) task 4706. The FUGEN task 4704 generates fast video picture updates according to which of the room's fast update flags are set and what state the room's fast update timers are in. When the FUGEN task 4704 starts any of the room's timers it posts the FUMON task 4705.

The fast updates are required when switching because the digital signal usually only includes changes in the picture scenes in order to compress the transmission bandwidth.

The FUMON task 4705 operates the room's fast update timers. These fast update timers are actually counters that the FUMON task 4705 decrements every 250 milliseconds. When any of the room's fast update timers expires (i.e. the counter is decremented to zero) and fast updates need to be generated, then the FUMON task 4705 posts the FUGEN task 4704.

The VSWCH task 4706 processes fast updates when they are received. It notifys the FUMON task 4705 that a fast update was processed and sends an interrupt to the MS 101 if a video switch is required.

The MLCT must synchronize the switching of the video signal being transmitted to a room with a fast update of the new video signal. The fast update provides the room with information of the complete video picture. Without this fast update the room's video would be severely affected for a number of seconds after the switch has occurred. The fast update must follow the video switch with enough delay to allow the room's TV picture processor to synchronize to the framing of the new video signal. This delay should be minimized to reduce the time that the room's video picture is frozen or blanked when the video switch occurs.

The MLCT can reduce the number of fast updates required during the conference if it monitors fast updates that is processes. Fast update requests can be dropped if the MLCT determines that they can be handled by fast updates pending or already processed. This is important because the fast update initially provides a low resolution video picture. This is achieved, in accordance with an aspect of the invention, by storing the video select modes, i.e., Push-to-See (PTS) or Automatic Video Switch (AVX), and the transmission states for each conference location and utilizing the stored information to determine any differences between the video signals presently being transmitted to the locations and those to be transmitted. Fast video picture updates are generated only for those locations for which there is a difference between the presently transmitted and the to be transmitted video signals.

To perform the video switch (room J to view room I), the MLCT transmits a generate-fast-update-command (GFUC) message to room I if the MLCT also serves room I. If room I is not served by this MLCT, the MLCT does nothing. The MLCT that serves room I will transmit the GFUR command message to generate the fast update. Room I will respond by transmitting a get-ready-for-fast-update (GR) message, wait a specified period of time, and then send a fast update of its video signal.

Upon receipt of the GR message from room I the MLCT serving room I will:
1. Perform any video switches required for rooms viewing room I.
2. Transmit a GRI message to its serving rooms that are receiving room I's video signal.
3. Transmit a GRI message over the broadcast links that are transmitting room I's video signal.

Upon receipt of the GRI message from another MLCT this MLCT will:
1. Perform any video switches required for rooms viewing room I.
2. Transmit a GRI message to its serving rooms that are receiving room I's video signal.

The acknowledgement to the GFUC (GFURIJ) message is the GR (GRI) message received from room I (the other MLCT).

The delay between the room's transmission of the GRI message and the actual start of the fast update should be long enough to allow the following events to occur:
1. The first MLCT receives and interprets the GR command received from the room (room I).
2. The first MLCT performs a video switch.
3. The first MLCT transmits a GRI message to other MLCTs that are expecting to receive the video.
4. The other MLCT(s) receive and interpret the GRI command received from the first MLCT.
5. The second MLCT(s) perform a video switch.
6. The other MLCT(s) transmit a GRI message to rooms receiving room I's video. This transmission does not hve to precede the actual fast update.
7. The rooms that have just been switched to receive room I's video must synchronize to the encryption and framing of the new video signal. The time required to synchronize varies according to the transmission rate, for example 140 milliseconds for a 6.0 Mhz signal and 240 milliseconds for a 3.0 Mhz signal The time required to allow the MLCTs to process the GR/GRI messages, perform video switches, and transmit GRI messages is estimated to be under 250 milliseconds for most cases.

The MLCT maintains a wait-for-fast-update timer and disregard-first-update-requests timer for each room in the call. These timers are actually counters that are set to a positive value and decremented once every 250 milliseconds until they reach zero. While positive the timer counter is considered to be active.

When the MLCT transmits a GFUC or GFURI message requesting a fast update from room I it starts both of room I's fast update timers. While the room I's disregard-fast-update-requests timer is active the MLCT will drop, i.e., disregard, all requests from rooms for a fast update from room I. This enables the MLCT to service multiple requests with one fast update. Examples of when multiple requests are serviced by one fast update are:
1. The MLCT switches the video going to several rooms to view the new talker. A fast update from the new talker is pending, but the rooms detect loss of video synchronization and transmit a generate-fast-update-request (GFUR) message to the MLCT before receiving the fast update.
2. Several rooms are viewing the new talker room when that room's outgoing video is disrupted. Each of the rooms viewing the new talker room detects loss of synchronization and transmits a generate-fast-update-request (GFUR) message to the MLCT, but only one fast update is required.

The room's wait-for-fast-update timer should be greater than or equal to the room's disregard-fast-update-requests timer. When the room's disregard-fast-update-requests timer expires the MLCT holds all requests for fast updates, i.e., delays responding to the requests, until the wait-for-fast-update timer expires. In one example, the wait-for-fast update interval is equal to the sum of the disregard and hold intervals.

It is noted, that the room's disregard fast update timer is reinstated when a GRGRI message is received from or for that room. The MLCT also maintains three request fast update flags for each room in the call. This allows separation of the requests for fast updates according to their source. The room's request for fast update flags are:
1. Room I's request-fast-update-received flag is set when the MLCT receives a GFUR message from a room viewing room I or a GFURI message from another MLCT.
2. Room I's request-fast-update-for-video-switch flag is set when the MLCT determines that a fast update from room I is required in order to perform a video switch.
3. Room I's fast-update-expected flag is set when room I is served by another MLCT and one of this MLCT's serving rooms and should be viewing room I. The other MLCT serving room I should generate the fast update automatically. Setting this flag will cause this MLCT to start room I's fast update timers in anticipation of a fast update from that room without actually requesting the fast update.

If the fast-update-expected flag is set for a room served by another MLCT, this MLCT starts that room's two fast update timers, but does not transmit a GFURI message. The MLCT processes the room's request-fast-update-received and request-fast-update-for-video-switch flags as follows:
1. If room I's disregard-fast-update-requests timer is active, then the MLCT clears the request-fast-update-received flag of any room viewing room I. The MLCT does nothing with the request-fast-update-for-video-switch flag of any room viewing room I. These flags are processed later.
2. If room I's disregard-fast-update-requests timer is inactive and wait-for-fast-update timer is active, the MLCT does nothing with the request-fastupdate-received or request-fast-update-for-video-select flags of rooms viewing room I. These flags are processed later.

3. If room I has both fast update timers inactive, the MLCT checks to see if any room viewing room i has their request-fast-update-received or request-fast-update-for-video-select flag set. If a flag is set the MLCT clears the flag and transmits a GFUC/GFURI message.

The Fast Update Generator (FUGEN) task 4704 generates video fast updates from rooms. It generates the required GFUC/GFURI messages to be transmitted to rooms/MLCTs, starts the rooms fast update timers, and posts the FUMON task 4705 to monitor the timers.

The Fast Update Monitor (FUMON) task 4705 operates the room's fast update timer counters. The Video Switch (VSWCH) 4706 task processes the fast updates as they arrive. To this end, broadcast links are dedicated to ensure that the MCLT will be able to transmit any of the required combination of video signals to the other MCLTs. At the time of conference set up the facility administrator module decides how to dedicate each of its broadcast links as described above. The dedication of these broadcast links will not be changed unless the call set up is changed.

In a Sender's Choice call each MLCT requires only one broadcast link. This broadcast link is not dedicated.

In a Viewer's Choice call MLCTs may need more than one broadcast link. The push-to-see (PTS) mode requires that MLCTs be able to transmit any combination of video signals to the rooms. In a Viewer's Choice call the broadcast links are dedicated by the facility administrator module according to following priorities:

1. If the MLCT has enough broadcast links it assigns a broadcast link to each of its serving rooms. In this case all of the other MLCTs always receive video from every room served by this MLCT.
2. If the MLCT has enough broadcast links it assigns a broadcast link to each of the rooms served by the other MLCTs. In this case the MLCT will always be able to transmit the video required for each of the rooms served by other MCLTs.
3. If the MLCT does not have enough broadcast links to satisfy either of two pervious cases, then the MLCT cannot operate properly in the call.

If the MLCT has more than enough broadcast links needed for dedication to the rooms, then it leaves the extra broadcast links undedicated.

The VSWCH task 4706 processes the fast updates when they arrive.

FAST UPDATE GENERATOR (FUGEN) TASK

FIGS. 60 and 61 connected as shown depict a flowchart of the steps performed in the fast update generator (FUGEN) task by controller processor 1006 of FIG. 39. The program is stored in memory 3904 (FIG. 39).

The fast update generator (FUGEN) task initiates the fast update to be generated by the conference room video processor. It generates request fast update (FU) messages to be transmitted to rooms and other MLCTs in the conference. It checks the fast update related flags and timing counters of the rooms to determine if a fast update should be requested. The FUGEN task also starts the room's fast update counters if fast updates are expected.

Accordingly, the FUGEN task is entered via oval 6001. Then, operational block 6002 causes a wait-for-post. Operational block 6003 sets counter J=5. Conditional branch point 6004 tests to determine if room J is active. If the test is false, operational block 6005 clears room J's request fast update received flag, fast update for video select flag and fast updated expected flag. Thereafter, control is transferred to operational block 6006.

If the test in step 6004 is true, i.e., room J is active, conditional branch point 6007 tests to determine if room J's request fast update received flag or fast update for video select flag is set. If the test in step 6007 is false, control is passed to conditional branch point 6008. However, if the test is true, conditional branch point 6009 tests to determine if room J's wait-for-fast-update counter is 0. If the test is false, conditional branch point 6010 tests to determine if room J's disregard-fast-update-requests counter=0. If the test in step 6010 is false, operational block 6011 clears room J's fast update received flag. Thereafter, control is transferred to conditional branch point 6008. If the test in step 6010 is true, control is transferred directly to conditional branch point 6008.

If the test result in step 6009 is true, operational block 6012 clears room J's request fast update received flag, fast update for video select flag and fast update expected flag.

Figure 62:
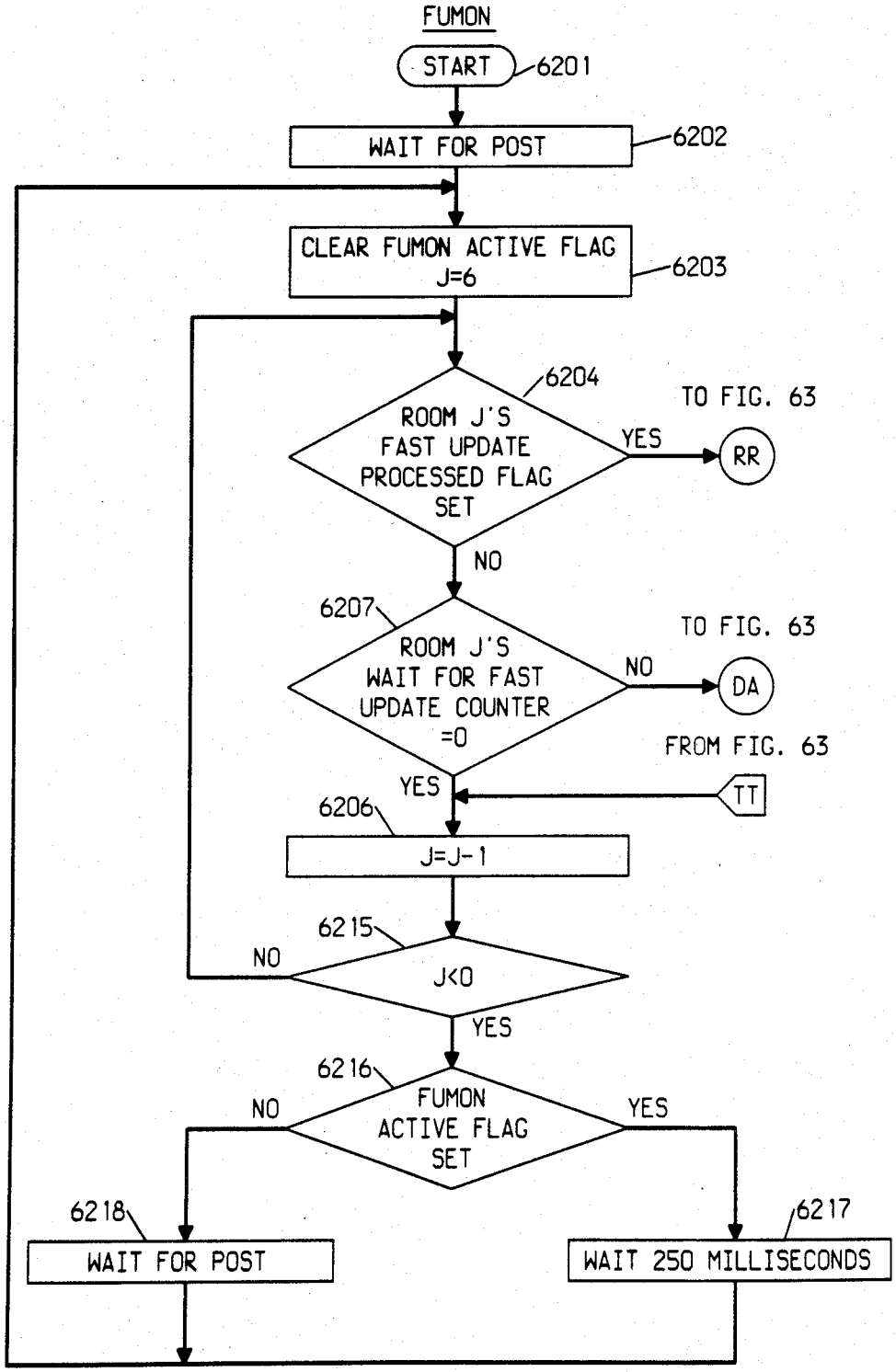
FIGS. 62 and 63 when connected as shown form a flow chart of the steps performed in the fast update monitor (FUMON) program task by control processor 1006 of FIG. 39.
Figure 63:
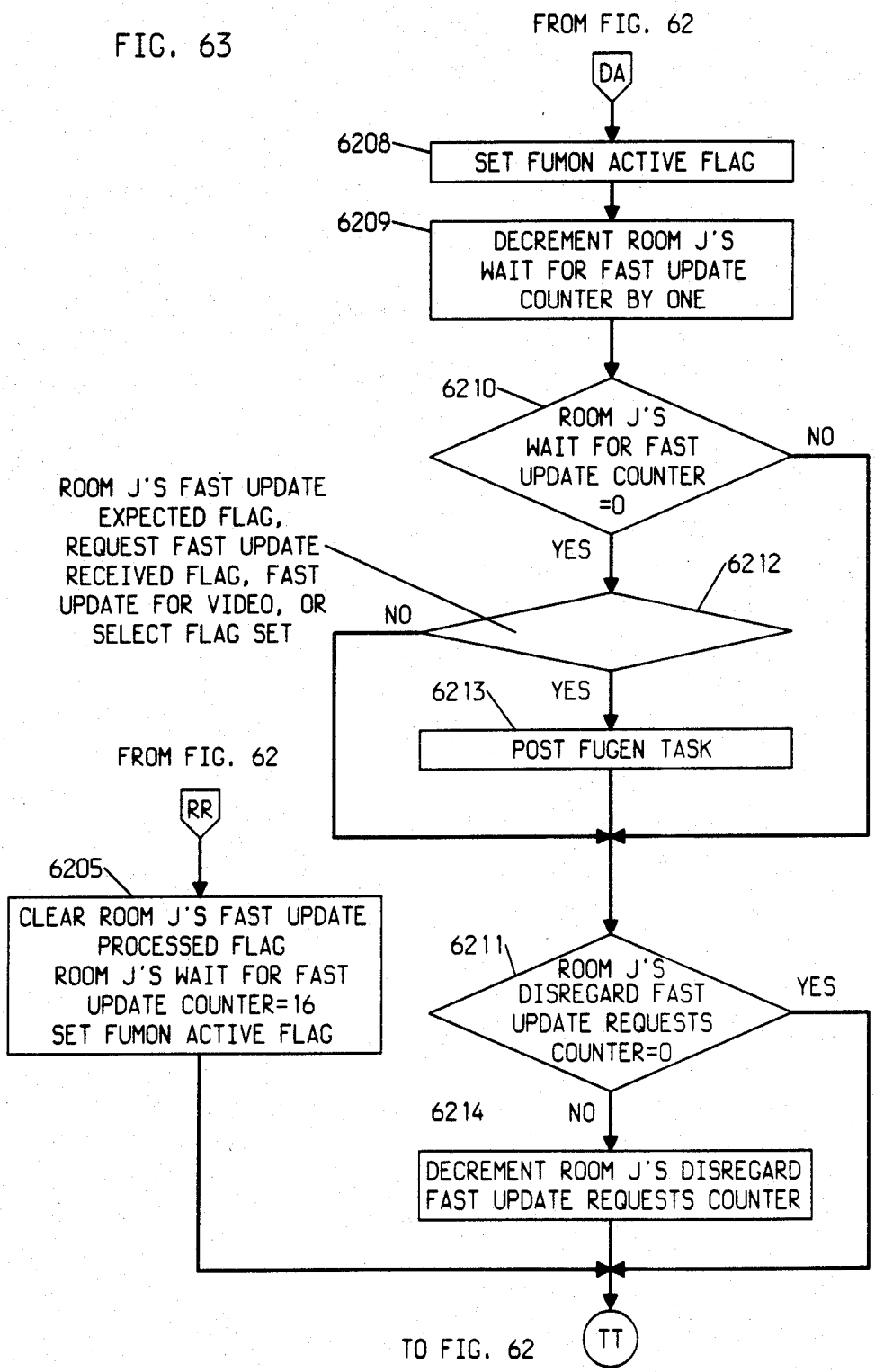

Conditional branch point 6013 tests to determine if room J is served by this MLCT. If the test is true, operational block 6014 causes the GFUC message to be transmitted to room J, sets room J's disregard-fast-update-requests counter=4, and room J's wait-for-fast-update counter =4. Thereafter, control is transferred to operational block 6115. If the test result in 6013 is false, operational block 6016 causes a GFURJ message to be transmitted to the MLCT serving room J, sets room J's disregard-fast-update requests counter=20 and sets room J's wait-for-fast-update counter=20. Then, operational block 6015 causes a post to the fast update monitor (FUMON) task. A flowchart of the FUMON task is shown in FIGS. 62 and 63 and described below. Thereafter, control is transferred to conditional branch point 6008.

Conditional branch point 6008 tests to determine if room J's fast update expected flag is set. If the test is false, control is transferred to operational block 6006. If the test is true, conditional branch point 6017 tests to determine if room J is served by this MLCT. If the test is true, operational block 6018 clears room J's fast update expected flag and transfers control to operational block 6006. If the test in step 6017 is false, operational block 6019 clears room J's fast update expected flag, fast update for video select flag, and request fast update received flag, and then sets room J's disregard-fast-update requests counter=20, wait-for-fast-update counter=20, and posts the FUMON task. Thereafter, control is transferred to operational block 6006.

Operational block 6006 sets counter J=J−1. Conditional branch point 6020 tests to determine if counter J is less than 0. If the test is false, control is transferred to conditional branch point 6004. If the test is true, control is transferred to operational block 6002.

FAST UPDATE MONITOR (FUMON) TASK

FIGS. 62 and 63 are connected as shown depict a flowchart of the steps performed in the fast update monitor (FUMON) task by control processor 1006 of FIG. 39. The program is stored in memory 3904 FIG. 39.

When posted by other tasks, the (FUMON) task enters a loop of predetermined interval, for example, 250 milliseconds, decrementing the fast update (FU) timing counters of the rooms. When a rooms wait-for-fast-update timer expires, i.e., reaches a count of 0 and a fast update is required for a corresponding room video processor, the FUMON task posts the FUGEN task to initiate the fast update. When the fast-update counters of all the rooms in the conference have expired, the FUMON task retires and waits for another post.

Accordingly, the FUMON task is entered via oval 6201. Thereafter operational block 6202 causes a wait-for-post. Operational block 6203 clears the FUMON active flag and sets counter J=6. Conditional branch point 6204 tests to determine if room J's fast update process flag is set. If the test is true, operational block 6205 clears room J's fast update process flag, sets room J's wait-for-fast-update count=16, and sets FUMON task active flag. Thereafter, control is transferred to operational block 6206.

If the test in step 6204 is false, conditional branch point 6207 tests to determine if room J's wait-for-fast-update counter is 0. If the test is true, control transfers directly to operational block 6206. If the test is false, operational block 6208 sets the FUMON active flag. Operational block 6209 decrements room J's wait-for-fast-update counter by one. Conditional branch point 6210 tests to determine if room J's wait-for-fast-update counter is 0. If the test is false, control transfers directly to conditional branch point 6211. If the test is true, conditional branch point 6212 tests to determine if room J's fast update expected flag, request fast update received flag or fast update for video select flag is set. If the test in step 6212 is true, operational block 6213 causes a post to the FUGEN task. A flowchart of the FUGEN task is shown in FIGS. 60 and 61 and is described above. Therafter, control is transferred to conditional branch point 6211.

If the test in step 6212 is false, control transfers directly to conditional branch point 6211. Conditional branch point 6211 tests to determine if room J's disregard-fast-update requests counter is 0. If the test is false, operational block 6214 decrements room J's disregard-fast-update requests counter and transfers control to operational block 6206. If the test in step 6211 is true, control transfers directly to operational block 6206 which sets counter J=J−1.

Conditional branch 6215 tests to determine if J is less than 0. If the test is false, control is transferred to conditional branch point 6204. If the test is true, conditional branch point 6216 tests to determine if the FUMON active flag is set. If the test is true, operational block 6217 causes a wait for 250 milliseconds. Thereafter, control is transferred to operational block 6203. If the test in step 6216 is false, operational block 6218 cases a wait-for-post and transfers control to operational block 6203.

VIDEO SWITCH (VSWCH) TASK

Figure 64:
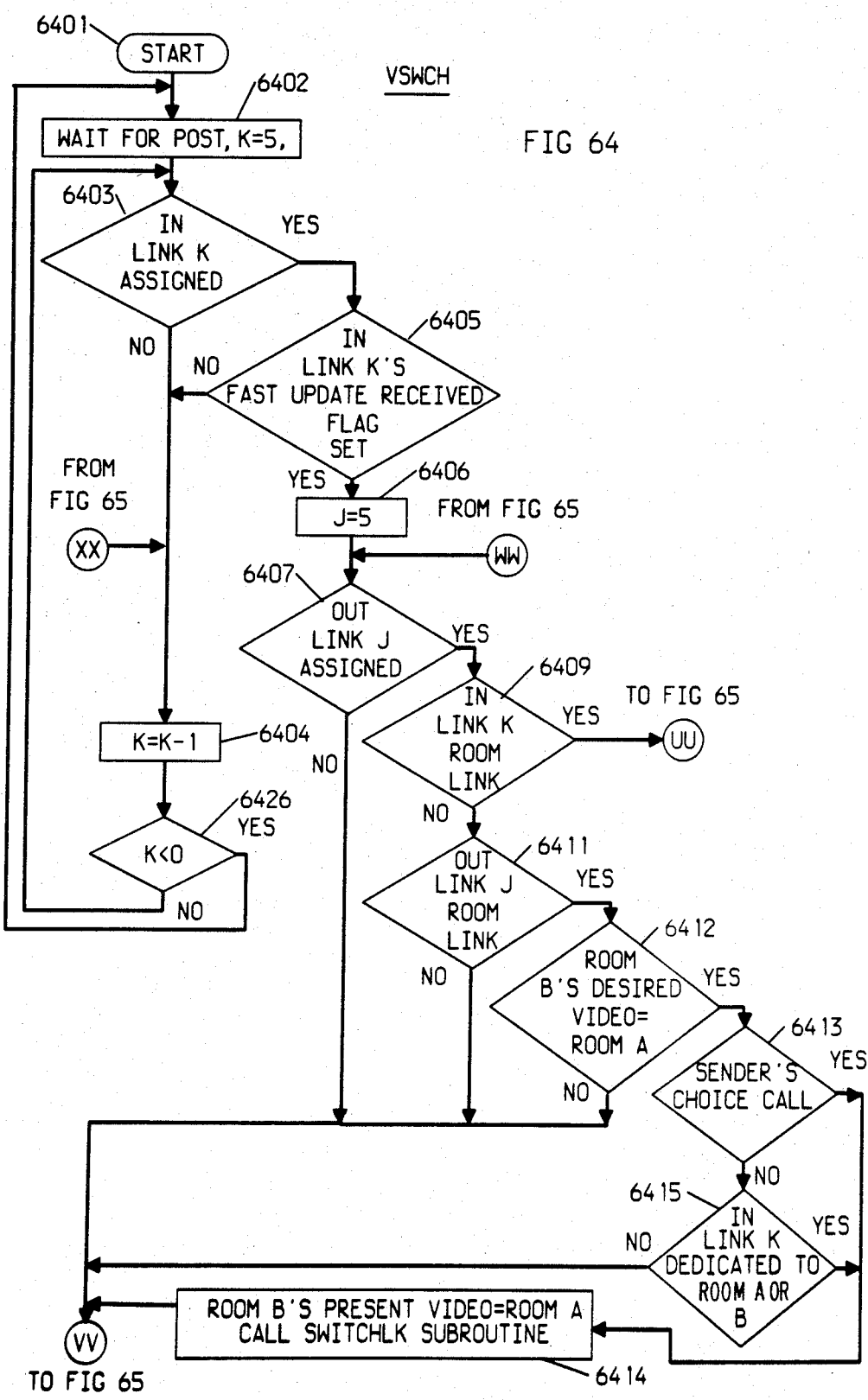
FIGS. 64 and 65 when connected as shown form a flow chart of the steps performed in the video switch (VSWCH) program task by control processor 1006 of FIG. 39.
Figure 65:
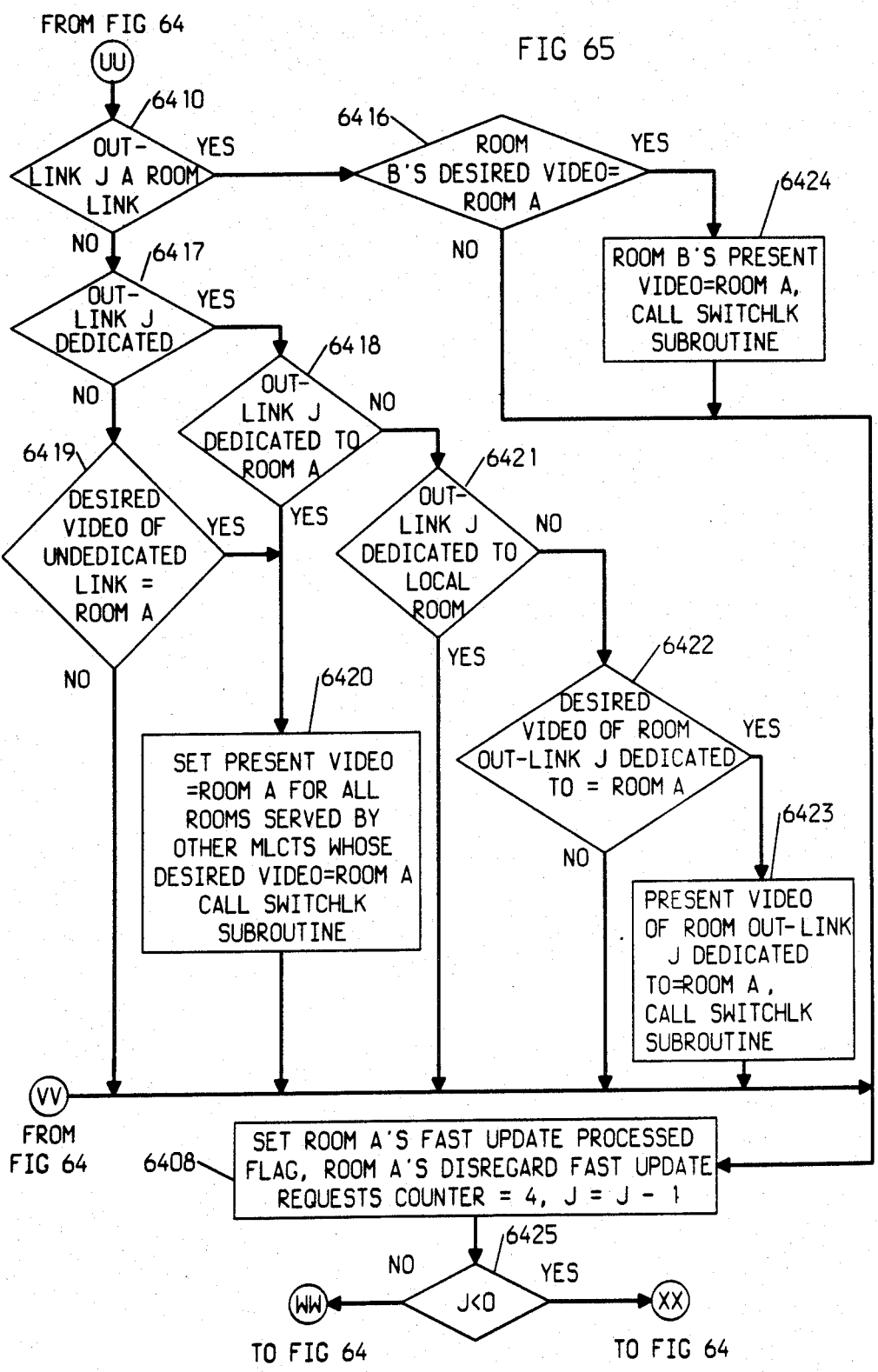

FIGS. 64 and 65 connected as shown depict a flowchart of the steps performed in the video switch task (VSWCH) by control processor 1006 of FIG. 39. The program is stored in memory 3904 of (FIG. 39).

The VSWCH task processes the in-links fast update received flags. The message processing module of control processor 1006 sets this in-links flag and posts the VSWCH task when it receives a get-ready-for-fast-update from room I message (GRI) over that particular in-link. The VSWCH task determines which outgoing links should be transmitting the particular in-links video signal and notifies the microprocessor system 101 if a video switch is required. The VSWCH task also transmits a GRI message over each of those outgoing links transmitting the particular in-links video, sets the fast update processed flag for room I, initiates the fast update disregard counter for room I and posts the FUMON task described in relationship to FIGS. 62 and 63.

Accordingly, the VSWCH task is entered via oval 6401 and, then, operational block 6402 causes a wait for post and sets counter K=5. Conditional branch point 6403 tests to determine if in-link K is assigned. If the test is false, control is transferred to operational block 6404. If the test is true, conditional branch point 6405 tests to determine if in-links K's fast update received flag is set. If the test is false, control is transferred directly to operational block 6404. If the test in step 6405 is true, operational block 6406 sets counter J=5.

Conditional branch point 6407 tests to determine if outgoing link J is assigned. If the test is false, control is transferred to operational block 6408. If the test is true, conditional branch point 6409 tests to determine if in-link K is a room link. If the test is true control is transferred to conditional branch point 6410. If the test is false, conditional branch point 6411 tests to determine if out-link J is a room link. If the test is false, control is transferred to operational block 6408. If the test is true, conditional branch 6412 tests to determine if room B's desired video=room A. Room A is defined as the room originating the present video transmitted on in-link K. Room B is defined as the room that out-link J is dedicated to.

If the test in step 6412 is false, control is transferred to operational block 6408. If the test in step 6412 is true, conditional branch point 6413 tests to determine if the MLCT is operating in a Sender's choice conference mode. If the test is true, control is transferred to operational block 6414. If the test is false, conditional branch point 6415 tests to determine if in-link K is dedicated to room A or B. If the test is true, operational block 6414 sets room B's present video=to room A and calls the SWITCHLK sub-routine. The flowchart of the SWITCHLK sub-routine is described in FIG. 66 and described below. Thereafter, control is transferred to operational block 6408. If the test in step 6415 is false, control is transferred to operational block 6408.

Conditional branch point 6410 tests to determine if out-link J is a room link. If the test is true, control is transferred to conditional branch point 6416. If the test is false, conditional branch point 6417 tests to determine if out-link J is dedicated. If the test is true, control is transferred to conditional branch point 6418. If the test is false, conditional branch point 6419 tests to determine if the desired video of the undedicated MLCT broadcast links=room A. If the test is false, control is transferred to operational block 6408. If the test is true, control is transferred to operational block 6420. Operational block 6420 sets the present video=to room A for all rooms served by other MLCTs who have their desired video=to room A and calls the SWITCHLK sub-routine. Control is then transferred to operational block 6408.

Conditional branch point 6418 tests to determine if out-link J is dedicated to room A. If the test result is true, control is transferred to operational block 6420 as described above and then to operational block 6408.

However, if the test result is false, control is transferred to conditional branch point 6421 which tests to determine if out-link J is dedicated to a room served by this MLCT. If the test is true, control is transferred to operational block 6408. If the test is false, conditional branch point 6422 tests to determine if the desired video of the room that out-link J is dedicated to is room A. If the test is false, control is transferred to operational block 6408. If the test is true, operational block 6423 sets the present video of the room that out-link J is dedicated to to room A and calls the SWITCHLK sub-routine. Thereafter, control is transferred to operational block 6408.

Operational block 6408 sets room A's fast update processed flag and room A's disregard-fast-update-requests counter=4 and sets counter J=J−1. Conditional branch point 6425 tests to determine if counter J is less than 0. If the test is false, control is transferred to conditional branch 6407. If the test is true, control is transferred to operational block 6404.

Operational block 6404 sets counter K=K−1. Conditional branch point 6426 tests to determine if K is less than 0. If the test is false, control is transferred to conditional branch point 6403. If the test is true, control is transferred to operational block 6402.

Figure 66:
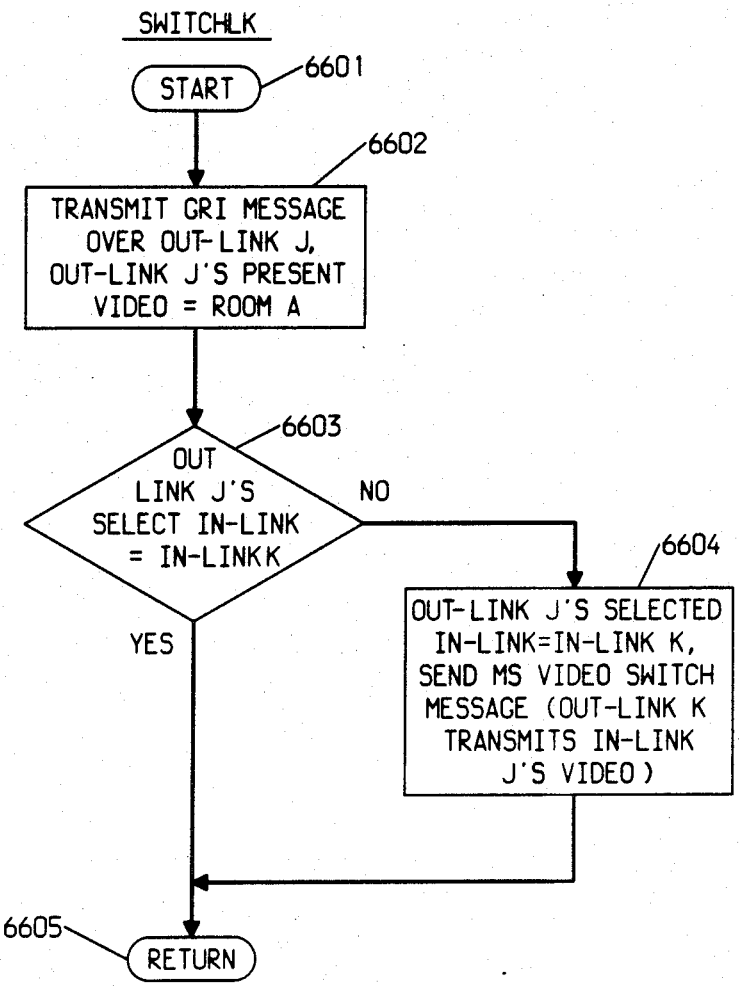
FIG. 66 is a flow chart of the SWITCHLK sub-routine used in the VSWCH program task of FIGS. 64 and 65.

FIG. 66 shows a flowchart of the steps performed in the (SWITCHLK) sub-routine used in the VSWCH task program and performed by control processor 1006 of FIG. 39. The program is stored in memory 3904 (FIG. 39).

Subroutine SWITCHLK selects in-link K's video for transmission on out-link J.

Accordingly, the sub-routine is entered via oval 6601. Thereafter, operational block 6602 causes a GRI message to be transmitted over out-link J and sets out-link J's present video=to room A. Conditional branch point 6603 tests to determine if out-link J selected in-link=in-link K. If the test is false, operational block 6604 sets out-link J's selected in-link to in-link K and sends the microprocessor system a message to perform a video switch so that out-link K transmits in-link K's video signal. Control is then transferred back to the VSWCH task via oval 6605. If the test in step 6603 is true, control is transferred directly back to the VSWCH task via oval 6605.

FIGS. 67 and 68 when connected as shown form a flow chart of steps performed in the facility administrator task (FADMIN) 4708 (FIG. 47) by control processor 1006 of FIG. 39. The program is stored in memory 3904 (FIG. 39).

Briefly, the FADMIN task maintains the active and muted states of the conference rooms assigned to the MLCT, maintains an available rooms list (AR) and performs the dedication of outgoing transmission links, i.e., paths, to other MLCTs.

Accordingly, the FADMIN task is entered via oval 6701. Thereafter, control is transferred to operational block 6702 which executes a wait for post, initializes variables, and sets counter J=5.

Operational block 6703 declares outgoing link J active if it is assigned and control channel communication is established. Otherwise, outgoing link J is declared inactive. It also declares incoming link J active if it is assigned and the control channel communication is established. Otherwise, incoming link J is declared inactive.

Conditional branch 6704 tests to see if incoming link J and outgoing link J are assigned to a room. If the test result is true, control is passed to operational block 6705 which sets that room's muted state to the same state as incoming link J's muted state. Operational block 6705 also marks that room as active if both incoming link J and outgoing link J are active. Otherwise, it marks that room inactive. Thereafter, control is transferred to operational block 6706. If the test result of conditional branch point 6704 is false, control is transferred to conditional branch point 6707.

Conditional branch point 6707 tests to determine if either incoming link J's or outgoing link J's active state was just changed by operational block 2703. If the test result is false, control is passed to operational block 6706. If the test result is true, control is passed to operational block 6708.

Operational block 6708 generates a MSTAT message to be sent to the other MLCTs and post the NTP, NGP, and VSEL tasks. Thereafter, control is transferred to operational block 6706.

Operational block 6706 decrements counter J by one.

Conditional branch point 6709 tests to determine if counter J is less than zero. If the test result is false, control is passed to operational block 6703 and steps 6703 through 6708 are repeated until conditional branch point 6709 yields a true result. If the test result of conditional branch point 6709 is true, control is passed to operational block 6710 which forms the available rooms list. A room is determined to be available if it is assigned and is active.

Conditional branch point 6711 tests to determine if the available rooms list has changed. If the test is true control is passed to operational block 6712. Operational block 6712 generates an MSTAT message to be sent to the other MLCTs, generates an AR message to send to the rooms, and posts the NTP, NGP, and VSEL tasks. Control is then passed to conditional branch point 6713. If the test result of conditional branch point 6711 is false, control is transferred directly to conditional branch point 6713.

Conditional branch 6713 tests to determine if the MLCT is in the stand alone condition. If the test result is true, operational block 6714 undedicates all broadcast links. Thereafter, control is returned to operational block 6702. If the test result of conditional branch point 6713 is false, control is transferred to conditional branch point 6716.

Conditional branch point 6716 tests to determine if the number of broadcast links is sufficient for dedicating the links to the rooms assigned to this MLCT. If the test result is true, operational block 6717 dedicates a broadcast link to each room assigned to this MLCT and undedicates any remaining broadcast links. Thereafter, control is passed to operational block 6702. If the test result of conditional branch point 6716 is false, control is transferred to conditional branch point 6718.

Conditional branch point 6718 tests to determine if the number of broadcast links is sufficient for dedicating the links to the rooms assigned to other MLCTs. If the test result is true, operational block 6719 dedicates a broadcast link to each room served by another MLCT and undedicates any remaining broadcast links. Thereafter, control is passed to operational block 6702. If the test result of conditional branch point 6718 is false operational block 6720 sends a message to the MS 101 indicating the number of broadcast links is insufficient. Thereafter, control is passed to operational block 6702.

What is claimed is:

1. In apparatus for transmitting video signals to a plurality of remote locations, wherein said remote locations include at least one conference location and each of said conference locations includes means responsive to a fast picture update command signal for generating fast video picture update information, responsive to said fast picture update command signal for generating a get ready control signal prior to transmitting the fast video picture update information, means for generating a fast video picture update command signal, means for transmitting said fast video picture update command signal to a selected conference location, and means responsive to said get ready control signal from the selected conference location for controllably switching the transmission of a video signal from said selected conference location to prescribed ones of said remote locations, wherein a switch of the video signal being transmitted is delayed until said get ready control signal from the selected conference location is received by this apparatus.

2. The apparatus as defined in claim 1 wherein said conference locations each generate said get ready control signal a predetermined interval prior to transmitting said fast video picture update information.

3. The apparatus as defined in claim 1 wherein said switching means includes means for initiating generation of said fast video picture update command signal when a switch of the video signal being transmitted is required.

4. The apparatus as defined in claim 1 wherein each of said conference locations further includes means for generating a fast video picture update request message, and the apparatus further includes means for disregarding fast video picture update request messages for said selected conference location from the other conference locations during a first predetermined interval initiated upon generation of a fast video picture update command signal to be transmitted to said selected conference location.

5. The apparatus as defined in claim 4 further including means for controllably selecting video signals to be transmitted to said remote locations, and first means for delaying generation of a fast video picture update command signal to be transmitted to said selected conference location in response to fast video picture update request message for said selected conference location received from other locations until expiration of a second predetermined interval beginning upon expiration of said first interval.

6. The apparatus as defined in claim 5 further including second means for delaying generation of a fast video picture update command signal to be transmitted to said selected conference location in response to video selection requests from said video signal selecting means for a switch of the video signal to be transmitted from said selected conference location to other locations until expiration of a third predetermined interval initiated upon generation of said fast video picture update command signal.

7. The apparatus as defined in claim 6 wherein said third predetermined interval equals the sum of said first and second intervals.

8. In apparatus for transmitting video signals to a plurality of remote locations, wherein the remote locations include at least one conference location and can include other apparatus for transmitting video signals to a plurality of remote locations having at least one conference location to be included in the conference, each of said conference locations including means for generating fast video picture update signals, and means for generating a manual override signal to control the selection of a video signal to be transmitted to that conference location from one of the other conference locations and for generating a manual override release signal to enable the apparatus to select the video signal to be transmitted to the conference location, said manual override signal and said manual override release signal indicating either a manual or an automatic video select mode for the conference location, means for transmitting a video select mode for each of the conference locations assigned to this apparatus to the other apparatus in the conference, means for receiving the video select modes of conference locations assigned to the other apparatus in the conference, means for storing the video select modes of all the conference locations in a conference, means responsive to said manual override signal and to said manual override release signal for controllably selecting the video signal to be transmitted to said remote locations and for indicating the video transmission state for each conference location, said controllably selecting means including means for automatically selecting the video signal to be transmitted to individual ones of the remote locations, means responsive to said manual override signal to inhibit the automatic selection of the video signal to be transmitted to a corresponding conference location and for controlling the selection of a video signal to be transmitted to said corresponding conference location and means responsive to said manual override release signal for enabling operation of said means for automatically selecting, means for storing said video transmission state for each conference location, and means for utilizing said stored video transmission states and said stored video select modes to determine the fast video picture update signals required from conference locations assigned to this apparatus.

9. The apparatus as defined in claim 8 wherein said means for utilizing includes means for determining from said stored video select modes the video signal to be transmitted to the remote locations, means for comparing the video signals to be transmitted to the remote locations to the video signals presently being transmitted to the remote locations and means reponsive to the results of said comparison for generating fast video picture update command signals for conference locations assigned to this apparatus when there is a difference in said comparison.

10. The apparatus as defined in claim 8 wherein each of the remote locations is connected to this apparatus by dedicated outgoing transmission paths and dedicated incoming transmission paths and each conference location generates a get ready control signal prior to generating a fast video picture update, and the apparatus further including means for storing the identity of conference locations to which the outgoing transmission paths are dedicated and means for storing the identity of the conference locations to which the incoming transmission paths are dedicated and wherein said utilizing means is responsive to said get ready control signal for employing said stored dedication identities, said stored video select modes and said stored video transmission states to determine which of said outgoing transmission paths, if any, are to be selected for transmitting said selected video signal.

11. The apparatus as defined in claim 10 wherein said utilizing means further includes means for storing the video transmission state for each of said outgoing transmission paths and means for comparing said stored outgoing transmission paths video transmission states to said outgoing transmission paths selected for transmitting said selected video signal to determine whether a switch of the video signals being transmitted is required, and means for switching said video signals to said outgoing transmission paths determined to require a switch.

* * * * *